Sept. 27, 1960 R. D. WILLIAMS 2,954,440

COORDINATE SWITCHING ARRANGEMENT

Filed May 14, 1958 53 Sheets-Sheet 1

INVENTOR
R.D. WILLIAMS
BY
S.L. Turner
ATTORNEY

Sept. 27, 1960 R. D. WILLIAMS 2,954,440

COORDINATE SWITCHING ARRANGEMENT

Filed May 14, 1958 53 Sheets-Sheet 2

INVENTOR
R.D. WILLIAMS
BY
[signature]
ATTORNEY

COORDINATE SWITCHING ARRANGEMENT

Filed May 14, 1958

53 Sheets-Sheet 3

INVENTOR
R. D. WILLIAMS
BY S. Turner
ATTORNEY

INVENTOR
R.D. WILLIAMS
BY
[signature]
ATTORNEY

INVENTOR
R.D. WILLIAMS
BY
Sr Turner
ATTORNEY

Sept. 27, 1960 R. D. WILLIAMS 2,954,440

COORDINATE SWITCHING ARRANGEMENT

Filed May 14, 1958 53 Sheets-Sheet 6

INVENTOR
R.D. WILLIAMS
BY
[signature]
ATTORNEY

INVENTOR
R. D. WILLIAMS
BY
[signature]
ATTORNEY

COORDINATE SWITCHING ARRANGEMENT

Filed May 14, 1958 53 Sheets-Sheet 8

INVENTOR
R.D. WILLIAMS
BY
ATTORNEY

Sept. 27, 1960 R. D. WILLIAMS 2,954,440

COORDINATE SWITCHING ARRANGEMENT

Filed May 14, 1958 53 Sheets-Sheet 9

INVENTOR
R.D. WILLIAMS
BY [signature]
ATTORNEY

COORDINATE SWITCHING ARRANGEMENT

Filed May 14, 1958 53 Sheets-Sheet 10

INVENTOR
R. D. WILLIAMS
BY Turner
ATTORNEY

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 12

INVENTOR
R.D. WILLIAMS
BY
[signature]
ATTORNEY

Sept. 27, 1960 R. D. WILLIAMS 2,954,440
COORDINATE SWITCHING ARRANGEMENT
Filed May 14, 1958 53 Sheets-Sheet 13

INVENTOR
R. D. WILLIAMS
BY
S. Turner
ATTORNEY

INVENTOR
R.D. WILLIAMS
BY
S. Turner
ATTORNEY

INVENTOR
R.D. WILLIAMS
BY
[signature]
ATTORNEY

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 17

INVENTOR
R. D. WILLIAMS
BY
ATTORNEY

Sept. 27, 1960 R. D. WILLIAMS 2,954,440

COORDINATE SWITCHING ARRANGEMENT

Filed May 14, 1958 53 Sheets-Sheet 18

INVENTOR
R.D. WILLIAMS
BY *[signature]*
ATTORNEY

Sept. 27, 1960 R. D. WILLIAMS 2,954,440

COORDINATE SWITCHING ARRANGEMENT

Filed May 14, 1958 53 Sheets-Sheet 19

INVENTOR
R.D. WILLIAMS
BY
[signature]
ATTORNEY

COORDINATE SWITCHING ARRANGEMENT

Filed May 14, 1958 53 Sheets-Sheet 20

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 21

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 22

INVENTOR
R. D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 23

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958

53 Sheets-Sheet 24

INVENTOR
R.D. WILLIAMS
BY
[signature]
ATTORNEY

INVENTOR
R. D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 26

INVENTOR
R. D. WILLIAMS
BY
[signature]
ATTORNEY

INVENTOR
R.D. WILLIAMS
BY
[signature]
ATTORNEY

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 29

INVENTOR
R. D. WILLIAMS
BY
[signature]
ATTORNEY

INVENTOR
R. D. WILLIAMS
BY
Sn Turner
ATTORNEY

INVENTOR
R. D. WILLIAMS
BY
[signature]
ATTORNEY

Sept. 27, 1960 R. D. WILLIAMS 2,954,440
COORDINATE SWITCHING ARRANGEMENT
Filed May 14, 1958 53 Sheets-Sheet 32

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 33

INVENTOR
R. D. WILLIAMS
BY
[signature]
ATTORNEY

INVENTOR
R.D. WILLIAMS
BY
[signature]
ATTORNEY

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 36

INVENTOR
R. D. WILLIAMS
BY
S. Turner
ATTORNEY

Sept. 27, 1960 R. D. WILLIAMS 2,954,440

COORDINATE SWITCHING ARRANGEMENT

Filed May 14, 1958 53 Sheets-Sheet 37

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 38

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 39

INVENTOR
R. D. WILLIAMS
BY
[signature]
ATTORNEY

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 41

INVENTOR
R. D. WILLIAMS
BY
[signature]
ATTORNEY

INVENTOR
R. D. WILLIAMS
BY [signature]
ATTORNEY

INVENTOR
R.D. WILLIAMS
BY [signature]
ATTORNEY

INVENTOR
R. D. WILLIAMS
BY
[signature]
ATTORNEY

INVENTOR
R. D. WILLIAMS
BY [signature]
ATTORNEY

INVENTOR
R. D. WILLIAMS
BY
[signature]
ATTORNEY

INVENTOR
R. D. WILLIAMS
BY *[signature]*
ATTORNEY

INVENTOR
R.D. WILLIAMS
BY
[signature]
ATTORNEY

INVENTOR
R.D. WILLIAMS
BY
[signature]
ATTORNEY

Sept. 27, 1960 R. D. WILLIAMS 2,954,440

COORDINATE SWITCHING ARRANGEMENT

Filed May 14, 1958 53 Sheets-Sheet 50

INVENTOR
R. D. WILLIAMS
BY [signature]
ATTORNEY

Sept. 27, 1960 R. D. WILLIAMS 2,954,440

COORDINATE SWITCHING ARRANGEMENT

Filed May 14, 1958 53 Sheets-Sheet 51

INVENTOR
R. D. WILLIAMS
BY
[signature]
ATTORNEY

INVENTOR
R.D. WILLIAMS
BY
[signature]
ATTORNEY

INVENTOR
R. D. WILLIAMS
BY [signature]
ATTORNEY 2,954,440
Patented Sept. 27, 1960

2,954,440

COORDINATE SWITCHING ARRANGEMENT

Robert D. Williams, Parsippany-Troy Hills, N.J., assignor to Bell Telephone Laboratories, Incorporated, New York, N.Y., a corporation of New York Filed May 14, 1958, Ser. No. 735,157

16 Claims. (Cl. 179—22)

The present invention relates generally to switching arrangements and particularly to coordinate switching arrangements, such as the well-known crossbar type, wherein the switching apparatus comprises a coordinate array of overlying horizontal and vertical links and wherein switch control means is selectively employed to interconnect at the crosspoint thereof a selected pair or pairs of vertical and horizontal links, it being appreciated that the words "horizontal" and "vertical" are used in a generic sense to indicate any sets of overlying links regardless of their geometric relationship, and that the use of these words herein is not intended to limit the scope of the invention to the well-known rectangular coordinates found in the usual crossbar switches.

It is generally the case in the use of coordinate switches, such as in crossbar systems, to employ common control equipment, such as a marker, to be used repeatedly for very short work intervals (usually referred to as holding times) to effect various switching operations, a number of which for any one call through the system may involve different selective control of the same switch or switches. For instance, it is usual at the start of a call through a telephone system for a marker (or equivalent) to effect a connection of a calling party to a register of some sort whereby dial tone may be supplied thereto, and whereby called digits dialed thereby may be registered. Such a connection uses a path through a coordinate switch in a crossbar system. When the register has received sufficient information from the calling party, the marker is again sized to effect another switching operation, which may be merely an intermediate step in a chain of switch manipulations. It is a convenient and economical procedure for a marker, for instance, to be permitted to reuse a switch link if it can. For example, when the so-called "dial tone job" is finished, the register is usually dismissed after having called in a marker to complete the desired connection. Instead of releasing the switch connection used for the dial tone job, it would be convenient and prudent to reuse the dial tone switch connection if possible, as part of the connection completion job, etc.

It is the general object of the present invention to permit such switch link reuse in a coordinate system. Generally speaking, permitting the reuse of links through a coordinate switch or switches is not new; however, the present invention has for its general object to provide improved means whereby this reuse is realized.

The usual prior art technique of providing for switch link reuse in a coordinate system is to identify the desired link, register its identity in common control equipment, transfer this registration around wherever it is needed, and use this memory registration as the means whereby the common control equipment can reuse it. This technique inherently involves additional registering means, perhaps in a multiple of circuits, additional control conductors, etc. but, while accomplishing the end result, entails apparatus, etc. which represent initial plant investment and maintenance expense.

It is a particular object of the present invention to use part of the coordinate switch as the link use memory and to arrange relatively few control conductors between the switch and the common control equipment.

A general feature of the invention whereby the foregoing objects are attained is the provision of the well-known coordinate switch including horizontal utility links and vertical utility links, one set overlying the other at crosspoints corresponding to respective coordinates thereof and including switch control means selectively operable to interconnect at the crosspoint thereof a selected pair or pairs of vertical and horizontal links, and the provision on the same switch of a separate horizontal control link corresponding to each horizontal utility link and a separate vertical control link overlying the horizontal control links at crosspoints corresponding to respective coordinates thereof, and circuits controlled by the switch control means to interconnect at the crosspoint thereof the vertical control link to the one of the horizontal control links corresponding to the horizontal utility link of the said selected pair.

A particular feature of the invention, as applied to the usual coordinate switch having select magnets corresponding to horizontal links and hold magnets corresponding to vertical links, is the provision of a separate memory hold magnet for the vertical control link, whereby upon the operation of a select magnet to select a horizontal utility link, the corresponding horizontal control link will be selected, and upon the operation of a hold magnet to interconnect a corresponding vertical utility link to the selected horizontal utility link, the memory hold magnet is operated to interconnect the vertical control link with the said corresponding horizontal control link. As long as the hold magnets are operated, the closed control link crosspoint is a permanent registration of the horizontal utility link in use. A few control leads of the common control equipment selectively manipulated by the control link crosspoints provides all of the information needed for a reuse of the horizontal utility link.

Other features of the invention will be apparent from the subsequent detailed description of an exemplary embodiment thereof when taken in connection with the drawings.

Still other features of the disclosed embodiment are disclosed and claimed in Patent 2,949,506 to H. H. Abbott, R. O. Rippere, R. D. Williams and O. H. Williford of August 16, 1960, in Patent 2,904,637 to R. D. Williams of September 15, 1959, and in application Serial No. 735,159 of H. H. Abbott, R. O. Rippere, L. D. Schmidt and R. D. Williams filed on May 14, 1958.

Figure 4:
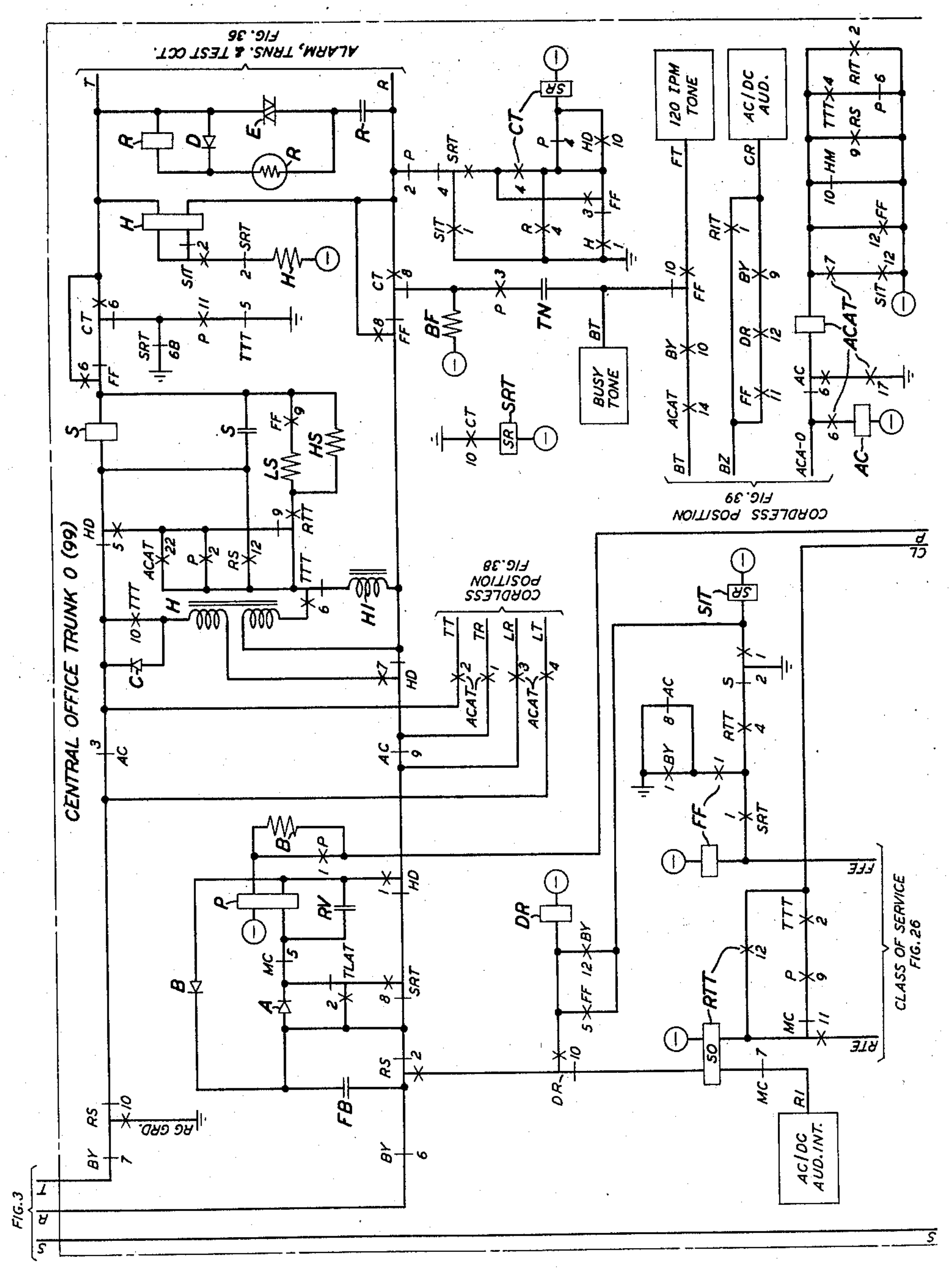
Figure 5:
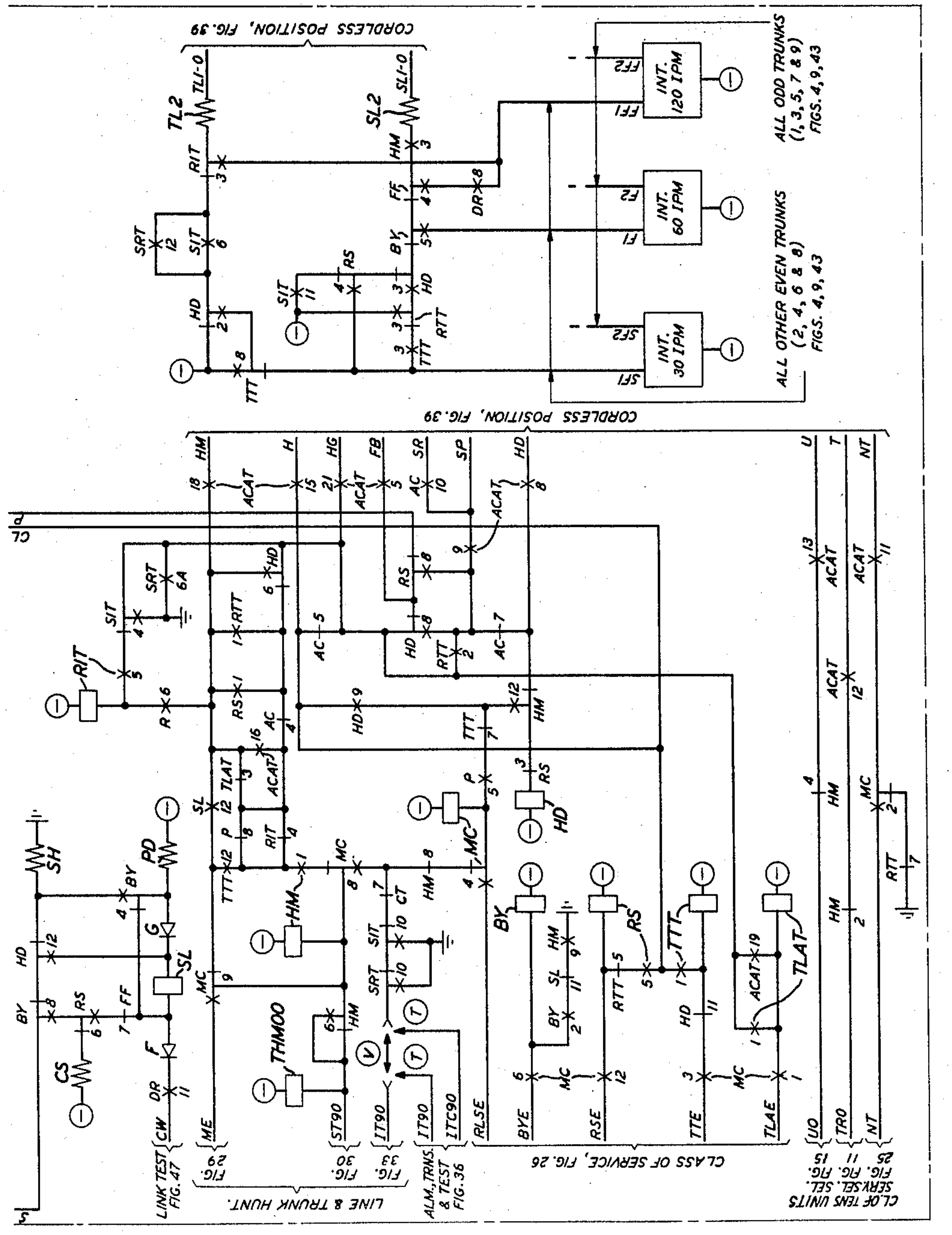
Figure 9:
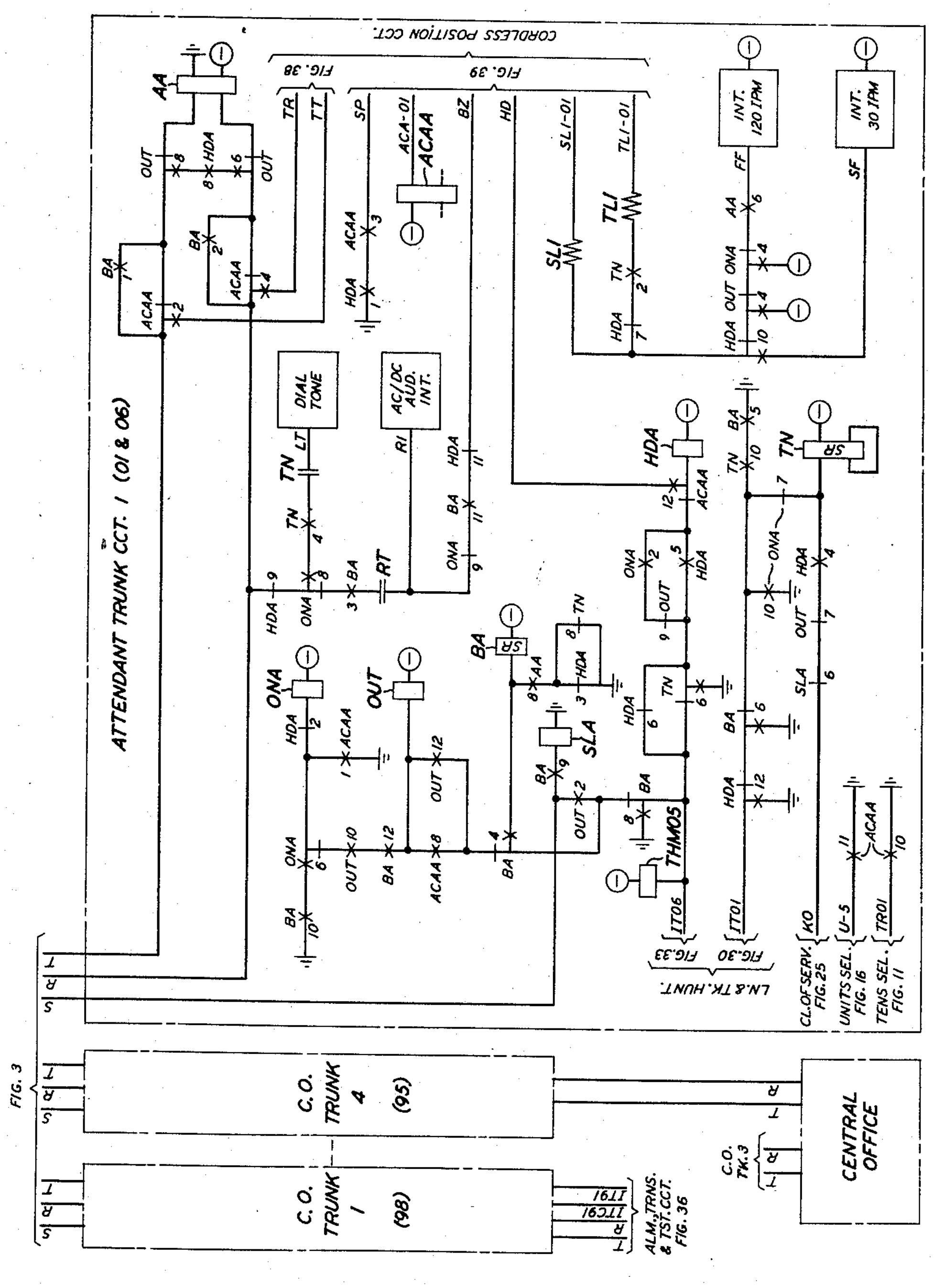
Figure 13:
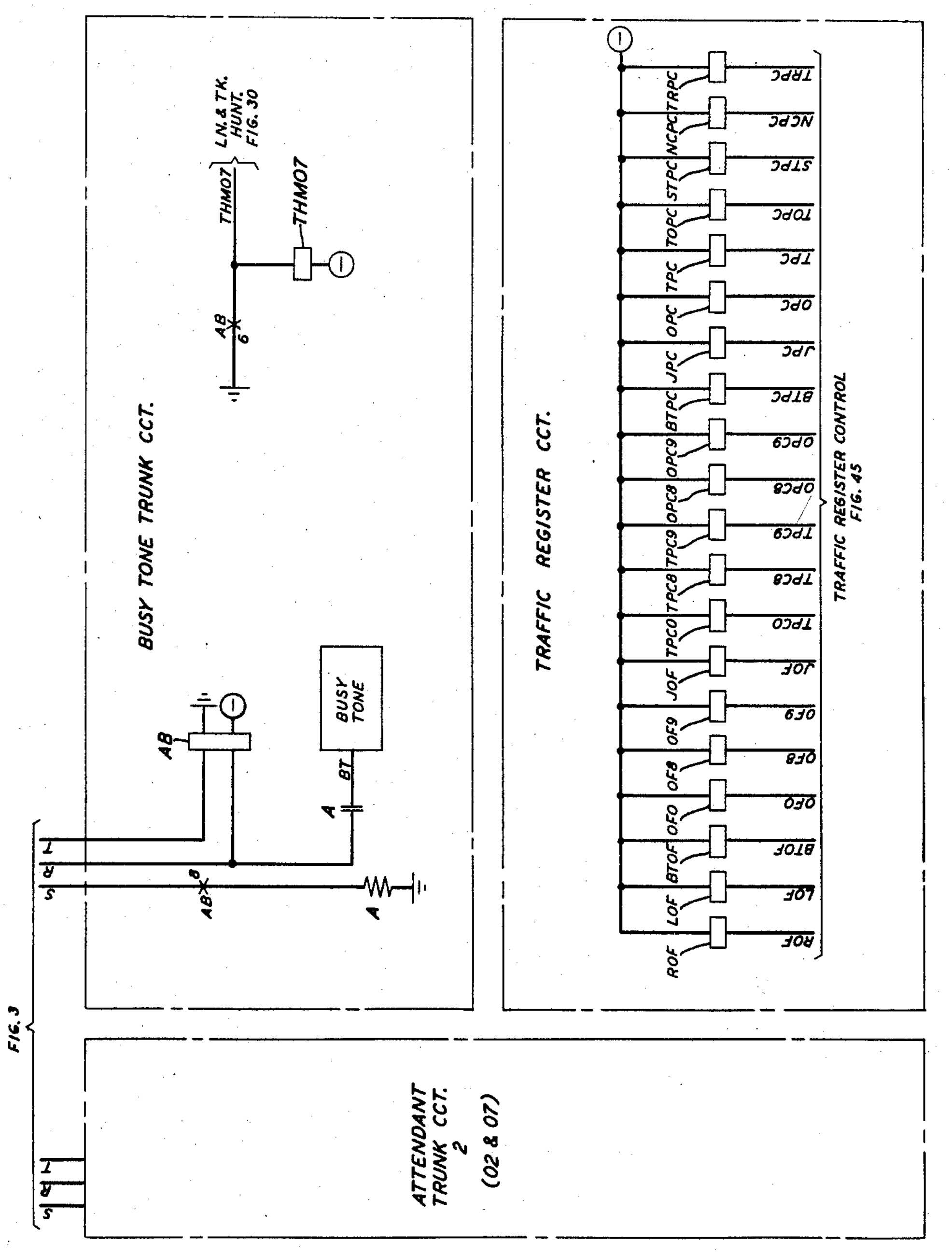
Figure 14:
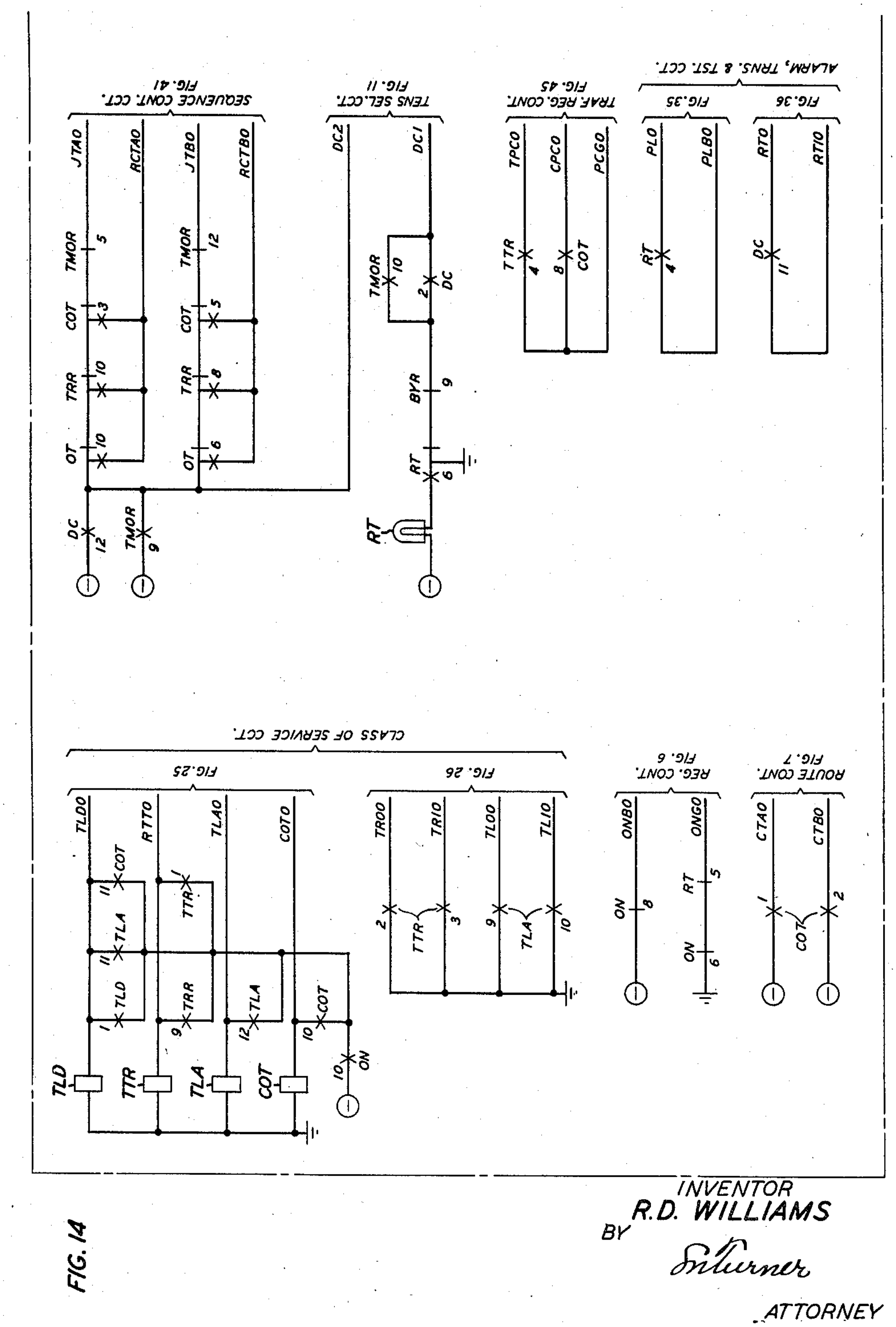
Figure 18:
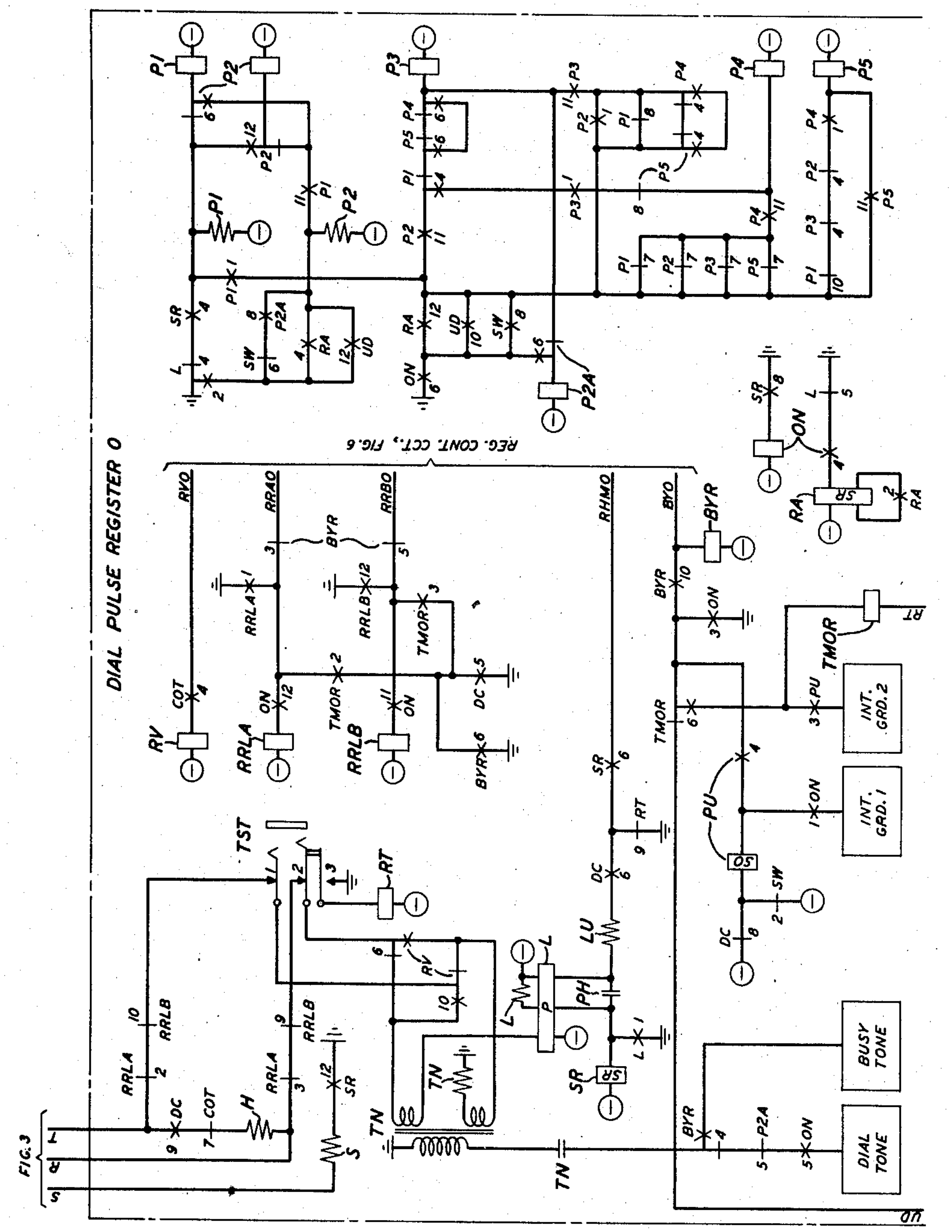
Figure 19:
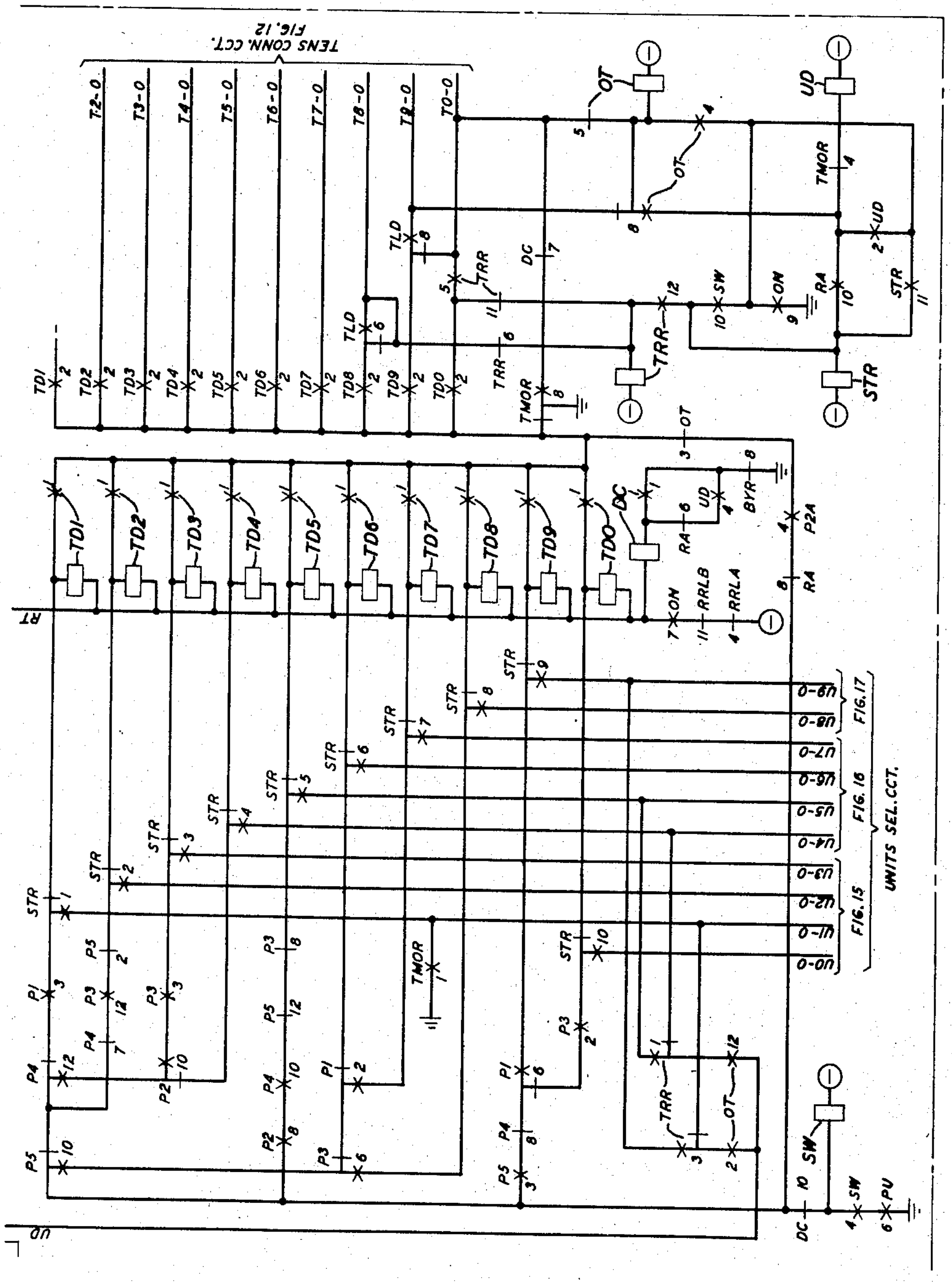
Figure 24:
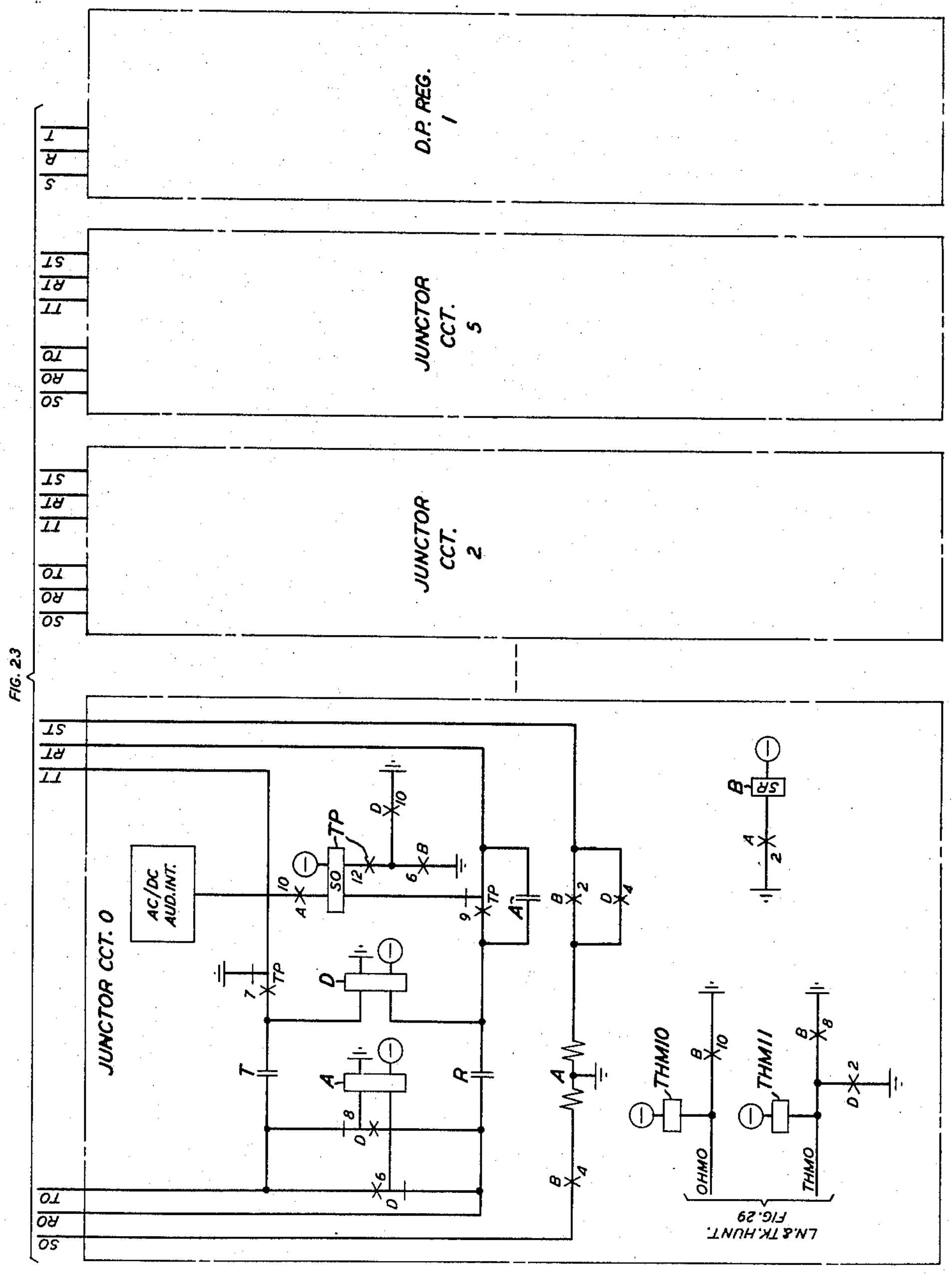
Figure 28:
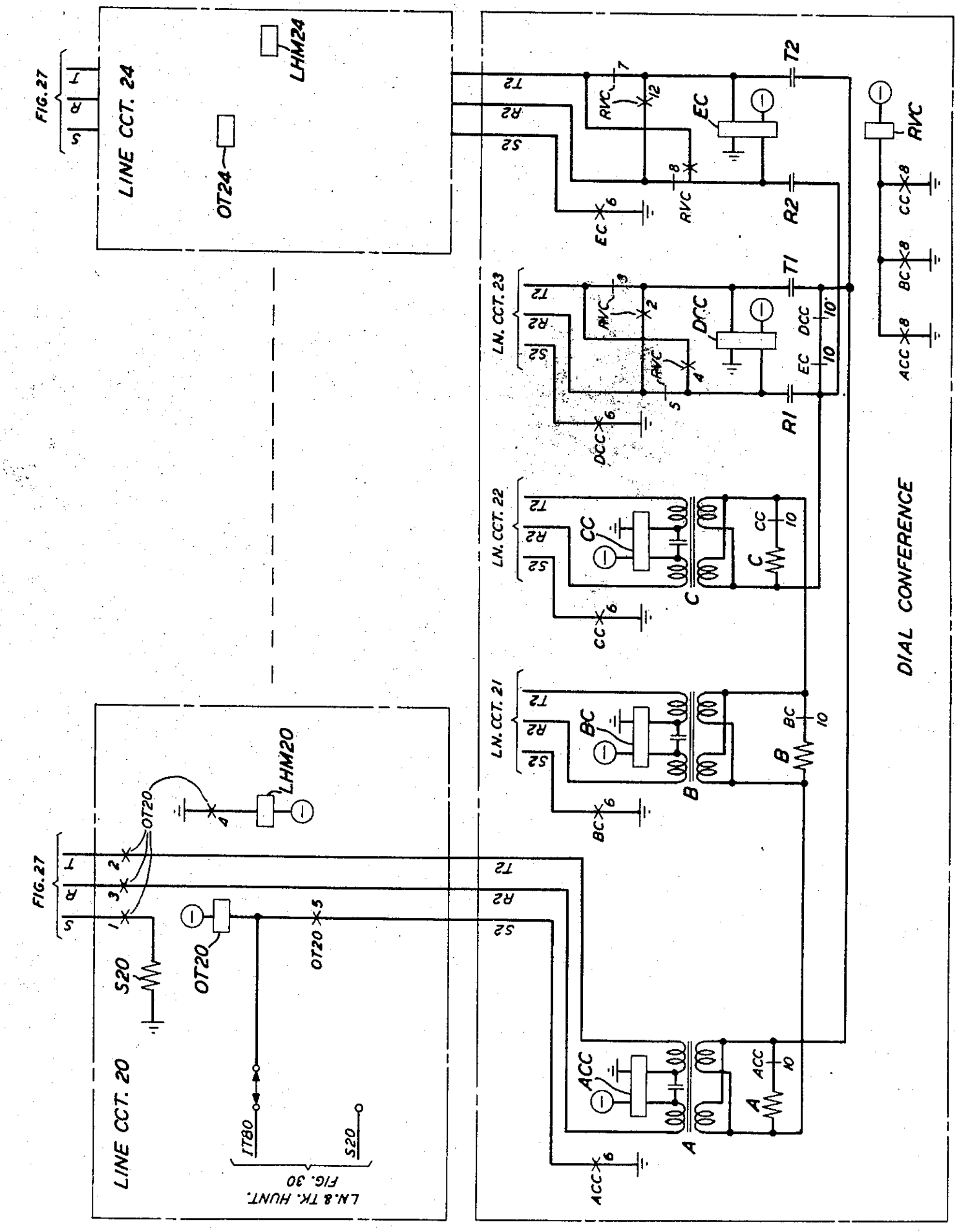
Figure 31:
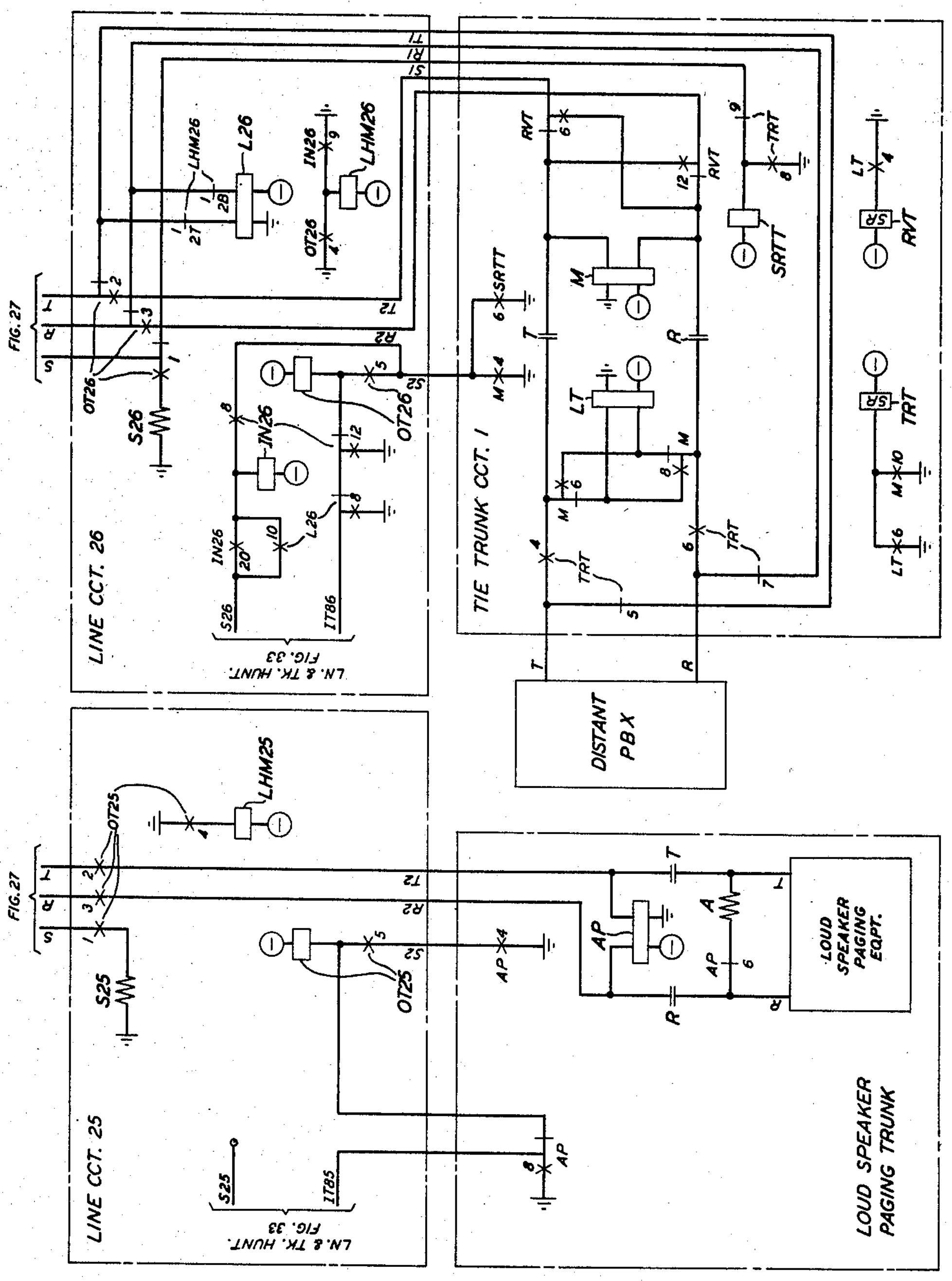
Figure 31A:
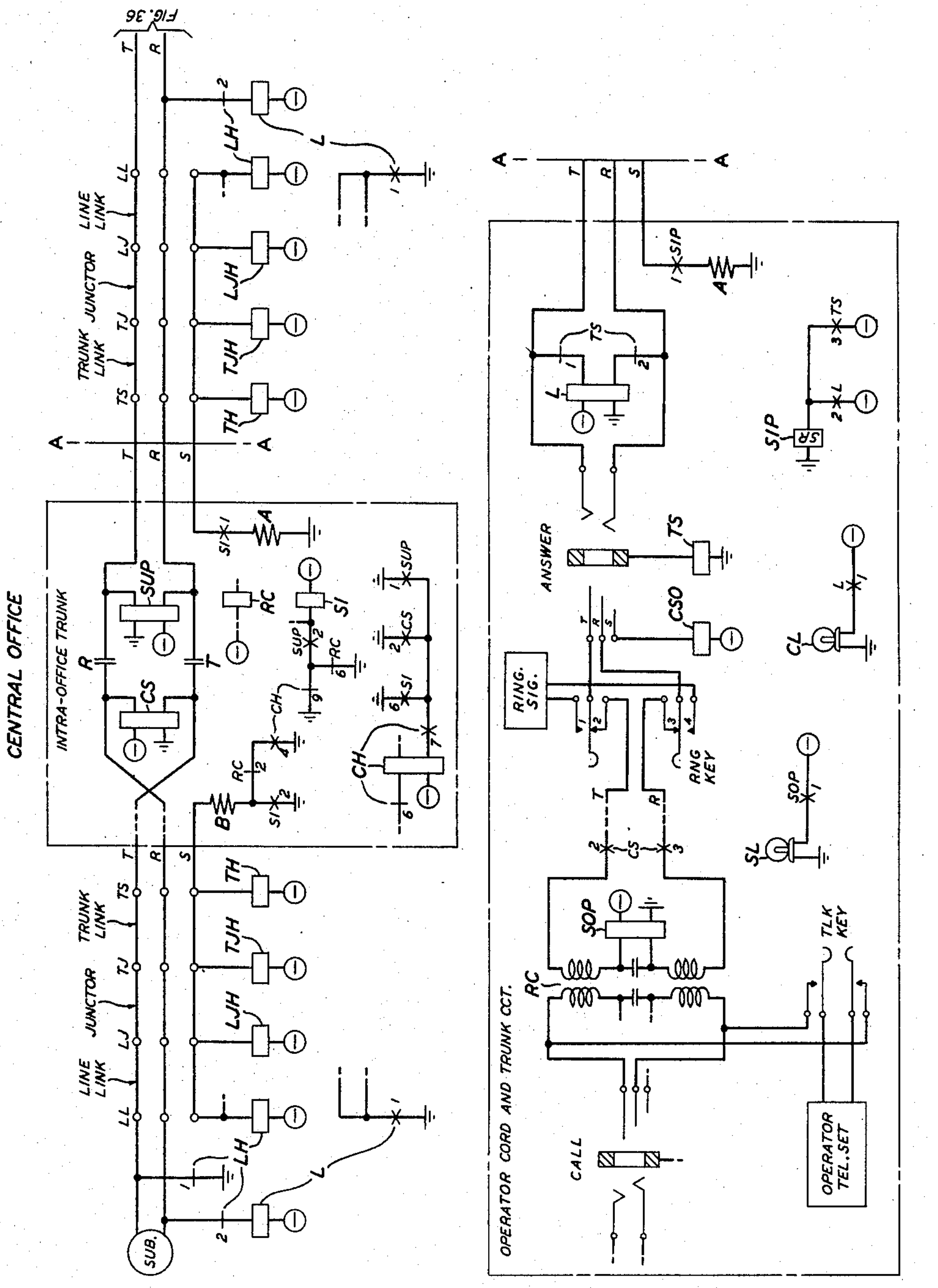
Figure 35:
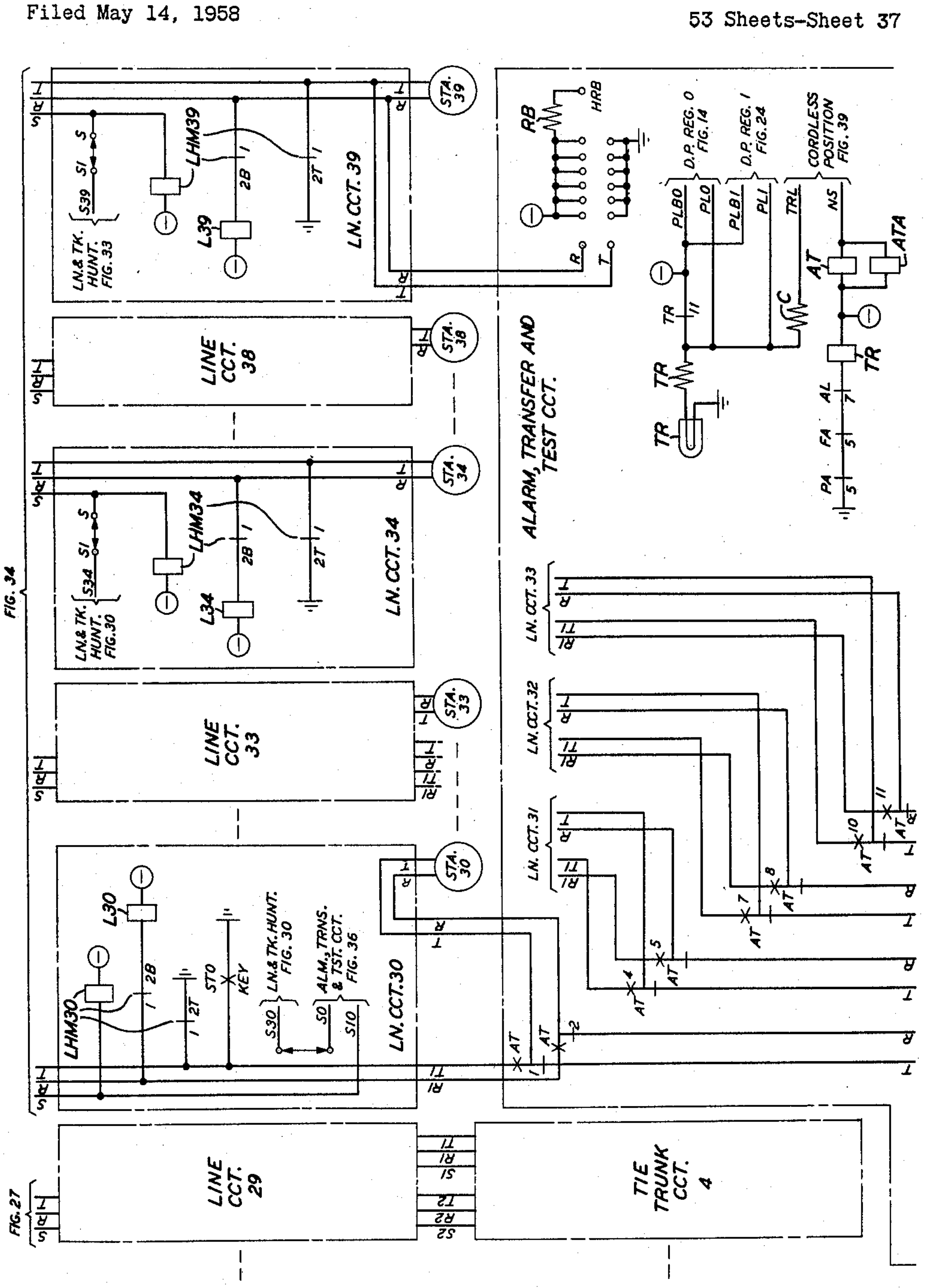
Figure 36:
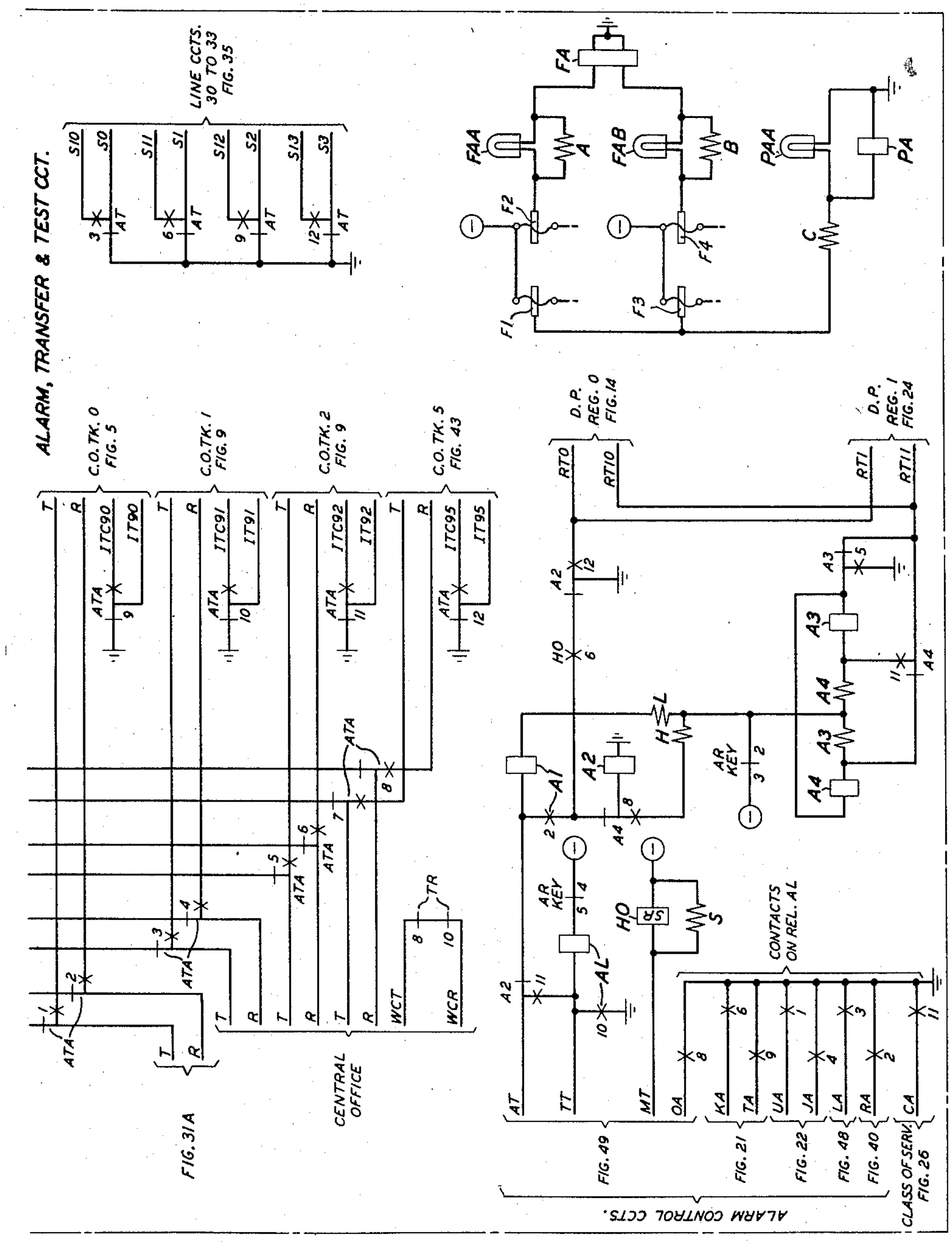
Figure 38:
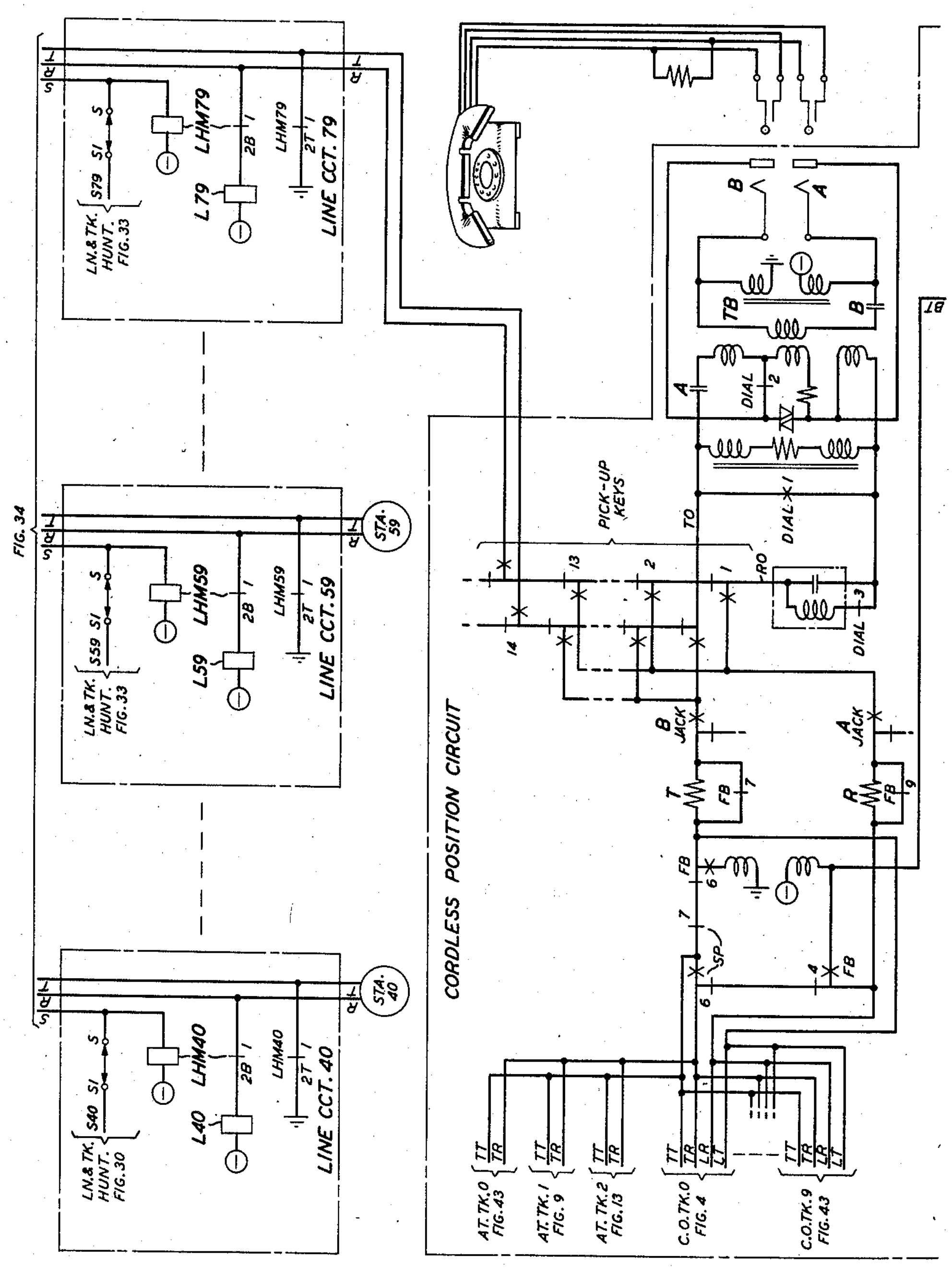
Figure 39:
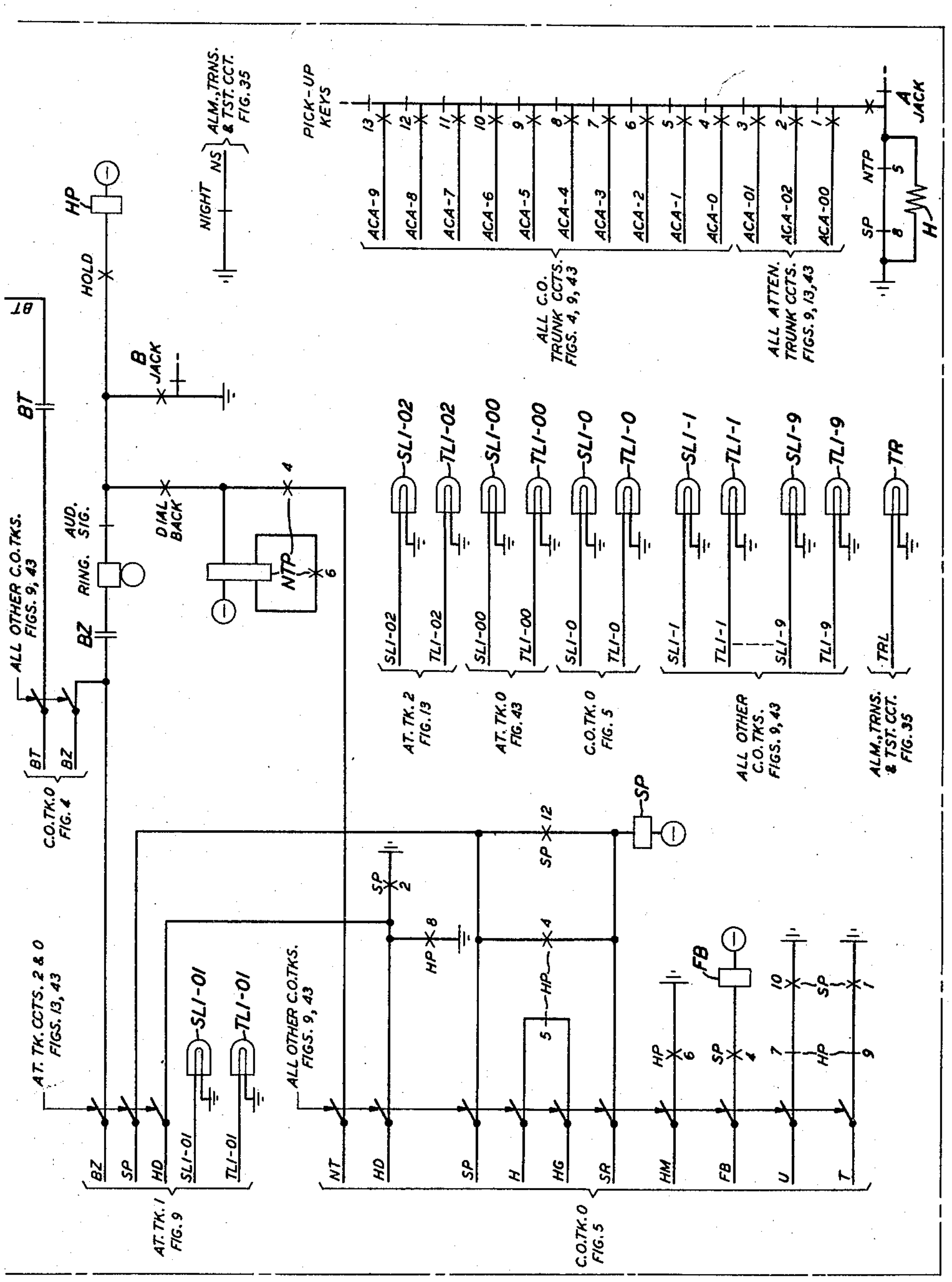
Figure 43:
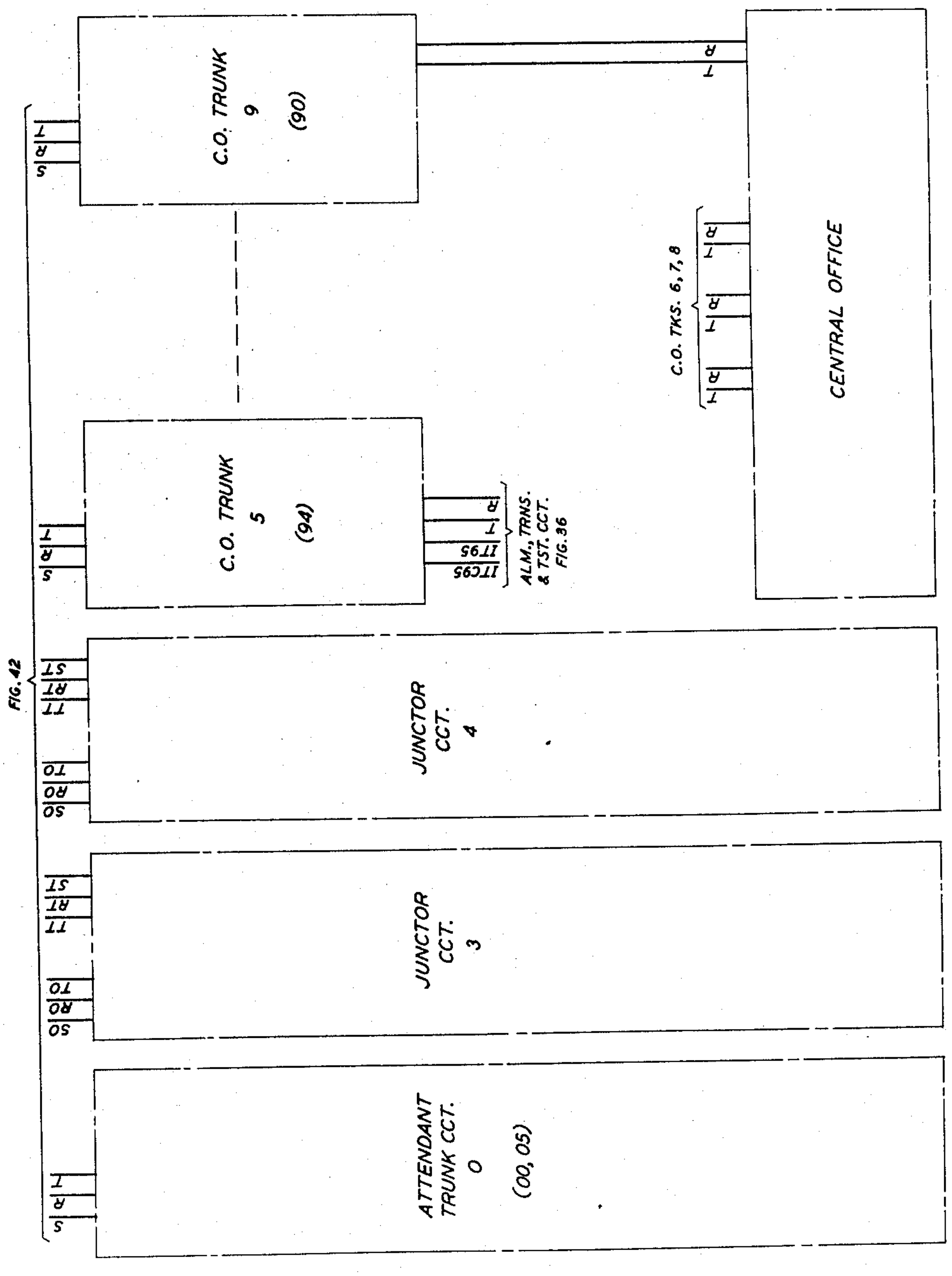

Figs. 4, 5, 9 and 43 show ten (0 to 9) central office trunks (two way trunks between the P.B.X and a central office), of which central office trunk 0 is shown in detail in Figs. 4 and 5;

Figs. 9, 13 and 43 show three (0, 1 and 2) attendant trunks (trunks providing access to and from the P.B.X circuitry by the P.B.X attendant), of which attendant trunk 1 is shown in detail in Fig. 9;

Fig. 13 shows a busy tone trunk and a traffic and trouble register circuit;

Figs. 14, 18, 19 and 24 show two (0 and 1) dial pulse registers, of which register 0 is shown in detail in Figs. 14, 18 and 19;

Figs. 24 and 43 show six (0 to 5) junctors, of which junctor 0 is shown in detail on Fig. 24;

Fig. 28 shows five (20 to 24) P.B.X line circuits, of which line circuit 20 is shown in detail, and a five-channel dial conference circuit using these five P.B.X lines;

Figs. 31 and 35 show five (25 to 29) P.B.X line circuits, of which line circuits 25 and 26 are shown in detail in Fig. 31 and terminated respectively in a loudspeaker paging trunk and in a tie trunk (to another P.B.X);

Fig. 35 shows ten (30 to 39) P.B.X line circuits, of which line circuits 30, 34 and 39 are shown in detail;

Figs. 35 and 36 show an alarm, transfer and test circuit terminating P.B.X line circuits 30 to 33 and 39;

Fig. 31A shows portions of a central office including toll operator facilities;

Fig. 38 shows forty (40 to 79) P.B.X line circuits, of which line circuits 40, 59 and 79 are shown in detail; and Figs. 38 and 39 show the cordless attendant position circuits terminating central office trunks 0 to 9, attendant trunks 0 to 2, and line circuit 79.

Figure 6:
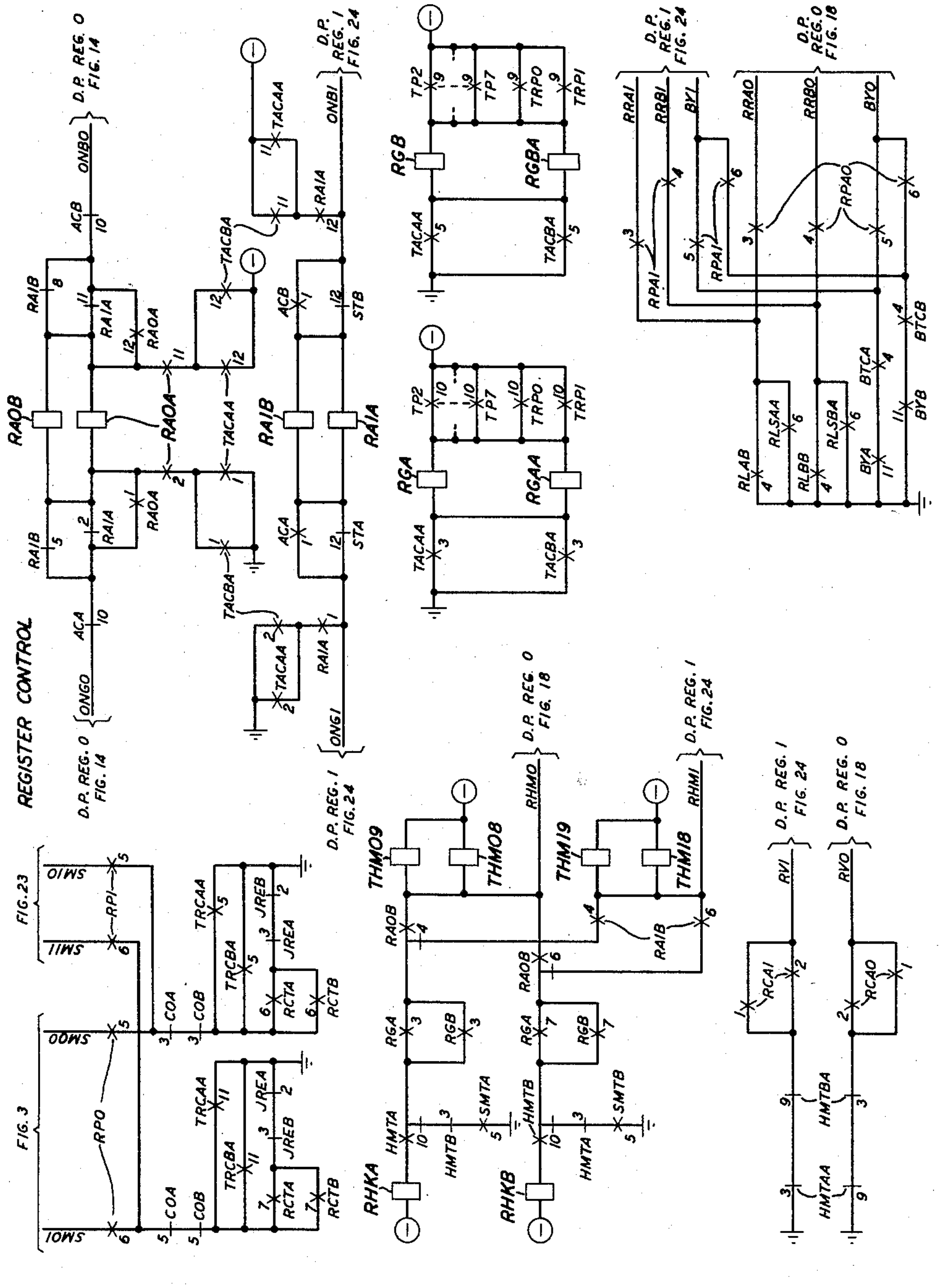
Figure 7:
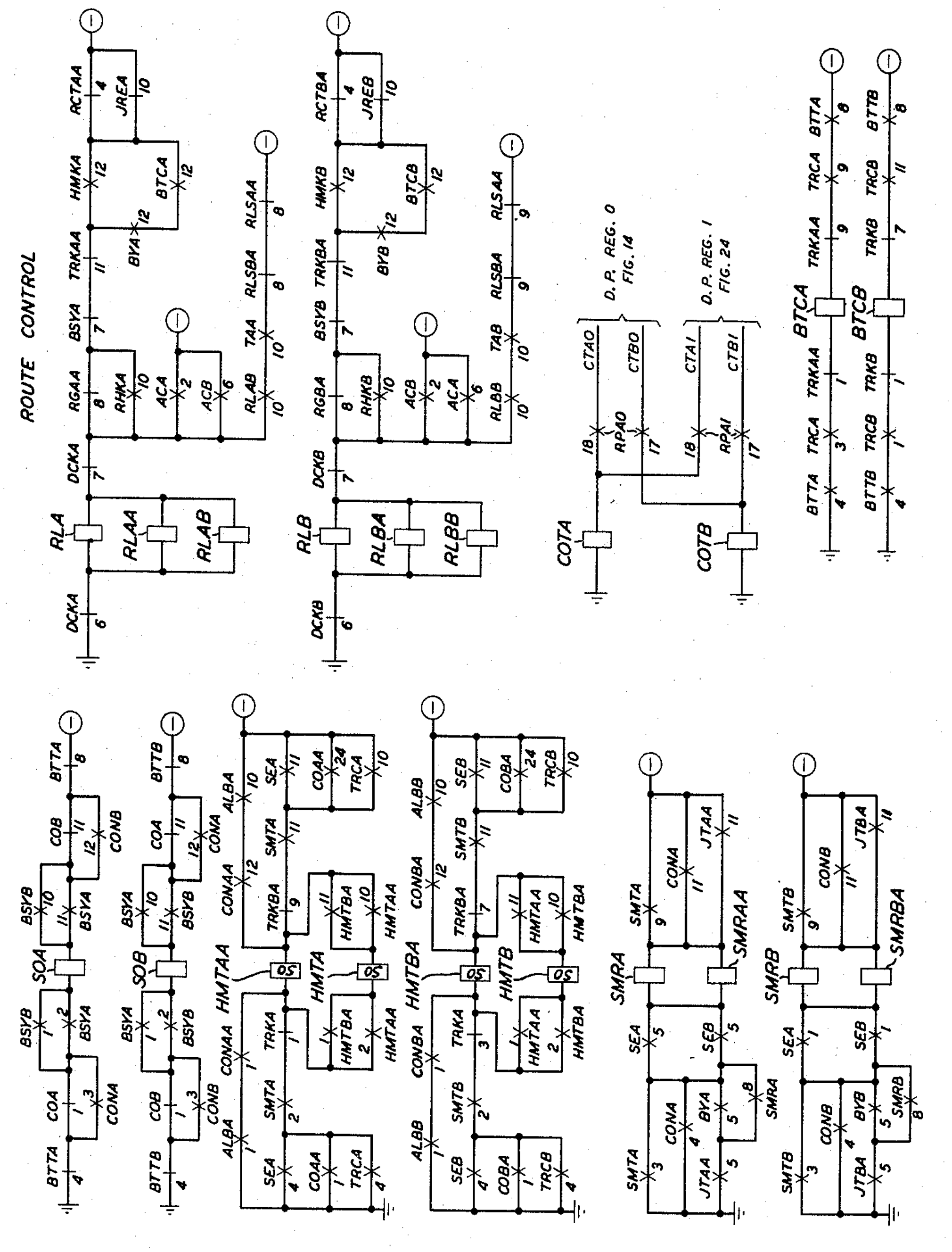
Figure 8:
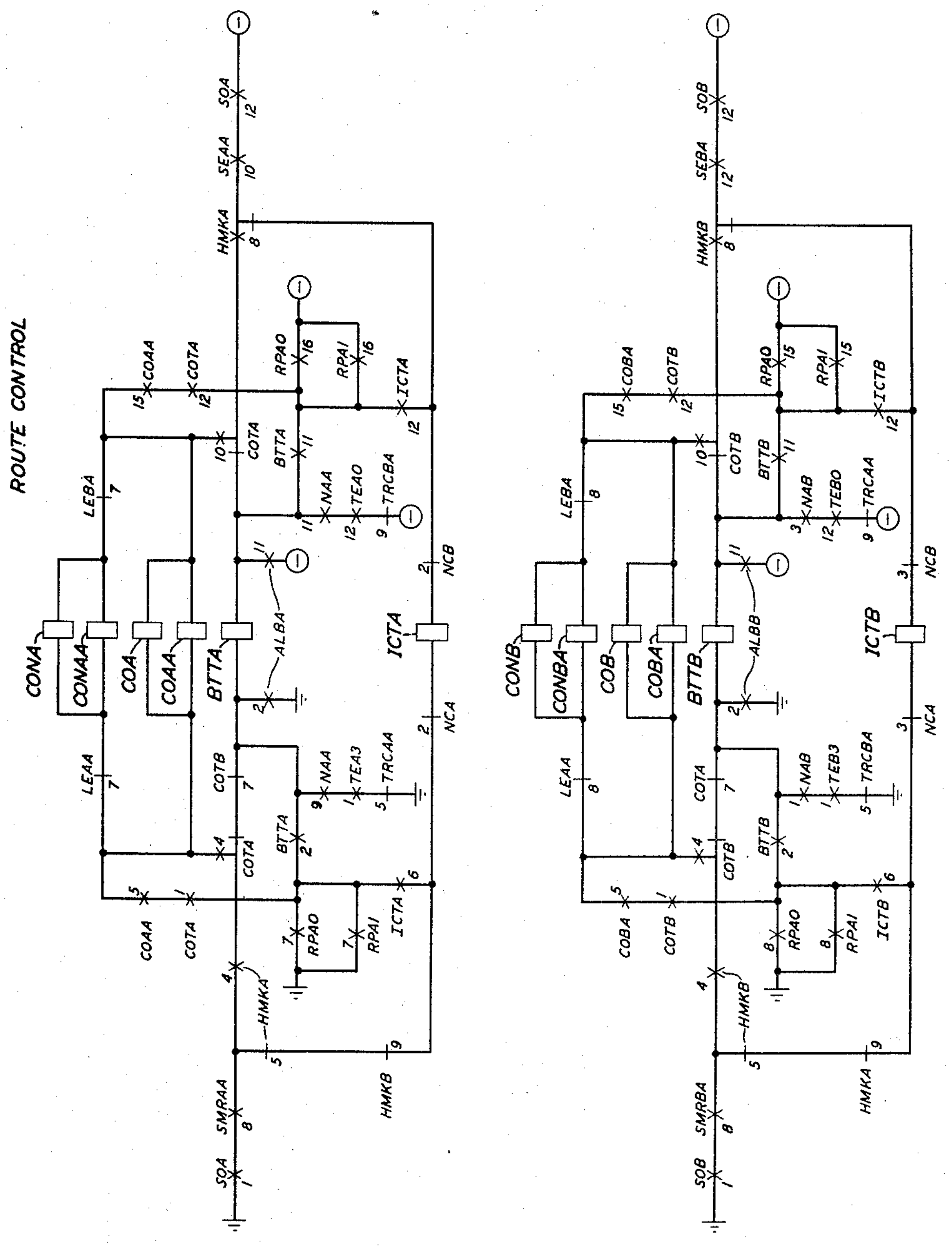
Figure 10:
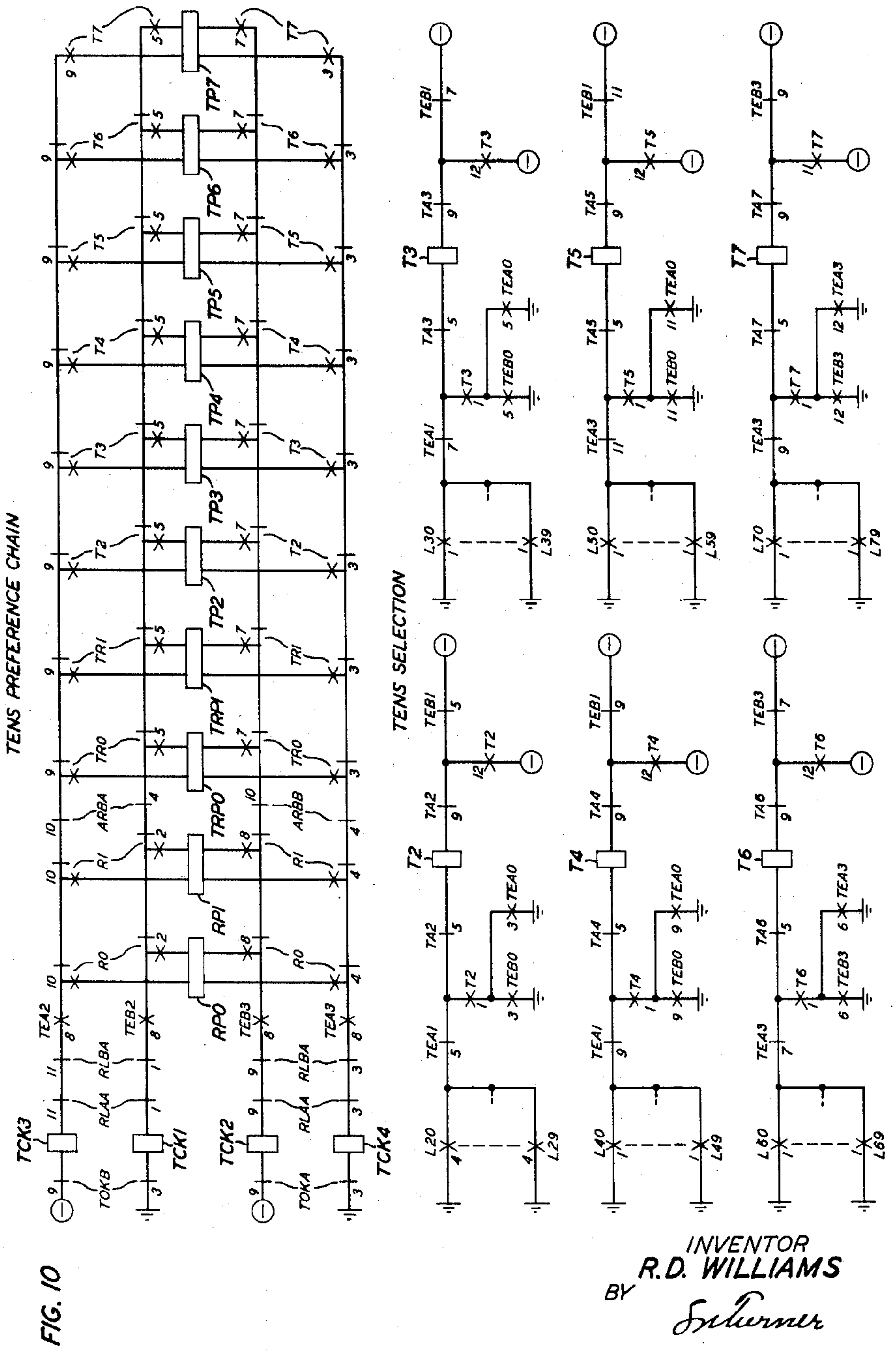
Figure 11:
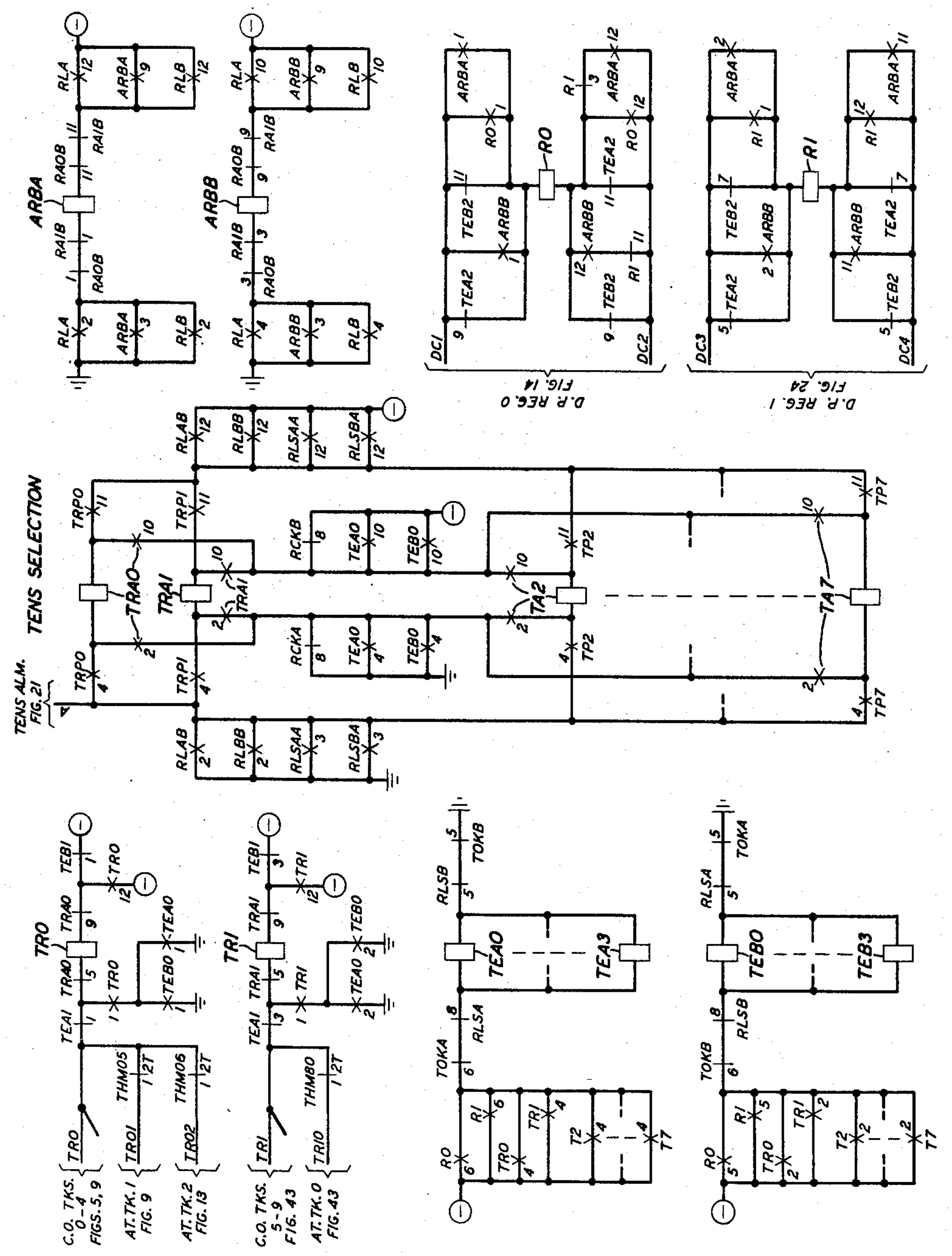
Figure 12:
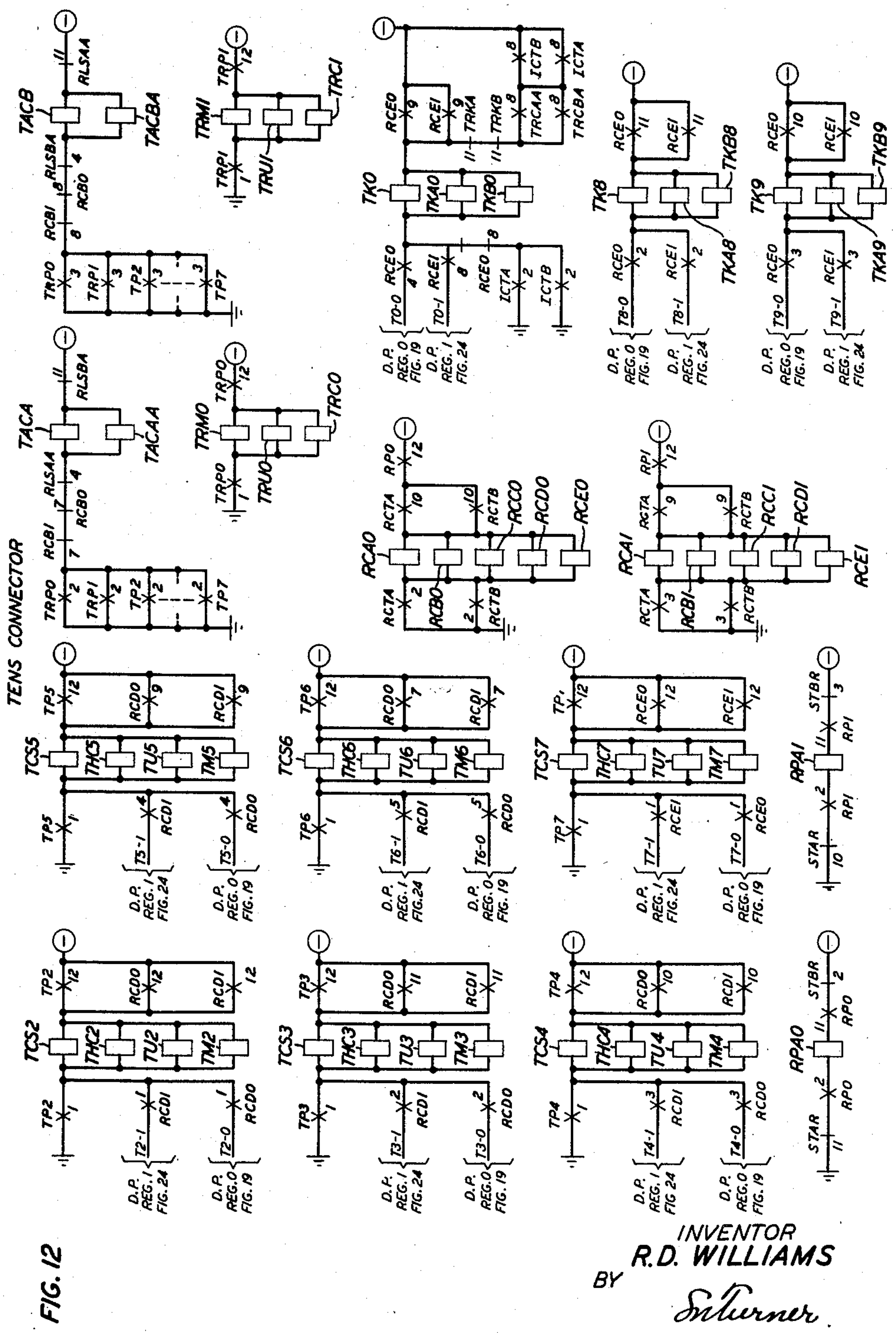
Figure 15:
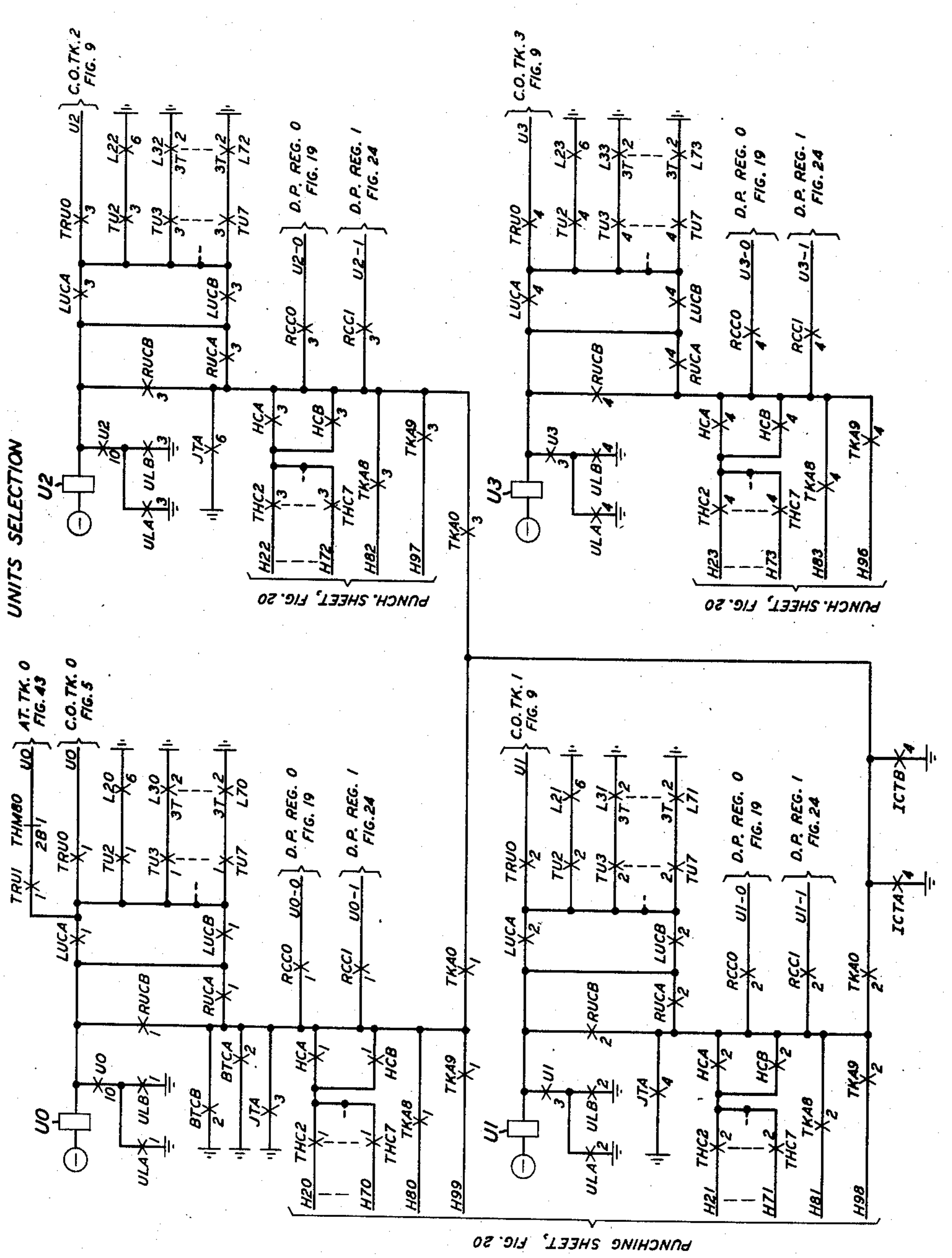
Figure 16:
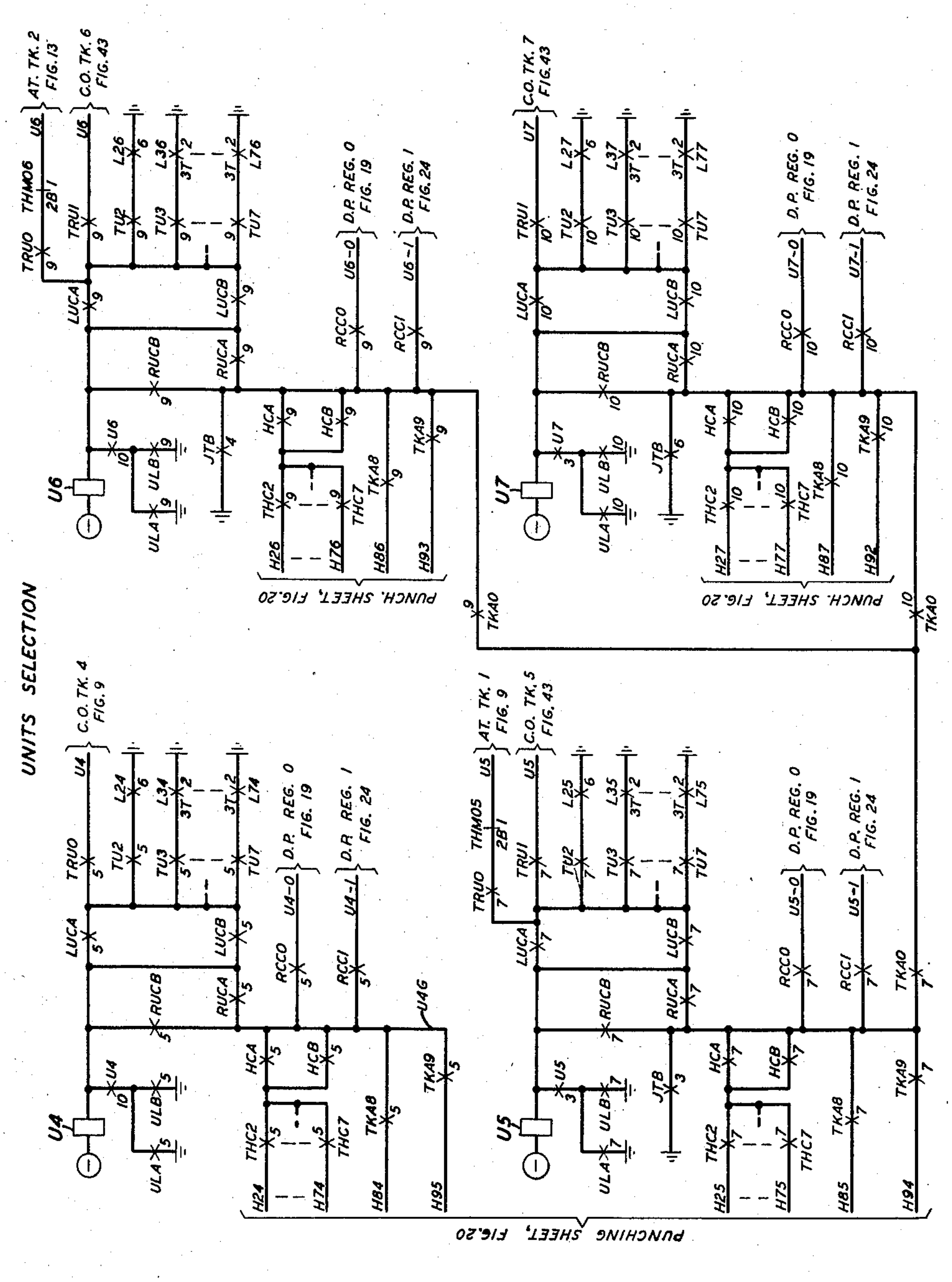
Figure 17:
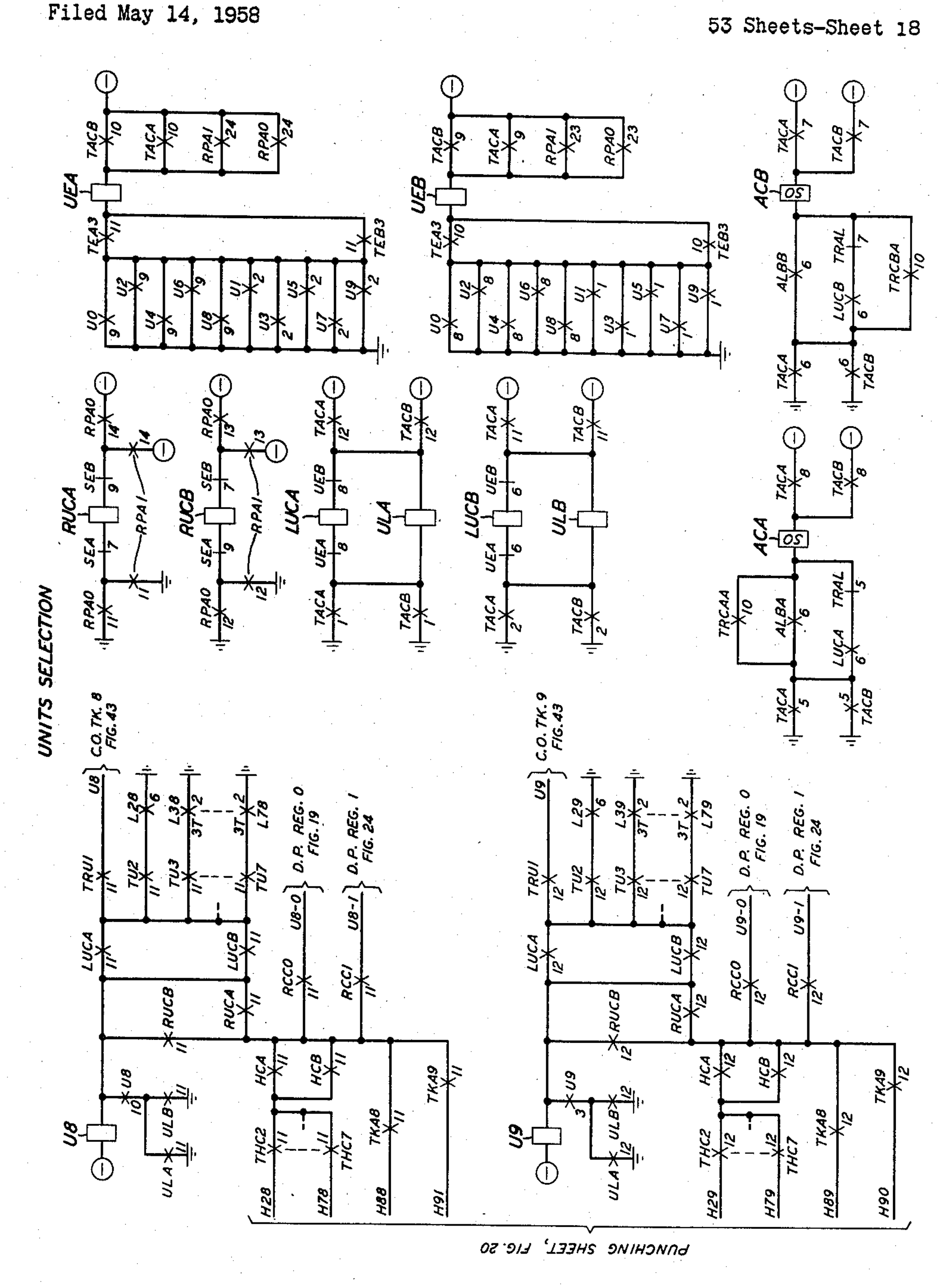
Figure 20:
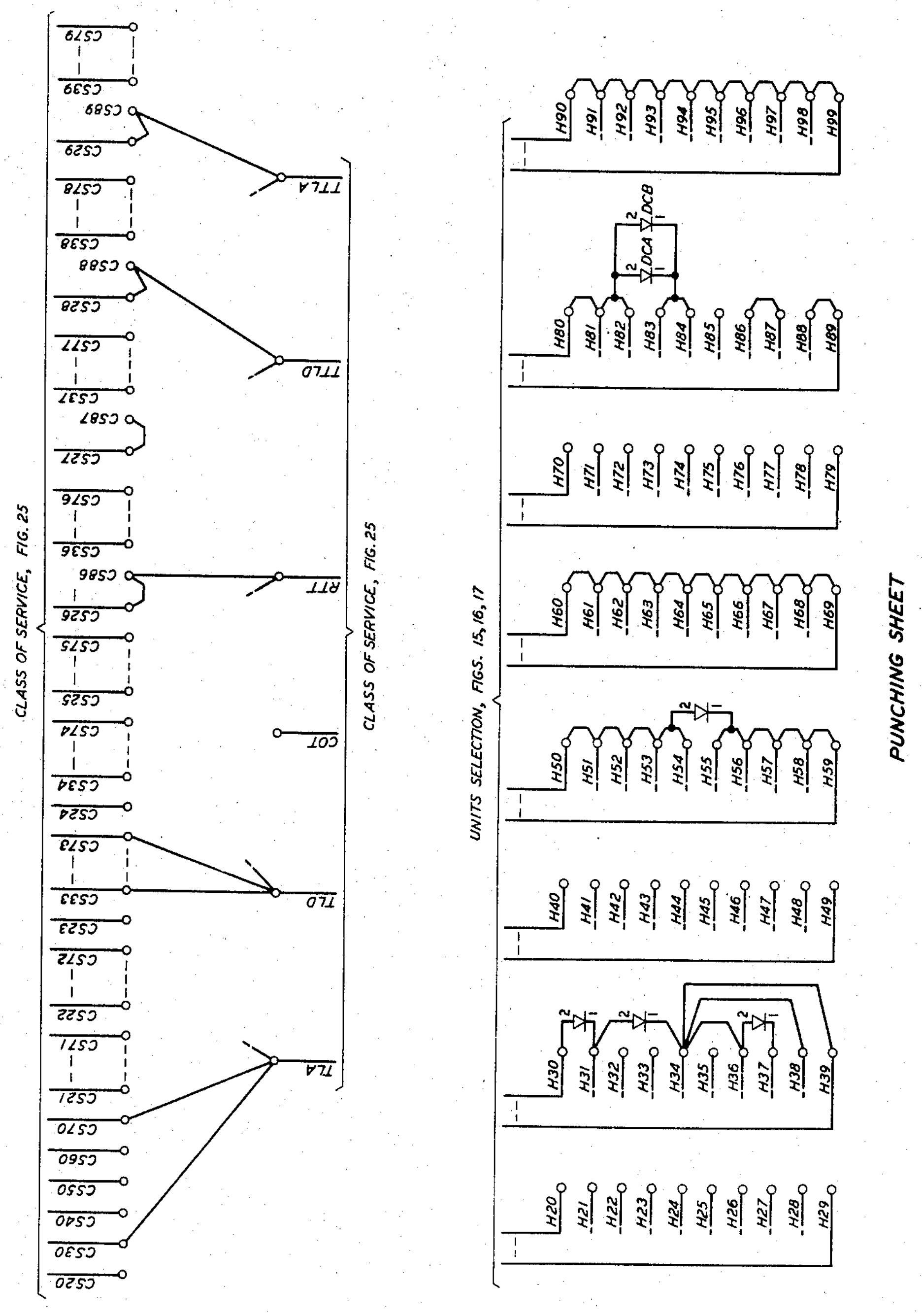
Figure 21:
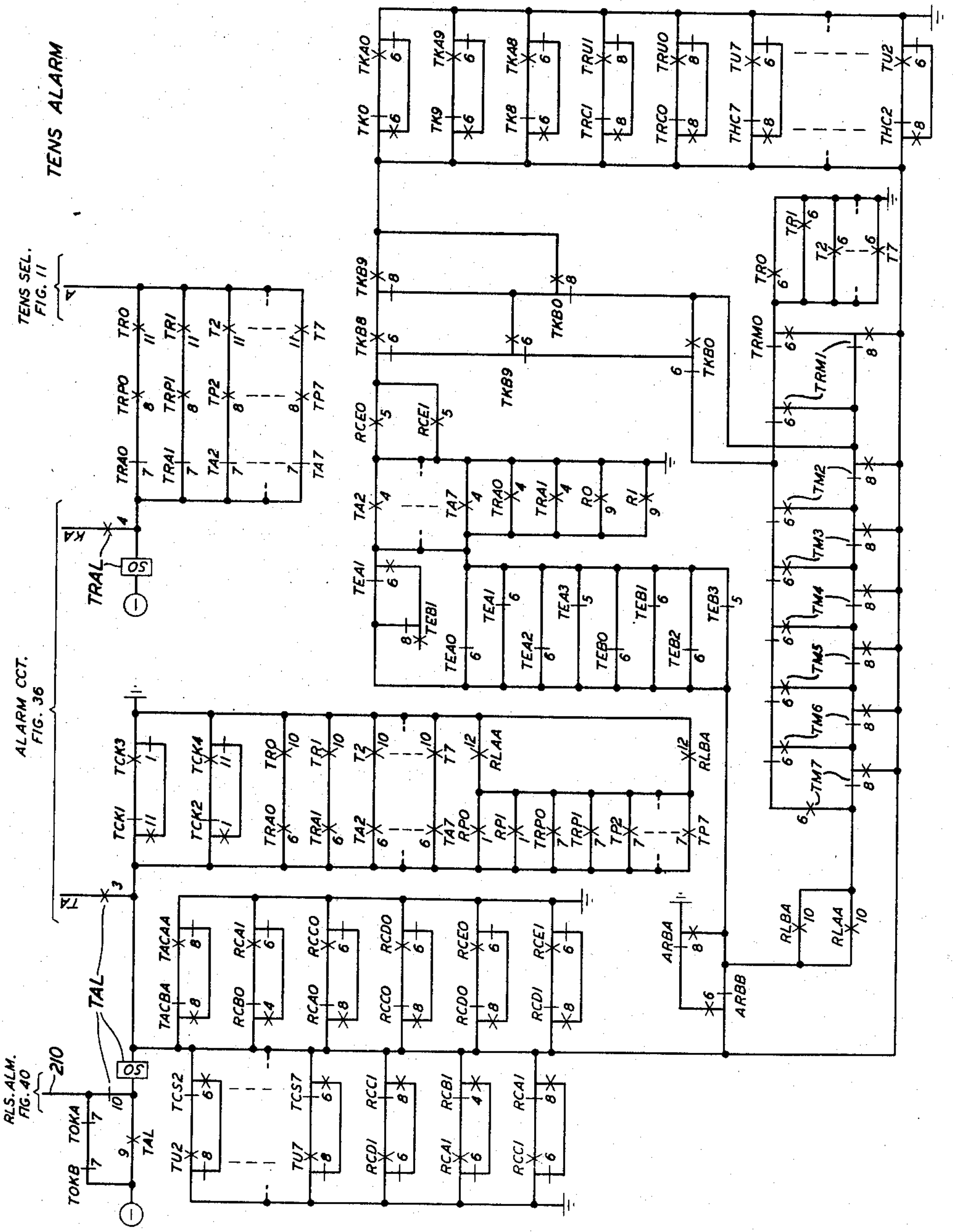
Figure 22:
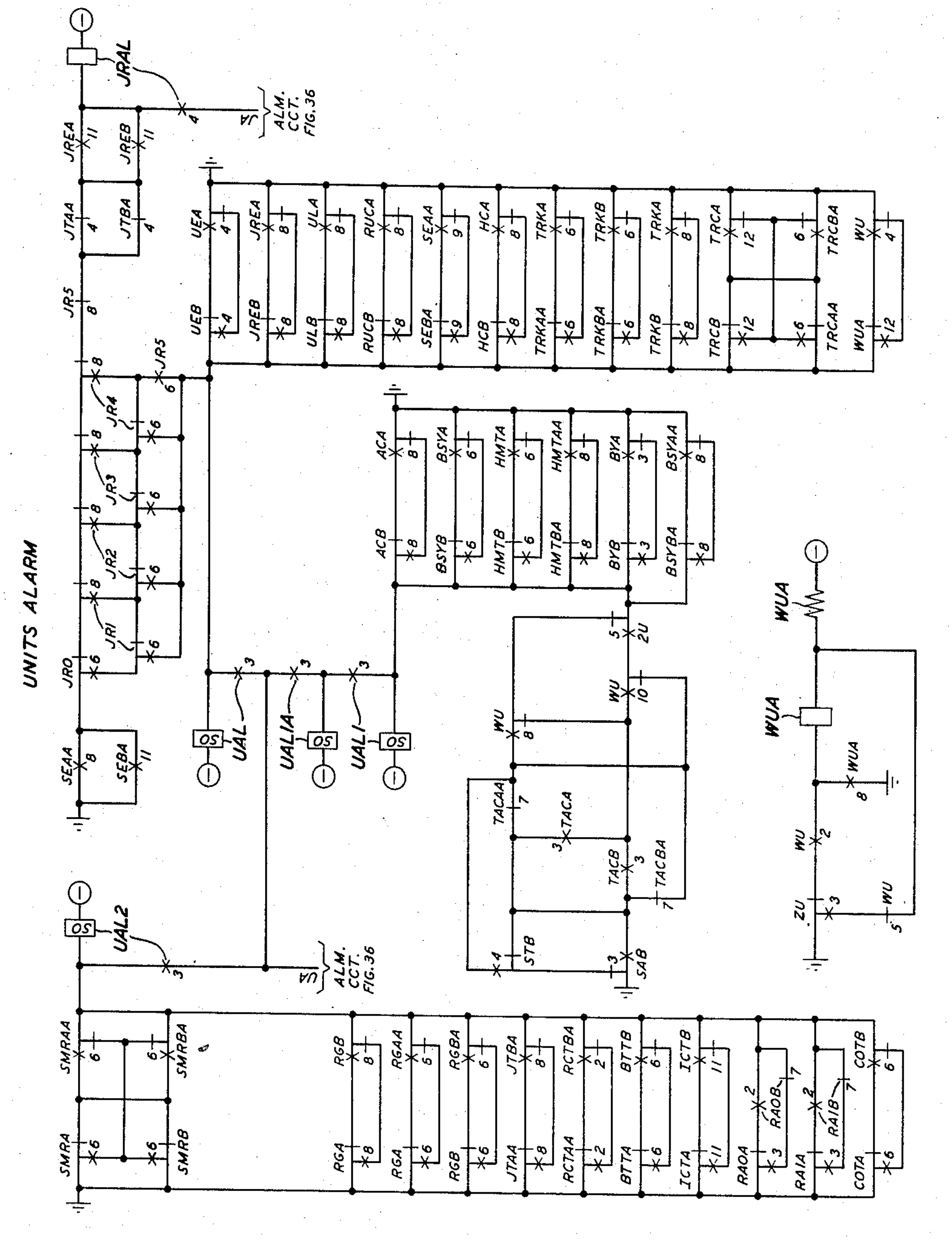
Figure 25:
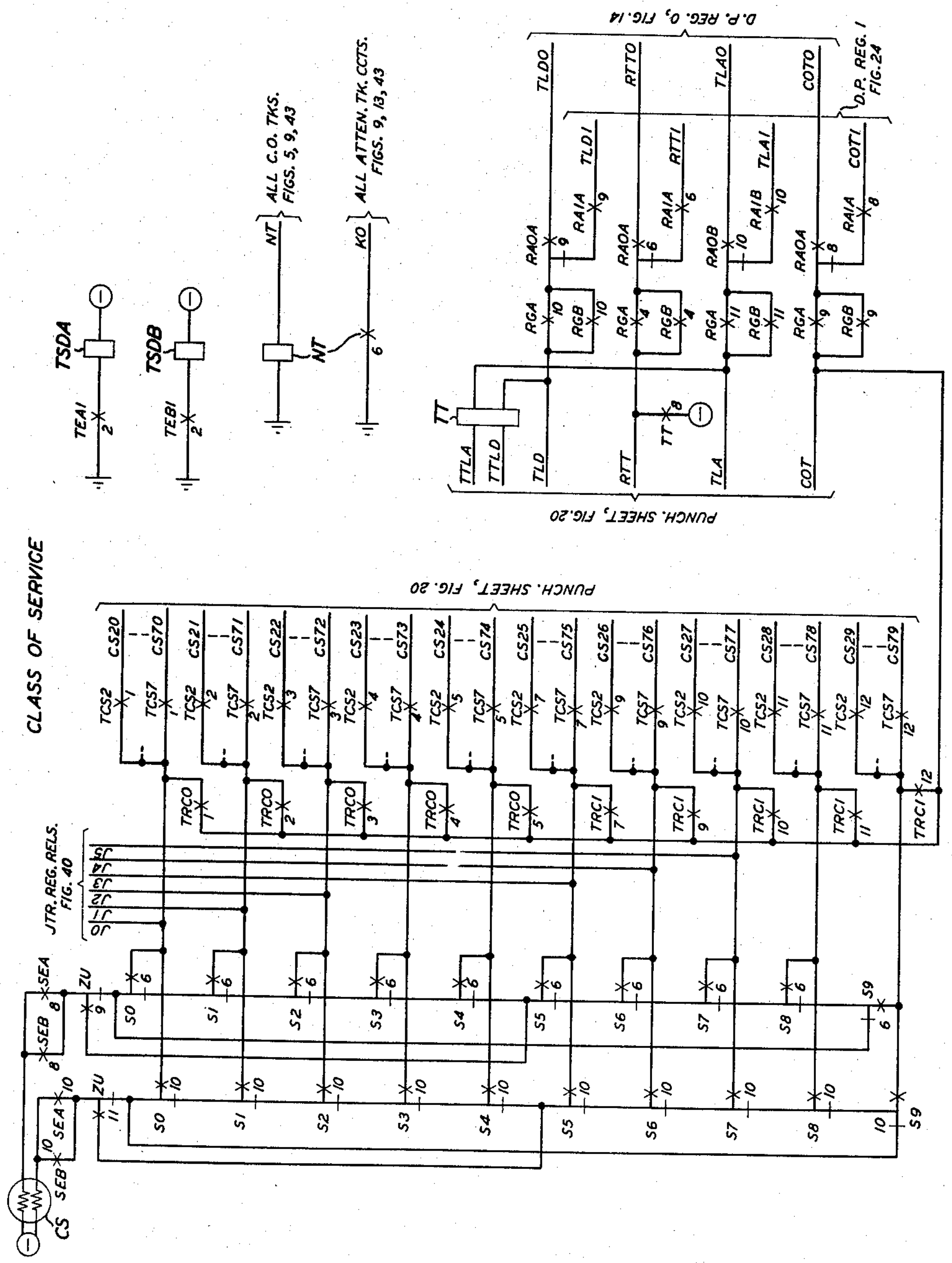
Figure 26:
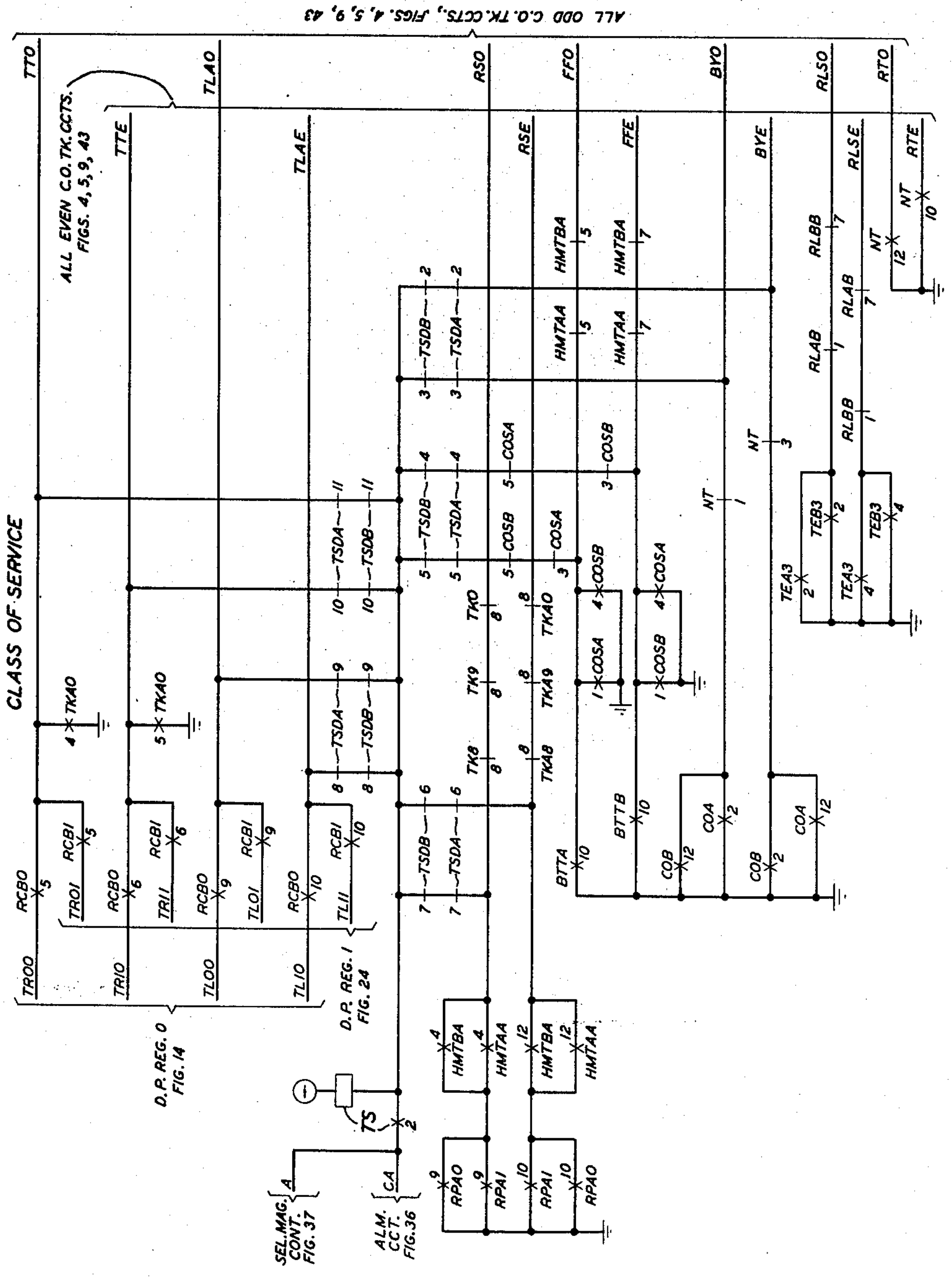
Figure 37:
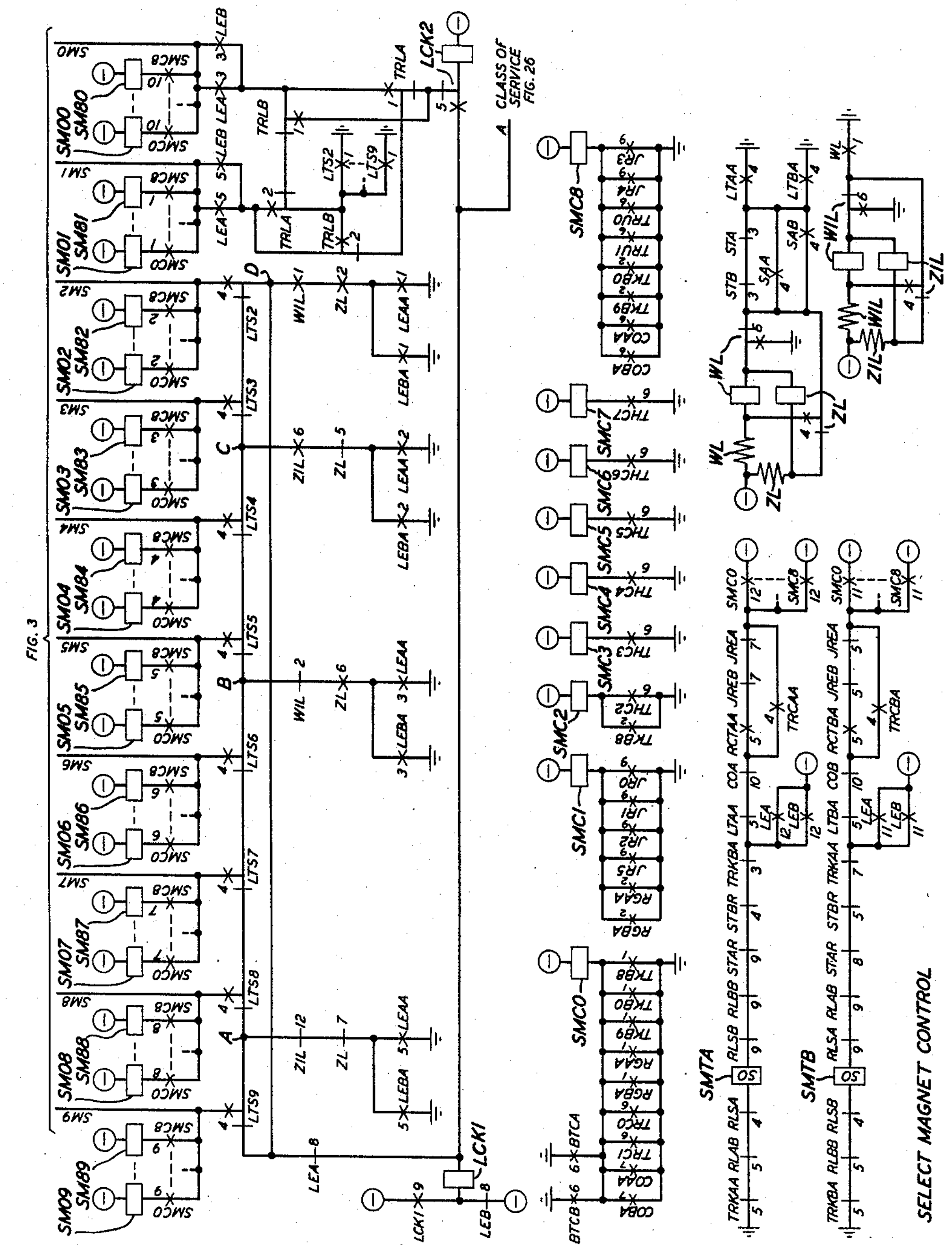
Figure 40:
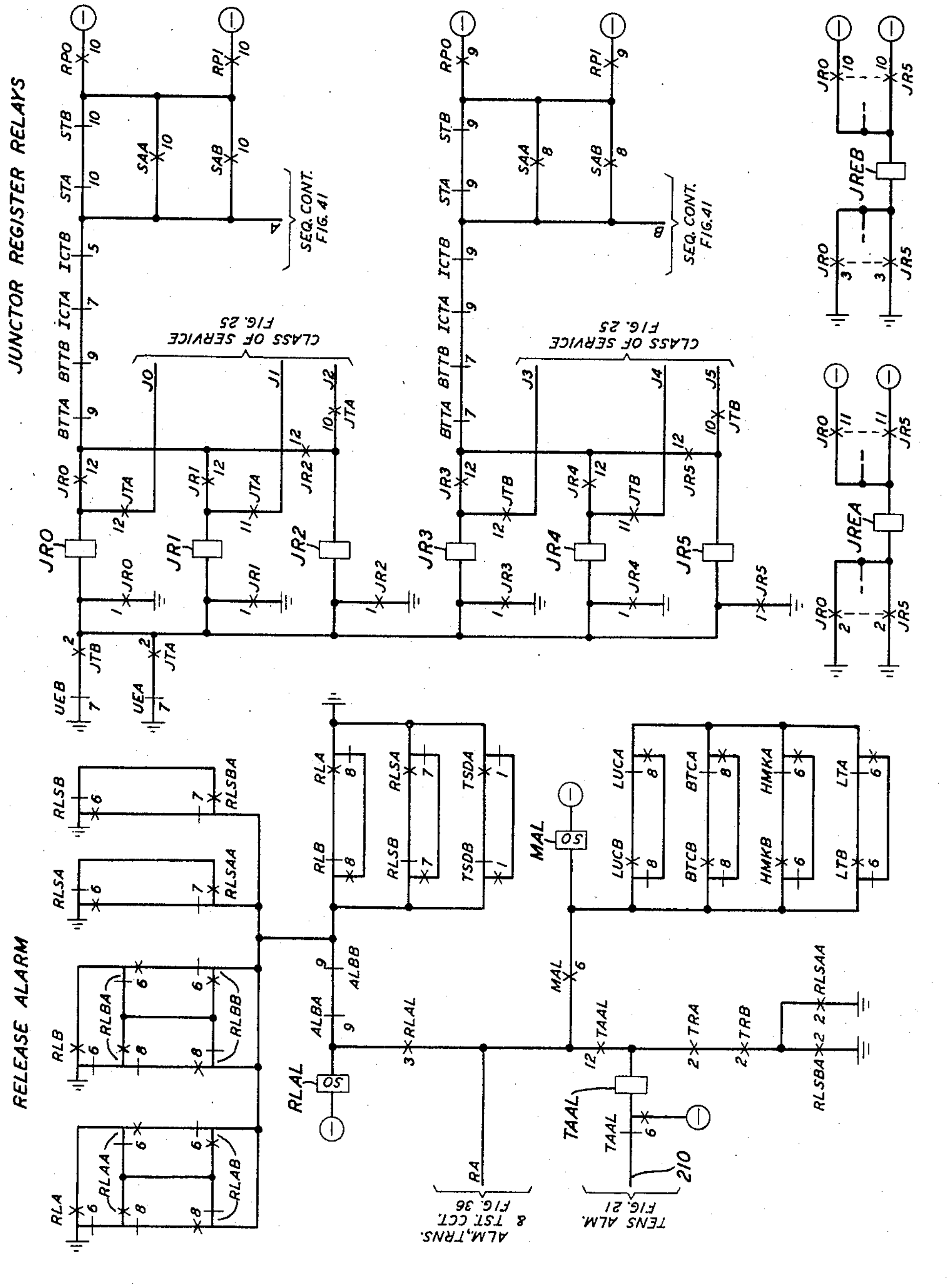
Figure 41:
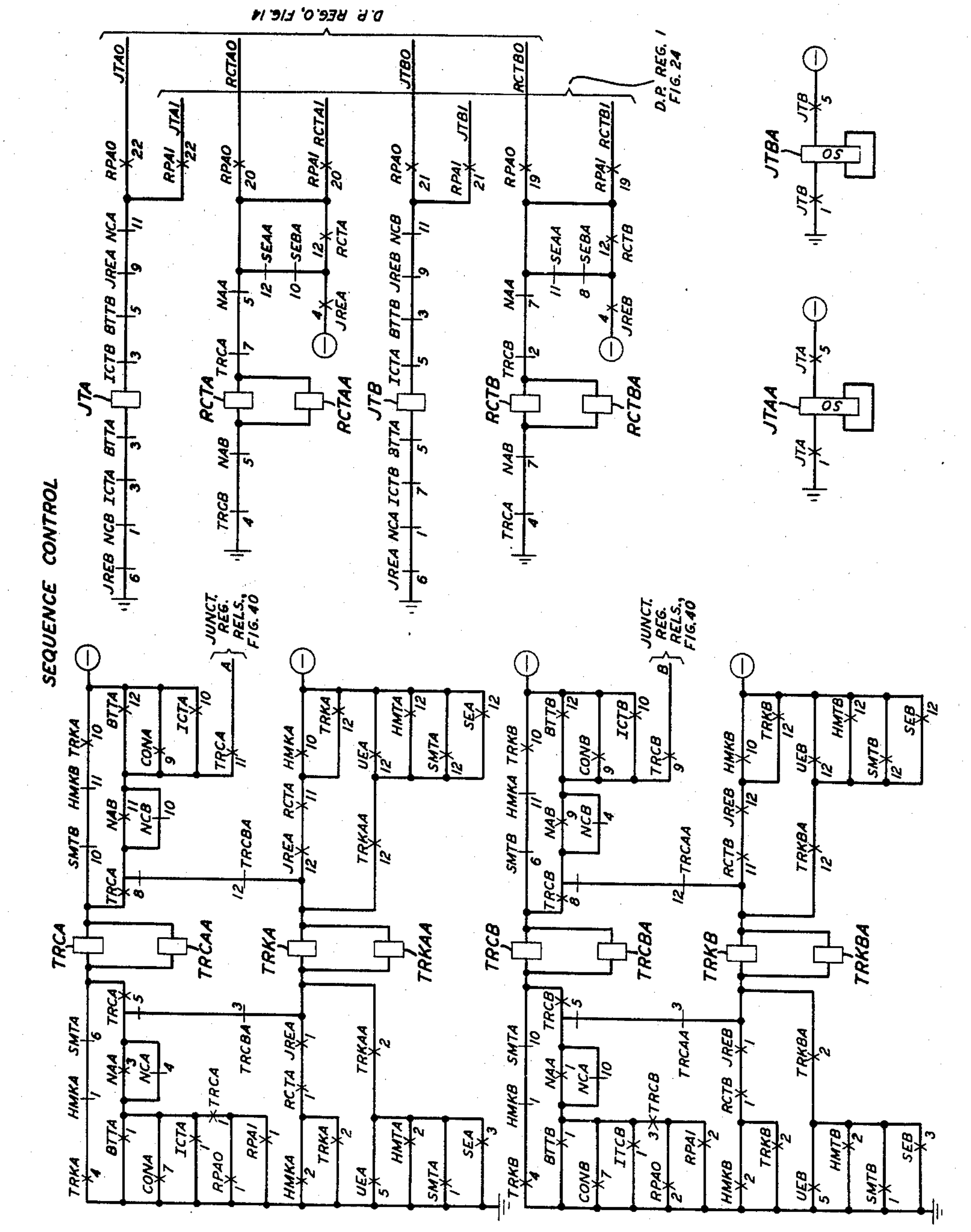
Figure 44:
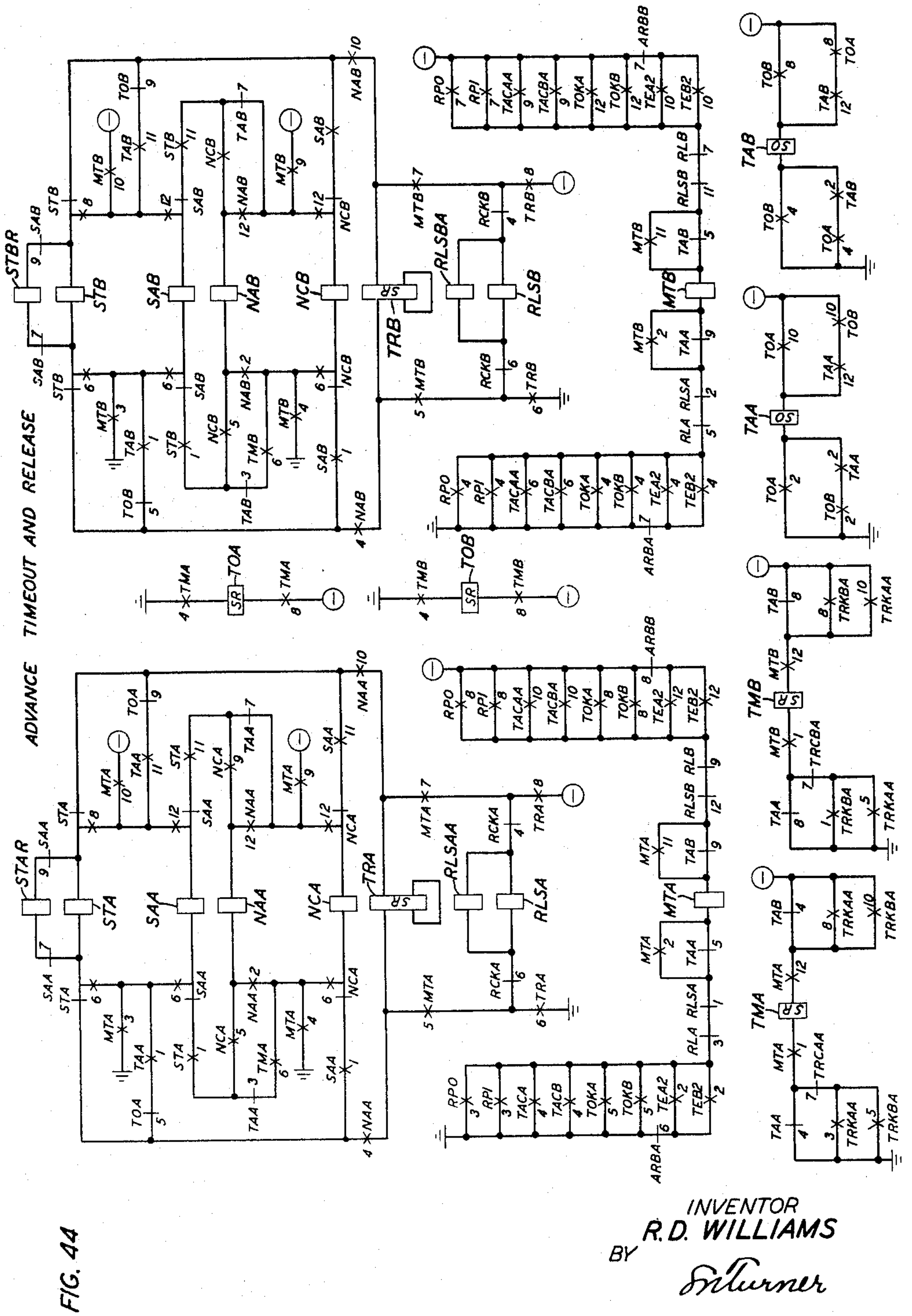
Figure 45:
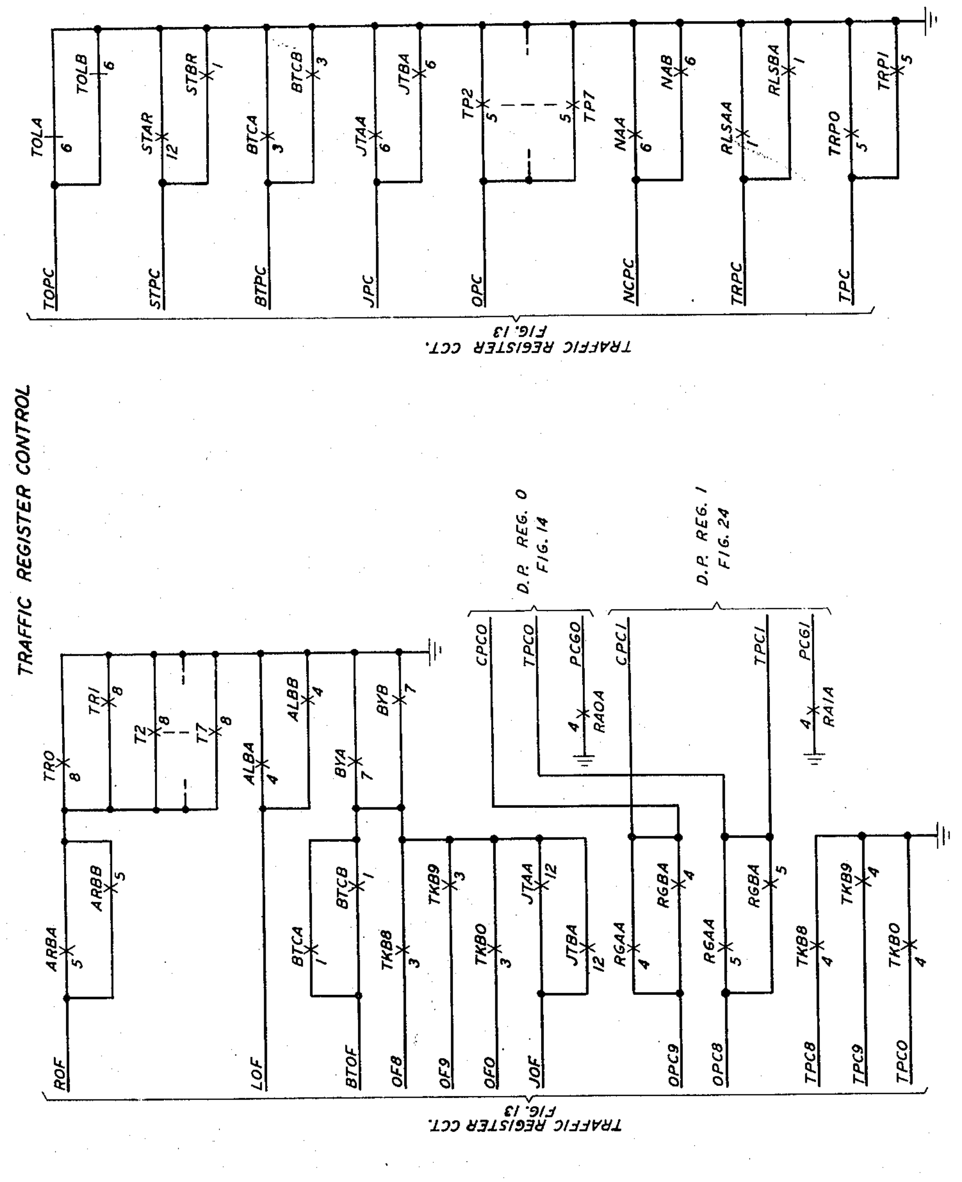
Figure 46:
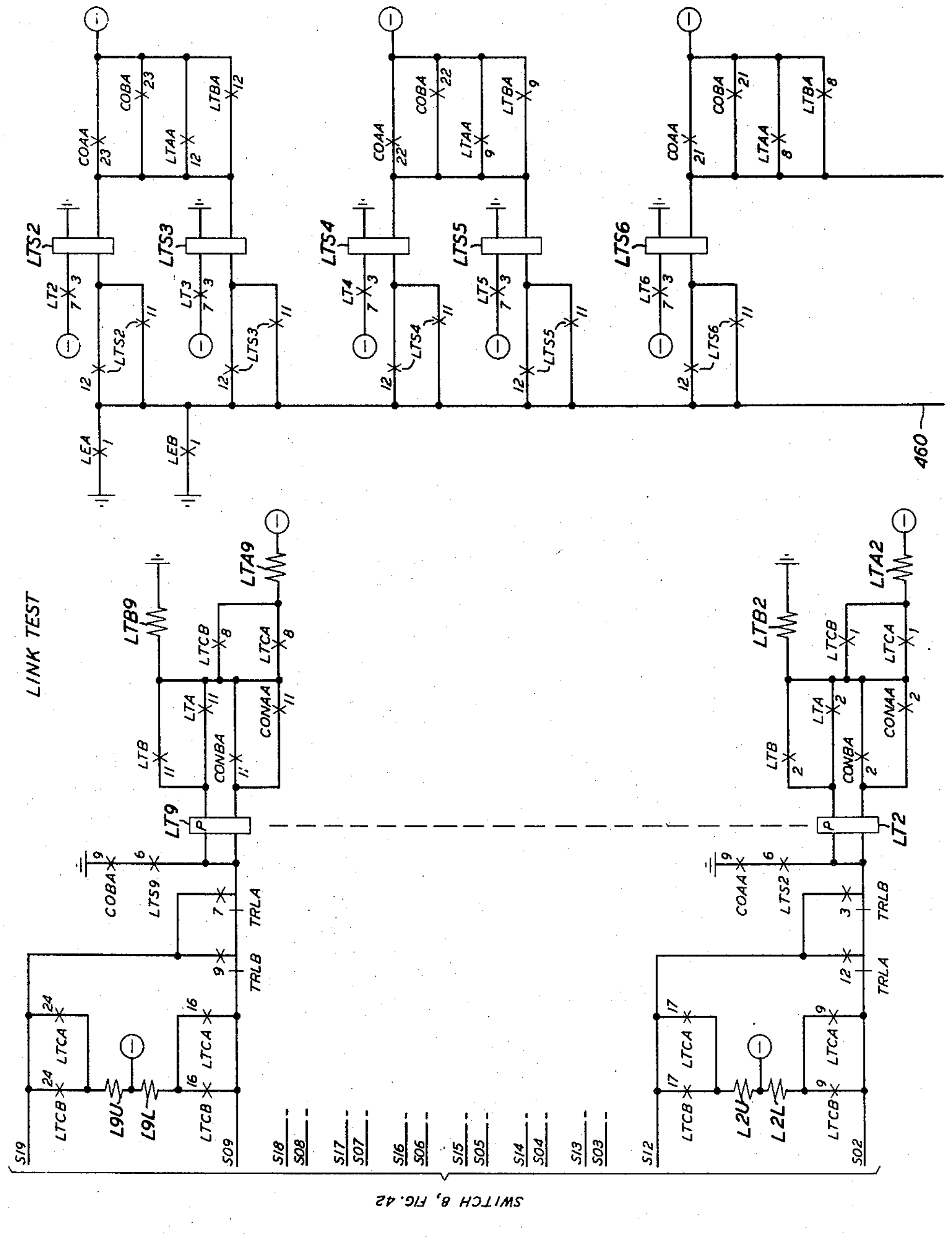
Figure 47:
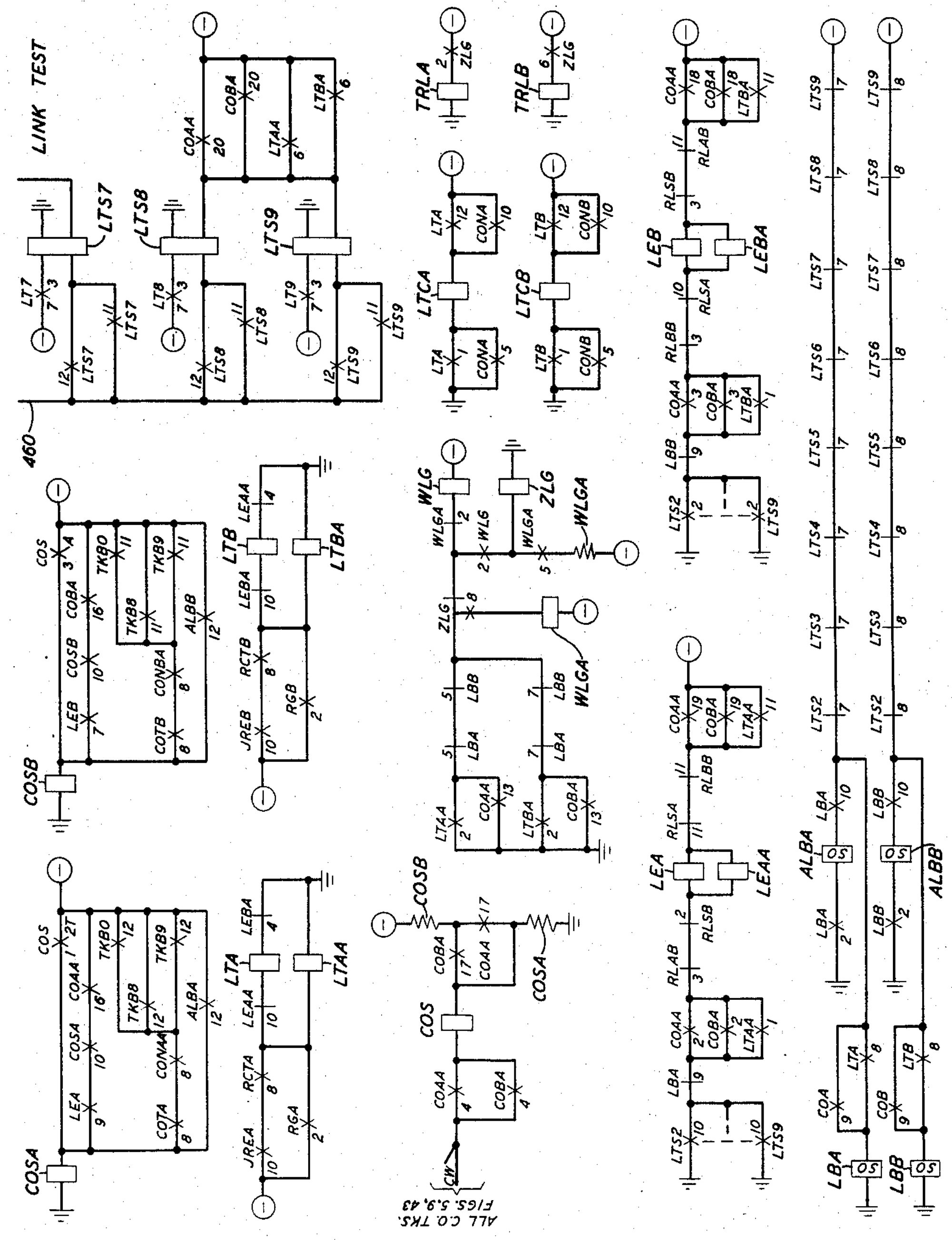
Figure 48:
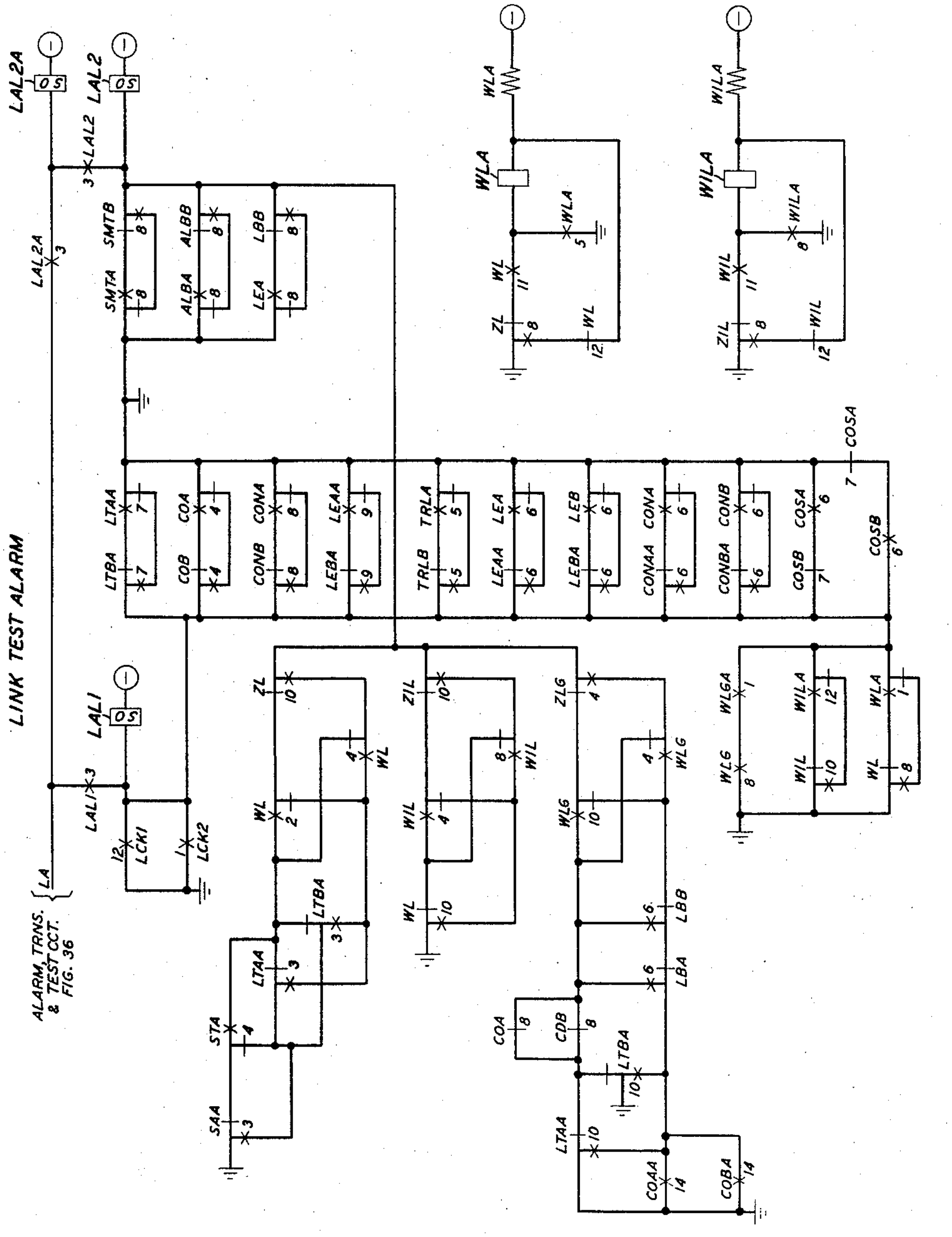
Figure 49:
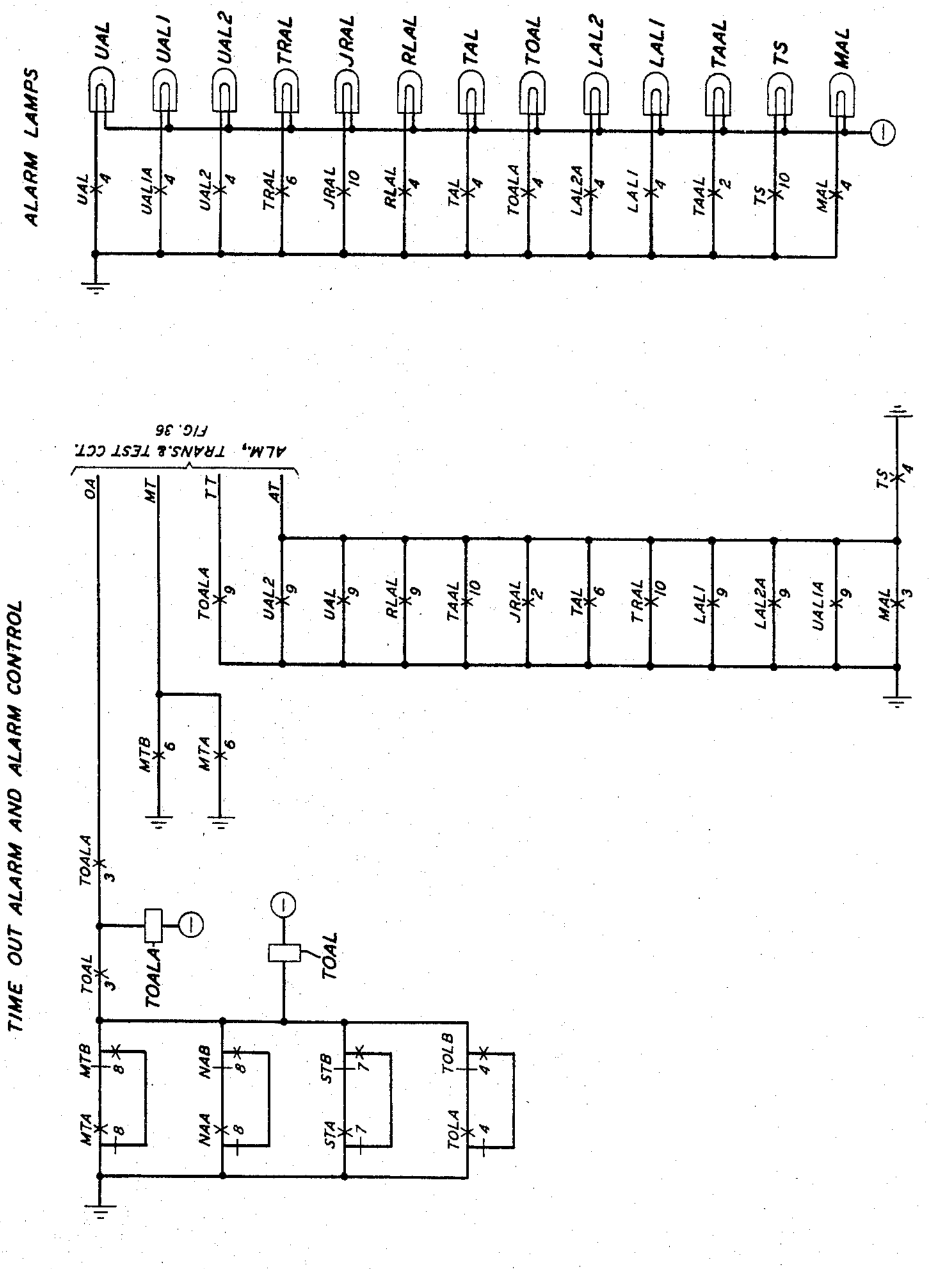
Figure 50:
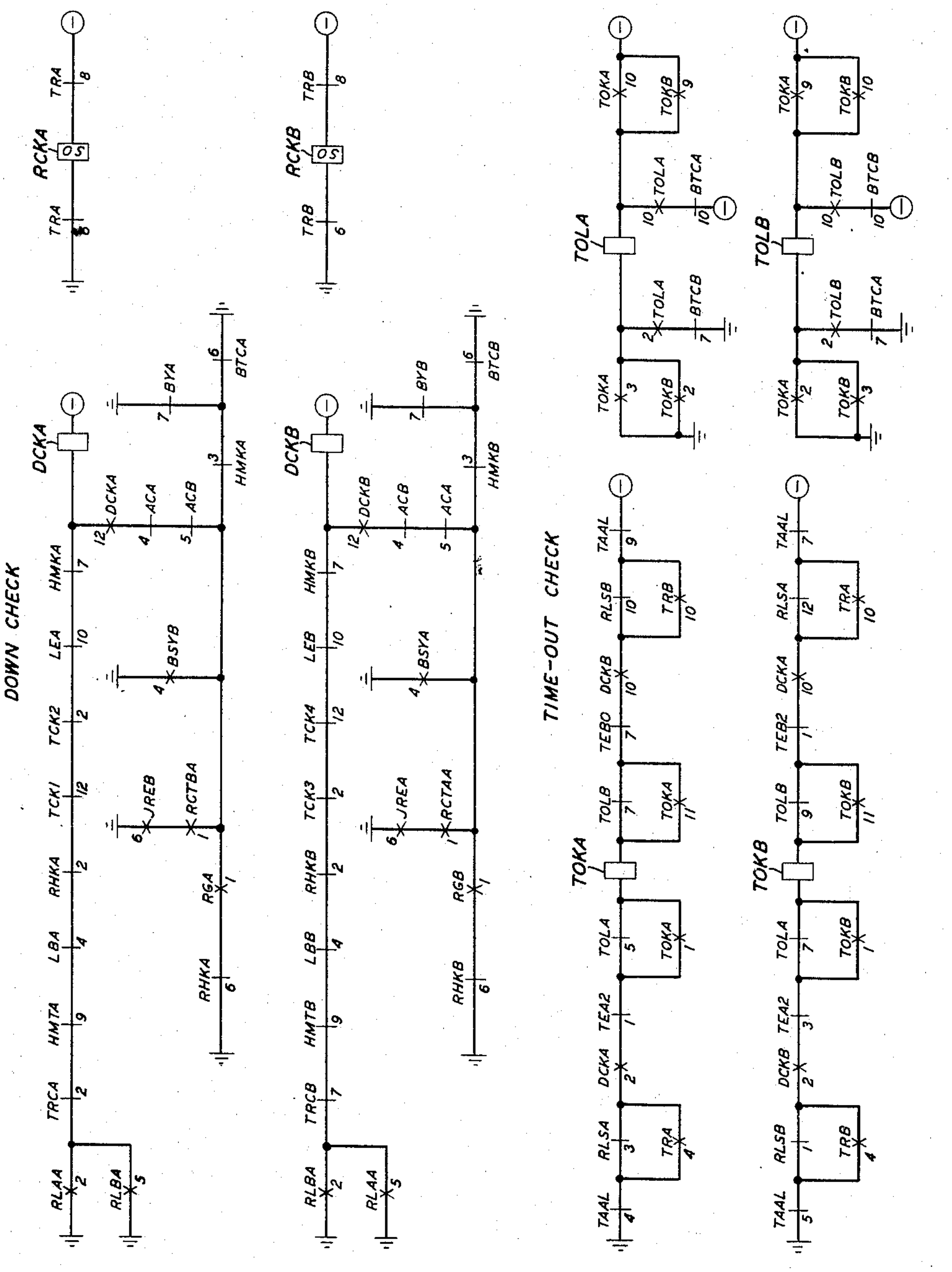
Figure 51:
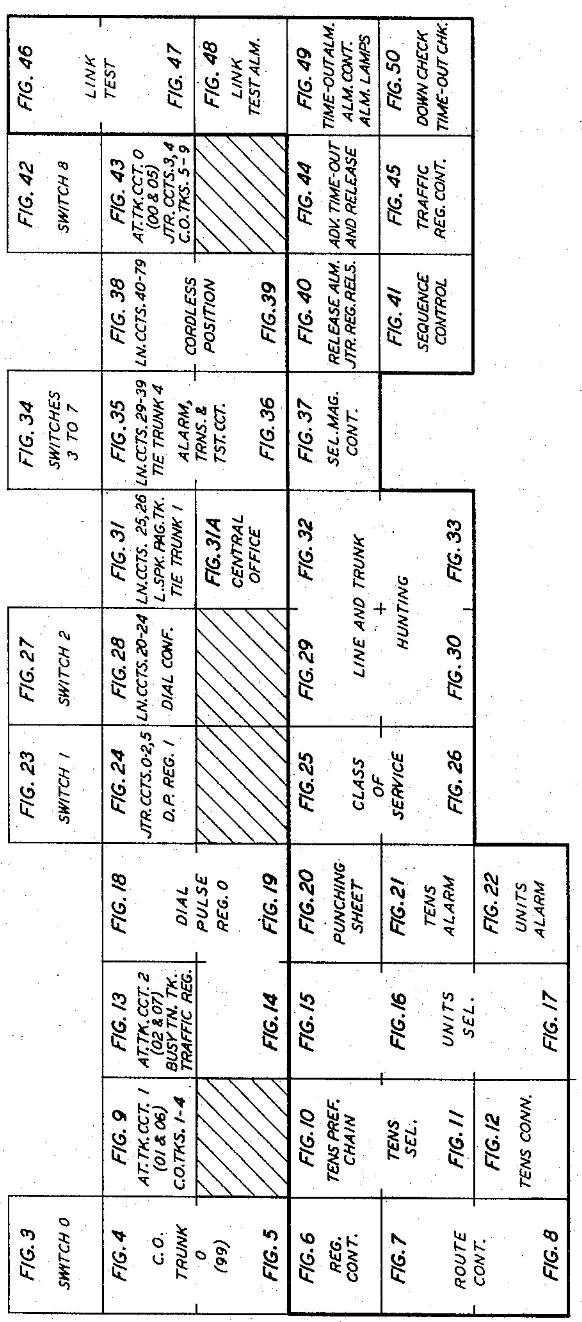
Fig. 51 shows how Figs. 3 through 50 may be conveniently arranged to disclose a complete P.B.X, particular portions thereof identifiable generally as follows.

Figs. 6 to 8, 10 to 12, 15 to 17, 20 to 22, 25, 26, 29, 30, 32, 33, 37, 40, 41, 44, 45, and 46 to 50 show the marker circuit, the separate functional circuits of which are located as follows:

Fig. 6 shows the register control;

Figs. 7 and 8 show the route control;

Fig. 10 shows the tens preference chain;

Figs. 10 and 11 show the tens selection;

Fig. 12 shows the tens connector;

Figs. 15 to 17 show the units selection;

Fig. 20 shows punchings and cross-connections for class of service and line-and-trunk hunting control;

Figs. 21 and 22 show, respectively, the tens alarm and units alarm;

Figs. 25 and 26 show the class of service;

Figs. 29, 30, 32 and 33 show the line and trunk hunting;

Fig. 37 shows the select magnet control;

Fig. 40 shows the release alarm and the junctor register relays;

Fig. 41 shows the sequence control;

Fig. 44 shows the advance, time-out and release;

Fig. 45 shows the traffic register control;

Figs. 46 and 47 show the link test;

Fig. 48 shows the link test alarm;

Fig. 49 shows the time-out alarm, the alarm control, and alarm lamps; and,

Fig. 50 shows the down check and the time-out check.

SWITCHING PRINCIPLES AND MAJOR SWITCHING ELEMENTS

*General*

The switching plan of the P.B.X is designed to provide for interconnection between station lines, central office trunks, tie trunks, attendant trunks, and special services, as prescribed by accepted P.B.X traffic operating practices. The P.B.X switching plan employs crossbar switches under control of a common group of circuits. The common group control circuits of this P.B.X are designed with the marker as the basic element. The marker has interconnections with all of the other circuits. The functions involved in completing calls are accomplished partly by the marker and partly by the other circuits. The switching plan is illustrated by the block diagram shown in Fig. 2A. The station lines, central office trunks, tie trunks, attendant trunks, busy tone trunk, junctors, and dial pulse registers are terminated on the verticals of crossbar switches. Connections between verticals are made through 16 links using the horizontal paths of the crossbar switches.

When a station in the P.B.X originates a call, a line relay operates and signals the identity of the calling line to the marker. The marker then selects an idle dial pulse register and establishes a connection from the calling station to this register through an idle horizontal path in the crossbar switches. The register returns dial tone to the calling station and stores the dial pulsed information. When the dial pulse register has stored all of the dialed information, it calls for the marker and passes information to it as to the type of call required, the number called, and the class of the calling party. The marker then completes the call.

The marker operates on only one call at a time. While the marker is serving a call, all other calls are locked out so as not to interfere with the call in progress. The marker operation is relatively fast and the involvement time so short that under normal operating conditions, no appreciable delay is experienced in handling the other calls which may be in progress.

A station-to-station call requires two links, one from the calling station to the originating end of a junctor, and one from the terminating end of the junctor to the called line. The marker sets up this connection and the junctor applies ringing. A dialed tie trunk-to-station call also uses two links and a junctor, and the call is completed as in a station-to-station call. Calls from a station to a trunk, or from a trunk to a station, or from a trunk to a trunk, do not require a junctor and use only one link for completion.

When an incoming trunk to the P.B.X is seized at the central office, an indication of the seizure appears at the attendant equipment. The attendant answers the call and completes it to the desired station by dialing. When the attendant starts this completion, the trunk calls for the marker and identifies itself. The marker then connects the trunk to an idle dial pulse register in the same manner as for a station line.

Calls encountering busy stations, all trunks busy, or all paths busy are routed to a busy tone trunk which returns a busy indication to the originating end of the call. If the busy tone trunk is busy, the register returns the busy indication.

*Crossbar switches*

Each of the crossbar switches used in this P.B.X is a 10 by 10 switch providing 100 crosspoints. It contains 10 vertical units and 10 horizontal units consisting of five horizontal bars with two select magnets for each bar. One select magnet pulls the bar upward and the other select magnet pulls it downward, thus providing two horizontal paths for each bar or a total of ten horizontal paths. The crossbar switch horizontals are arranged so that a total of 16, 3-wire links are available for calls. These links are obtained by using eight 6-wire horizontals (levels 2 to 9) and choosing either the left half or the right half (or the upper or lower half, as they may be referred to) of a crosspoint by operating either the 0 or 1 level 3-wire crosspoint in combinaiton with one of the others. Each vertical unit has ten groups of contacts, one for each horizontal unit associated with it. The groups associated with horizontal unit 2 to 9 contain six contacts and the remaining two vertical groups contain three contacts. The vertical contacts are wired in multiple. A hold magnet with two off-normal break contacts is provided for each vertical unit.

*Station lines*

The station line circuits serve to indicate a request for service and to identify the station line requesting service. The universal line circuits for station lines or trunks are normally arranged for use as station line circuits. Provision is made through strapping on terminal strips whereby these circuits may be arranged for use with trunk-type circuits. These circuits are designed to serve tie trunks, secondary trunk groups, conference arrangements, paging trunks, or other special services, as required.

*Central office trunks*

The central office trunk circuits used with this P.B.X serve as 2-way links between the central office and the P.B.X. When the trunk is seized at the central office, the attendant is alerted that an incoming call is awaiting answer by a lamp signal and an audible signal. After answering the call, the attendant may extend it to a P.B.X line and may either remain on the line to announce the incoming call, or release immediately after receiving ringing induction. If the called line is busy, the trunk circuit will camp on the connection until the called line becomes idle, at which time it will automatically cut through and ring the line. However, if the called line is already camped-on and a second incoming trunk call tries to establish a connection to it, the trunk circuit returns a visual and audible indication to the attendant who in turn advises the calling party of the busy and waiting conditions.

Distinctive lamp signals are provided to indicate the call progress for all incoming and outgoing trunk calls.

When a station within the P.B.X originates a call to the central office, the trunk circuit acts as a screening device to either allow or deny toll calls from being completed in accordance with the class mark of the calling line. In cases where direct toll access is denied to the calling line, the central office trunk circuit disconnects the call from the toll connection and causes it to return busy tone.

*Attendant trunks*

The attendant trunk circuits provide means whereby the attendant may originate calls to P.B.X lines or vice versa. The attendant trunk circuit provides talking battery for the connection. This trunk is also used in establishing connections between station lines which are not permitted access to central office trunks or to toll codes or operators and the central office or toll facilities. After the attendant establishes a call between the station line and the central office, the attendant trunk is automatically released from the connection and becomes available for other calls.

*Tie trunks*

Each tie trunk uses one line terminal. The classes of service available for station lines are also available for these tie trunks. The trunks will use two links on each call from a tie trunk to a station line, one to connect the tie trunk to the originating end of a junctor, and the other to connect the terminating end of the junctor to the called line. On outgoing calls from P.B.X stations to these tie trunks, junctors are not required; therefore, only one link is used.

*Busy tone trunk*

When a P.B.X line or trunk originates a call to another P.B.X line or trunk and the called line or trunk is busy, the call is automatically routed to a busy tone trunk. Routing a call to the busy tone trunk permits the release of the dial pulse register to handle subsequent calls. When the busy tone trunk is seized, it supplies 60 i.p.m. interrupted tone to the connection and holds the connection under control of the calling party.

*Dial pulse registers*

The dial pulse register functions as a dial pulse counter and digit and class information storage. The register receives and stores the originating line or trunk class information from the marker and transmits dial tone to the calling line or trunk. The dial pulse register is arranged to receive 2-digit codes for station lines and miscellaneous trunks, 1- or 2-digit codes for central office trunks, and a 1-digit code for attendant trunks. After dialing is completed, the register engages the marker to complete the call and transmits to the marker information needed to establish the connection to the called line or trunk. When the connection has been established, the marker releases the register. The register also returns busy tone when a signal is received from the marker that the busy tone trunk is busy. The register allows from 8 to 16 seconds in which to complete the dialing after seizure. If dialing is not completed within this interval, the register signals the marker to route the call to an attendant trunk. This arrangement is provided to prevent tying up the register in cases where dialing is incomplete or where a receiver is left off the hook.

*Junctors*

The junctor circuit is used to supply talking battery and to provide supervision on station-to-station and tie trunk-to-station calls. When the marker is signaled by the register to set up a call of this type, it does so by connecting a link from the terminating end of the junctor to the called line, and another link from the originating end of the junctor to the calling line. Upon seizure, the junctor holds both ends of the connection and applies ringing current to the called line. When the called line answers, the junctor trips the ringing and cuts through the transmission path.

*Marker*

The marker is the basic control element of the P.B.X and is the most complex part of the system. In response to signals received from the station lines, trunks, dial pulse registers, etc., the marker establishes connections in accordance with the directions received.

The marker is self-checking and is designed so that its operations are timed. If for any reason its operations are not completed within the time allotted, the marker advances to a second trial condition and another attempt, using different circuits, is made to complete the call. If the marker is unable to complete the call in the second trial, it is restored and the call is routed to the busy tone trunk. If the marker is unable to complete the call to the busy tone trunk before the timing circuit advances again, the marker is released from the call and the call is locked out of the marker until all waiting calls have been served.

The marker is designed so that a single relay trouble, such as dirty contacts, crosses, grounds, opens, or faulty adjustments, will not cause the failure of service on more than ten station lines, nor on more than one half of all links, nor on more than one half of all trunks in any one group. To meet this objective, critical relays, contacts, and circuit paths have been provided in duplicate and arranged so that, in the event of trouble, the trouble spot is bypassed. The marker is also arranged so that it provides sectionalized alarm indications in the event of trouble or circuit failure.

*Numbering plan*

The station lines are numbered 30 to 79 in the 60-line P.B.X. The universal line circuits are arranged to be reached by dialing 20 to 29 when used for station lines, and by dialing 80 to 89 when used for the trunks or miscellaneous trunks. The central office trunks are normally reached by dialing the single digit "9." If foreign exchange lines are also desired, 2-digit codes 90 to 99 are assigned for central office connections by changing wiring straps at the dial pulse registers. The attendant trunks are coded "0."

*Class of service*

Three classes of service are available for the station lines:

(a) *Restricted.*—The station is required to place outgoing central office calls through the attendant position. An attempt to place a call by dialing the central office code will result in the call being intercepted by the attendant.

(b) *Toll allowed.*—The station may dial central office calls including those to the toll facilities.

(c) *Toll denied.*—The station may dial a local central office but will be directed to busy tone should an attempt be made to dial a toll call or to reach the toll operator.

Lines within any tens group may be arranged for 1- or 2-way consecutive or nonconsecutive line hunting by optional strapping on the line unit terminal strip. With this arrangement, calls to a busy line in a 1-way hunting group will hunt for an idle higher numbered line in the group. Calls to a busy line in a 2-way hunting group will hunt for an idle higher or lower numbered line in the group. With either arrangement, the assignment of line numbers in a hunting group may be in consecutive order or not, as desired.

*Supplementary services*

Arrangements are included in the P.B.X whereby such usual supplementary services as tie trunks, long lines, long trunks, conference arrangements, code call, loudspeaker paging, and recorded telephone dictation may be provided when and if desired.

APPARATUS AND EQUIPMENT ELEMENTS

*Switching cabinet*

Figure 1:
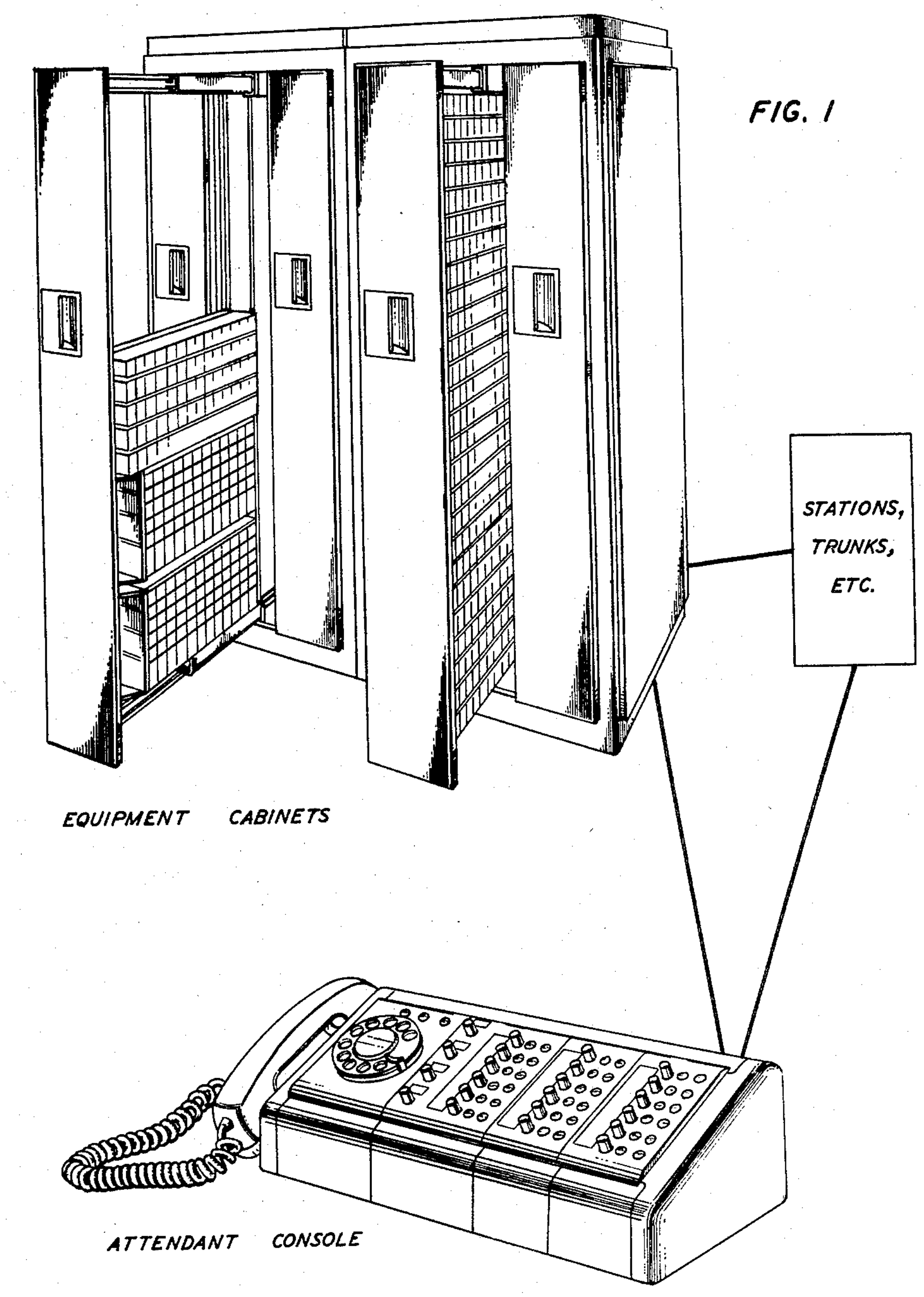
Fig. 1 is a perspective illustration of the Equipment Cabinets and Attendant Console which house all of the circuitry, apparatus, equipment, etc. in a sixty (60) line version of the crossbar P.B.X, detailed circuits, etc. for which are shown in Figs. 3 through 50.

The switching equipment for the P.B.X is mounted in a specially designed switching cabinet, Fig. 1, consisting of twin modules which are bolted together at the installation site and interconnected by a plug-in cable. The switching cabinet is designed so that it may be located against a wall or partition in general office space along with office furniture, file cabinets, business machines, etc. The modules are constructed of steel framework. The side panels are removable and the top may be raised for access to the cable terminations. Sound absorbing materials are provided to achieve quiet operation.

The apparatus in each module is mounted on three vertical sliding-type racks, each supported at the top and bottom by telescoping tracks. Each slide is equipped with a dustproof face panel, in the center of which is a flush mounted handle for use in withdrawing the slide. Concealed in the handle is a latch for use in releasing the slide from its normally closed position. The three slides in each module are provided with an interlocking device so that only one slide per module may be withdrawn at a time. With this arrangement, the weight distribution is such that the cabinet does not require anchoring to the floor.

*Attendant equipment*

The attendant cordless position, Fig. 1, consists of a modular station unit containing the lamps, pickup keys, and common equipment required for attendant service. This unit contains the following common equipment:

(*a*) Attendant telephone set
(*b*) Dial
(*c*) Audible signal with adjustable volume control
(*d*) Trouble indicating lamp
(*e*) Control keys
(*f*) Trunk pickup keys and lamps A combined turn and push key is provided for Night Transfer and Dial-Back. The locking turn portion of this key is used to establish night service between four central office trunks and four station lines. The nonlocking push portion of this key is used to permit the attendant to dial back the calling station when establishing central office connections for restricted station lines. A 2-position locking turn key is provided to cut off the audible signal. A nonlocking push Hold key is provided. A nonlocking push Release key is provided to restore any depressed pickup key.

The trunk pickup keys are of the locking push type and are used for connecting the attendant to the trunk lines. There are two lamps associated with each pickup key to indicate the various stages of a call's progress.

*Station equipment*

The P.B.X is designed so that any standard station equipments or key equipments normally used in association with P.B.X service may be used with it.

TRAFFIC HANDLING FEATURES

*General*

Local calls and outgoing central office or tie trunk calls are made by dialing. On an incoming call, visual and audible signals appear at the P.B.X attendant equipment. The incoming trunk call is answered by depressing a key associated with the visual signal. If the call is to be extended to a P.B.X station line, the P.B.X attendant dials the desired station code and the call is automatically connected. If the desired station line is busy on another call, the new call may "camp on" the called line until the line becomes idle, at which time the call will be cut through to the desired line. Upon conclusion of the conversation, the connection will be disconnected automatically.

*Class of service options*

Several class-of-service options may be applied to station lines, tie lines, central office trunks, and attendant equipment. Unrestricted station lines and tie trunks are permitted access to central office trunks. Restricted lines and trunks are denied direct access to the central office trunks, and may or may not be restricted from tie trunks. Outgoing calls from restricted facilities must be placed through the attendant. If a restricted station dials the central office code "9," the call will be intercepted by the attendant. Toll allowed lines and trunks may dial the central office operator or toll facilities. Toll denied lines and trunks may dial the central office or place extended area calls but are denied access to the toll facilities. However, this option may be used only in those areas where the central offices are arranged for toll diversion. Attempts to place such unauthorized calls will result in the caller being connected to busy tone. Unrestricted trunks are permitted access to other central office trunks and to tie trunks. Restricted trunks are denied access to other central office trunks and may or may not be restricted from tie trunks. Attempts to establish such unauthorized connections will be intercepted by the attendant.

*Typical calls*

There are ten (10) types of calls which illustrate the flexibility of the traffic handling ability of the P.B.X. These calls may be designated as follows.

(1) P.B.X line to P.B.X line.
(2) P.B.X line (unrestricted) to central office trunk.
(3) P.B.X line (restricted) to central office trunk.
(4) P.B.X line to tie trunk.
(5) Incoming central office trunk.
(6) Incoming tie trunk.
(7) Attendant originated.
(8) Conference connection.
(9) Special service trunks.
(10) Calls to unassigned lines or trunks.

(1) P.B.X LINE TO P.B.X LINE

A P.B.X station desiring to call another P.B.X station lifts the receiver and, after hearing dial tone, dials the 2-digit code of the desired station. If the called line is idle, automatic machine ringing, interrupted at a rate of 1 second on and 3 seconds off, will ring the bell at the called station. At the same time, an audible tone is heard by the caller. Lifting the receiver at the called station stops the ringing and conversation is possible. At the conclusion of the conversation, replacement of the receivers will automatically break the connection. If one station fails to replace the receiver, the other station may break away from the connection by hanging up. If the called line is busy and is in a hunting group, the call will be completed to an idle line in the hunting group, if one is available. If all of the lines in the group are busy, or if the called line is not in a hunting group, the caller will be advised of the busy condition by a busy tone, interrupted 60 times per minute (60 i.p.m.).

(2) P.B.X LINE (UNRESTRICTED) TO CENTRAL OFFICE TRUNK

An unrestricted station, after lifting the receiver and hearing dial tone, may be connected to the central office by dialing the single digit "9," or in cases where the P.B.X is served by foreign exchange trunks, by dialing a 2-digit code "90" to "99" for the desired trunk group. Upon completion of dialing, an idle trunk in the desired group will be selected and the caller will hear central office dial tone, or the central office operator, if the P.B.X is in a manual central office area. If all of the trunks in the group are busy, the caller will hear P.B.X busy tone.

(3) P.B.X LINE (RESTRICTED) TO CENTRAL OFFICE TRUNK

A restricted station line may be connected to a central office trunk with the aid of the P.B.X attendant. In this case, the caller dials the single digit "0," which will complete the call to an attendant trunk. The caller will hear the interrupted ringing tone and the attendant will be alerted by an audible and visual signal at the attendant equipment. The station line lamp of the attendant trunk will flash intermittently at 120 i.p.m. and the audible signal will sound at the same rate. The attendant answers the call by depressing the pickup key associated with the attendant trunk. The station lamp then ceases to flash and becomes steadily lighted and the audible signal is silenced. The attendant and the caller are now connected together. Once connected, the attendant, after conversing with the caller, has the option of disconnecting, placing the call on hold, or extending the connection to a trunk.

If the connection is to be extended to a central office or "outside" number, the attendant momentarily depresses the Hold key which disconnects her from the attendant trunk. Meanwhile, the station remains off-hook. The attendant then depresses an idle central office trunk pickup key, which releases the depressed attendant trunk pickup key and causes the trunk lamp associated with the central office trunk to light steadily. After hearing central office dial tone, the attendant dials the desired number, and, upon reaching the desired number, momentarily depresses the Hold key. This holds the trunk, connects the attendant to P.B.X dial tone, and causes the trunk lamp to wink at 30 i.p.m. The attendant then momentarily depresses the Dial-Back key and dials the code of the calling station. The connection cuts through from the attendant to the calling line, both the trunk and station lamps of the central office trunk become steadily lighted, and the attendant trunk is automatically released. At this point the attendant is connected to the calling station and the called party is excluded from the conversation. To connect the calling station with the called party, the attendant momentarily depresses the Release key. The operation of the Release key also restores the trunk pickup key to normal and disconnects the attendant from the connection. Both the trunk lamp and the station lamp of the associated trunk key remain steadily lighted during the conversation. When the station disconnects at the end of the call, the station lamp goes dark; and, when the central office disconnects, the trunk lamp goes dark and the connection is broken.

(4) P.B.X LINE TO TIE TRUNK

Station lines which are permitted direct access to tie trunks may be connected by dialing the 2-digit code in the "80" to "89" group assigned for the desired destination. If the tie trunk is of the dial repeating type, the distant end will either be ready to receive dial pulses immediately or will transmit a second dial tone, depending upon the type of P.B.X at the distant end, after which the caller will dial the code of the desired station. If the tie trunk is of the ringdown type, the connection to the tie trunk will cause a 2-second ringing signal to be transmitted to the distant end. This signal will alert the attendant at the distant P.B.X. This attendant, after answering the call and conversing with the caller, will extend the call to the desired destination.

(5) INCOMING CENTRAL OFFICE TRUNK

All incoming central office calls to the P.B.X are handled by the P.B.X attendant. When the trunk is seized at the central office, the attendant is alerted that an incoming call is awaiting answer by a 120 i.p.m. flashing trunk lamp and audible signal. If this seizure is made during the silent interval of the central office ringing cycle, the trunk lamp lights steadily until the ringing starts, after which it flashes until answered. When the attendant answers this signal by depressing the pickup key associated with the trunk, the trunk lamp becomes steadily lighted and the audible signal is silenced. The attendant, after conversing with the caller, may disconnect from the trunk by momentarily depressing the Release key, which restores the trunk pickup key to normal, or she may place the trunk on hold by momentarily depressing first the Hold key and then the Release key. This action will hold the trunk, and the trunk lamp will wink intermittently at 30 i.p.m.

If, after answering the incoming signal, the attendant determines that the call is to be extended to a P.B.X station line or trunk, she momentarily depresses the Hold key. This holds the trunk, causes the trunk lamp to wink intermittently at 30 i.p.m., and connects the attendant to P.B.X dial tone. The attendant then dials the code of the desired station line.

If the called line is idle, the trunk lamp ceases to wink and becomes steadily lighted; the station lamp winks at the 30 i.p.m. rate, indicating that the called line is being rung; and the attendant hears the ringing induction. Unless the attendant wishes to announce the call to the called party, she momentarily operates the Release key. This restores the trunk pickup key to normal and disconnects the attendant from the connection. When the called line answers, the station lamp ceases to wink and becomes steadily lighted, and the central office trunk cuts through to the called line. Both the trunk and station lamps remain steadily lighted during the conversation. If the attendant wishes to announce the call, she remains on the connection. When the station line answers, the connection is between the attendant and the called party, and the calling party is excluded from the conversation. If the called party wishes to talk to the caller, the attendant operates the Release key, and the connection is established between the trunk and the called line. If the called party does not wish to talk to the caller, the attendant momentarily operates the Hold key, which releases the inward connection. The station lamp goes dark and the attendant is reconnected to the caller.

If the called line is busy, the trunk will camp on it provided it is not already camped-on, the station lamp will flash intermittently at 60 i.p.m., and the attendant will hear the busy tone. The attendant then operates the release key, which removes the busy tone and prepares a connection which may later be cut through from the called line to the central office trunk. At this time the attendant, by reoperating the trunk pickup key, may reenter the connection to advise the caller of the busy condition. If the caller wishes to wait, the attendant operates the Release key and the trunk continues to camp-on. When the called station becomes idle, the trunk automatically cuts through and starts ringing the called line. The caller hears the ringing induction, and the station lamp changes from 60 i.p.m. flash to 30 i.p.m. wink. When the called line answers, the ringing is tripped and the station lamp becomes steadily lighted. If the called line is already camped-on, the station lamp flashes at 120 i.p.m. and the busy tone, interrupted at 120 i.p.m., is heard by the attendant. The attendant then momentarily operates the Hold key to release the inward connection and to reconnect her to the caller, whereupon the station lamp goes dark. The attendant advises the caller of the busy and call waiting conditions. The attendant may either disconnect, continue to hold the trunk as previously described, or she may connect the caller to another P.B.X line or trunk. Her actions in the latter case are the same as for establishing the original connection.

Once a connection is established between a trunk and a P.B.X line, the attendant plays no further role in the call unless recalled by the called line. If the called line wishes to recall the attendant, the station switchhook is momentarily depressed, causing the station lamp to flash at 120 i.p.m. and the audible signal to sound steadily. The attendant answers the recall by operating the trunk pickup key. This silences the audible signal and the station lamp becomes steadily lighted. If the call is to be transferred to another P.B.X line, the attendant momentarily depresses the Hold key twice, the first operation releasing the original connection, and the second, connecting the attendant to P.B.X dial tone. She then proceeds as for a new call as described above.

(6) INCOMING TIE TRUNK

Incoming calls from dial repeating tie trunks are treated as station-to-station calls on a direct dial basis. After the trunk is seized by the distant end, dial tone from the P.B.X is transmitted to the caller. The caller then dials the code of the desired destination.

(7) ATTENDANT ORIGINATED

With cordless operation, the attendant, by using the attendant trunk, may originate a call to a station line, to a tie trunk, or to a special service trunk. In making such a call from the cordless position equipment, the attendant selects an idle attendant trunk and depresses the associated pickup key. This causes the station lamp to light steadily and the P.B.X dial tone to be heard. Operation of the attendant trunk button of a key telephone set will cause the button to be lighted steadily and the P.B.X dial tone to be heard. In either case, the attendant then dials the code of the desired line or trunk and ringing induction is heard. When the called line answers, conversation is possible. The attendant may disconnect by momentarily depressing the Hold key and operating the Release key with the cordless attendant equipment or by hanging up with the key telephone set.

(8) CONFERENCE CONNECTION

The conference circuit of this P.B.X is of the "meet-me" type. A conference is set up by the parties involved dialing the conference code at a specified time. The conference circuit may be assigned to line terminals "80" to "84" or "85" to "89," as desired. To reach the conference circuit in a P.B.X where it is connected to terminals "80" to "84," the parties on the station lines dial the code "80" while those on trunks dial the code "83." If terminals "85" to "89" are used, the parties dial "85" and "88," respectively. A maximum of five station lines or three station lines and two trunks may be connected to the conference circuit. An attempt to connect lines or trunks beyond the maximum results in the additional caller being diverted to busy tone. Central office trunks are connected to the conference circuit by the attendant in the same manner as for a trunk-to-station call, as described above.

(9) SPECIAL SERVICE TRUNKS

Special service trunks are normally assigned to line or trunk terminals in the "80" to "89" group and are reached by dialing the appropriate code. With cordless operation, the line may, in some cases, be terminated at a spare key position to permit the attendant to pick up the line manually. In this case, a busy lamp associated with the key lights steadily to indicate a busy condition. In cases of emergency, the attendant may gain access to the circuit under busy conditions by depressing the pick-up key.

(10) CALLS TO UNASSIGNED LINES OR TRUNKS

If a call has been directed to an unassigned line or trunk code, the call will be diverted to an attendant trunk. When the attendant trunk is seized, the caller will hear ringing induction and the attendant will be alerted by a visual and audible signal. The visual signal is interrupted at 120 i.p.m. and the audible signal sounds steadily. With cordless position equipment, both the trunk and station lamps associated with the attendant trunk pickup key will flash. To answer the call, the attendant at the cordless position equipment or at a key telephone set depresses the pickup key. A low tone is transmitted to the attendant to indicate that the call is an intercepted call. When the call is answered, the audible signal is silenced, and the station lamp, key button, or busy lamp becomes steadily lighted.

NATURE OF THE DRAWINGS

The circuits of the present disclosure are arranged in the so-called "detached contact" type of circuit representation. Generally speaking, this type of circuit representation shows relay, key, etc. contacts separated from the relay winding, etc. which controls those contacts. This type of disclosure permits functional groups of circuitry to be shown separately, thus facilitating an understanding of the operational features embodied in the system.

A ready understanding of circuits presented in this form can be realized by a few examples, taking the central office trunk circuit 0 of Figs. 4 and 5 as illustrative. In the lower left corner of Fig. 5 is a relay winding designated TTT. Just to the left of relay TTT on the circuit path is an X designated TTT and numbered 1. This represents a pair of contacts controlled by the TTT relay so as to be open when relay TTT is unoperated and to be closed when relay TTT is operated; that is, it represents what is commonly referred to in the art as a "make contact." Near the top center of Fig. 4 is shown another X designated TTT and numbered 10. This is another make contact of the TTT relay, etc. Near the upper right center of Fig. 4 is a — shown across a circuit lead and it is designated TTT and numbered 5. This symbol represents a pair of contacts controlled again by the TTT relay but closed when the relay is unoperated and open when the relay is operated; that is, it represents what is commonly referred to in the art as a "break contact." Also, in the upper middle part of Fig. 4, directly over the coil designated H1, are two markings X and — across two circuit leads which intersect. This pair of symbols is designated TTT and is numbered 6. This pair of symbols represent what is known in the art as a "transfer"; that is, the X is a make contact pair and the — is a break contact pair where one contact is common (electrically) to both pairs. The circuit action in this instance, when relay TTT operates, is to open the lead to the H1 coil and close the lead to the bottom winding of the H coil—i.e., a "transfer."

Similar symbols are used to show the functional action of keys, jacks, etc. For instance, on Figs. 38 and 39 is shown the cordless attendant position circuit which, as may be seen in Fig. 1, involves keys, etc. In the center of Fig. 38 are shown symbols for fourteen (14) "pick-up keys." Each key is shown as a transfer, this being the functional circuit result of the attendant depressing the corresponding key in Fig. 1. Similarly, near the right upper portion of Fig. 39 are shown X and — symbols designated variously as "dial back," "hold," and "aud. sig.", etc. Again, the symbol X is a make (operated key) contact and the symbol — is a break (unoperated key) contact. The transfer pair designated "B Jack" in Fig. 39 represents a plug-and-jack arrangement where the X symbol is a closed pair and the — symbol an open pair when the plug is in the jack, and vice versa.

To facilitate a correlation between relay windings and contacts controlled thereby, the following table is provided showing upon which figure of the drawing appears the winding for each relay in the system. This table will be useful to those who may, at some time during a study of the circuits, desire to know the location on the drawings of the winding or coil which controls a contact of interest.

DRAWING LOCATION OF RELAYS, ETC.

| Relay, etc. | Patent Figure |
|---|---|
| A | 24 |
| A(1–4) | 36 |
| AA | 9 |
| AB | 13 |
| AC | 4 |
| ACAA | 9 |
| ACA, ACB | 17 |
| ACAT | 4 |
| ACC | 28 |
| AL | 36 |
| ALBA, ALBB | 47 |
| AP | 31 |
| ARBA, ARBB | 11 |
| AT | 35 |
| ATA | 35 |
| B | 24 |
| BA | 9 |
| BC | 28 |
| BSYA, BSYAA, BSYB, BSYBA | 32 |
| BTCA, BTCB | 7 |
| BTTA, BTTB | 8 |
| BTOF | 13 |
| BTPC | 13 |
| BY | 5 |
| BYA, BYB | 32 |
| BYR | 18 |
| CC | 28 |
| COA, COAA, COB, COBA, CONA, CONAA, CONB, CONBA | 8 |
| COS, COSA, COSB | 47 |
| COT | 14 |
| COTA, COTB | 7 |
| CT | 4 |
| D | 24 |
| DC | 19 |
| DCC | 28 |
| DCKA, DCKB | 50 |
| DR | 4 |
| EC | 28 |
| FA | 36 |
| FB | 39 |
| FF | 4 |
| H | 4 |
| HCA, HCB | 29 |
| HD | 5 |
| HDA | 9 |
| HM | 5 |
| HMKA, HMKB | 29 |
| HMTA, HMTAA, HMTB, HMTBA | 7 |
| HO | 36 |
| HP | 39 |
| ICTA, ICTB | 8 |
| IN20, IN24 | 28 |
| IN26 | 31 |
| JOF | 13 |
| JPC | 13 |
| JR(0–5) | 40 |
| JRAL | 22 |
| JREA, JREB | 40 |
| JTA, JTAA, JTB, JTBA | 41 |
| L | 18 |
| L26 | 31 |
| L30, L34, L39 | 35 |
| L40, L59, L79 | 38 |
| LAL1, LAL2, LAL2A | 48 |
| LBA, LBB | 47 |
| LCK1, LCK2 | 37 |
| LEA, LEAA, LEB, LEBA | 47 |
| LHM20, LHM24 | 28 |
| LHM25, LHM26 | 31 |
| LHM30, LHM34, LHM39 | 35 |
| LHM40, LHM59, LHM79 | 38 |
| LOF | 13 |
| LT | 31 |
| LT(2–9) | 46 |
| LTA, LTAA, LTB, LTBA | 47 |
| LTCA, LACB | 47 |
| LTS(2–6) | 46 |
| LTS(7–9) | 47 |
| LUCA, LUCB | 17 |
| M | 31 |
| MAL | 40 |
| MC | 5 |
| MTA, MTB | 44 |
| NAA, NAB | 44 |
| NCA, NCB | 44 |
| NCPC | 13 |
| NT | 25 |
| NTP | 39 |
| OF0 | 13 |
| OF8 | 13 |
| OF9 | 13 |
| ON | 18 |
| ONA | 9 |
| OPC | 13 |
| OPC8 | 13 |
| OPC9 | 13 |
| OT | 19 |
| OT20, OT24 | 28 |
| OT25, OT26 | 31 |
| OUT | 9 |
| P | 4 |
| P(1–5) | 18 |
| P2A | 18 |
| PA | 36 |
| PU | 18 |
| R | 4 |
| R0, R1 | 11 |
| R1T | 5 |
| RA | 18 |
| RA0A, RA0B, RA1A, RA1B | 6 |
| RCA(0, 1), RCB(0, 1), RCC(0, 1), RCD(0, 1), RCE(0, 1) | 12 |
| RCKA, RCKB | 50 |
| RCTA, RCTAA, RCTB, RCTBA | 41 |
| RGA, RGAA, RGB, RGBA | 6 |
| RHKA, RHKB | 6 |
| RLA, RLAA, RLAB, RLB, RLBA, RLBB | 7 |
| RLAL | 40 |
| RLSA, RLSAA, RLSB, RLSBA | 44 |
| ROF | 13 |
| RP0, RP1 | 10 |
| RPA0 RPA1 | 12 |
| RRLA, RRLB | 18 |
| RS | 5 |
| RT | 18 |
| RTT | 4 |
| RUCA, RUCB | 17 |
| RV | 18 |
| RVC | 28 |
| RVT | 31 |
| S | 4 |

| Relay, etc. | Patent Figure |
|---|---|
| S1T | 4 |
| S(0–4) | 30 |
| S(5–9) | 33 |
| SAA, SAB | 44 |
| SEA, SEAA, SEB, SEBA | 32 |
| SL | 5 |
| SLA | 9 |
| SM(00–89) | 37 |
| SMC(0–8) | 37 |
| SMRA, SMRAA, SMRB, SMRBA | 7 |
| SMTA, SMTB | 37 |
| SOA, SOB | 7 |
| SP | 39 |
| SR | 18 |
| SRT | 4 |
| SRTT | 31 |
| STA, STB | 44 |
| STAR, STBR | 44 |
| STPC | 13 |
| STR | 19 |
| SW | 19 |
| T(2–7) | 10 |
| TA(2–7) | 11 |
| TAA, TAB | 44 |
| TAAL | 40 |
| TACA, TACAA, TACB, TACBA | 12 |
| TAL | 21 |
| TCK(1–4) | 10 |
| TCS(2–7) | 12 |
| TD(0–9) | 19 |
| TEA(0–3), TEB(0–3) | 11 |
| THC(2–7) | 12 |
| THM00 | 5 |
| THM05 | 9 |
| THM07 | 13 |
| THM08, THM09 | 6 |
| THM10 | 24 |
| THM11 | 24 |
| THM18, THM19 | 6 |
| TK0, TK8, TK9, TKA0, TKA8, TKA9, TKB0, TKB8, TKB9 | 12 |
| TLA | 14 |
| TLAT | 5 |
| TLD | 14 |
| TM(2–7) | 12 |
| TMA, TMB | 44 |
| TMOR | 18 |
| TN | 9 |
| TOA, TOB | 44 |
| TOAL, TOALA | 49 |
| TOKA, TOKB | 50 |
| TOLA, TOLB | 50 |
| TOPC | 13 |
| TP | 24 |
| TP(2–7) | 10 |
| TPC | 13 |
| TPC0 | 13 |
| TPC8 | 13 |
| TPC9 | 13 |
| TR | 35 |
| TR0, TR1 | 11 |
| TRA, TRB | 44 |
| TRA0, TRA1 | 11 |
| TRAL | 21 |
| TRC0, TRC1 | 12 |
| TRCA, TRCAA, TRCB, TRCBA | 41 |
| TRKA, TRKAA, TRKB, TRKBA | 41 |
| TRLA, TRLB | 47 |
| TRM0, TRM1 | 12 |
| TRP0, TRP1 | 10 |
| TRPC | 13 |
| TRR | 19 |
| TRT | 31 |
| TRU0, TRU1 | 12 |

| Relay, etc. | Patent Figure |
|---|---|
| TS | 26 |
| TSDA, TSDB | 25 |
| TT | 25 |
| TTR | 14 |
| TTT | 5 |
| TU(2–7) | 12 |
| U(0–3) | 15 |
| U(4–7) | 16 |
| U(8,9) | 17 |
| UAL, UAL1, UAL1A, UAL2 | 22 |
| UD | 19 |
| UEA, UEB | 17 |
| ULA, ULB | 17 |
| W1L | 37 |
| W1LA | 48 |
| WL | 37 |
| WLA | 48 |
| WLG | 47 |
| WLGA | 47 |
| WU | 32 |
| WUA | 22 |
| Z1L | 37 |
| ZL | 37 |
| ZLG | 47 |
| ZU | 32 |

SIGNALING CURRENTS, ETC.

In a number of places throughout the drawings there appear boxes representing different types of signaling currents, voltages, etc. These boxes represent equipment which is well known in the telephone plant today; however, in order that it be fully understood what is involved, each such box will be explained at this point, it being understood that all boxes similarly labeled represent the same signaling condition.

In the lower left corner of Fig. 4 is a box labeled "AC/DC AUD INT" representing an interrupted composite signal of 20 cycles and an audible signal superimposed on minus 50 volt (—50) direct-current voltage. The 20 cycles is ringing current for ringing called station ringers: the audible tone is what is heard by a calling party during ringing; and, the —50 v. is for operating the usual ring-trip relay. The —50 v. is on the signaling lead at all times and the composite signal is applied to the signaling lead by an interrupter for one second out of every four seconds.

In the lower right corner of Fig. 4 is a box labeled "AC/DC AUD" representing an uninterrupted signal composed of —50 v. direct-current voltage with 20 cycles and an audible signal superimposed thereon.

In the lower right corner of Fig. 4 a box labeled "Busy Tone" is self-explanatory.

In Fig. 4, the box labeled "120 IPM Tone" represents dial tone interrupted at a rate of one-quarter second on and one-quarter second off.

In the upper right of Fig. 9 a box labeled "Dial Tone" is self-explanatory.

In the lower right corner of Fig. 9 are two boxes labeled respectively "INT 30 IPM" and "INT 120 IPM." Each represents negative battery (—48 v.) interrupted at a different rate. The former is interrupted at a rate of 1¾ seconds on and ¼ second off, and the latter, at a rate of ¼ second on and ¼ second off. In the lower right corner of Fig. 5 is a similar box labeled "INT 60 IPM." This represents negative battery interrupted at a rate of one-half second on and one-half second off.

In the lower left corner of Fig. 18 are two boxes labeled respectively "INT GRD 1" and "INT GRD 2." The former represents ground applied at the start of an eight (8) second interval, lasting for ¼ second, and then removed until the end of the eight second interval, where it is reapplied to start another eight second interval. The latter of the two signals is phased with the former and represents ground applied from the end of the first ¼ second of the eight second interval (not overlapping the former signal) to the end of the first ½ second of the eight second interval, and kept removed throughout the rest of that eight second interval.

OFF-NORMAL CONDITIONS

When power is supplied to the P.B.X circuits, etc. and before any call handling circuits are involved, there are nevertheless a few preliminary circuit operations which take place in order to ready the P.B.X for service.

*Automatic transfer*

As will be explained more in detail hereinafter, arrangements are provided whereby in the event that a P.B.X attendant's position becomes unoccupied, such as at night, four central office trunks can be switched onto four P.B.X station lines so that traffic can be handled without the necessity of having the attendant present. In order to control this feature the relays AT and ATA in the Alarm, Transfer and Test circuit of Fig. 35 are normally operated. The operating circuit may be traced from ground in the Cordless Position circuit of Fig. 39, over the break contact of the Night key and lead NS to Fig. 35 to battery through the windings of relays AT and ATA. As long as the Night key of Fig. 39 is unoperated, relays AT and ATA will be operated. Conversely, if the Night key should be operated, relays AT and ATA will release. With relays AT and ATA operated, as will be explained hereinafter, the P.B.X line circuits 30 to 33 of Fig. 35 and the central office trunk circuits 0 of Fig. 5, 1 and 2 of Fig. 9 and 5 of Fig. 43 will perform normally. However, if relays AT and ATA should be released, trunks 0, 1, 2 and 5 will be terminated directly into line circuits 30, 31, 32 and 33.

*Trouble indication*

As will be seen in Fig. 36, four fuses F1, F2, F3 and F4 are shown. Through these four fuses is fed power, which is assumed, unless otherwise indicated, to be negative 48 (—48) volts D.C. with the positive pole grounded. The minus sign in a circle, used throughout the drawings, represents this —48 volts obtained via a fuse, etc. These fuses are of the type, well known in the telephone art, which mechanically hold a circuit open and permit it to close only if the fuse blows. Thus, in Fig. 36, relays FA and PA are normally released and lamps FAB and PAA are normally extinguished. If a fuse should blow, one or both of the relays FA and PA would operate and one or more of the lamps FAA, FAB and PAA would be lit. Likewise, in Fig. 36, since there would be no alarm condition present in the P.B.X under normal circumstances, relay AL would be released. With relays AL, FA and PA of Fig. 36 unoperated, relay TR of Fig. 35 will be operated in a circuit from ground over break contacts 5 of relay PA, 5 of FA and 7 of AL to battery through the winding of relay TR. With relay TR operated, battery is removed from the trouble lamp TR of Fig. 35 by the break contact 11 of relay TR, thus leaving lamp TR extinguished, and in Fig. 36 the WCT—WCR trouble signalling circuit to the central office will be opened by break contacts 8 and 10 of relay TR.

*Cordless position occupied*

The cordless position circuit represented in Figs. 38 and 39 is indicated as occupied by an attendant when the plug and jack pairs, indicated in Fig. 38 as "B Jack" and "A Jack," are connected. This means, as heretofore explained, that the make contacts (x) of the A and B jacks are effective (closed) and the break contacts (—) thereof are ineffective (open).

*Dial pulse register normal*

As explained previously, there are two dial pulse registers, registers 0 and 1, provided in the P.B.X. Dial pulse register 0 is shown in detail in Figs. 14, 18 and 19 and, dial pulse register 1 is indicated by a box in Fig. 24 It is necessary for the marker to know at all times whicl of these registers is idle, etc. With respect to dial puls register 0 (DP register 0), when it is occupied or engage in a normal circuit operation its off-normal relay ON of Fig. 18 will be operated and its test relay RT of Fig 18 will be released. Both of relays RT and ON are operated if the register is under test. When the registe is idle, both its ON and RT relays will be released. Referring to Fig. 14, when the register 0 is idle (ON an RT relays released) a circuit is completed from ground over break contacts 6 of relay ON and 5 of relay RT lead ONG0 to the marker register control circuit of Fig 6, break contact 10 of relay ACA, parallel break contact 2 and 5 of respective relays RA1A and RA1B, winding of relays RA0B and RA0B, parallel break contacts 1 and 8 of respective relays RA1A and RA1B, break contact 10 of relay ACB, lead ONB0 to the DP register of Fig. 14, to battery over the break contacts 8 of rela ON. Relays RA0A and RA0B of the marker registe control circuit of Fig. 6 operate in this path, to thereb indicate the idle condition of DP register 0, and shun the break contacts of relays RA1A and RA1B with mak contacts 1 and 12 of relay RA0A so that subsequen possible operation of relays RA1A and RA1B cannot release relays RA0A and RA0B. As soon as DP registe 0 becomes engaged, either by a normal or a test operation, these relays RA0A and RA0B release, thereby in dicating to the marker that DP register 0 is not idle, an thus not available to handle new traffic, etc.

In Fig. 6 are shown the circuits whereby the idle o busy condition of DP register 1 of Fig. 24 is indicate to the marker register control circuit. These relay RA1A and RA1B are controlled by DP register 1 in th same manner as the above described relays RA0A an RA0B are controlled by DP register 0.

It will be noted that the operating path for relay RA1A and RA1B is independent of relays RA0A an RA0B. Thus, relays RA1A and RA1B can operate an time that DP register 1 is idle. However, since the op erating path of relays RA0A and RA0B includes brea contacts of relays RA1A and RA1B, these relays RA0 and RA0B cannot reoperate at any time until after th marker has served a call in DP register 1. It will be as sumed that both DP registers are idle, however, in whicl case, as will be explained hereinafter, the marker wil prefer to deal with DP register 0; but, all four of the re lays RA0A, RA0B, RA1A and RA1B will be operate showing DP registers 0 and 1 to be idle.

DETAILED CIRCUIT OPERATION

All calls except attendant-to-trunk or trunk-to-attend ant calls are established by dialing. As soon as a reque for service is made, for example by a P.B.X station use lifting the station handset from the switchhook, th marker sets up a connection between the calling circu and a dial pulse register. The nature of the originatin circuit and the number dialed determine the terminatin class of the call and the register accordingly directs th marker in its method of call completion.

There are two general call completion classes—junct class and trunk class. Junctor class calls are those whic require a junctor to supply talking battery and ringi current and to provide supervision. All junctor cla calls require two switch links to establish the necessa connections. Trunk class calls are those which do n require the use of a junctor since talking battery is su plied by a trunk, and the trunk is seized on a loop signa ing basis. The trunk class calls require only one swit link to establish the required connections.

The following detailed description is divided in major sections dealing with the following types of call descriptions of which will provide a full understanding of the P.B.X:

(A) P.B.X line to P.B.X line
(B) Tie trunk to P.B.X line
(C) P.B.X line to tie trunk
(D) Tie trunk to tie trunk
(E) P.B.X line (toll allowed) to central office trunk
(F) P.B.X line (toll denied) to central office trunk
(G) P.B.X line (restricted) to central office trunk
(H) Incoming central office trunk
(I) Miscellaneous call features

(A) P.B.X LINE TO P.B.X LINE

A detailed description will now be given of the circuit action involved in extending a call from station 30 to station 34 of Fig. 35.

*Dial tone connection (see Fig. 2C)*

When a P.B.X station lifts the receiver to make a call, the line relay operates and passes the tens and units identity of the calling station to the marker. All calls requesting service compete for the marker. The tens selection circuit of the marker accepts the tens information but allows only one call at a time to be processed. All lines, trunks, and registers are given a location in the tens preference chain, and simultaneous calls are served according to that location. When a call has been given preference, the tens connector, for the group of ten lines in which the calling station line is located, operates and allows the units information from the line relay to be extended to the units selection circuit. However, where more than one line in a group is requesting service, only that line which has the highest preference in the group will be served, as determined by the line and trunk hunting circuit.

Seizure of the marker circuit is effected by the operation of the line relay associated with a calling P.B.X station line. Referring to Fig. 35, when the calling party associated with line circuit 30 initiates a call, a circuit is completed for operating the line relay L30 associated therewith. The operating path for the line relay L30 may be traced from ground over break contact 1,2T of the line hold magnet LHM30, over the T1 lead into the alarm transfer and test circuit, over make contact 1 of the AT relay, over the tip conductor T and through a circuit completed by the lifting of the telephone instrument at station STA30, back over the ring lead R to the alarm transfer and test circuit, through make contact 2 of relay AT, conductor R1, over break contact 1,2B of the line hold magnet LHM30, to battery through the winding of the line relay L30, which thereupon operates. The operation of the line relay L30 causes the operation of the corresponding tens selection relay T3 of Fig. 10. The operating circuit for relay T3 is traced in Fig. 10 from ground, over make contact 1 of the L30 relay, break contact 7 of relay TEA1, break contact 5 of relay TA3, winding of relay T3, break contact 9 of relay TA3, to battery through break contact 7 of relay TEB1. It will be noted in Fig. 10 that each of the tens selection relays T2 through T7 is associated with all of the line relays for lines falling within the corresponding tens group. For instance, the tens selection relay T3 will be operated by the operation of any one of the line relays L30 through L39 which fall within the tens group 3. Upon the operation of any one of the tens selection relays T2 through T7 of Fig. 10, such as the operation of relay T3 in the present example, the tens end relays of Fig. 11, namely, relays TEA0 through TEA3 and TEB0 through TEB3, will be operated as an indication to the marker that at least one tens selection relay has been operated. The operating circuit for relays TEA0 through TEA3 extends from battery, through make contact 4 of any one of the tens selection relays T2 through T7, break contacts 6 of relay TOKA, break contact 8 of relay RLSA, through the windings of relays TEA0—TEA3 and to ground over break contacts 5 of relays RLSB and TOKB. The operating circuit for relays TEB0—TEB3 extends from battery, over make contact 2 of any one of the tens selection relays T2 through T7, break contact 6 of relay TOKB, break contact 8 of relay RLSB, through the windings of relays TEB0—TEB3 to ground through break contacts 5 of relays RLSA and TOKA.

Referring now to Fig. 10, a circuit designated "Tens Preference Chain" includes ten preference relays RP0 through TP7. These preference relays are all included in a preference lock-out circuit whereby only one of them is permitted to operate at any one time. The operation of any one of these preference relays represents the crucial step in the seizure of a marker. The preference relays RP0 and RP1 represent the dial pulse registers 0 and 1, relays TRP0 and TRP1 represent the various trunk circuits involved in the P.B.X depending upon whether the particular trunk is in a so-called "odd" or "even" trunk group as will be explained hereinafter, and the remaining preference relays TP2 through TP7 represent P.B.X line circuit groups involving tens digits 2 through 7. For purposes of simplicity in the present example it has been assumed that all of the circuits in the P.B.X are idle with the exception of the station line 30 chosen as an example in placing the present call. Under these circumstances, all of the tens preference chain relays of Fig. 10 will be released. It will be recalled that the tens selection relay T3 of Fig. 10 is operated as are the tens end relays TEA0—TEA3 and TEB0—TEB3 of Fig. 11. Under these circumstances a circuit is completed for operating the tens preference chain relay TP3 of Fig. 10. This circuit extends through the double windings of the TP3 relay, on both ends of which are two tens check relays. One of the two circuits through the TP3 relay extends in Fig. 10 from ground, through break contact 3 of relay TOKA, the winding of relay TCK4, break contacts 3 of relays RLAA and RLBA, make contact 8 of relay TEA3 break contacts 4 of relays R0, R1 and ARBB, break contacts 3 of relays TR0, TR1 and T2, make contact 3 of relay T3, left-hand winding of relay TP3, make contact 9 of relay T3, break contacts 9 of relays T2, TR1 and TR0, break contacts 10 of relays ARBA, R1 and R0, make contact 8 of relay TEA2, break contacts 11 of relays RLBA and RLAA, through the winding of relay TCK3 to battery through break contact 9 of relay TOKB. In this circuit relays TCK4 and TCK3 operate and the left-hand winding of relay TP3 is energized. The circuit through the right-hand winding of relay TP3 may be traced in Fig. 10 from ground, through break contact 3 of relay TOKB, winding of relay TCK1, break contacts 1 of relays RLAA and RLBA, make contact 8 of relay TEB2, break contacts 2 of relays R0 and R1, break contact 4 of relay ARBA, break contacts 5 of relays TR0, TR1 and T2, make contact 5 of relay T3, right-hand winding of relay TP3, make contact 7 of relay T3, break contacts 7 of relays T2, TR1 and TR0, break contact 10 of relay ARBB, break contacts 8 of relays R1 and R0, make contact 8 of relay TEB3, break contacts 9 of relays RLBA and RLAA, winding of relay TCK2, to battery through break contact 9 of relay TOKA. In this latter circuit relays TCK1 and TCK2 operate and the right-hand winding of relay TP3 is energized. Relay TP3 operates upon the energization of either or both of its windings, thereby to effect seizure of the marker circuit by the tens selection relay T3.

It will be noted in passing that the operation of the tens end relays of Fig. 11, namely relays TEA0—TEA3 and TEB0—TEB3, immobilizes the operating circuits of all of the tens selection relays T2 and T4 through T7 of Fig. 10, the trunk selection relays TR0 and TR1 of Fig. 11 and the register selection relays R0 and R1 of Fig. 11. In addition, the operation of the tens end relays TEB0 and TEA0 complete a locking circuit for the tens selection relay T3 of Fig. 11 extending from ground through the parallel make contacts 5 of relays TEB0 and TEA0, make contact 1 of relay T3, break contact 5 of relay TA3, winding of relay T3, break contact 9 of relay TA3, to battery through make contact 12 of relay T3.

The operation of the tens preference chain relay TP3 of Fig. 10 causes the operation of a number of relays in the tens connector circuit of Fig. 12 and in the units selection circuit of Fig. 17 in preparation for the identification by the marker of the units digit of the calling line circuit 30 of Fig. 35. In Fig. 12, the tens connector relays TCS3, THC3, TU3 and TM3 operate in a circuit extending from ground, over make contact 1 of relay TP3, through the windings in parallel of these ten connectors to battery through make contact 12 of relay TP3. Also, in Fig. 12, the tens connector auxiliary relays TACA, TACAA, TACB and TACBA are operated under the control of the operated tens preference relay TP3 of Fig. 10. The circuit for operating the relays TACA and TACAA extends from ground in Fig. 12, over make contact 2 of relay TP3, break contacts 7 of relays RCB1 and RCB0, break contact 4 of relay RLSAA, through the windings of relays TACA and TACAA, to battery through break contact 11 of relay RLSBA. Similarly, the operating circuit for the tens connector auxiliary relays TACB and TACBA in Fig. 12 extends from ground, over make contact 3 of relay TP3, break contacts 8 of relays RCB1 and RCB0, break contact 4 of relay RLSBA, through the windings of relays TACB and TACBA, to battery through break contact 11 of relay RLSAA. Upon the operation of the tens connector auxiliary relays TACA and TACB of Fig. 12, the line units connector relays LUCA and LUCB and the units lock relays ULA and ULB of Fig. 17 are operated. Relays LUCA and ULA of Fig. 17 are operated in a circuit extending from ground, through the parallel make contacts 1 of relays TACA and TACB, through the winding of relay ULA in parallel with a circuit extending through break contacts 8 of relays UEA and UEB and the winding of relay LUCA, to battery through the parallel make contacts 12 of relays TACA and TACB. The relays LUCB and ULB are operated in a circuit extending from ground, through the parallel make contacts 2 of relays TACA and TACB, through the winding of relay ULB in parallel with a circuit through break contacts 6 of relays UEA and UEB and the winding of relay LUCB, to battery through the parallel make contacts 11 of relays TACA and TACB.

Upon the operation of the tens connector relay TU3 of Fig. 12 and the line units connector relays LUCA and LUCB of Fig. 17, a circuit is completed for operating the units relay U0 in Fig. 15. This circuit in Fig. 15 extends from ground, over make contact 3T,2 of line relay L30, make contact 1 of tens connector relay TU3, parallel make contacts 1 of relays LUCA and LUCB, to battery through the winding of relay U0, which thereupon operates and locks in a circuit extending from its winding through its own make contact 10, to ground through the parallel make contacts 1 of the units lock relays ULA and ULB. It will be noted that in the event that any other line relays may be operated in the group of lines 30 to 39 (that is the same tens group 3), all of the corresponding units relays of the units selection circuit in Figs. 15, 16 and 17 will be operated at the same time that the units relay U0 of Fig. 15 is operated by the operation of the line relay L30 of line circuit 30 in Fig. 35. The possibility of there being more than one units relay operated in the units selection circuit of Figs. 15, 16 and 17, as previously mentioned, will be taken care of by preference circuits in the line and trunk hunting arrangement of Figs. 29, 30, 32 and 33 when the time comes, to be described hereinafter, for actually selecting the preferred one of the calling line circuits. In the present example it may be assumed for purposes of simplicity that the only line which is in a calling condition is the line circuit 30 of Fig. 35, whereupon the only units relay which will be operated in the units selection circuits of Figs. 15, 16 and 17 is the units relay U0 of Fig. 15. Upon the operation of the relay U0 of Fig. 15, the units end relays UEA and UEB of Fig. 17 are operated. Relay UEA operates in a circuit extending from ground, through make contact 9 of relay U0, parallel make contacts 11 of relays TEA3 and TEB3, winding of relay UEA, to battery through the parallel make contacts 10 of relays TACB and TACA. The operating circuit for relay UEB extends from ground, over make contact 8 of relay U0, parallel make contacts 10 of relays TEA3 and TEB3, the winding of relay UEB, to battery through the parallel make contacts 9 of relays TACB and TACA. The operation of the units end relays UEA and UEB causes the release of the line units connector relays LUCA and LUCB of Fig. 17, which relays, upon releasing, prevent any other units relays in the units selection circuit of Figs. 15, 16 and 17 from becoming operated.

Figure 30:
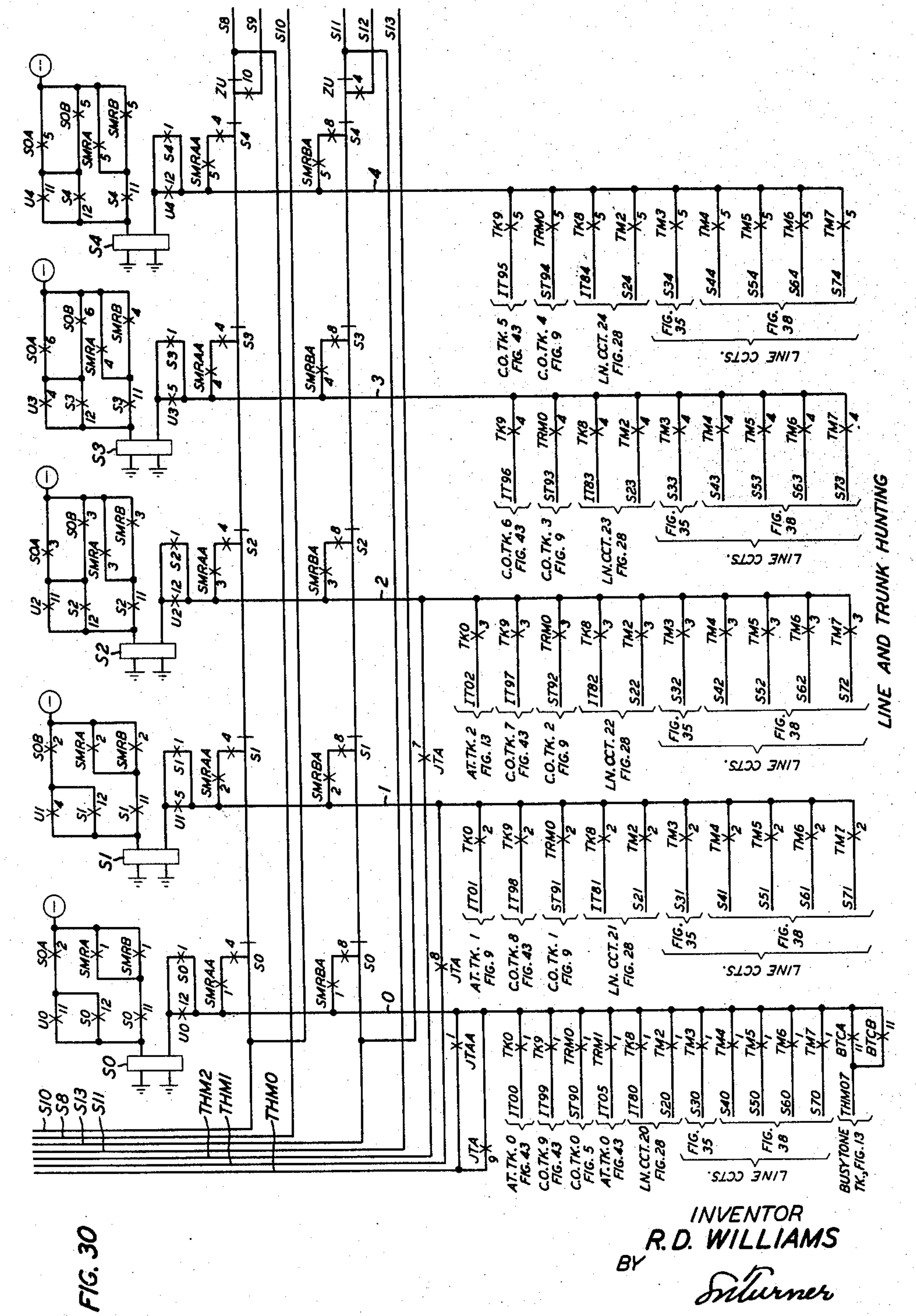
Figure 32:
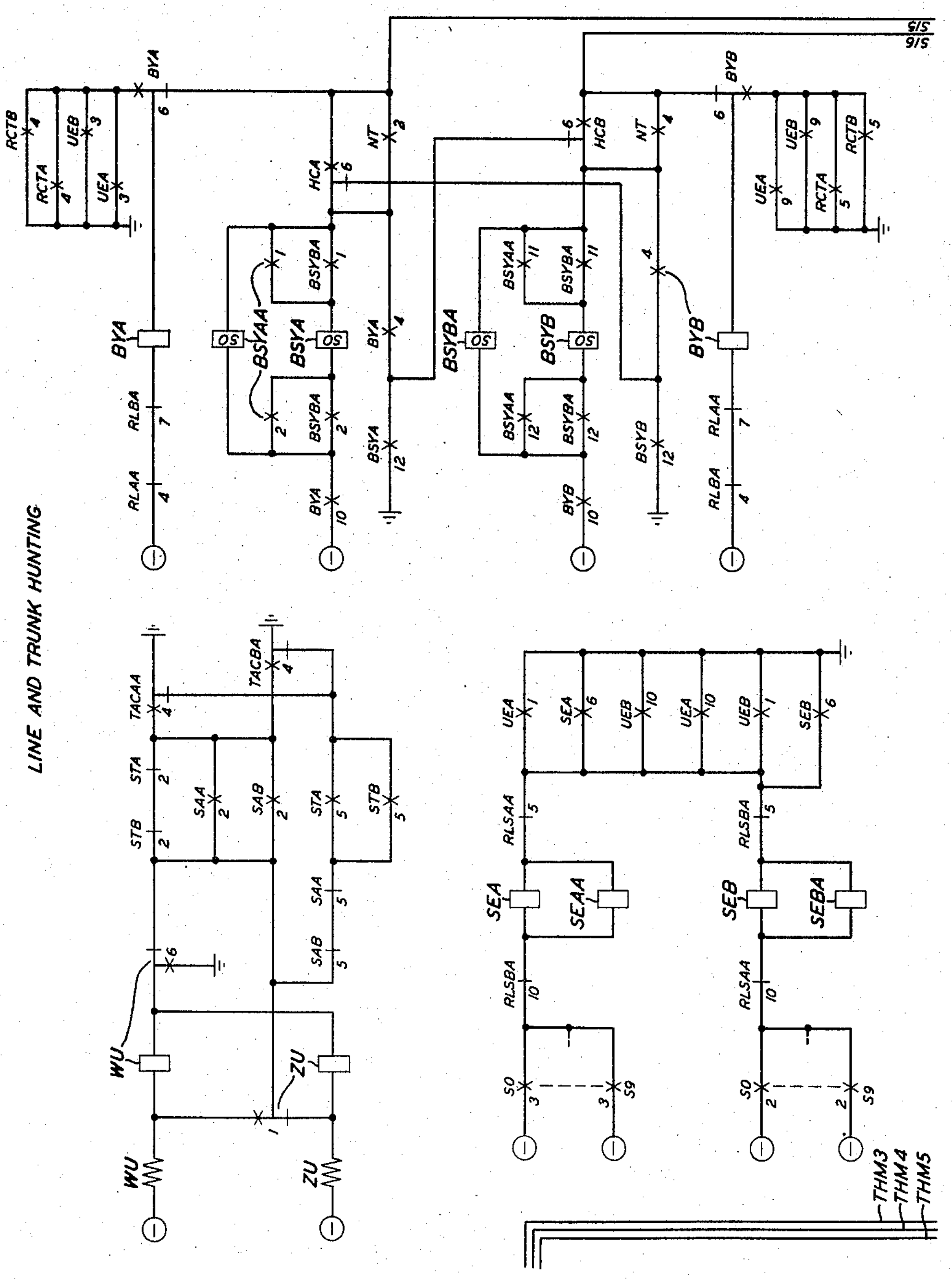

The operation of the selection relay U0 of Fig. 15 closes a circuit for testing the sleeve lead S30 of line circuit 30 in Fig. 35. The relays which make this sleeve test are the S0 through S9 relays in Figs. 30 and 33 of the line and trunk hunting circuit. A circuit is completed in Fig. 30 from ground, through the lower winding of relay S0, over make contact 12 of relay U0 to conductor 0, and over make contact 1 of the tens connector relay TM3 to conductor S30, into Fig. 35 to the line circuit 30 of Fig. 35, thence over conductor S0 to the alarm transfer and test circuit of Fig. 36, over make contact 3 of relay AT, conductor S10, to line circuit 30 of Fig. 35 and to battery through the winding of the hold magnet LHM30. The sleeve relay S0 of Fig. 30 will operate in this circuit over its lower winding in series with the line hold magnet LHM30 of Fig. 35; however, the line hold magnet LHM30 will not operate in this circuit. Relay S0 of Fig. 30 in operating, completes a circuit over its make contact 1 in parallel with make contact 12 of the U0 relay to hold the S0 relay operated over its lower winding independently of the U0 relay which caused it to operate in the first place. Relay S0 in operating, also prepares a locking circuit over its upper winding by closing its make contacts 11 and 12. It will be appreciated, in Figs. 30 and 33 of the line and trunk hunting circuit, that others of the sleeve relays S0 through S9 will be operated under the same circumstances as previously described in connection with the possibility of having more than one units relays of the units selection circuit in Figs. 15, 16 and 17 operated; however, in the present example it will be assumed that the sleeve relay S0 of Fig. 30 is the only such sleeve relay operated. Upon the operation of the S0 relay of Fig. 30, the sleeve end relays SEA, SEAA, SEB and SEBA of Fig. 32 are operated. The circuit for relays SEA and SEAA extend from battery, over make contact 3 of relay S0, break contact 10 of relay RLSBA, through the parallel windings of relays SEA and SEAA, break contact 5 of relay RLSAA, to ground through the parallel make contacts 1 and 10 of the units end relays UEA and UEB. Similarly, the circuit for operating the sleeve end relays SEB and SEBA of Fig. 32 extends from battery, over make contact 2 of relay S0, break contact 10 of relay RLSAA, parallel windings of relay SEB and SEBA, break contact 5 of relay RLSBA, to ground over the parallel make contacts 1 and 10 of the units end relays UEA and UEB. These four sleeve end relays, upon operating, lock to ground over the parallel make contacts 6 of sleeve end relays SEA and SEB. The sleeve end relays of Fig. 32 perform no function of particular interest at this time.

The operation of the tens preference chain signals the register control circuit to select an idle dial pulse register. If both registers are busy, the register control circuit will be released and the marker will hold the call. When a register becomes available, the marker reoperates the register control circuit. The register control circuit selects an idle register, connects the class-of-service circuit to this register, and requests the link test circuit to locate an idle link. When a register has been allotted to a call, the marker transmits the originating class information to the register where it is stored for use when dialing is completed. Depending upon the class-of-servive option involved, certain class relays in the register will either operate or remain unoperated, and will either allow the call to proceed or will translate the dialed digits to the attendant "0" code and signal the marker to complete the call to an attendant trunk as an Intercept Call.

When the tens preference relay TP3 of Fig. 10 and the tens auxiliary connector relays TACAA and TACBA of Fig. 12 are operated, circuits are completed for operating the register group control relays RGA, RGAA, RGB and RGBA of the register control circuit in Fig. 6 preparatory to the marker making a test to determine an idle link through the crossbar switch network for the purpose of connecting the calling line to a dial pulse register. In Fig. 6 a circuit is completed for operating relays RGA and RGAA extending from ground, through the parallel make contacts 3 of relays TACAA and TACBA, the parallel windings of relays RGA and RGAA, to battery through make contact 10 of relay TP3. Similarly, a circuit extends from ground, over the parallel make contacts 5 of relays TACAA and TACBA, through the parallel windings of relays RGB and RGBA, to battery over make contact 9 of the relay TP3, thereby operating relays RGB and RGBA. The operation of relays RGA and RGB causes the operation of the link test relays LTA, LTAA, LTB and LTBA of the link test circuit in Fig. 47. The circuit for relays LTA and LTAA in Fig. 47 extends from battery, over make contact 2 of relay RGA and to ground through the winding of relay LTAA and in parallel therewith over break contact 10 of relay LEAA, winding of relay LTA and to ground through break contact 4 of relay LEBA. Similarly the circuit for operating relays LTB and LTBA in Fig. 47 extends from battery over make contact 2 of relay RGB and in parallel through the winding of relay LTBA to ground and over break contact 10 of relay LEBA, winding of relay LTB to ground over the break contact 4 of relay LEAA. These four link test relays operated in the previously-described circuits. In response to the operation of the link test relays LTA and LTB of Fig. 47, the corresponding link test connector relays LTCA and LTCB in Fig. 47 are operated. The circuit for operating relay LTCA extends from ground over make contact 1 to relay LTA, through the winding of relay LTCA to battery over the make contacts 12 of relay LTA. The circuit for operating relays LTCB in Fig. 47 extends from ground over make contact 1 of relay LTB, through the winding of relay LTCB to battery over the make contact 12 of relay LTB. The operation of the link test relays LTA and LTB and the link test connector relays LTCA and LTCB, all of Fig. 47, initiate an operation whereby the link test relays LT2 through LT9 of Fig. 46 test 8 horizontal links (half of the total of 16 links) of the crossbar switch to determine whether or not an idle link is available.

Figure 42:
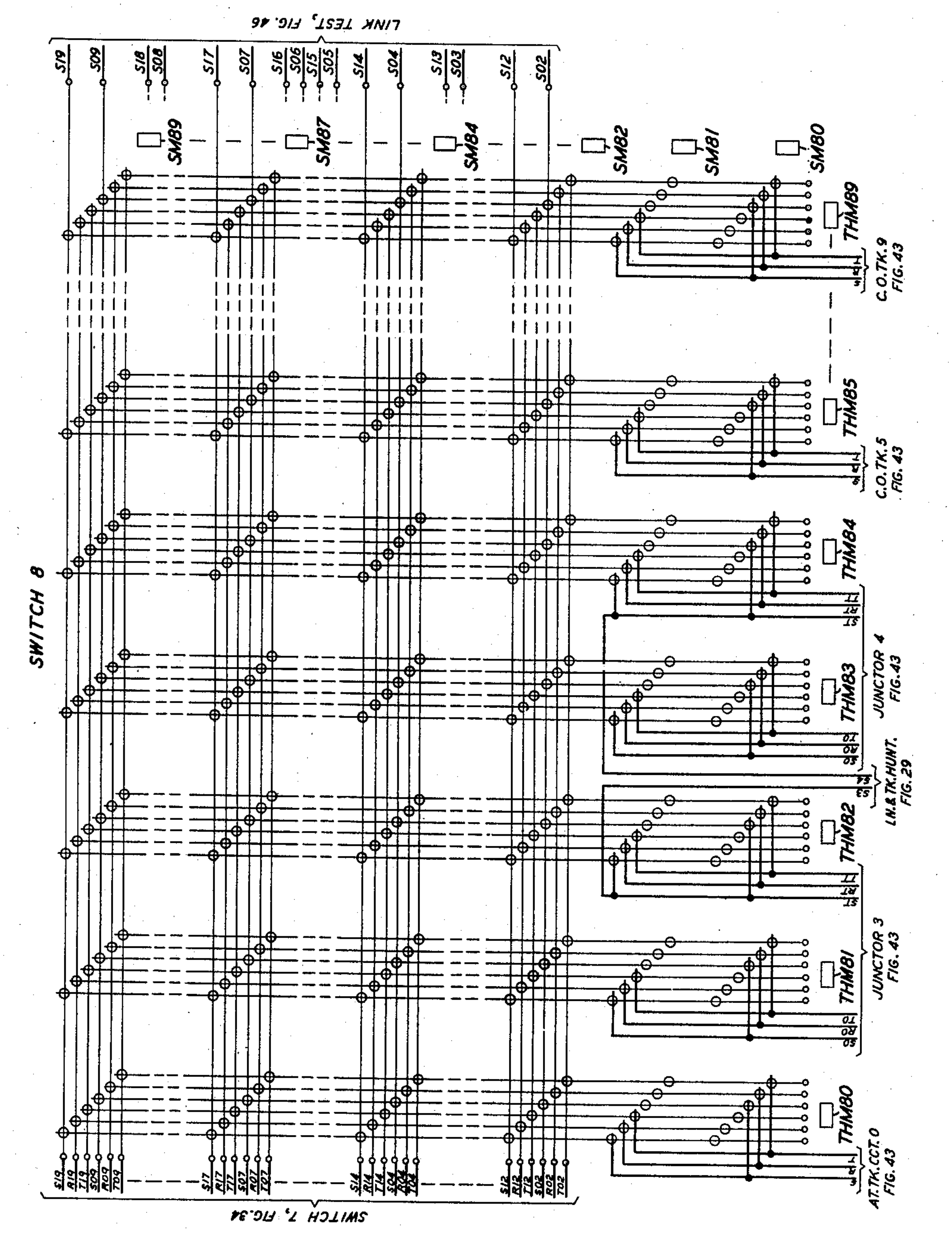

With reference to Fig. 42, showing the layout of switch No. 8 of the nine crossbar switches involved in the particular version of the P.B.X disclosed herein, there are eight horizontal levels of conductors, levels 2 through 9, each involving six horizontal conductors. These six horizontal conductors per horizontal level involve tip, ring and sleeve conductors for each of two pairs of three leads. In essence, each one of the eight horizontal levels of six conductors actually involves two separate horizontal multiples of tip, ring and sleeve conductors each. In selecting a crosspoint for operation on this crossbar switch, actually what is selected is only one of the groups of three conductors out of the six such conductors in each horizontal level. That is, each horizontal level has an upper and a lower half corresponding respectively to the select magnets SM81 and SM80, which are used to select the upper or lower level in a particular horizontal group of six conductors comprising one of the eight six conductors levels of each switch. When the time comes for testing for an idle horizontal link, the horizontal links are tested in groups of eight at a time. The link test circuit of Figs. 46, 47 and 48 tests either the eight upper level three-wire links or the eight lower level three-wire links depending upon the condition of certain control relays in the link test circuit, as will be described presently. In essence, what happens is that for each time the marker circuit requests the link test circuit to test for an idle link the test circuit chooses all of the upper levels one time, all of the lower levels the next time, and this cycle repeats so that each time the link test circuit tests for an idle link it alternates the test between the upper and the lower levels.

In Fig. 47, upon the first operation of the link test relays LTAA and LTBA, a circuit is completed for operating relay WLG extending from ground, through the parallel make contacts 2 of relays LTAA and LTBA, over two parallel circuits one extending through the break contacts 7 of relays LBA and LBB and the other extending through the break contacts 5 of the same relays, and through break contact 8 of relay ZLG and break contacts 2 of relay WLGA, to battery through the winding of WLG. Relay WLG, in operating, extends its operating ground over its make contact 2 to ground through the winding of relay ZLG, which cannot operate because both sides of its winding are grounded. When relays LTAA and LTBA will have released at the end of the link testing, the operating ground for relay WLG will be removed; however, relays ZLG and WLG will operate in series with each other, over the make contact 2 of relay WLG and the break contact 2 of relay WLGA. Upon the next request for a link test, relays LTAA and LTBA will be reoperated, whereupon the previously-used operating ground for relay WLG will now extend over make contact 8 of relay ZLG to battery through the winding of relay WLGA. Relay WLGA, in operating, releases relay WLG and completes a locking circuit for relay ZLG from the winding of relay ZLG over make contact 5 of relay WLGA to battery through resistance WLGA. Furthermore, upon the next release of the link test relays LTAA and LTBA, relays WLGA and ZLG will be released and the circuit reverts to its original condition. This cycle repeats each time the marker makes a new request for a link test. In Fig. 47, it will be noted that the relays TRLA and TRLB follow the operations of relay ZLG by virtue of being controlled by the respective make contacts 2 and 6 of the relay ZLG. Thus, whenever relay ZLG is operated or released, so are relays TRLA and TRLB operated or released respectively. Since it has been assumed in the present example that the circuits are being used for the first time, the first operation of relays LTAA and LTBA will represent the first request by the marker for a link test, whereupon the condition of the relays of Fig. 47 is that relay WLG is operated, relay ZLG is released, and the relays TRLA and TRLB are released.

In Fig. 46 are shown the eight link test relays LT2 through LT9. Taking the LT9 link test relay as an example, it will be noted that a potentiometer is formed on the right side of the upper winding of relay LT9, from negative battery through resistance LTA9, through the parallel make contacts 8 of relays LTCA and LTCB and through resistance LTB9 to ground. This potentiometer establishes a voltage of about minus 7 volts at the left-hand side of resistance LTB9, which voltage is extended through the parallel make contacts 11 of relay LTB and LTA to the right-hand side of the upper winding of relay LT9. To the left of relay LT9 in Fig. 46, negative battery also extends through resistance L9U and the parallel make contacts 24 of relays LTCB and LTCA to the conductor S19, which is the sleeve lead for the upper half of horizontal level 9 in the crossbar switch network. Negative battery also extends through resistance L9L and in parallel over the make contacts 16 of relays LTCA and LTCB to conductor S09, which is the sleeve test conductor for the lower half of level 9 in the cross bar switch network. Either one or the other of these two sleeve conductors S09 and S19 will be extended to the left-hand side of the upper winding of relay LT9 depending upon whether the relays TRLB and TRLA are operated or released. Since we have assumed that relays TRLA and TRLB are released, because this is the first request by the marker to the link test circuit for testing for an idle link, the sleeve conductor S09 will be extended through break contact 9 of relay TRLB and break contact 7 of relay TRLA to the left-hand side of the upper winding of relay LT9. Similar circuits will extend through the upper windings of all of the link test relays LT2 through LT8 from the respective lower half sleeve test leads S02, S03, etc., through S08. If any link is busy, the sleeve lead thereof, such as sleeve lead S09, will be adjusted at a potential of approximately minus 8 volts due to the presence on that sleeve lead of a relatively low impedance ground from some circuit connected to it. The matter of busy links will be discussed hereinafter. An idle link will not have such a low impedance holding condition on it; and therefore, the corresponding sleeve lead, such as lead S09 in Fig. 46, will be adjusted at approximately minus 42 volts. Since it is assumed that all links are at present idle, all of the lower level leads S02, S03, etc., through S09 will be adjusted at approximately minus 42 volts which, in combination with the minus 7 volts on the right-hand side of the upper windings of the relays LT2 through LT9, will cause the operation of all of the link test relays LT2 through LT9 of Fig. 46. This indicates that all eight links comprising the lower half of the eight horizontal multiples are idle. The operation of one or more, and in this case all, of the link test relays LT2 through LT9 of Fig. 46 operates the corresponding link test slave relay LTS2 through LTS9 of Figs. 46 and 47 in obvious circuits through their upper windings and over make contacts 7, 3 of the corresponding link test relays LT2 through LT9.

The operation of any one or more of the link test slave relays LTS2 through LTS9 of Figs. 46 and 47 causes the operation of the link end relays LEA, LEAA, LEB and LEBA of Fig. 47. Relays LEA and LEAA are operated in a circuit extending from ground, over the make contact 10 of any one of the link test slave relays LTS2 through LTS9, break contact 9 of relay LBA, make contact 1 of relay LTAA, break contact 3 of relay RLAB, break contact 2 of relay RLSB, through the windings of relays LEA and LEAA, through break contacts 11 of relays RLSA and RLBB, to battery through the make contact 11 of relay LTAA. The operating circuit for relays LEB and LEBA extends from ground, over the parallel make contacts 2 of relays LTS2 through LTS9, break contact 9 of relay LBB, make contact 1 of relay LTBA, break contact 3 of relay RLBB, break contact 10 of relay RLSA, the windings of relays LEB and LEBA, break contact 3 of relay RLSB, break contact 11 of relay RLAB, to battery through make contact 11 of relay LTBA. The operation of relays LEA and LEB complete locking circuits for the operated relays LTS2 through LTS9 of Figs. 46 and 47. Taking relay LTS9 of Fig. 47 as an example, the locking circuit therefore extends from battery in Fig. 47, through the parallel make contact 6 of relays LTAA and LTBA, through the lower winding of relay LTS9, over the parallel make contacts 11 and 12 of relay LTS9, to conductor 460 extending into Fig. 46 and thence to ground over the parallel make contacts 1 of relays LEA and LEB. Upon the operation of relays LEAA and LEBA of Fig. 47, relays LTA and LTB of Fig. 47 are released, in turn releasing the corresponding relays LTCA and LTCB of Fig. 47. The release of the relays LTA, LTB, LTCA and LTCB of Fig. 47 causes the release of all of the operated link test relays LT2 through LT9 of Fig. 46.

Upon the operation of the relays LEAA and LEBA of Fig. 47, as previously described, a circuit is completed through a preference chain involving contacts of the link test relays LTS2 through LTS9 of Figs. 46 and 47 to cause the selection of an idle link corresponding to one of these operated link test relays. This preference chain arrangement is shown in Fig. 37, which involves the select magnet control circuits of the marker.

Before describing the actual select magnet operation it is advisable at this point to discuss the operation of the relays WL, ZL, W1L and Z1L of Fig. 37. The operation of these relays in Fig. 37 will in effect, as will be seen hereinafter, change the preference arrangement of Fig. 37 with respect to which select magnets will be operated; and, thus is similar to the operation of the relays WLG and ZLG, etc., of Fig. 47, which from time to time change the link testing arrangement as to whether or not the upper or lower levels of the horizontal links of the switches are tested at any one particular time. In Fig. 37, with respect to the relays WL and ZL, these relays represent the well-known W–Z combination and in this particular instance, similarly to the relays WLG and ZLG of Fig. 47, are controlled by the link test auxiliary relays LTAA and LTBA of Fig. 47. It will be recalled that the LTAA and LTBA relays are operated each time the marker requests the link test circuit of Figs. 46 and 47 to make a test for an idle crossbar switch link, and are released at the end of each such request. Upon the first operation of relays LTAA and LTBA, a circuit is completed for operating the WL relay extending from ground, over the parallel make contacts 4 of relays LTAA and LTBA, through break contacts 3 of relays STA and STB, break contact 6 of relay WL, through the winding of relay WL, to negative battery through resistance WL. Relay WL operates in this circuit and locks to ground through its own make contact 6, the relay ZL not operating in this circuit because the right-hand side of its winding is grounded through the make contact 6 of relay WL and the left-hand side of its winding is grounded through break contact 4 of relay ZL back to the operating ground controlled by the relays LTAA and LTBA. When relays LTAA and LTBA will have released after the conclusion of the marker's first request for a link, the ground on the left-hand side of the winding of relay ZL will be removed, whereupon relay ZL will operate in parallel with the locking circuit for relay WL. Upon the second marker request for a link test, relays LTAA and LTBA will be reoperated, whereupon the operating ground will extend over make contact 4 of the relay ZL to shunt down the winding of relay WL, which thereupon releases, relay ZL being maintained operated at this time. When relays LTAA and LTBA again release, the holding ground for relay ZL is removed, whereupon relay ZL releases and the WL, ZL relay combination reverts to its original condition. On the third and fourth requests by the marker for link test the above WL, ZL relay combination operation is repeated. Again referring to Fig. 37, when relay WL is operated for the first time a circuit is completed for operating relay W1L from ground through make contact 1 of relay WL, break contact 6 of relay W1L, winding of relay W1L, to battery through the W1L resistance, relay Z1L not operating in this circuit because both sides of its winding are grounded. When relay WL releases the first time, relay Z1L is operated in parallel with relay W1L with the locking ground extending over the make contact 6 of relay W1L. When relay WL reoperates it causes the release of relay W1L by extending a shunting ground to the left-hand side of the winding of relay W1L through make contact 4 of relay Z1L. When the relay WL again releases it causes the release of relay Z1L by removing the holding ground therefrom.

In Fig. 37 in the upper central portion thereof, it will be noted that there are four circuits entering the preference chain for controlling the select magnets and that these four circuits are controlled by various operated and released conditions of the relays Z1L, W1L and ZL. In the upper left-hand part of Fig. 37 near the winding of relay LCK1 there is a first circuit which extends from ground, through the parallel make contacts 5 of relays LEBA and LEAA, through break contact 7 of relay ZL and break contact 12 of relay Z1L to the circuit point designated A, which will be referred to a preference condition A. Just to the right of this circuit is another one extending from ground, through the parallel make contact 3 of relays LEBA and LEAA, through make contact 6 of relay ZL and break contact 2 of relay W1L to point B, which will be referred to as preference condition B. Likewise, immediately to the right of the B preference condition is a third circuit extending from ground through the parallel make contacts 2 of relays LEBA and LEAA, break contact 5 of relay ZL and make contact 6 of relay Z1L to point C, which will be referred to as preference condition C. Again, to the right of preference condition C is a fourth circuit extending from ground over the parallel make contacts 1 of relays LEBA and LEAA and over make contact 2 of relay ZL and make contact 1 of relay W1L to the circuit point marked D, which will be referred to as the D preference condition.

Assuming that all of the link test relays LTS2 through LTS9 of Figs. 46 and 47 are operated, as in the assumed instance where all of the horizontal links in the crossbar switch network are free, it will be apparent from Fig. 37 that preference condition A prefers to cause the operation of a select magnet such as SM09 through SM89 corresponding to the ninth level of any switch; preference condition B prefers to operate one of the select magnets SM06 through SM86 corresponding to the sixth switch level; preference condition C prefers to cause the operation of one of the select magnets SM04 through SM84 corresponding to the fourth switch horizontal link level; and, preference condition D prefers to cause the operation of one of the select magnets SM02 through SM82 corresponding to the second switch level. It follows, due to the configuration of the four controlling grounds involved in these four preference circuits, and in the light of the preceding discussion concerning the operation of relays WL, ZL, W1L and Z1L of Fig. 37, that preference arrangement A corresponds to the first time that a marker request a link test, preference D corresponds to the second marker request for link test, preference C corresponds to the third marker request for such a test, and preference B corresponds to the fourth marker request for a test. From the fifth marker request on, the preference order A, D, C, B repeats in the above sequence. Since it has been assumed in the present example that the link test involved at the moment is the first one requested by the marker, it will be apparent from the previous discussion that preference condition A is the one established.

When an idle link has been found, the select magnet control circuit operates the select magnets associated with the assigned link and signals the register control circuit and the line and trunk hunting circuit to operate the hold magnets associated with the dial pulse register and with the calling line. The calling line is thereby connected to a dial pulse register through the assigned link, and dial tone is transmitted to the caller. The line and trunk hunting circuit checks to determine that the register is holding the connection to the calling line, in which case it signals the route control circuit to release the marker. The marker is then available to handle the next call.

Figure 3:
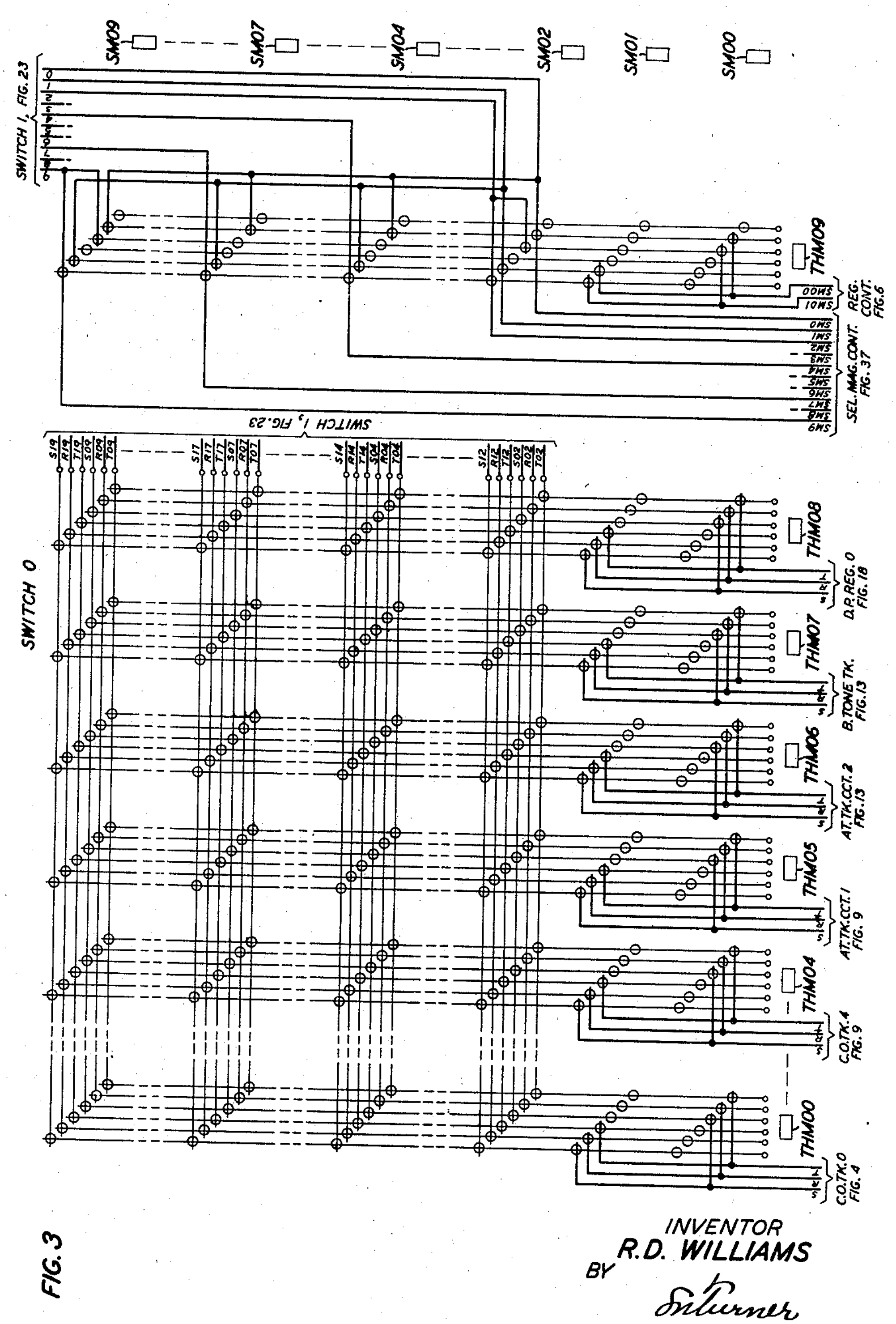
Figs. 3, 23, 27, 34 and 42 show nine (0 to 8) crossbar switches comprising the main connecting means of the P.B.X.
Figure 23:
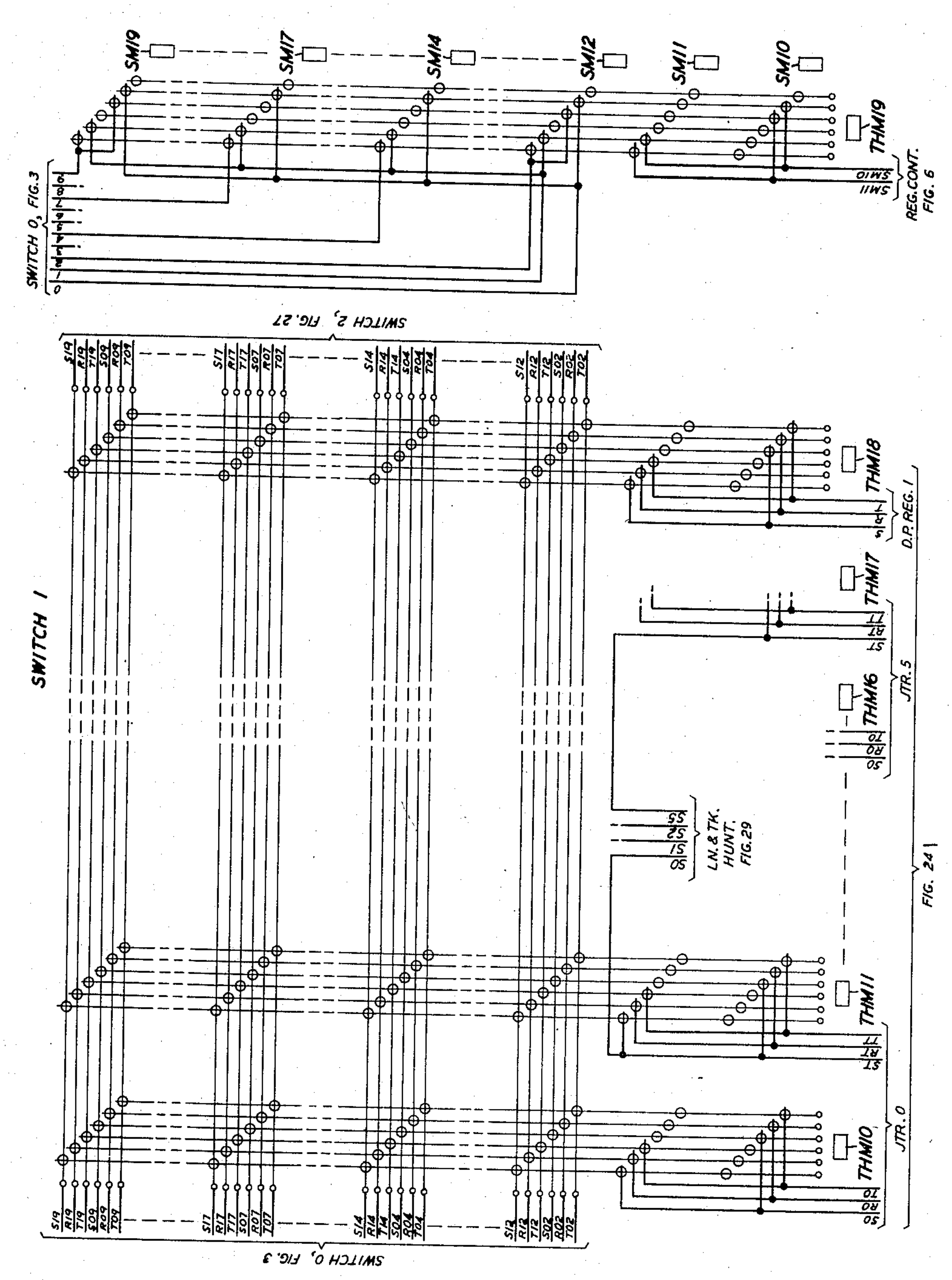
Figure 34:
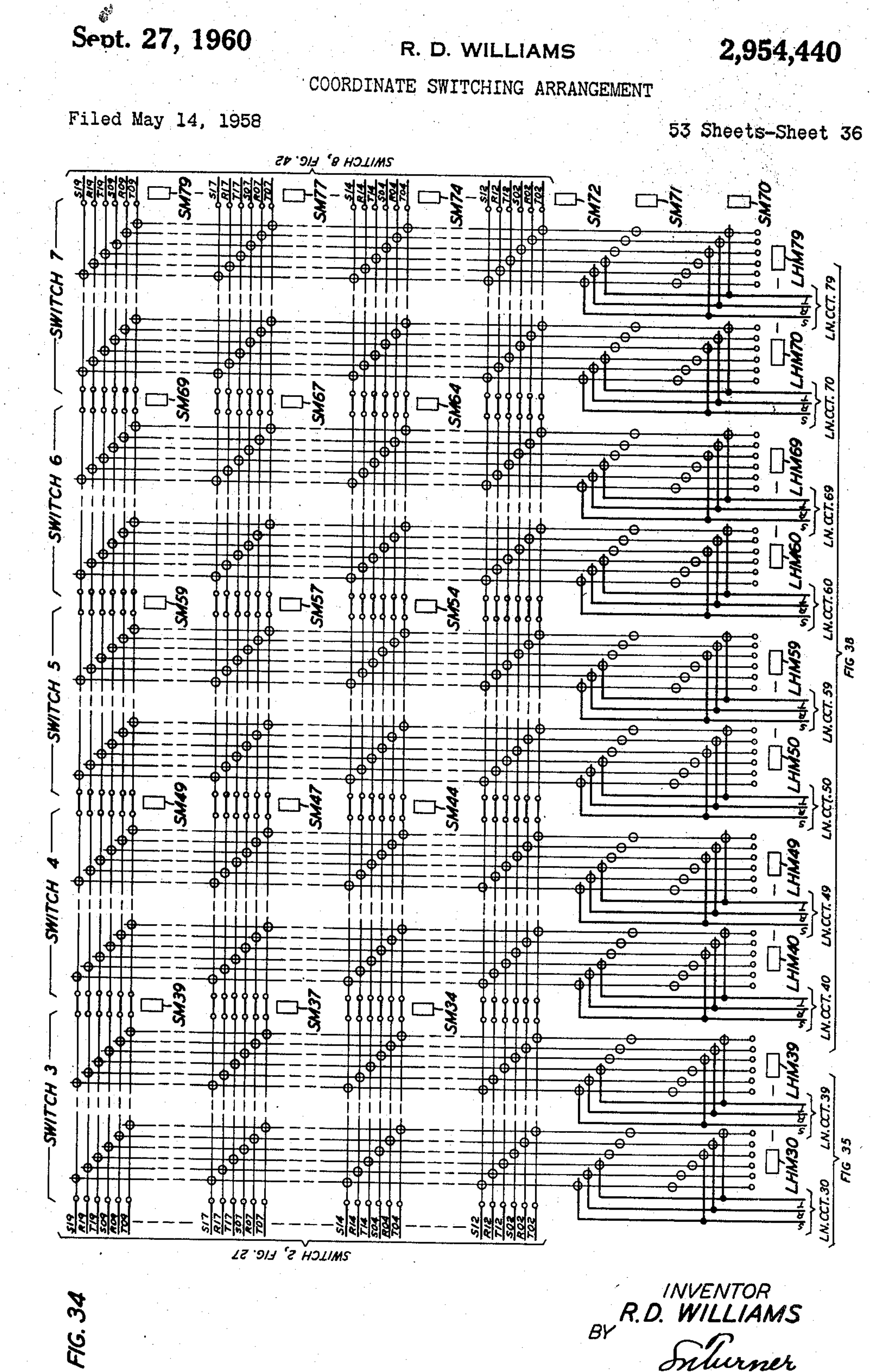

Since the presently described dialed tone connection requires the interconnection of the line circuit 30 of Fig. 35 with one of the dial pulse registers 0 and 1 of Figs. 14, 18, 19 and 24, it will be necessary to operate select magnets on switch 0 of Fig. 3 terminating dial pulse register 0 or on switch 1 of Fig. 23 terminating dial pulse register 1, and on switch 3 in Fig. 34 terminating line circuit 30 of Fig. 35. It will also be necessary to cause the operation of one or the other of the select magnets corresponding to levels 0 and 1 in these corresponding switches in order to choose the upper or lower level of one of the particular six-wire horizontals 2 through 9. In the central portion of Fig. 37 are indicated nine relays SMC0 through SMC8 corresponding to the eight switches 0 through 8 of Figs. 3, 23, 27, 34 and 42. It follows that it will be necessary to cause the operation of relays SMC0, SMC1, and SMC3. The operating circuit for relay SMC0 extends from ground, through the parallel make contacts 1 of relays RGAA and RGBA of Fig. 6, to battery through the winding of relay SMC0, which thereupon operates. The operating circuit for relay SMC1 extends from ground, through the parallel make contacts 2 of relays RGBA and RGAA, to battery through the winding of relay SMC1. Relay SMC3 is operated in a circuit extending from ground, over the make contact 6 of the tens connector THC3 of Fig. 12 to battery through the winding of relay SMC3.

Since it has been assumed that the ninth horizontal level of the crossbar switch link is idle, a circuit is extended from ground at point A in Fig. 37, through make contact 4 of relay LTS9, and in parallel through the break contacts 9 of relays SMC0, SMC1 and SMC3, to battery through the corresponding select magnets SM09, SM19 and SM39, select magnet SM09 being shown in Fig. 3, select magnet SM19 being shown in Fig. 23 and select magnet SM39 being shown in Fig 34. The operation of these three select magnets, as is well known in the art of crossbar switch technique, will, upon the operation of any hold magnet on any one of these three switches, cause an interconnection between the horizontal level 9 and the vertical of the switch corresponding to the particular hold magnet which is operated.

As has been mentioned previously, each of the horizontal links on the crossbar switches, such as horizontal 9, involves six wires, which in fact comprise two, three-wire half links. These, for convenience, have been referred to as the upper and lower levels. It will be necessary to operate on switch 0 of Fig. 3, on switch 1 of Fig. 23 and on switch 3 of Fig. 34, one of the two select magnets corresponding to levels 0 and 1 in order to select one of the three-wire circuits involved in the upper or lower half of each level. For instance, on switch 0 of Fig. 3 are shown two select magnets SM00 and SM01 corresponding respectively to the 0 and 1 levels of switch 0. It will be apparent in Fig. 3, by observing the tip, ring and sleeve conductors T, R and S terminating in the eighth vertical position on that switch, that the operation of the select magnet SM00 will cause the dial pulse register 0 to be connected to the lower three conductors T09, R09 and S09 of level 9; whereas, the operation of selcet magnet SM01 will cause the dial pulse register 0 to be connected to the upper three conductors T19, R19 and S19 of level 9. The same situation prevails with respect to switch 1 of Fig. 23 and switch 3 of Fig. 34. In each instance the select magnet corresponding to the same level 0 or 1 must be operated in order that the dial pulse register be interconnected with line 30 of Fig. 35 over the same upper or lower level of the main switch link 9. This level switching control is provided for in the select magnet control circuit of Fig. 37. In the upper right-hand corner of Fig. 37 are 18 select magnets SM01 through SM81 and SM00 through SM80 which comprise the 0 and 1 level select magnets for switches 0 through 8. It will be recalled from previous discussion that the relays TRLA and TRLB of Fig. 47 are released because this is the first marker request for a link test. With this recollection in mind and referring to the upper right-hand portion of Fig. 37, a circuit extends from ground, over the parallel make contacts 1 of all of the operated link test relays LTS2 through LTS9, through break contact 2 of relay TRLA, break contact 1 of relay TRLB, through the parallel make contacts 3 of relays LEA and LEB, and through the parallel make contacts 10 of relays SMC0, SMC1 and SMC3, to battery through the corresponding select magnets SM00, SM10 and SM30, which are shown respectively in Figs. 3, 23 and 34. Actually, in Fig. 34 the select magnets for levels 0 and 1 throughout switches 3 through 6 have not been shown for lack of suitable space on the drawing; however, it will be obviously understood that the select magnets SM70 and SM71, comprising the select magnets for levels 0 and 1 of switch 7, indicate similar arrangements for the other switches 3 through 6.

As a result of the previous description of the select magnet operation, it will now be apparent that when the hold magnet LHM30 is operated corresponding to line circuit 30 on Fig. 34, the tip, ring and sleeve conductors T, R and S of line circuit 30 will be connected to the right-hand 3 conductor of the vertical corresponding to line hold magnet LHM30 and that these three conductors will be interconnected to the lower three conductors T09, R09 and S09 of the crossbar switch horizontal 9 and that similar action will take place in Figs. 3 and 23 depending upon which one of the dial pulse registers is selected by the marker to handle this dial tone connection. In Fig. 37 are shown two relays SMTA and SMTB which are the select magnet timing relays and which are made slow-operate in order that they will not operate until a sufficient time has elapsed to permit the full operation of the select magnets to be used on the particular connection involved. The operation of these relays SMTA and SMTB initiates the operation of the hold magnets necessary to complete the desired connection and they are made slow-operate in order to insure that the select magnet fingers on the crossbar switches have been fully operated. The operating circuit for relay SMTA, in Fig. 37, extends from ground, over break contacts 5 of relay TRKAA and RALB, break contact 4 of RLSA, winding of relay SMTA, break contacts 9 of relays RLSB, RLBB and STAR, break contact 4 of relay STBR, break contact 3 of relay TRKBA, to battery through the parallel make contacts 12 of relay LEA and LEB. Similarly, the operating circuit for relay SMTB, in Fig. 37, extends from ground, over break contacts 5 of relays TRKBA and RLBB, break contact 4 of relay RLSB, winding of relay SMTB, break contacts 9 of relays RLSA and RLAB, break contact 8 of relay STAR, break contact 5 of relay STBR, break contact 7 of relay TRKAA, and to battery through the parallel make contacts 11 of relays LEA and LEB.

The operation of relays SMTA and SMTB of Fig. 37 cause the operation of the route control relays SMRA, SMRAA, SMRB and SMRBA of Fig. 7. Relays SMRA and SMRAA are operated in a circuit extending from ground, over make contact 3 of relay SMTA, parallel make contacts 5 of relays SEA and SEB, parallel windings of relays SMRA and SMRAA, to battery through make contact 9 of relay SMTA. Relays SMRB and SMRBA are operated in obvious circuits in a similar manner. Upon the operation of relays SMRA, SMRAA, SMRB and SMRBA in the route control circuit of Fig. 7, the hold magnet operation takes place. However, it will be necessary to digress for a moment in connection with the W–Z relay circuit of the line and trunk hunting arrangement in Fig. 32.

In the upper left-hand corner of Fig. 32 are the circuits for controlling relays WU and ZU. The relay contacts included in these circuits indicate that there are contacts for relays SAA, SAB, STA and STB of the advance, time-out and release circuit of Fig. 44. These four relays are involved when a second trial is made by the marker. Under present assumed circumstances the second trial feature of the marker is not involved, in which case relays SAA, SAB, STA and STB will be released. Upon the operation of the tens auxiliary connector relays TACAA and TACBA of Fig. 12, a circuit is completed in Fig. 32 for causing the operation of relay WU extending from ground, over the parallel make contacts 4 of relays and TACBA, through the break contact 2 of relays STA and STB, through the break contact 6 of relay WU, and through the winding of relay WU to battery through resistance WU. Relay WU operates in this circuit and locks to ground over its make contact 6, the relay ZU not operating in this circuit because both sides of its winding are grounded. As soon as the tens connector circuit of Fig. 12 is released, indicating that the marker has finished with its first request for service from a line or a trunk or a register, the relays TACAA and TACBA will release, whereupon relay ZU will operate in parallel with relay WU to the locking ground controlled by make contact 6 of relay WU. Upon the next reoperation of relays TACAA and TACBA representing a second request for the services of a marker, shunting ground will be applied to the left-hand side of the winding of relay WU through make contact 1 of relays ZU, whereupon relay WU releases and provides a locking circuit for relay ZU through break contact 6 of relay WU. Upon the subsequent release of relays TACAA and TACBA, the locking ground for relay ZU will be removed and relay ZU will release, thereby reverting the W–Z combination of Fig. 32 to the original situation. Under the present circumstances, since it is assumed that the marker has been asked for service by the tens connector circuit of Fig. 12 for the first time, the condition of the W–Z relays of Fig. 32 will be that relay WU is operated and relay ZU is released. With relay ZU of Fig. 32 released, and with relays SMRAA and SMRBA of Fig. 7 operated, and with relays SMTA and SMTB of Fig. 37 operated, and with the relays UEA and UEB of Fig. 17 operated, and with relays SEA and SEB of Fig. 32 operated, a circuit is completed for operating the hold magnet associated with line 30 of Fig. 35, namely line hold magnet LHM30 of Fig. 34. The operation of this line hold magnet will connect line 30 to the horizontal link 9.

The line and trunk hunting circuit of Figs. 29, 30, 32 and 33 is used for the purposes of operating the hold magnet of the line circuit involved, under control of the operated sleeve relay S0 in Fig. 30. Starting in the lower central portion of Fig. 29, a circuit is extended from ground, through make contact 4 of relay SMTB, break contact 7 of relay HMTA, break contact 4 of relay HMTB, break contact 5 of relay TRKB, break contact 8 of relay SOA, break contact 4 of relay SOB, parallel make contacts 2 of relays UEB and SEB, break contact 2 of relay ZU, conductor S13 into Fig. 30, over make contact 8 of relay S0 and make contact 1 of relay SMRBA to conductor 0, which connects to the right-hand side to the lower winding of relay S0 through make contact 12 of relay U0. Again in Fig. 29, another circuit extends from ground, over make conductor 4 of relay SMTA, break contact 7 of relay HMTB, break contact 4 of relay HMTA, break contact 5 of relay TRKA, break contact 8 of relay SOB, break contact 4 of relay SOA, parallel make contacts 2 of relays SEA and UEA, break contact 8 of relay ZU, to conductor S10 extending into Fig. 30 and over make contact 4 of relay S0 and make contact 1 of relay SMRAA to conductor 0. This ground on the right-hand side of the lower winding of relay S0 does not shunt down relay S0 because a locking circuit extends from ground through the upper winding of relay S0, through make contact 11 of relay S0, to battery through the parallel make contacts 1 of relay SMRA and SMRB. Ground on conductor 0 in Fig. 30 extends over make contact 1 of relay TM3 to conductor S30 into Fig. 35 to line circuit 30, thence via conductor S0 into the alarm transfer and test circuit in Fig. 36, over make contact 3 of relay AT in Fig. 36, over lead S10 to line circuit 30 of Fig. 35, thence to battery through the winding of hold magnet LHM30, which thereupon operates and, in operating, releases the line relay L30. The operation of hold magnet LHM30 in Fig. 35, as shown in Fig. 34, causes the tip, ring and sleeve leads T, R and S from line circuit 30 to be extended over the three right-hand verticals of that position due to the operation of the select magnet SM30 (not shown), and vertically over those three wires to the ninth level, where connection is made to the horizontal conductors T09, R09, and S09 by virtue of the fact that select magnet SM39 is also operated. This connects the line circuit 30 of Fig. 35 to the lower half of the ninth horizontal link of switch 3 in Fig. 34.

It will now be necessary to describe the operation of the hold magnet on switch 0 or on switch 1 corresponding to the dial pulse register 0 or dial pulse register 1 which is to be connected to the line circuit 30 of Fig. 35 for purposes of supplying dial tone thereto. The operating circuit for the hold magnets corresponding to these dial pulse registers are shown on the register control circuit of Fig. 6. On this same Fig. 6 it will be recalled that relays RA0B, RA0A, RA1B and RA1A are all operated as an indication to the marker register control circuit that both of the dial pulse registers are idle and available to be seized. It was also pointed out previously that if this situation prevails, the marker will prefer dial pulse register 0 of Figs. 14, 18 and 19. This means that it will be necessary to operate the hold magnets THM08 and THM09 of Fig. 6 corresponding to dial pulse register 0. In Fig. 6, two parallel circuits are provided for operating the hold magnets THM08 and THM09. One circuit extends from ground over make contact 5 of relay SMTA, break contact 3 of relay HMTB, break contact 10 of relay HMTA, parallel make contacts 3 of relays RGA and RGB, through make contact 4 of relay RA0B, through the parallel windings of the hold magnets THM08 and THM09 to battery. Another circuit in Fig. 6 extends from ground, over make contact 5 of relay SMTB, break contact 3 of relay HMTA, break contact 10 of relay HMTB, parallel make contacts 7 of relays RGA and RGB, over make contacts 6 of relay RA0B, through the parallel windings of hold magnets THM08 and THM09 to battery. Hold magnets THM08, THM09 operate in this circuit. Thus, the hold magnets THM08 and THM09 diagrammatically shown in Fig. 3 will be operated. As a result of the operation of the hold magnets THM08 and THM09 of Fig. 3 and LHM30 of Fig. 34, the tip, ring and sleeve conductors T, R and S of line circuit 30 in Fig. 35 are interconnected over the crossbar switch with the tip, ring and sleeve leads T, R and S of the dial pulse register 0 shown in Fig. 18. These three leads may be traced as follows beginning at the line circuit 30 in Fig. 35. The T, R and S leads extend from line circuit 30 in Fig. 35 into Fig. 34 and, by means of the three right-hand crosspoints corresponding to select magnet SM30, to the three vertical wires on the right-hand side of the crossbar switch vertical corresponding to hold magnet LHM30, vertically through the switch and by means of the three lower crosspoints corresponding to the operated select magnet SM39, connect to respective conductors T09, R09 and S09 comprising the lower half of the ninth horizontal crossbar link, thence to the left to switch No. 2 in Fig. 27, across the leads T09, R09 and S09 through switch 2, thence to switch No. 1 of Fig. 23 and across the T09, R09 and S09 leads into switch 0 of Fig. 3, over the T09, R09 and S09 leads, through the crosspoints corresponding to the operation of select magnet SM09 to the right-hand three verticals of switch 0 corresponding to hold magnet THM08, thence across the crosspoints corresponding to the operate select magnet SM00 to the T, R and S leads to the dial pulse register circuit in Fig. 18.

When the tip, ring and sleeve leads of line circuit 30 are cut through to the tip, ring and sleeve leads on the dial pulse register 0 of Fig. 18, the line relay L in Fig. 18 operates in a circuit extending from ground in Fig. 18, through the TN resistance, the lower winding of the TN transformer, break contact 10 of relay RV, contact 1 of jack TST, break contact 10 of relay RRLB, break contact 2 of relay RRLA, over the tip lead T, through the switch link to the tip lead T of line circuit 30 in Fig. 35, over make contact 1 of relay AT in the alarm transfer and test circuit of Fig. 35, over the tip and ring loop of the station equipment at STA30, back over make contact 2 of relay AT in the alarm transfer and test circuit, out over the ring lead R of line circuit 30, back over the switch link to the ring lead R of the dial pulse register 0 in Fig. 18, through break contact 3 of relay RRLA, break contact 9 of relay RRLB, contact 2 of jack TST, break contact 6 of relay RV, upper right-hand winding of the TN coil, and to battery through the left outer winding of the line relay L, which thereupon operates as an indication to the dial pulse register 0 that the calling station loop is closed through to the L relay of the register.

Prior to the time when the dial pulse register 0 of Fig. 18 will have been interconnected with the line circuit 30 of Fig. 35, the marker circuit will have ascertained the class of service to which the calling line 30 is entitled and will have caused a registration of this information both in the marker and in the dial pulse register circuit 0 of Fig. 14. In the class of service section of the marker shown in Fig. 25, dual circuits extend from negative battery in the upper left hand corner, through the CS resistances, over the parallel make contacts 10 and 8 of relays SEB and SEA, and the parallel break contacts 11 and 9 of relay ZU, and the parallel make contacts 10 and 6 of relay S0 (the sleeve relay S0 of Fig. 30 operated by virtue of the call having been placed from line 30 in Fig. 35), thence over make contact 1 of the tens connector relay TCS3 (previously operated in Fig. 12) to class of service lead CS30, extending to the punching sheet in Fig. 20, where it has been shown as cross-connected to the TLA lead (toll allowed station), extending back into the class of service circuit in Fig. 25 on lead TLA, thence in Fig. 25 over the parallel make contacts 11 of relays RGA and RGB and the make contact 10 of relay RA0B to the TLA0 lead extending into the dial pulse register circuit in Fig. 14, thence through the winding of relay TLA to ground. Relay TLA of Fig. 14 operates in this circuit as an indication to dial pulse register 0 that the class of this calling line 30 of Fig. 35 is toll allowed. Relay TLA of Fig. 14, in operating, completes an obvious circuit over its make contact 11 for operating relay TLD.

The operation of the line relay L of dial pulse register 0 in Fig. 18 initiates an operation whereby dial pulse register 0 is seized, placed off normal and arranged in condition to supply dial tone to the calling P.B.X line 30 shown in Fig. 35. The operation of relay L in Fig. 18 causes the operation of relay SR in an obvious circuit over make contact 1 of relay L. Relay SR of Fig. 18, in operating, supplies ground for holding operated the hold magnets corresponding to the operated line 30 and dial pulse register 0 circuits. In the upper left-hand corner of Fig. 18, ground extends over make contact 12 of relay SR, through the S resistance (which is about 100 ohms), to the sleeve lead S extending over the cross-bar switches and connecting up in Fig. 35 with the sleeve lead of the line circuit 30 connected to the left-hand side of the line hold magnet LHM30, thereby to hold operated this hold magnet independently of the marker circuit. Another circuit extends from ground in the lower left-hand corner of Fig. 18, over break contact 9 of relay RT and make contact 6 of relay SR to the RHM0 lead, extending into the register control circuit of Fig. 6, to the left-hand side of the windings of the hold magnets THM08 and THM09 to hold these hold magnets operated independently of the marker circuit. Another circuit operation of interest at the present time, with respect to the operated SR relay, is shown in the lower right-hand corner of Fig. 18, whereby the off-normal relay ON of dial pulse register 0 is operated in an obvious circuit over make contact 8 of relay SR. Relay ON of Fig. 18, in operating, completes a locking circuit in Fig. 14 from battery, over make contact 10 of relay ON and make contacts 12 and 11 of relay TLA and 1 of relay TLD to hold relays TLA and TLD operated independently of the marker. Also, it will be noted in Fig. 14 that the operation of relay ON removes battery and ground from the two leads ONB0 and ONG0 extending into the marker register control circuit of Fig. 6, whereby relays RA0B and RA0A are permitted to release when various other relays of the marker release. As had been explained hereinbefore, the fact that relays RA0B and RA0A will have been released, leaving relays RA1B and RA1A operated, causes the marker upon its next request for the services of a dial pulse register to seize and make use of dial pulse register circuit 1 shown in block form in Fig. 24.

Dial tone is supplied from dial pulse register 0 to calling line 30 of Fig. 35 in a circuit extending in Fig. 18 from the lower left-hand corner "dial tone" box, over make contact 5 of relay ON, break contact 5 of relay P2A, break contact 4 of relay BYR, through condenser TN, to ground through the primary winding of the TN transformer, thence from the secondary windings of the transformer over previously-described circuits, including the crossbar switch links, to the receiving instrument at station 30 on Fig. 35. In response to the reception of dial tone at line circuit 30, the P.B.X caller thereat may then proceed to dial the necessary digits into the dial pulse register 0 circuit for completing the desired call. The subsequent operation, responsive to the receipt of such digits in dial pulse register 0 of Figs. 14, 18 and 19, will be described under the heading "Dialing" below after a description of the release of the marker circuit, etc., as a result of having completed this dial tone connection.

Figure 29:
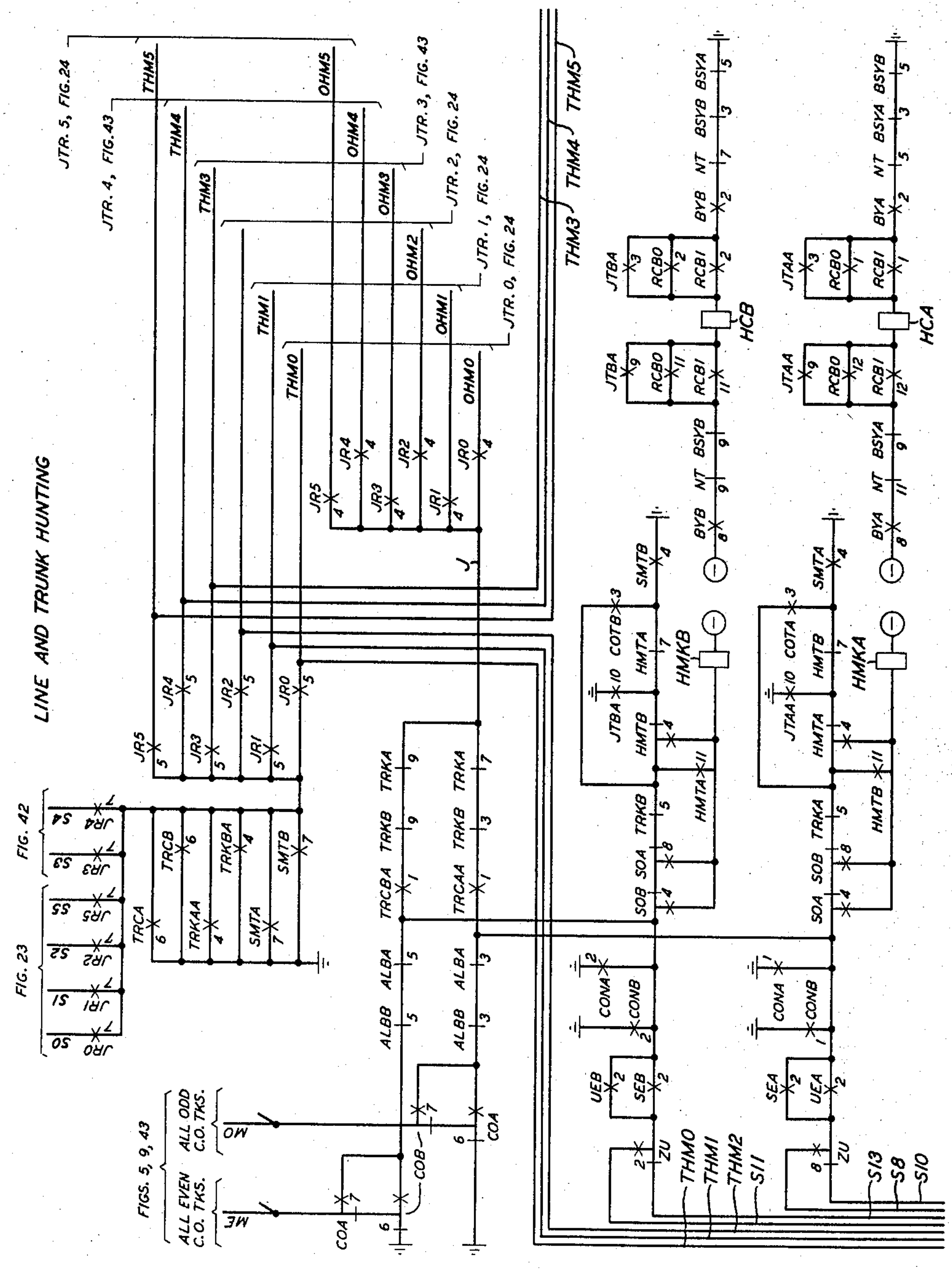

In Fig. 7, in the route control circuit of the marker, upon the operation, previously described, of relays SEA, SEB, SMTA and SMTB, the hold magnet timing relays HMTAA and HMTBA will have been operated and their operation in turn will have caused the operation of corresponding relays HMTA and HMTB. These four relays are all slow operate relays and are operated in tandem in order to insure that the hold magnets have been properly operated before any further circuit operation takes place with respect to the release of certain of the control circuits of the marker. In Fig. 7 the circuit for operating relay HMTAA extends from ground, over make contact 4 of relay SEA, make contact 2 of relay SMTA, break contact 1 of relay TRKA, winding of relay HMTAA, break contact 9 of relay TRKBA, to battery through the make contacts 11 of relays SMTA and SEA. A similar circuit is shown directly below for operating relay HMTBA. Upon the operation of relays HMTAA and HMTBA, make contacts of these relays cause the corresponding operation of relay HMTA and HMTB after a suitable delay controlled by the slow operate characteristic of these relays. In Fig. 6, the operation of relays HMTA and HMTB removes, from the operating circuit of the dial pulse register 0 hold magnets THM08 and THM09, the ground supplied by the marker and completes a circuit for each of the relays RHKA and RHKB to determine whether or not the dial pulse register 0 has applied a holding ground for these hold magnets. The circuit for relay RHKA extends from battery, through the winding of relay RHKA, make contact 10 of relay HMTA, parallel make contacts 3 of relays RGA and RGB, through make contact 4 of relay RA0B (before its release), to the left-hand side of the windings of hold magnets THM08 and THM09, which is also the lead RHM0 extending to the dial pulse register circuit 0 of Fig. 18 and should have a holding ground thereon as previously described. A similar circuit in Fig. 6 is provided in an obvious way for relay RHKB. Relays RHKA and RHKB operate in these circuits from the hold magnet holding ground supplied over lead RHM0 from dial pulse register 0, and thereby indicate that dial pulse register 0 is holding operated the hold magnets THM08 and THM09. In Fig. 18, as previously described, the dial pulse register 0 suppiles a 100-ohm holding ground to the sleeve conductor extending over the switching network into the line circuit 30 of Fig. 35, over the S lead and thence over the lead S30 into the line and trunk hunting circuit of Fig. 30, over make contact 1 of relay TM3, and over previously-described circuits into Fig. 29 to supplement the ground supplied by the make contacts 4 of relays SMTA and SMTB. This holding ground supplied by the dial pulse register (a 100-ohm ground) comes into Fig. 29 on leads S10 and S13. Lead S10 extends over break contact 8 of relay ZU, parallel make contacts 2 of relays SEA and UEA, break contact 4 of relay SOA, break contact 8 of relay SOB, break contact 5 of relay TRKA, and in parallel over the make contacts 11 and 4 of respective relays HMTB and HMTA, to battery through the winding of relay HMKA. A similar circuit extends from the holding ground on conductor S13 Fig. 29, to operate the corresponding relay HMKB. The operation of relays HMKA and HMKB of Fig. 29 is an indication to the marker circuit that dial pulse register 0 is also properly holding operated the hold magnet corresponding to line 30 of Fig. 35.

Before proceeding with the description of the releasing functions of the marker, it will be necessary to digress somewhat in order to consider various features built into the circuits of the advance, time-out, and release arrangement of Fig. 44 and the various checking and timing circuits of Figs. 49 and 50. These various special features will be described in detail hereinafter; however, certain preliminary remarks are necessary at this time in order to indicate the condition of certain timing relays since the release functions of the marker depend upon the condition of these relays.

With respect to the down-check and time-out check of Fig. 50, certain of the relays shown on Fig. 50 are normally operated when the marker circuit is seized for service. During the normal progress of the marker's handling of several successive calls the relays DCKA and DCKB will have been operated and locked in a circuit extending from battery through their windings, through their own respective make contacts 12, break contacts 4 of relays ACA and ACB, break contacts 5 of relays ACA and ACB, break contacts 3 of relays HMKA and HMKB, to ground through the parallel break contacts 6 and 7 of respective relays BTCA, BTCB and BYA, BYB. Since the relays DCKA and DCKB are normally operated, circuits are completed for making the relays TOKA and TOKB also normally operated. The circuit for relay TOKA extends from ground through break contact 4 of relay TAAL, break contact 3 of relay RLSA, make contact 2 of relay DCKA, break contact 1 of relay TEA2, break contact 5 of relay TOLA, winding of relay TOKA, break contacts 7 of relays TOLB and TEB0, make contact 10 of relay DCKB, break contact 10 of relay RLSB, and to battery through the break contact 9 of relay TAAL. A similar circuit is provided for normally operating the relay TOKB. Relays TOKA and TOKB, upon operating, complete circuits, by virtue of their respective make contacts 1 and 11 in parallel with break contacts of relays TOLA and TOLB, to maintain relays TOKA and TOKB operated when relays TOLA and TOLB are operated, as will be described presently. Upon the operation of relays TOKA and TOKB, relays TOLA and TOLB are operated. For example, the operating circuit for relay TOLA extends from ground, over the respective make contacts 2 and 3 in parallel of relays TOKB and TOKA, through the winding of relay TOLA, to battery through the respective make contacts 9 and 10 in parallel of relays TOKB and TOKA. A similar circuit is provided for operating relay TOLB. Relays TOLA and TOLB, upon operating, provide locking circuits for themselves such as the locking circuit for relay TOLA extending from ground, through break contact 7 of relay BTCB, make contact 2 of relay TOLA, winding of relay TOLA, to negative battery through the make contact 10 of relay TOLA and the break contact 10 of relay BTCA. A similar locking circuit is provided for relay TOLB. In the upper right-hand corner of Fig. 50 two obvious circuits are provided whereby relays RCKA and RCK1 are normally operated over break contacts 6 and 8 of relays TRA and TRB.

Under normal conditions the operation of Fig. 50 as described in the previous paragraph would normally prevail. However, since it has been assumed that the P.B.X has just been turned on, so to speak, and power is initially applied to the market circuit, there will not have been any previous marker usage and therefore no situation whereby relays DCKA, DCKB, TOKA, TOKB, TOLA and TOLB could have been operated. Relays RCKA and RCKB, however, will be normally operated. At the point reached in the operation of the dial tone connection as previously described, when the check relays in the marker circuit operated as an indication that the hold magnets were being held by dial pulse register 0, relays DCKA, DCKB, TOKA and TOKB will have been released at any rate. DCKA and DCKB relays are released when the check relays RHKA, RHKB, HMKA and HMKB operate in the marker circuit as previously described. Relays TOKA and TOKB will have been released as soon as the tens end relays TEA2, TEB0 and TEB2 are operated in the marker circuit. Relays TOLA and TOLB would still be held operated by their own contacts however; but, in the present circumstances even these two relays will not be operated because this is the first time that the marker circuit has been used.

In the bottom portion of Fig. 44 are shown a number of relays in the market circuit which time the marker's operation to be sure that the marker completes a particular function within a specified amount of time. When the tens end relay TEA2 in the marker operates as previously described, circuits are completed for operating relays MTA and MTB of Fig. 44. The circuit for operating relay MTA extends from ground, over break contact 6 of relay ARBA, parallel make contacts 2 of relays TEA2 and TEB2, break contact 3 of relay RLA, break contact 1 of relay RLSA, break contact 5 of relay TAA, winding of relay MTA, break contact 9 of relay TAB, break contact 12 of relay RLSB, break contact 9 of relay RLB, parallel make contacts 12 of relays TEA2 and TEB2, to battery through break contact 8 of relay ARBB. A similar circuit is provided in an obvious fashion whereby relay MTB is also operated. The operation of relays MTA and MTB cause the operation of relays TMA and TMB shown in the lower left-hand corner of Fig. 44. The circuit for operating relay TMA extends from ground through break contact 4 of relay TAA, make contact 1 of relay MTA, winding of relay TMA, make contact 12 of relay MTA, to battery through break contact 4 of relay TAB. Relay TMB is operated in a similar circuit in an obvious fashion. Upon the operation of relays TMA and TMB, the corresponding relays TOA and TOB are operated in obvious circuits. Relays TAA and TAB are thereupon operated in obvious circuits under control of make contacts 2 and 10 of relay TOA and 4 and 8 of relay TOB. The operation of relays TAA and TAB cause the release of the corresponding relays TMA and TMB, which, upon releasing, will cause the release of the corresponding relays TOA and TOB. These relays are slow operate, or slow release, whereby a measured amount of time will be consumed from the time that relays TMA and TMB are operated until relays TOA and TOB should release. The marker circuit should normally have completed its function before relays TOA and TOB release. It will therefore be assumed that in the present example relays MTA, MTB, TAA, TAB, TOA and TOB are still operated, it being noted that relays MTA and MTB complete circuits, by virtue of their respective make contacts 2 and 11, in parallel with the break contacts of relays TAA and TAB, thereby to maintain themselves operated irrespective of the condition of the relays TAA and TAB. The full performance of this time-out circuit will be described subsequently in connection with the description of irregular operations, troubles, alarms, etc. In the present instant it will be assumed as stated that the marker finishes its particular function within the allotted time. The other relays on Fig. 44 relate to trouble release conditions which will also be described hereinafter.

Returning now to the previous discussion, it will be recalled that after the line circuit 30 of Fig. 35 had been interconnected with the dial pulse register 0 of Fig. 18 four check relays were operated in the marker circuit as an indication that the hold magnets associated with line 30 and with dial pulse register 0 were properly being held by a 100-ohm ground supplied by the dial pulse register circuit from Fig. 18. These four relays are relays HMKA and HMKB of Fig. 29, which operated to indicate that the line hold magnets were being held properly, and relays RHKA and RHKB of Fig. 6, which operated as an indication that the register hold magnets are properly being held. Upon the operation of relays HMKA and RHKA, etc. circuits are completed in Fig. 7 for operating the release relays RLA, RLB, etc. One circuit is completed in Fig. 7 from ground, over break contact 6 of relay DCKA, the parallel windings of relays RLA, RLAA and RLAB, break contact 7 of relay DCKA, make contact 10 of relay RHKA, break contacts 7 and 11 of respective relays BSYA and TRKAA, make contact 12 of relay HMKA, to battery through the parallel break contacts 4 and 10 of respective relays RCTAA and JREA. A similar circuit is provided for operating the three relays RLB, RLBA and RLBB in a similar fashion. A locking circuit is provided for relays RLB, RLBA and RLBB extending from the right-hand side of break contact 7 of the relay DCKB to negative battery through make contacts 10 of relays RLBB and TAB and break contacts 9 of relay RLSBA and RLSAA. A similar locking circuit is provided for relays RLA, etc. under the control of make contact 10 of relay RLAB and make contact 10 of the relay TAA. The operation of release relay RLAA or relay RLBA causes the release of the tens check relays TCK1 through TCK4 and the release of the tens preference chain relay TP3 in Fig. 10. The release of tens preference relay TP3 causes the release in Fig. 12 of the tens connector and tens connector auxiliary relays TCS3, THC3, TU3, TM3, TACA, TACAA, TACB and TACGA. The release of the tens connector relay TACAA or TACBA or the tens preference relay TP3 causes the release in Fig. 6 of the register control relays RGA, RGAA. RGB and RGBA.

The release of the register control relays RGBA and RGAA and of the tens connector THC3 cause the release in Fig. 37 of the select magnet connectors SMC0, SMC1 and SMC3, which in turn cause the release of all of the operated select magnets, namely, select magnets SM00 and SM09 of Fig. 3, SM10 and SM19 of Fig. 23, and SM30 and SM39 of Fig. 34. This leaves the line circuit 30 of Fig. 35 interconnected with the dial pulse register circuit of Fig. 18 under the control of the respective hold magnets LHM30 of Fig. 34 and THM08 of Fig. 3. The release of the tens connector relays TACAA and TACBA cause the release in Fig. 6 of the register control relays RA0B and RA0A, the release of relay RA0B causing the release in Fig. 6 of relays RHKA and RHKB. The release of the tens auxiliary connector relays TACA and TACB cause the release in Fig. 17 of relays ULA and ULB, which thereupon cause the release of the units relay U0 of Fig. 15, the release of which causes the release of relays UEA and UEB of Fig. 17. The release of relays RGA and RGB cause the release in Fig. 47 of respective relays LTAA and LTBA. Similarly, in Fig. 47 the operation of either of the relays RLAB and RLBB of Fig. 7 causes the release of relays LEA, LEAAA, LEB and LEBA.

In Fig. 37, the operation of relay RLAB or RLBB or the release of relays LEA and LEB causes the release of relays SMTA and SMTB. Relays SMTA and SMTB, in releasing, cause the release in Fig. 7 of relays SMRB, SMRBA, SMRA, SMRAA, HMTBA and HMTAA. The release of relays HMTAA and HMTBA cause the release of the corresponding relays HMTA and HMTB. The release of relays SMRA and SMRB causes the release in Fig. 30 of the sleeve relay S0, the release of which causes the release in Fig. 32 of relays SEA, SEAA, SEB, and SEBA. In Fig. 29 the release of relays HMTA and HMTB cause the release of relays HMKA and HMKB. In Fig. 44, the operation of relays RLA and RLB causes the release of the marker timing relays MTA and MTB, which, in releasing, subsequently cause the release of relays TOA, TOB, TAA and TAB to completely stop the marker timing until such time as the marker may be seized for another function.

Upon the operation of relays RLAB and RLBB and before the tens preference relay TP3 of Fig. 10 releases, a circuit is completed in Fig. 11 for operating the tens auxiliary relay TA3 (not shown) corresponding to the operated tens preference relay TP3 of Fig. 10. This circuit extends in Fig. 11 from ground, over the parallel make contacts 2 of relays RLAB and RLBB, through contact 4 of relay TP3 (not shown), through the winding of relay TA3 (not shown), make contact 11 of relay TP3 (not shown), to battery through the parallel make contacts 12 of relays RLAB and RLBB. Relay TA3 (not shown), in operating, extends a locking circuit for itself over its own make contacts 2 and 10 (not shown), to ground and battery respectively through the parallel make contacts 4 of relays TEA0 and TEB0 and parallel make contacts 10 of relays TEA0 and TEB0. Upon the operation of relay TA3 (not shown in Fig. 11), relay T3 of Fig. 10 is released, the release of which causing the release of the tens end relays TEA0 through TEA3 and TEB0 through TEB3 of Fig. 11—provided no additional tens relays T2 through T7 of Fig. 10 are still operated as an indication that other tens selection requests may be already in the marker circuit. It will be assumed that this is the case and therefore that the tens end relays of Fig. 11 will release. With relays LEA, LEB, LTAA and LTBA of Fig. 47 released, all of the operated relays LTS2 through LTS9 of Figs. 46 and 47 will be released.

The marker circuits now have released to an extent whereby the down-check relays DCKA and DCKB of Fig. 50 will operate. The circuit for relay DCKA extends in Fig. 50 from ground, over parallel make contacts 2 and 5 of respective relays RLAA and RLBA, through break contact 2 of relay TRCA, break contact 9 of relay HMTA, break contact 4 of relay LBA, break contact 2 of relay RHKA, break contact 12 of relay TCK1, break contact 2 of relay TCK2, break contact 10 of relay LEA, break contact 7 of relay HMKA, to battery through the winding of relay DCKA, which operates and completes a locking circuit for itself from the left-hand side of its winding, through its own make contact 12, break contact 4 of relay ACA, break contact 5 of relay ACB, break contact 3 of relay HMKA, and to ground over the parallel break contacts 7 and 6 of respective relays BYA and BTCA. A similar circuit is provided in Fig. 50 whereby relay DCKB operates and locks. Upon the operation of relays DCKA and DCKB, circuits are completed in Fig. 50 for operating the time-out check relays TOKA and TOKB. The circuit for relay TOKA extends from ground over break contact 4 of relay TAAL, break contact 3 of relay RLSA, make contact 2 of relay DCKA, break contacts 1 and 5 of relays TEA2 and TOLA, through the winding of relay TOKA, break contacts 7 of relays TOLB and TEB0, make contact 10 of relays DCKB, to battery through the break contacts 10 and 9 of relays RLSB and TAAL. When relay TOKA operates it completes a circuit over its own make contacts 1 and 11 in shunt of the break contacts 5 and 7 of relays TOLA and TOLB so that relay TOKA will not release when relays TOLA and TOLB are operated. A similar operating and locking circuit is provided in Fig. 50 for relay TOKB. Upon the operation of relays TOKA and TOKB, circuits are completed in Fig. 50 for operating relays TOLA and TOLB. The circuit for relay TOLA extends from ground, over the parallel make contacts 3 and 2 of relays TOKA and TOKB, through the winding of TOLA, to negative battery over the parallel make contacts 10 and 9 of relays TOKA and TOKB. Relay TOLA, upon operating, completes a locking circuit for itself from ground, over break contact 7 of relay BTCB, make contact 2 of relay TOLA, winding of relay TOLA, to battery through make contact 10 of relay TOLA and break contact 10 of relay BTCA. A similar operating and locking arrangement is provided for relay TOLB.

Upon the operation of relays DCKA and of DCKB, the marker release relays RLA, RLB, etc. of Fig. 7 are released. Upon the release of relays RLA, RLB, etc. of Fig. 7, and due to the fact that relays TOKA and TOKB of the time-out check circuit of Fig. 50 are operated, circuits are completed in the advance, time-out and release circuit of Fig. 44 for causing the operation of relays MTA and MTB, the operation of which initiates a chain of relay timing functions in Fig. 44, the end result of which is the eventual release of relays TOKA and TOKB of Fig. 50.

The complete details of the operation of the advance, time-out and release circuit under conditions of time-out, second trial, no-connection or trouble release, etc., will be described hereinafter. For present purposes a short summary of the gyrations through which this circuit goes at the present time will be described. Relays MTA and MTB are operated, thereby causing the operation of relays TMA and TMB, the operations of which result in the operation of relays TOA and TOB, which in turn cause relays TAA and TAB to operate. As previously described, the operation of relays TAA and TAB causes the release of relays TMA and TMB, the release of which will cause the eventual release of relays TOA and TOB, which in turn cause relays TAA and TAB to release to reoperate relays TMA and TMB, etc. The release of relays TOA and TOB with relays TAA and TAB still operated represents a condition under which the marker has been unable to complete its assigned function within the allotted time interval.

Should the marker fail to perform its allotted function within the specified time interval, as in the previous paragraph, the marker, by means of the advance circuit of Fig. 44, will go to a so-called "second trial" condition. This is represented by the operation of relays STB, STA, STBR, STAR, SAA and SAB of Fig. 44. The left- and right-hand circuits of Fig. 44 are identical. Only one of them will be described, the operation of the other one being obvious. With relay MTA operated, with relay TOA released and with relay TAA operated, a circuit is completed for operating relays STA and STAR extending from ground in Fig. 44, through make contact 3 of relay MTA, make contact 1 of relay TAA, break contact 5 of relay TOA, break contact 6 of relay STA, through the winding of relay STA and in parallel therewith through the winding of relay STAR and series break contacts 7 and 9 of relay SAA, thence through break contact 8 of relay STA, break contact 9 of relay TOA, make contact 11 of relay TAA, to battery through make contact 10 of relay MTA. Relays STA and STAR operate in this circuit and close locking circuits for themselves over make contacts 6 and 8 of relay STA. Likewise, the corresponding relays STB and STBR operate and lock as will be apparent. Upon the eventual release of relay TAA, with relay TMA reoperated, a circuit is completed for operating relay SAA from ground in Fig. 44, through make contact 4 of relay MTA, make contact 6 of relay TMA, break contact 3 of relay TAA, make contact 1 of relay STA, break contact 6 of relay SAA, through the winding of relay SAA, break contact 12 of relay SAA, make contact 11 of relay STA, break contact 7 of relay TAA, to battery through make contact 9 of relay MTA. Relay SAA operates in this circuit and closes a locking circuit for itself through its make contacts 6 and 12. Likewise, the corresponding relay SAB operates and locks in the same fashion. Upon the operation of relays SAA and SAB, respective relays STAR and STBR are released.

Due to the operation of relays SAA, SAB, STA, STB, etc., the marker proceeds to make a second trial to complete the particular function which it was unable previously to complete. In the event that the marker circuit is unable to complete its function after a second trial time-out period, once again a condition is arrived at in Fig. 44 where relay TOA is released prior to the release of relay TAA. Under these circumstances, a circuit is completed for operating relay NCA (indicating that no connection can be made). This circuit in Fig. 44 extends from ground, over make contact 3 of relay MTA, make contact 1 of relay TAA, break contact 5 of relay TOA, make contact 1 of relay SAA, break contact 6 of relay NCA, through the winding of relay NCA, break contact 12 of relay NCA, make contact 11 of relay SAA, break contact 9 of relay TOA, make contact 11 of relay TAA, to battery through make contact 10 of relay MTA. Relay NCA operates in this circuit and completes a locking circuit for itself over its own make contacts 6 and 12. Similarly, relay NCB operates and locks. Then, upon the release of relay TAA and the subsequent reoperation of relay TMA, a circuit is completed for operating relay NAA extending in Fig. 44 from ground, over make contact 4 of relay MTA, make contact 6 of relay TMA, break contact 3 of relay TAA, make contact 5 of relay NCA, through the winding of relay NAA, make contact 9 of relay NCA, break contact 7 of relay TAA, to battery through make contact 9 of relay MTA. Relay NAA operates in this circuit and completes a locking circuit for itself over its own make contacts 2 and 12. The corresponding relay NAB also operates and locks in a similar fashion. This situation represents a time-out condition at the end of the second trial.

The same process is repeated once more for a third time-out period, at the end of which, in the event that the marker has not been able to complete its assigned function, the trouble-release relay TRA will operate. At the end of the next timing interval, upon the release of relay TOA with relay TAA operated, a circuit is completed for operating relay TRA extending from ground in Fig. 44, through make contact 3 of relay MTA, make contact 1 of relay TAA, break contact 5 of relay TOA, make contact 4 of relay NAA, through the winding of relay TRA, make contact 10 of relay NAA, break contact 9 of relay TOA, make contact 11 of relay TAA, to battery through make contact 10 of relay MTA. Relay TRA operates in this circuit and completes a locking circuit for itself in Fig. 44 extending from ground, through make contact 6 of relay TRA, make contact 5 of relay MTA, through the winding of relay TRA, to battery through make contacts 7 and 8 of respective relays MTA and TRA. Similarly, the corresponding relay TRB operates and locks in a similar fashion. In Fig. 50, upon the operation of relays TRA and TRB, relays RCKA and RCKB release, thereby completing circuits in Fig. 44 for the operation of the time-out release relays RLSA and RLSAA, extending from ground through make contact 6 of relay TRA, break contact 6 of relay RCKA, windings of relays RLSA and RLSAA, to battery through break contact 4 of relay RCKA and make contact 8 of relay TRA. The corresponding relays RLSB and RLSBA operate in a similar circuit. On the operation of the time-out release relays RLSA, RLSB, etc. of Fig. 44, relays TOKA and TOKB of Fig. 50 will release. Similarly, the relays MTA and MTB in Fig. 44 will release, thereby reverting the entire advance, time-out and release circuit to normal. Specifically in Fig. 44, relays MTA and MTB, in releasing, cause the release of relays STA, STB, SAA, SAB, NAA, NAB, NCA, NCB, TRA and TRB. Relays TRA and TRB, in releasing, cause the reoperation of relays RCKA and RCKB of Fig. 50 and the release of relays RLSA, RLSAA, RLSB and RLSBA of Fig. 44.

In Fig. 32 it will be noticed that the various operations of relays SAA, SAB, STA and STB will alter the condition of the WU—ZU relay circuit in the upper left-hand corner. For instance upon the operation of relays STA and STB, a circuit is completed for shunting down or releasing relay WU. This circuit extends from ground through break contacts 4 in parallel of relay TACAA and TACBA, parallel make contacts 5 of relays STA and STB, break contacts 5 of relays SAA and SAB, through make contact 1 of relay ZU to the left-hand side of relay WU, thereby causing relay WU to release. Upon the operation of relays SAA and SAB at the end of the first second trial time-out period, as described above, ground is removed from the right-hand side of the winding of relay ZU, thereby permitting relay ZU to release. Thus, at the end of the second trial time-out, the no-connection time-out and the trouble-release time-out intervals the condition of relays WU and ZU is that both of these relays are released. In Fig. 22 it will be noted that the WU and ZU relays, in reverting to their unoperated status in the above fashion, cause relay WUA to release.

As a result of the marker circuit having been called into service, performed its function and released, certain of the previously mentioned W—Z relay combinations will have gone through at least part of one cycle. In Fig. 47, upon the release of relays LTAA and LTBA, relay ZLG will operate in series with relay WLG in a circuit extending from ground, through the winding of relay ZLG, make contact 2 of WLG, break contact 2 of WLGA, to battery through the winding of relay WLG; and, these relays will remain in this condition upon the first complete release of the marker circuit. It will be recalled in Fig. 32, when the marker was first called into operation the relay WU was operated and the relay ZU was released. At this point, in Fig. 22 a circuit was completed for operating relay WUA from ground, through break contact 3 of relay ZU, make contact 2 of WU, through the winding of WUA to battery through resistance WUA. Relay WUA, upon operating, completed an obvious locking circuit for itself over its own make contact 8. Returning now to Fig. 32, upon the release of relays TACAA and TACBA at the time that the marker released, relays ZU and WU are operated and kept operated in circuits extending from ground, over make contact 6 of relay WU, through the windings and respective resistances WU and ZU, to negative battery. In Fig. 22, the additional operation of relay ZU does not change the condition of relay WUA, which remains operated. It will be recalled that when the marker was first brought into use the W—Z relay combinations in the lower right-hand corner of Fig. 37 were arranged in condition whereby relays WL and W1L were operated and relays ZL and Z1L were released. Under this condition, referring to Fig. 48, circuits were completed for operating the respective relays WLA and W1LA. The circuit for relay WLA extended from ground, over break contact 8 of relay ZL, make contact 11 of relay WL, winding of relay WLA, to battery through resistance WLA. The operating circuit for relay W1LA extended from ground, over break contact 8 of relay Z1L, make contact 11 of relay W1L, winding of relay W1LA, to battery through resistance W1LA. Relays WLA and W1LA operated in these circuits and completed locking circuits for themselves over their respective make contacts 5 and 8. Returning now to Fig. 37, upon the release of relays LTAA and LTBA when the marker released, relay ZL will have been operated in parallel with relay WL. This does not change the condition of the W1L—Z1L combination where relay W1L remains operated and relay Z1L remains released. In Fig. 48, the operated conditions of relays WLA and W1LA are also not affected.

The condition of the circuits at this point may be summarized as follows. Line circuit 30 of Fig. 35 is interconnected with the dial pulse register 0 of Figs. 14, 18 and 19 by virtue of the facts that line hold magnet LHM30 of Figs. 34 and 35 is operated and that hold magnets THM08 and THM09 of Figs. 3 and 6 are operated. In dial pulse register 0 of Figs. 14, 18 and 19, relays L, SR and ON of Fig. 18 are operated and relays TLA and TLD of Fig. 14 are operated. In the alarm, transfer and test circuit of Figs. 35 and 36, relays TR, AT and ATA of Fig. 35 are operated, as previously described. In the marker circuit the register control relays RA1B and RA1A of Fig. 6 remain operated as an indication that register 1 is idle and is available to handle the next call. And, all of the down-check and time-out check relays of Fig. 50 remain operated. Also, in the marker circuit the following relays are operated: relay WUA of Fig. 22; relays WU and ZU of Fig. 32; relays WL, ZL and W1L of Fig. 37; relays WLG and ZLG of Fig. 47; and, relays WLA and W1LA of Fig. 48.

The circuits of the P.B.X are now in condition whereby the P.B.X station 30 of Fig. 35 may proceed to dial the necessary digits into the dial pulse register of Figs. 14, 18 and 19 to effect completion of the desired connection.

*Dialing and marker seizure*

After the calling line dials the one or two digits required for identification of the called line or trunk, the tens digit is stored on the tens digit register relays and the units digit on the pulse counter. The digit steering relays in the register determine when the tens and units digits have been registered. The register then calls for the marker to complete the call. The tens selection circuit recognizes the register's request for service and passes the information on to the tens preference circuit. The registers have the highest preference in the marker and will be served before any trunks or stations which might be originating calls at the same time. However, the marker will continue to serve any trunk and station requests which awere waiting when the register called for service, unless an all-register-busy condition is encountered. In the latter case, the marker will serve a waiting register first to free it for another call.

Before discussing the details of the registration, in the dial pulse register 0 of Figs. 14, 18 and 19, of the two digits dialed by the P.B.X station line 30 of Fig. 35, it is advisable to consider certain of the timing aspects of the dial pulse register operation. In Fig. 18 are shown two relays PU and TMOR. Generally speaking, these two relays are operated by timed impulses such that relay PU operates and then a certain time interval elapses before relay TMOR operates. The time interval between the operation of relay PU and the operation of relay TMOR is sufficient for the dial pulse register to accomplish particular functions before it is retimed. For a normal call relay PU has its battery supply to the left-hand side of its winding controlled by break contacts 2 and 8 respectively of relays SW and DC of Fig. 19. Relay SW will operate when relay RA of Fig. 18 releases after the first digit is dialed, but releases when the calling station dial goes off normal to start the dialing of the second digit, provided that relay PU of Fig. 18 has not previously operated. Also under normal circumstances, with relay PU operated after the first digit has been dialed, relay SW of Fig. 19 will operate and will lock under the control of make contact 6 of relay PU. However, when relay DC of Fig. 19 operates, upon the completion of dialing, the operating circuit for relay PU is opened. Relay PU thereupon releases, in turn causing relay SW to release. Relay SW, upon releasing, provides battery again through its break contact 2 to the PU relay, preparing it for reoperation when the next timed impulse occurs. The register is thus retimed upon dial completion. A similar retiming takes place between the time of dial completion and the time required for the register to call in the marker circuit for handling the completion functions of the call. Normally the marker will take care of this action within a sufficiently short interval of time to preclude the operation of relay TMOR. The various time-out and trouble aspects of register timing will be described hereinafter. For present purposes it will be assumed that no situation is encountered which causes the relay TMOR of Fig. 18 to operate to cause a register time-out release.

A few remarks are advisable concerning the triple winding line relay L of Fig. 18. The L relay is a three winding, magnetically biased, polarized, mercury contact relay. The left-hand, or primary winding is in series with the calling line dial contacts and is used as a line winding to operate relay L in response to dial pulses. The middle, or secondary winding is used to aid the release of relay L. Whenever relay L operates, its make contact 1 furnishes a ground for the middle or secondary winding, which is arranged to be poled oppositely to the left-hand, or primary winding. This opposition of ampere turns, whenever relay L is operated, tends to make relay L easier to release. The L resistance is set at a value that will give the optimum benefit from this secondary or middle winding. The right-hand, or tertiary winding is a pulse-aiding winding. This winding is in a circuit which includes the pulse help capacitor PH. The side of the PH condenser which is connected to ground through the make contact 1 of the L relay is also connected to the right-hand side of the winding of relay SR. When the L relay operates, charging current is supplied to capacitor PH in a circuit extending from battery, through the right-hand, or tertiary winding of relay L, through condenser PH, to ground through make contact 1 of the L relay. This charging current is in a direction which tends to hold the relay L operated. As capacitor PH becomes fully charged, the charging current approaches 0 and the other two windings regain full control. When the left hand, or primary winding circuit is opened, relay L releases, thereby removing ground from the left-hand side of condenser PH. The capacitor PH then proceeds to discharge through the winding of the SR relay. This discharge current through the right-hand, or tertiary winding is in such a direction as to tend to hold relay L released. The right-hand tertiary winding and the capacitor PH thus act to insure that once the relay L operates, it will remain operated for a definite minimum time and that once relay L releases, it will remain released for a definite minimum time. This action permits longer maximum dialing loops to be used than would otherwise be possible.

Relays SR and RA of Fig. 18 are the usual timing relays which control various switching operations within the dial pulse register during the dialing of pulses of a digit and the dial of different digits. Relay SR is energized from ground through make contact 1 of the line relay L each time relay L operates when the dialing loop is closed. Relay SR is sufficiently slow releasing to hold over momentary opens of the make contact 1 of relay L, such as caused by the open circuit pulses coming over the line. Relay SR, therefore, will remain operated normally throughout the entire dialing condition within the dial pulse register. Relay RA is a fast operating relay which operates during the first open of the dial pulse loop when relay L releases and remains operated until the interdigital interval when relay L is held operated between the dialing of digits. Relay RA is fast operating but is made slow releasing through the use of its lower winding, which is short circuited when relay RA is operated. Thus, the RA relay, as is well-known in the art, is arranged to recognize the start and stop of pulse trains representing separate digits.

The pulse counting circuit of the dial pulse register comprises the counting relays P1, P2, P3, P4, P5 and P2A of Fig. 18. A description will be given of the action of these six pulse counting relays in response to each one of the pulses representing a digit of ten in order to show the action thereof. Then, the condition of the pulse counting register will be described with respect to the particular example presently being considered wherein the P.B.X line circuit 34 of Fig. 35 is being called by line 30, thereby involving a tens digit of 3 and a units digit of 4. When the L relay releases on the first break of the P.B.X station dial, relay P1 operates in a circuit extending from ground, through break contact 4 of relay L, make contact 4 of relay SR, and break contact 6 of relay P2, to battery through the winding of relay P1. In Fig. 18, relay RA also operates in a circuit extending from ground, through break contact 5 of relay L, make contact 4 of relay ON, to battery through the upper winding of relay RA. As previously mentioned, relay RA, in operating, completes a circuit through its own make contact 2 for short circuiting its lower winding, thereby making relay RA slow releasing. Relay P1, in operating, completes a locking circuit for itself over its make contact 1, to ground through make contact 12 of relay RA and make contact 6 of relay ON. When relay L reoperates at the end of the first open loop pulse, a circuit is completed for operating relay P2 extending from ground, through make contact 2 of relay L, make contact 4 of relay RA, make contact 11 of relay P1, break contact 12 of relay P2, to battery through the winding of relay P2. Relay P2, in operating, extends a locking circuit for itself from the left-hand side of its winding through its own make contact 12 to the locking ground for relay P1 and extends the locking ground for relay P1 from the left-hand side of the winding of relay P1, through make contact 6 of relay P2, to the operating circuit for relay P2. Upon the next release of relay L, relay P1 releases and completes a circuit for operating relays P3 and P2A extending from ground, over make contact 6 of relay ON, make contact 12 of relay RA, make contact 11 of relay P2, break contacts 4, 6 and 6 of respective relays P1, P5 and P4, and to battery through the winding of relay P3 in parallel with a circuit through break contact 6 of relay P2A and through the winding thereof to negative battery. Relay P2 is held operated in a circuit extending from ground through break contact 4 of relay L, make contact 4 of relay SR, and make contact 12 of relay P2 to battery through the winding of relay P2. On the reoperation of relay L at the end of the second pulse, relay P2 releases, leaving relay P2A locked in a circuit extending from the right-hand side of its winding through its own make contact 6 to off-normal ground over make contact 6 of relay ON and leaving relay P3 locked in a circuit extending from the left-hand side of its winding through its own make contact 11, break contact 8 of relay P1 in parallel with break contacts 4 of relays P4 and P5 in series, to ground through make contact 12 of relay RA and make contact 6 of relay ON. This cycle of relays P1 and P2 repeats itself, with relays P1 and P2 remaining operated at the end of odd numbered pulses (1, 3, 5, 7, and 9) and remaining normal (unoperated) at the end of even numbered pulses (2, 4, 6, 8 and 10).

Since the number 1 is not assigned as a tens digit and since means for eliminating single pulses due to accidental momentary line opens must be provided for, the pulsing circuit is designed to refuse registration of a tens digit of 1. The P2A relay accomplishes this task by keeping open the information ground path for the TD1 through TD9 relays of Fig. 19 at make contact 4 of relay P2A in Fig. 19 until such time as relay P2A operates, and by not providing a locking ground in Fig. 18 for relays P1 and P2 should the RA relay release. If relay P2A should remain unoperated, it maintains the dial tone output to the calling line as indicated by break contact 5 of relay P2A in Fig. 18. This indicates to a calling party that regardless of how a digit of 1 may have arrived in the dial pulse register, in the tens digit position, the calling party should continue to dial just as through nothing had happened.

At the end of the third open line pulse, relays P1 and P2 will have been reoperated and a circuit will be completed for operating relay P4 extending from ground, over make contact 6 of relay ON, make contact 12 of relay RA, make contact 11 of relay P2, make contact 4 of relay P1, make contact 1 of relay P3, break contact 8 of relay P5, to battery through the winding of relay P4 which, upon operating, extends a locking circuit from the left-hand side of its winding through its own make contact 11 and break contact 7 of relay P5 to the off-normal ground circuit, relay P3 remaining locked under the control of make contact 1 of relay P2. At the end of the fourth open pulse, relays P1 and P2 will have been released, leaving relays P2A, P3 and P4 operated, the locking circuit for relay P3 now being under the control of break contact 8 of relay P1, and the locking circuit for relay P4 being under the control of the parallel break contacts 7 of relays P1, P2 and P5. During the fifth open line pulse, the locking circuit for relay P3 will be opened by the operation of relay P1, thereupon releasing relay P3; and, at the end of the fifth pulse, relays P1 and P2 will be reoperated, relay P3 will be released, and relays P2A and P4 will remain operated. At the end of the sixth open pulse, relays P1 and P2 will have been released and a circuit will be completed for operating relay P5 from battery, through its winding, through make contact 1 of relay P4, to off-normal ground through break contacts 4 of relays P2 and P3 and break contact 10 of relay P1. At the end of the seventh open line pulse, relays P1 and P2 will be operated, as will relays P2A, P4 and P5, the locking circuit for relay P4 extending from the left-hand side of its winding, through its make contact 11 to off-normal ground, through break contact 7 of relay P3, and the locking circuit for relay P5 extending from the left-hand side of its winding to off-normal ground through its own make contact 11. At the end of the eighth open line pulse relays P1 and P2 will have been released, leaving operated relays P2A, P3, P4 and P5. Relay P3 was operated during the open line interval of the eighth pulse by a circuit extending from off-normal ground through make contact 11 of relay P2, break contact 4 of relay P1, and the series make contacts 6 of relays P5 and P4, and relay P3 locked itself over its own make contact 11, to off-normal ground through the series make contacts 4 of relays P4 and P5. At the end of the ninth open line pulse, relays P1 and P2 will have been reoperated and relay P4 will have been released, leaving operated relays P1, P2, P2A, P3 and P5, the locking circuit for relay P4 having been opened by the operation of relays P1, P2, P3 and P5. At the end of the tenth open line pulse, relays P1 and P2 will have been released, thereby leaving operated only relays P2A, P3 and P5.

Since it has been asseumed that the P.B.X. party at station line circuit 30 of Fig. 35 is attempting to secure a connection to the P.B.X. party at line circuit 34, it will be necessary for the calling party to dial a tens digit of three and a units digit of 4. From the above description of the operation of the pulse counting circuit of Fig. 18, it will be apparent that at the end of the third open line pulse (representing a tens digit of 3), upon the reoperation of relay L the relays of the pulse counting circuit which will be operated are relays P1, P2, P2A, P3 and P4. It will be noted at this point, as has been briefly referred to herebefore, that the operation of relay P2A has opened the dial tone connection in Fig. 18. The locking circuit for relay P1 now extends from ground, over make contact 2 of relay L, break contact 6 of relay SW, make contact 8 of relay P2A, to the winding of relay P1 through make contacts 11 and 6 of respective relays P1 and P2. The locking circuit for relay P2 extends from ground, over make contact 6 of relay ON, and break contact 8 of relay SW, to the off-normal ground wire, thence to the winding of relay P2 through make contacts 1 and 12 of respective relays P1 and P2. The locking circuit for relay P3 extends from the off-normal ground conductor, to the winding of relay P3 through make contacts 1 and 11 of respective relays P2 and P3. The locking circuit for relay P4 extends from the off-normal ground conductor, through break contact 7 of relay P5, to the winding of relay P4 through make contact 11 of relay P4. And, the locking ground for relay P2A extends to the winding thereof over make contact 6 of relay ON and make contact 6 of relay P2A.

Upon the prolonged reoperation of relay L at the end of the third impulse, relay RA of Fig. 18 releases. Upon the release of relay RA, a circuit is completed in Fig. 19 for causing the operation of relay TD3 to represent the registration of the tens digit of 3. This circuit extends from ground, over break contact 8 of relay TMOR, break contact 3 of relay OT, make contact 4 of relay P2A, break contact 8 of relay RA, break contact 10 of relay P5, make contact 12 of relay P4, make contact 10 of relay P2, make contact 3 of relay P3, break contact 3 of relay STR, through the winding of relay TD3 to battery over make contact 7 of relay ON and break contacts 11 and 4 of relays RRLB and RRLA. Relay TD3, in operating, locks over its own make contact 1 to ground over break contact 8 of relay TMOR. In the meantime, relay SW of Fig. 19 is operated in the same circuit which operated relay TD3, in the lower left-hand corner of Fig. 19, over break contact 10 of relay DC to battery through the winding of relay SW. Relay SW, in operating, releases all of the operated pulse counting relays of Fig. 18 and completes a circuit for operating relay STR of Fig. 19 extending from battery, through the winding of relay STR, to ground through make contacts 10 and 9 of respective relays SW and ON. The operation of relay STR prepares the pulse counting relays for counting the units digit and completes a locking circuit for itself from the right-hand side of its winding over its own make contact 11, to ground over make contact 9 of relay ON. The release of relay P2A causes the release of relay SW.

Upon the first open dial pulse of the units digit, relay RA of Fig. 18 reoperates and completes a circuit for operating relay UD extending from locking ground on the right-hand side of relay STR, through make contact 10 of relay RA, to the winding of relay UD and to battery through break contact 4 of relay TMOR. The operation of relay UD completes circuits in Fig. 18 over its make contacts 10 and 12 to provide locking grounds for the pulse counting relays so that these relays will remain in whatever condition they find themselves after having counted the units digit. This enables the pulse counting relays themselves to be used as the actual units digit registration means in the dial pulse register. The operation of relay UD also prepares in Fig. 19 part of the operating circuit for relay DC which, when it operates at the end of the units digit (upon the subsequent release of relay RA), will indicate the completion of dialing.

Since it has been assumed that line circuit 34 of Fig. 35 is the called party, the units digit which remains registered in the pulse counting relays at the end of the dialing of the units digit will be a 4. This, as previously discussed, is a condition represented at the end of the fourth open line impulse by the operation of relays P2A, P3 and P4.

Upon the release of relay RA at the end of the dialing of the units digit, relay UD will have completed a locking circuit for itself extending from the left-hand side of its winding in Fig. 19, through break contact 4 of relay TMOR and make contact 2 of relay UD, to ground over make contact 9 of relay ON. Also, a circuit is completed for operating the "dial completion" relay DC of Fig. 19 extending from battery, through break contacts 4 and 11 of respective relays RRLA and RRLB, make contact 7 of relay ON, through the winding of relay DC, break contact 6 of relay RA, make contact of relay UD, to ground over break contact 8 of relay BYR. Relay DC, in operating, completes a locking circuit for itself in an obvious fashion over its own make contact 1. Relay DC, in operating, opens the operating circuit for relay SW, thereby preventing it from reoperating, and in Fig. 18 completes a circuit for maintaining the right-hand tertiary winding of relay L energized as an additional help in insuring that relay L remains operated at the end of the dialing of the units digit. The circuit for the right-hand winding of relay L extends from battery, through the right-hand winding of relay L, through resistance LU, make contact 6 of relay DC, to ground through break contact 9 of relay RT. It will be noted that this same circuit causes the discharge of whatever charge may have been accumulated on condenser PH.

The above described operation of relay DC is an indication that the dial pulse register is ready to transmit its stored data to the marker in order for the marker to complete the desired call. In Fig. 14, upon the operation of relay DC, circuits are completed whereby ground is applied to conductor DC1 and battery is supplied to conductor DC2, both leading into the tens selection circuit of the marker in Fig. 11. Ground extends in Fig. 14 over break contact 6 of relay RT, break contact 9 of relay BYR, make contact 2 of relay DC, to conductor DC1; and, battery extends to conductor DC2 over make contact 12 of relay DC. In Fig. 11 of the tens selection circuit in the marker, conductors DC1 and DC2 from the dial pulse register 0 are related to the operating circuit of relay R0, the relay which will be operated by dial pulse register 0 in its bid for the services of the marker. Assuming that the marker circuit is idle at the moment, relays TEA2 and TEB2 will be released, thereby completing an operating circuit for relay R0 extending from ground on lead DC1, through the parallel break contacts 9 and 11 of relays TEA2 and TEB2, through the winding of relay R0, to battery on lead DC2 through the parallel break contacts 9 and 11 of relays TEB2 and TEA2. The operation of relay R0, as will be described presently, is the action whereby seizure of the marker is effected by dial pulse register 0 when and if the marker is available for such a seizure.

It will be noted in Fig. 10 that the contacts of relay R0 of Fig. 11 are at the highest preference position in the tens preference chain, followed by contacts of relay R1 of Fig. 11, which of course is the tens selection relay corresponding to dial pulse register 1. Under normal circumstances therefore, dial pulse register 0 will have a higher preference in the order of marker seizure than will dial pulse register 1. Also, it will be noted in Fig. 11, with respect to the operating circuits for relays R0 and R1, that if the marker were still engaged in a tens selection function at the time that one of the dial pulse registers bids for seizure of the marker, relays TEA2 and TEB2 will be operated, thereby precluding either of relays R0 and R1 from operating except under one condition. That condition is a condition whereunder the marker has detected that both dial pulse registers are busy. Under this circumstance the marker will give immediate priority to one of the dial pulse registers in order to clear one of them for further action. Before doing so, however, the marker will complete the particular function in which it is presently engaged. The relays which detect whether or not both of the dial pulse registers are busy are relays ARBA and ARBB of Fig. 11.

It will be recalled from previous description with respect to the register control circuit of Fig. 6 that, if both registers are busy the relays RA0A, RA0B, RA1B and RA1A will all be released. As will be obvious in Fig. 11, if this condition prevails when the marker releases from a particular function, thereby operating its relays RLA and RLB of Fig. 7, obvious circuits will be completed whereby both of the relays ARBA and ARBB will operate and lock to ground through their respective make contacts 3 and 9 independently of the marker release relays RLA and RLB. Relays ARBA and ARBB will remain locked until such time as one or the other of the dial pulse registers becomes idle, as indicated by the operation of one or the other of relays RA0B and RA1B of Fig. 6. At such time as one of the dial pulse registers attempts to seize the marker circuit, for example the instant case where dial pulse register 0 attempts to seize the marker by operating the corresponding register tens selection relay R0 of Fig. 11, if relays ARBA and ARBB are operated the marker will cause the operation of relay R0 or relay R1 over make contacts of relays ARBA and ARBB. In this respect it will be noted that such operating circuits for relay R0 of Fig. 11 also depend upon the released condition of relay R1 since the operating circuit for relay R0 must pass through break contacts 11 or 3 of relay R1; however, the operating circuit for relay R1 does not depend upon the released condition of relay R0. Therefore, it will be apparent that under a condition whereby the marker is busy with a tens selection function (relays TEA2 and TEB2 operated) and whereunder both dial pulse registers are busy (operated relays ARBA and ARBB), if both dial pulse registers attempt to seize the marker at the same time (by attempting to operate their respective tens selection relays R0 and R1), the dial pulse register R1 will be preferred over dial pulse register 0, thus reversing the normal preference arrangement in the tens preference chain of Fig. 10. With respect to the latter tens preference chain, it will be noted that under the condition where both registers are busy the entire tens preference chain is opened beyond the register preference relays RP0 and RP1 by the opening of the break contacts 10 and 4 of relays ARBA and ARBB. This prevents any line or trunk circuit from causing a tens preference chain relay operation until such time as one of the register preference relays RP0 and RP1 is permitted to be operated.

Under present circumstances, as indicated previously, it is assumed that the marker circuit is idle and it will also be assumed that register 1 is not attempting to operate its tens selection relay R1. Therefore, relay R0 will be operated in the previously described circuit and will provide a locking circuit for itself in an obvious fashion through its own make contacts 1 and 12. The operation of relay R0 of Fig. 11 causes the operation of all of the tens-end relays TEA0 through TEA3 and TEB0 through TEB3 by virtue of make contacts 6 and 5 of relay R0.

Upon the operation of relays TEA2, TEB2, TEA3 and TEB3 of Fig. 11, a circuit is completed in Fig. 10 for the operation of the tens preference relay RP0 corresponding to dial pulse register 0. One circuit in Fig. 10 extends from ground over break contact 3 of relay TOKA, through the winding of relay TCK4, break contacts 3 of relays RLAA and RLBA, make contact 8 of relay TEA3, make contact 4 of relay R0, left-hand winding of relay RP0, make contact 10 of relay R0, make contact 8 of relay TEA2, break contacts 11 of relays RLBA and RLAA, through the winding of relay TCK3, to battery through the break contact 9 of relay TOKB. A similar circuit is completed in an obvious fashion through the right-hand winding of relay RP0 and through the windings of relays TCK1 and TCK4. In these circuits are operated relays TCK1 through TCK4 and relay RP0. The operation of relay RP0 in Fig. 10 causes the operation in Fig. 12 of the corresponding register preference auxiliary relay RPA0 in a circuit extending from ground through break contact 11 of relay STAR, make contact 2 of relay RP0, winding of relay RPA0, make contact 11 of relay RP0, to battery through break contact 2 of relay STBR.

The operation of the register preference relay RP0 of Fig. 10 and the corresponding register preference auxiliary relay RPA0 of Fig. 12 represents the successful seizure of the marker circuit by dial pulse register 0.

*Completing the connection (see Figs. 2B, 2E and 2G)*

Figure 2B:
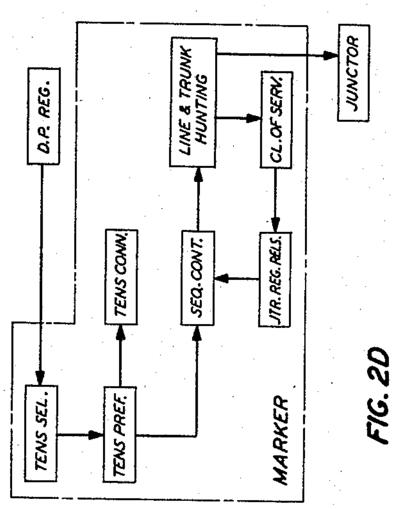
Figs. 2A, 2B, 2C, 2D, 2E, 2F, 2G and 2H show certain block diagrams useful in understanding some of the general operational features of the P.B.X.
Figure 2D:
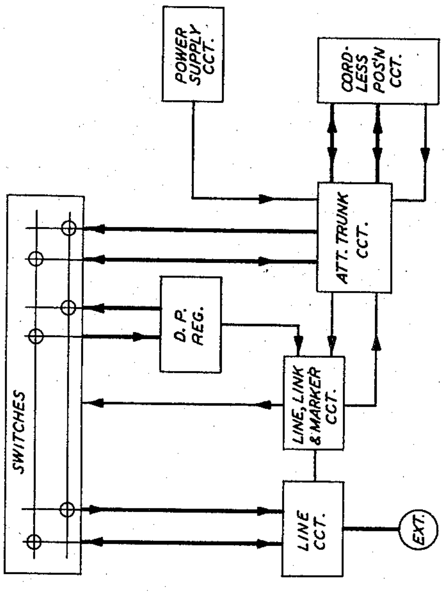
Figure 2A:
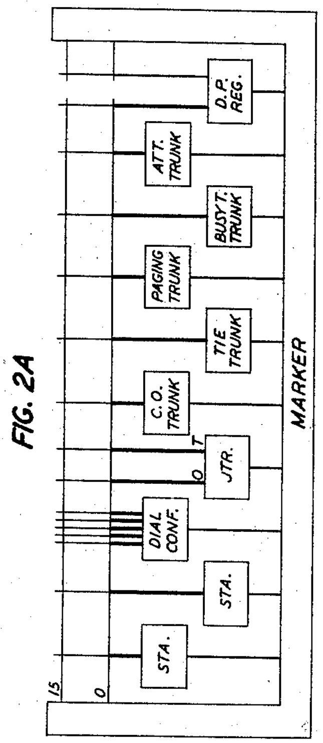
Figure 2C:
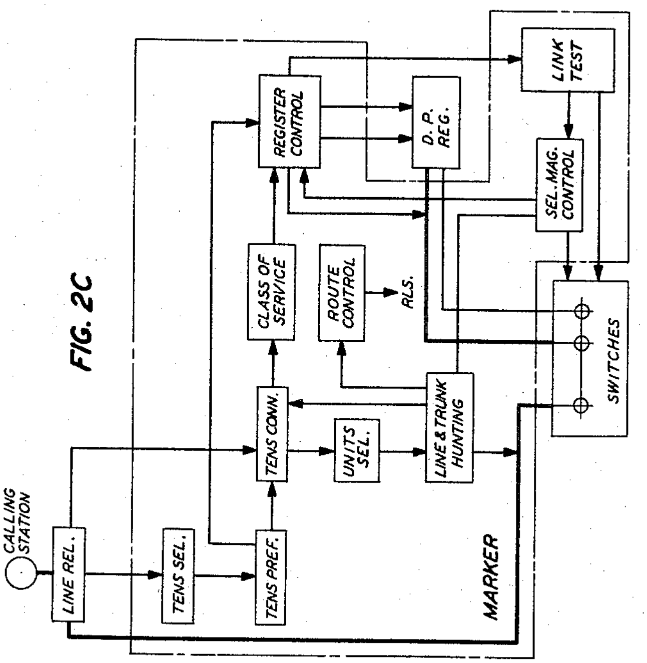
Figure 2F:
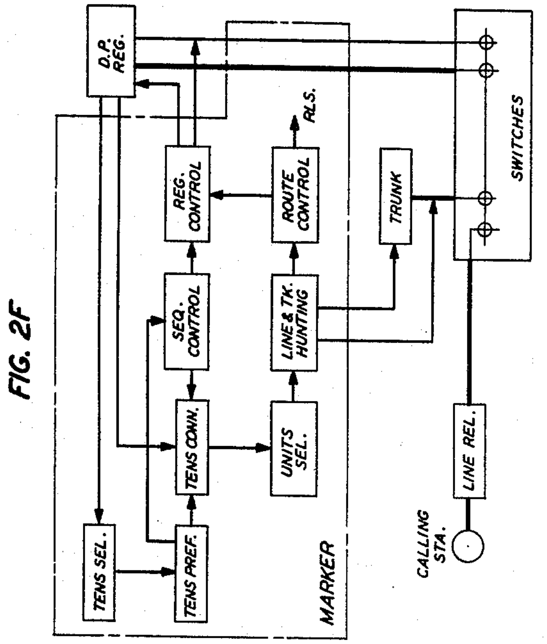
Figure 2H:
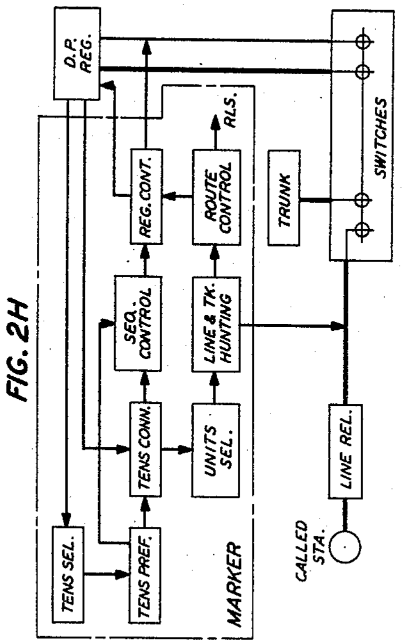

The register, having determined that this is a junctor class call, signals the sequence control circuit of the marker through the tens preference chain that a junctor will be required. The sequence control circuit then requests the line and trunk hunting circuit to find an idle junctor. When an idle junctor is found, its identity is stored on the junctor register relays by the class-of-service circuit (Fig. 2B). The sequence control circuit then operates the register connector relays of the tens connector circuit and the link test circuit is requested to find an idle link. The tens and units identity of the called station is also passed into the marker through the register connector, and the tens connector, corresponding to the tens digit of the called station line, and the units selection circuit relay, corresponding to the units digit of the called line, are operated. The line and trunk hunting circuit then tests the called line to determine if it is idle. The link test circuit, after finding an idle link, signals the select magnet control circuit of the marker to operate the select magnets corresponding to the selected link.

The circuit action will now be set forth describing the details involved in completing the connection. It will be recalled that line circuit 30 of Fig. 35 has succeeded in causing the registration, in dial pulse register 0 of Figs. 14, 18 and 19, the pertinent information required by the dial pulse register to complete the connection desired—namely, to line circuit 34 of Fig. 35. In Fig. 18 relays L, SR and ON have remained operated after the completion of registration in dial pulse register 0 of the tens (3) and units (4) digits of the desired line circuit 34; in Fig. 19 relays DC, STR and UD remain operated at the completion of dialing; in Fig. 14 relays TLA and TLD remain operated to indicate the toll allowed class of call; in Fig. 19 relay TD3 remains operated as a registration of the tens digit 3; and, in Fig. 18 relays P2A, P3 and P4 remain operated as a registration of the units digit 4. Line circuit 30 of Fig. 35 is interconnected with dial pulse register 0 of Fig. 18 by virtue of the operated hold magnets LHM30 of Fig. 34 and THM08 of Fig. 3, which maintain the tip, ring and sleeve connections between these two circuits over the lower half of horizontal level 9 of the crossbar switches (particularly conductors T09, R09 and S09). Similarly as previously explained, the hold magnet THM09 in Fig. 3 is also operated whereby certain control conductors are extended between the crossbar switch network and the marker circuit for purposes to be explained below.

At the end of the dial completing function the dial pulse register, as previously explained, has attempted to seize the marker through the operation of the tens selection relay R0 of Fig. 11 corresponding to dial pulse register 0. As a result of the operation of relay R0, other relays in Fig. 11, namely, the tens end relays TEA0, TEB0, etc. have been operated and the register preference relay RP0 of Fig. 10 has been operated in series with the tens check relays TCK1 through TCK4. Upon the operation of relays TEA2 and TEB2 of Fig. 11, the advance, time-out and release circuit of Fig. 44 is recycled as previously explained. In this connection it will be assumed that the circuit of Fig. 44 does not cause an alarm time-out or a second-trial before the marker is able to complete the function presently to be assigned to it.

Upon the operation of the register preference auxiliary relay RPA0 of Fig. 12 circuits are completed between the dial pulse register 0 of Fig. 14 and the marker sequence control circuit of Fig. 41 whereby the junctor test relays JTA and JTB are operated. In Fig. 14, circuits are completed from battery through make contact 12 of relay DC, over break contacts 10 of relays OT and TRR, break contact 3 of relay COT, and break contact 5 of relay TMOR to conductor JTA0 leading into the sequence control circuit of Fig. 41, and from battery over make contact 12 of relay DC, break contact 6 of relay OT, break contact 8 of relay TRR, break contact 5 of relay COT, and break contact 12 of relay TMOR to conductor JTBO, also leading into the sequence control circuit of Fig. 41. In Fig. 41, battery on conductor JTA0 extends through make contact 22 of relay RPA0, break contact 11 of relay NCA, break contact 9 of relay JREA, break contact 5 of relay BTTB, break contact 3 of relay ICTB, through the winding of relay JTA, break contacts 3 of relays BTTA and ICTA, to ground through break contacts 1 and 6 of respective relays NCB and JREB. Relay JTA operates in the previously described circuit. An obvious circuit is apparent in Fig. 41 whereby relay JTB is operated from the battery on conductor JTB0. Upon the operation of relay RPA0 of Fig. 12, circuits are also completed in Fig. 17 for operating relays RUCA and RUCB. The circuit for operating relay RUCA extends from ground, over make contact 11 of relay RPA0, break contact 7 of relay SEA, through the winding of relay RUCA, break contact 9 of relay SEB, to battery through make contact 14 of relay RPA0. A similar circuit is apparent for causing the operation of relay RUCB. Also in Fig. 41, the operation of relays JTA and JTB cause the operation of the auxiliary relays JTAA and JTBA in an obvious fashion. The operation of relays JTA, JTB and RUCB cause the operation in Figs. 15 and 16 of the units selection relays U0, U1, U2, U5, U6 and U7 preparatory to the marker's testing for an idle junctor circuit. In Fig. 15, the circuit for operating units selection relay U0 extends from ground, over make contac 3 of relay JTA and make contact 1 of relay RUCB, to battery through the winding of relay U0. It will be apparent from an inspection of the circuits in Figs. 15 and 16 that similar circuits are arranged for causing the operation of units relays U1, U2, U5, U6 and U7. The operation of any one or more of these units relays causes the operation in Fig. 17 of the units end relays UEA and UEB, as explained hereinbefore. The circuit for operating relay UEA extends in Fig. 17 from ground, over make contact 9 of relay U0, U2 or U6 or make contact 2 of relay U1, U5 or U7, through the parallel make contacts 11 of relays TEA3 and TEB3, through the winding of relay UEA, to battery through make contact 24 of relay RPA0. A similar circuit is apparent for causing the operation of relay UEB.

The operation of the units selection relays of Figs. 15 and 16 causes a test to be made for the busy or idle condition of the six junctors, four of which are in indicated in Fig. 24 terminating in crossbar switch No. 1 of Fig. 23 and the other two of which are indicated on Fig. 43 as terminating in crossbar switch No. 8 of Fig. 42. These six junctors are numbered 0, 1, 2 and 5 in Fig. 24 and Nos. 3 and 4 in Fig. 43, the detailed circuitry of these junctors being shown only once with respect to junctor circuit 0 of Fig. 24. Upon the operation of relay JTA, and before JTAA operates (it being a slow operate relay), a circuit is completed for testing for the busy or idle condition of, for instance, junctor circuit 0 of Fig. 24, extending from ground in Fig. 30, through the lower winding of relay S0, make contact 12 of relay U0, to conductor 0, make contact 9 of relay JTA, over conductor THM0 into Fig. 29, thence over conductor THM0 into Fig. 24 to the lower hand side of the winding of the terminating hold magnet THM11 for junctor circuit 0. If junctor circuit 0 is busy, the lower hand side of the winding of hold magnet THM11 will be grounded and relay S0 of Fig. 30 will not operate in this circuit. However, if junctor circuit 0 is idle, as will be assumed in the present case, the previously-described circuit through the lower winding of relay S0 of Fig. 30 will find battery through the winding to hold magnet THM11 in Fig. 24 and relay S0 will operate in this circuit, hold magnet THM11 being unable to operate in series therewith. Similar circuits in Figs. 30 and 33 will be extended to the terminating hold magnets of the other five junctors 1, 2, 3, 4 and 5 in the same fashion, such that sleeve relays S1 and S2 of Fig. 30 and S5, S6 and S7 of Fig. 33 will operate if all of the other junctors are idle. It will be apparent that none of these additional sleeve relays S1, S2, S5, S6 and S7 will operate if their corresponding junctors are busy.

Figure 33:
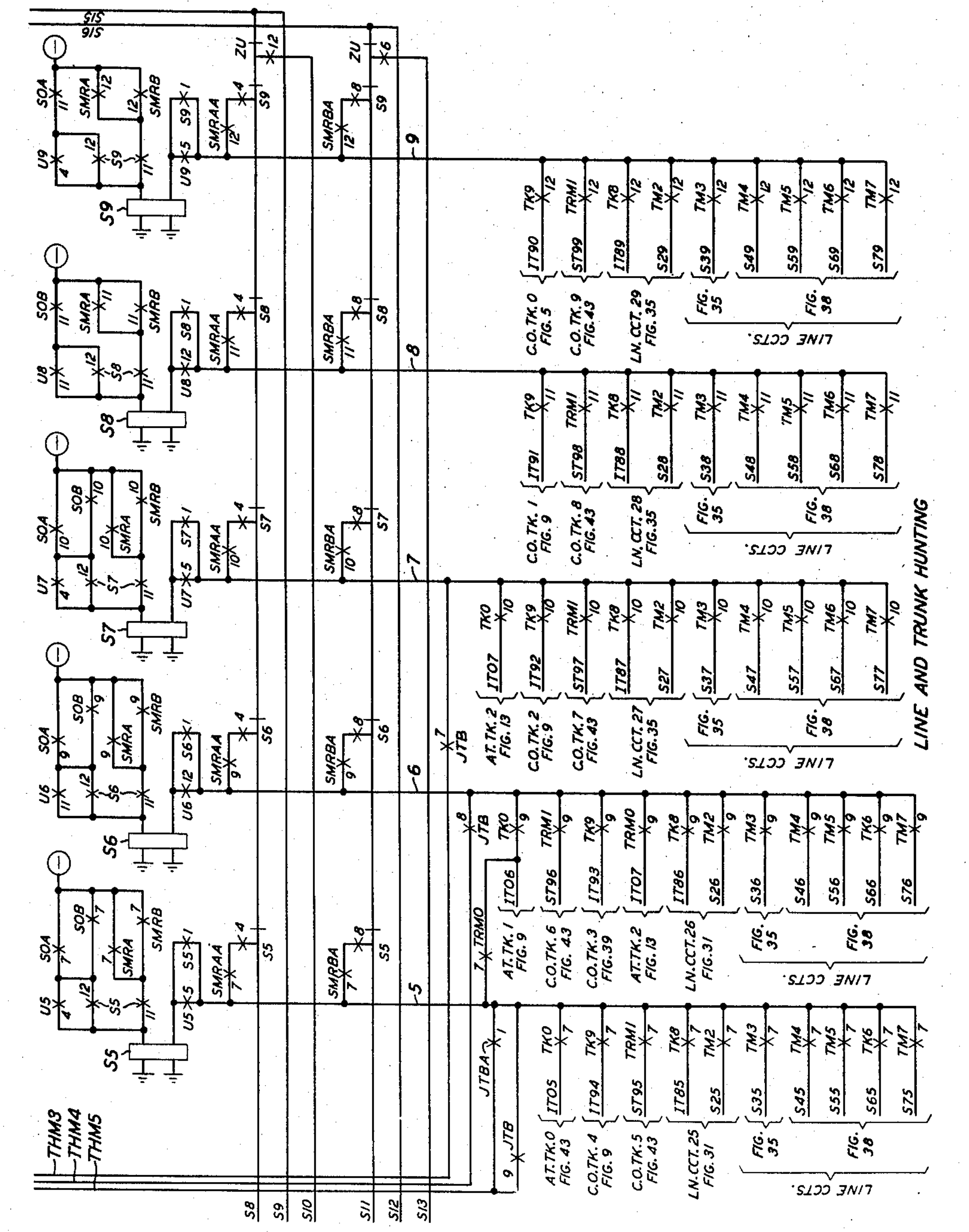

In the present example for purpose of illustration, it will be assumed that all of the six junctors are idle whereupon all of the sleeve relays S0, S1 and S2 of Fig. 30 and S5, S6 and S7 of Fig. 33 will operate to battery through the windings of their corresponding terminating hold magnets, such as magnet THM11 of Fig. 24 for junctor circuit 0. Upon the operation of one or more of the foregoing sleeve relays of Figs. 30 and 33 circuits are completed in Fig. 32 for operating the sleeve-end and sleeve-end-auxiliary relays SEA, SEB, etc. For instance, a circuit for operating relays SEA and SEAA extends from battery in Fig. 32, over make contact 3 of any one of the operated sleeve relays, break contact 10 of relay RLSBA, through the windings of relays SEA and SEAA, break contact 5 of relay RLSAA, to ground through the parallel make contacts 1 and 10 of relays UEA and UEB. Corresponding circuitry in Fig. 32 is provided whereby relays SEB and SEBA are operated in an obvious manner. The operation of relays SEA and SEB causes the release in Fig. 17 of relays RUCA and RUCB, which in turn cause the release in Figs. 15 and 16 of the operated units selection relays U0, U1, U2, U5, U6 and U7. The release of the units relays of Figs. 15 and 16 in turn causes the release in Fig. 17 of relays UEA and UEB, relays SEA and SEB, etc. locking over their make contacts 6.

Upon the release of relays UEA and UEB of Fig. 17, circuits are completed for operating in Fig. 40 one of the junctor register relays JR0 through JR5. With all of the sleeve test relays of Figs. 30 and 33 operated, indicating that all six junctors are idle, and with relay ZU of Fig. 32 released, junctor 0 of Fig. 24 will be preferred. A circuit is completed for operating junctor register relay JR0 of Fig. 40 extending from battery in Fig. 25, through two parallel circuits, one extending over make contacts 8 of relays SEB and SEA, break contact 9 of relay ZU and make contact 6 of relay S0 to conductor J0 extending into Fig. 40, and in parallel with this circuit from battery in Fig. 25, over make contacts 10 of relays SEB and SEA, break contact 11 of relay ZU and make contact 10 of relay S0 to the same conductor J0 extending into Fig. 40. In Fig. 40 battery on conductor J0 from Fig. 25 extends over make contact 12 of relay JTA, through the winding of relay JR0, to ground over the parallel make contacts 2 of relays JTA and JTB and parallel break contacts 7 of relays UEA and UEB. Relay JR0, in operating, completes a locking circuit for itself from ground, over its own make contact 1 through its winding, its own make contact 12, break contacts 9 of relays BTTA and BTTB, break contact 7 of relay ICTA, break contact 5 of relay ICTB, break contacts 10 of relays STA and STB, to battery through make contact 10 of relay RP0. In Fig. 40, upon the operation of relay JR0, obvious circuits are completed for operating relays JREA and JREB over make contacts 2, 3, 11 and 10 of relay JR0. The operation of relays JREA and JREB causes the release in Fig. 41 of relays JTA and JTB, which, upon releasing, cause the release of relays JTBA and JTAA also in Fig. 41. The release of relays JTA, JTB, JTAA, and JTBA causes the release in Figs. 30 and 33 of all of the sleeve relays which may have been operated. The release of the sleeve relays of Figs. 30 and 33 in turn causes the release in Fig. 32 of the sleeve-end and sleeve-end-auxiliary relays SEA, SEB, etc.

The operation of the junctor register relay JR0 of Fig. 40 causes the operation in Fig. 37 of select magnet connector relay SMC1 in an obvious circuit over make contact 9 of relay JR0. The operation of select magnet connector relay SMC1, as will be explained shortly, completes circuits whereby certain select magnets of switch 1 in Fig. 23 may be operated after the determination of an idle link over which the terminating circuit of the junctor 0, corresponding to hold magnet THM11 in Fig. 23, may be connected to the called line, assuming that it is idle when tested.

Upon the operation of relays JREA and JREB of Fig. 40 and the release of relays SEAA and SEBA of Fig. 32, circuits are completed in Fig. 41 for operating the register cut-through relays RCTA, RCTAA, RCTB, and RCTBA to initiate marker action whereby the called P.B.X line is tested and selected, if found to be idle. In Fig. 41 ground extends over break contact 4 of relay TRCB, break contact 5 of relay NAB, through the windings of relay RCTA and RCTAA, break contacts 7 and 5 of respective relays TRCA and NAA, break contacts 12 and 10 of respective relays SEAA and SEBA, to battery through make contact 4 of relay JREA. Relays RCTA and RCTAA operate in this circuit. Similarly obvious circuits are provided in Fig. 41 for causing the operation of relays RCTB and RCTBA. Also, the release of relays SEA and SEB of Fig. 32 completes circuits, previously described in Fig. 17, for reoperating relays RUCA and RUCB. In Fig. 12 a circuit is completed for operating relays RCA0, RCB0, RCC0, RCD0 and RCE0 in an obvious manner over make contacts 2 and 10 of relays RCTA and RCTB and make contact 12 of the register preference chain relay RP0.

Upon the operation of relay RCD0 of Fig. 12, a circuit is completed whereby the dial pulse register 0 circuit of Fig. 19 causes the operation of the tens connector relays of Fig. 12 in accordance with the registration in Fig. 19 of the tens digit 3 of the called P.B.X station. This circuit extends from ground in Fig. 19, over break contact 8 of relay TMOR and over make contact 2 of relay TD3 to conductor T3–0 extending into the tens connector circuit of Fig. 12, thence over make contact 2 of relay RCD0, through the windings of the tens connector relays TCS3, THC3, TU3 and TM3, to battery over make contact 11 of relay RCD0. In a similar fashion the operation of relay RCC0 causes a circuit to be completed from the dial pulse register of Fig. 19 to the units selection circuit in the marker of Fig. 16 whereby the units selection relay U4 of Fig. 16 is operated in accordance with the registration in Fig. 18 of the units digit 4 corresponding to the called P.B.X line. This circuit extends from ground in Fig. 19, over break contact 8 of relay TMOR, break contact 3 of relay OT, make contact 4 of relay P2A, break contact 8 of relay RA, break contact 10 of relay P5, make contact 12 of relay P4, break contact 10 of P2 and make contact 4 of relay STR, to conductor U4–0 extending into the units selection circuit of Fig. 16, thence over make contact 5 of relay RCC0, and make contact 5 of relay RUCB, to battery through the winding of relay U4. Upon the operation of relay THC3 of Fig. 12, a circuit is completed in Fig. 37 for operating select magnet connector relay SMC3 in an obvious manner over make contact 6 of relay THC3. The operation of relay SMC3 prepares circuits to be described hereinafter whereby the proper select magnets will be operated on switch No. 3 of Fig. 34 in order to effect connection with the called P.B.X line circuit 34 of Fig. 35, if the latter circuit is determined to be idle when tested.

The operation of the units selection relay U4 in Fig. 16 initiates the action whereby a test is made to determine the busy or idle condition of the called P.B.X line circuit 34 of Fig. 35, the operation of relay U4 having caused the operation in Fig. 17 of relays UEA and UEB over obvious circuits controlled by make contacts 9 and 8 of relay U4, make contacts 10 and 11 of relays TEA3 and TEB3, and make contacts 24 and 23 of register preference auxiliary relay RPA0. In Fig. 30 a circuit is completed extending from ground, through the lower winding of relay S4, make contact 12 of relay U4 to conductor 4, thence over make contact 5 of relay TM3, to sleeve conductor S34 extending into Fig. 35 to the sleeve lead S of line circuit 34. If line circuit 34 is busy, a low resistance (about 100 ohms) ground will exist on its sleeve conductor S and relay S4 of Fig. 30 will not operate. It will be assumed, however, that line circuit 34 is idle, whereupon relay S4 of Fig. 30 will find battery on the sleeve conductor S of line circuit 34 through the winding of line hold magnet LHM34. Relay S4 of Fig. 30 operates in this circuit but hold magnet LHM34 does not. Relay S4, in operating, closes its own make contact 1 in parallel with make contact 12 of relay U4 in order to maintain its operating circuit independently of the condition of the units selection relay U4 of Fig. 16. Relay S4, in operating, completes circuits in Fig. 32 for operating relays SEA, SEB, etc. as previously described, these relays locking under control of make contacts 6 of relays SEA and SEB. Upon the operation of relays SEA and SEB of Fig. 32, relays RUCA and RUCB of Fig. 17 release, thereby in turn causing the release of the units selection relay U4 of Fig. 16, which in turn causes the release in Fig. 17 of the units end relays UEA and UEB.

Upon the operation, previously described, of relays JREA and JREB of Fig. 40 and relays RCTA and RCTB of Fig. 41, circuits are completed in Fig. 47 for operating the relays LTAA, LTBA, LTA and LTB, the operation of which initiates the procedure whereby a test is made for an idle link through the crossbar switches as previously explained. In Fig. 47 a circuit extends from battery, over make contact 10 of relay JREA, make contact 8 of relay RCTA, and to ground through the winding of relay LTAA, and in parallel therewith, to ground through the winding of relay LTA through break contacts 10 and 4 of relays LEAA and LEBA. Relays LTA and LTAA operate in this circuit. A similar circuit in Fig. 47 is arranged in an obvious fashion to cause the operation of relays LTB and LTBA.

The operation of relays LTAA and LTBA cause the operation in Fig. 47 of relay WLGA and the release of relay WLG, as previously explained, leaving relay ZLG operated under the control of make contact 5 of relay WLGA. Also, in Fig. 37, the operation of relays LTAA and LTBA causes the release of relay WL, leaving relay ZL operated as perivously described; and, the release of relay WL causes the operation of relay Z1L, leaving relay W1L operated as previously described. It will also be apparent in Fig. 47 that since relay ZLG remains operated, both of the relays TRLA and TRLB will remain operated.

The testing for an idle crossbar switch link will take place substantially as perivously described under the control of the circuits of Figs. 46 and 47. However, with relays TRLA and TRLB of Fig. 47 operated, it will be noted in Fig. 46 that the circuits whereby the link test relays LT2 through LT9 test the busy or idle condition of the upper or lower halves of the eight switch links 2 through 9 have their circuits completed by make contacts of relay TRLA and TRLB, such that the testing this time for an idle link will be in all of the upper levels. For instance, with respect to link test relay LT2, the left-hand sides of its windings are extended over make contact 3 of relay TRLB or make contact 12 of relay TRLA to link sleeve test conductor S12, which represents the three upper tip, ring and sleeve conductors comprising the upper half of the six-wire horizontal link 2. The only link through the crossbar switch network which is presently busy is the link corresponding to sleeve test conductor S09 in Fig. 46, which is the lower half of the horizontal level 9. In view of the fact that we are now testing the upper halves of all of the switch levels, it will be assumed that they are all idle, whereupon all of the relays LT2 through LT9 will operate, thereby causing the operation of all of the corresponding relays LTS2 through LTS9 of Figs. 46 and 47. In Fig. 37, with relays ZL and W1L both operated, the preference arrangement for operating select magnets will result in preference D, in a circuit extending from ground, through the parallel make contacts 1 of relays LEAA and LEBA, make contacts 2 and 1 of respective relays ZL and W1L, over make contact 4 of relay LTS2 and over make contacts 2 of select magnet connector relays SMC1 and SMC3, to battery through select magnets SM12 and SM32 corresponding respectively to the similar numbered select magnets in Figs. 23 and 34, namely, select magnet SM12 on switch 1 of Fig. 23 and select magnet SM32 (not shown) on switch 3 in Fig. 34. Likewise in Fig. 37, circuits are completed for operating the select magnets SM11 and SM31 for switches 1 of Fig. 23 and 3 of Fig. 34. This circuit in Fig. 37 extends from ground, over the parallel make contacts 1 of the operated relay LTS2 through LTS9, parallel make contacts 2 of relays TRLA and TRLB, parallel make contacts 5 of relays LEA and LEB, and over make contacts 1 of select magnet connectors SMC1 and SMC3 to battery through the windings of select magnets SM11 for switch 1 in Fig. 23 and SM31 (not shown) for switch 3 in Fig. 34. The operation of select magnets SM11 and SM12 of switch 1 in Fig. 23 and of select magnets SM31 (not shown) and SM32 (not shown) for switch 3 in Fig. 34, the crossbar switch network is arranged such that upon the operation of the hold magnets corresponding to the junctor and line circuits, the called line circuit 34 of Fig. 35 will be connected to the terminating end of the junctor circuit 0 of Fig. 24.

Figure 2E:
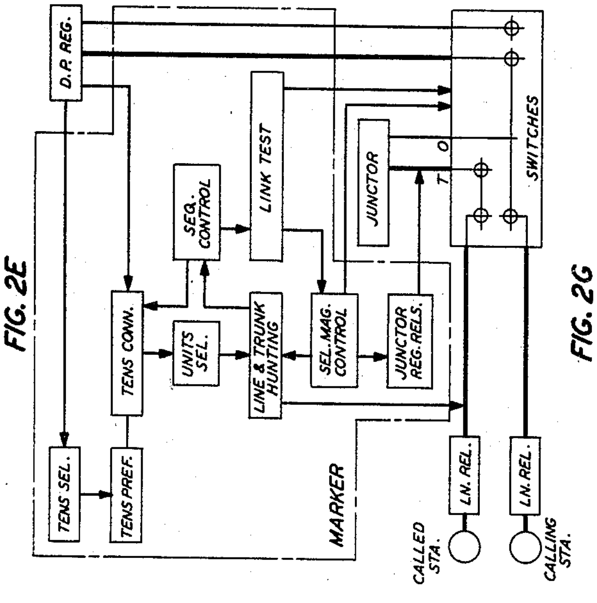

The select magnet control circuit then signals the line and trunk hunting circuit to operate the hold magnet associated with the called station line, assuming it is idle, and to operate the terminating hold magnet of the selected junctor. The terminating end of the junctor is then connected to the called line over the selected link. After checking to determine that the junctor is holding the called line, the line and trunk hunting circuit signals the sequence control circuit to advance from the terminating to the originating part of the call. The sequence circuit, in advancing, restores to normal the tens connector, the units selection, the line and trunk hunting, the link test, and the select magnet control circuits (Fig. 2E).

Upon the operation of one or more of the link test slave relays LTS2 through LTS9 of Figs. 46 and 47, circuit operation in the link test circuit of Figs. 46 and 47 is initiated whereby the link test circuit is returned to normal and hold magnet operation takes place. As previously explained, the operation in Fig. 47 of relays LEA, LEAA, LEB and LEBA indicates the end of link testing and initiates the release action. In Fig. 37, upon the operation of relays LEA and LEB, as previously described, relays SMTA and SMTB operate. Relays SMTA and SMTB, in operating, cause the operation in Fig. 7, as previously described, of the hold magnet test and select magnet release relays HMTA, HMTAA, HMTB, HMTBA, SMRA, SMRAA, SMRB and SMRBA. Upon the operation of relays SMTA and SMTB, circuits are completed in Figs. 29 and 30, as previously described, for applying ground to conductors S10 and S13 into Fig. 30 from Fig. 29. Ground on these two leads extends in Fig. 30 over respective make contacts 4 and 8 of relay S4 and make contacts 5 of relays SMRAA and SMRBA to conductor 4, thence over make contact 5 of relay TM3 to conductor S34 into Fig. 35, to battery through the winding of line hold magnet LHM34, which thereupon operates. Also, upon the operation of relays SMTA and SMTB, a circuit is completed between Fig. 29 and Fig. 24 for operating the terminating hold magnet THM11 for junctor circuit 0. This circuit extends in Fig. 29 from ground, over the parallel make contacts 7 of relays SMTA and SMTB, make contact 5 of junctor register relay JR0 to conductor THM0, leading into Fig. 24 to junctor circuit 0, thence to battery through the winding of junctor terminating hold magnet THM11, which thereupon operates.

Junctor circuit 0 terminating hold magnet THM11 is shown in Fig. 23 on switch 1 and line circuit hold magnet LHM34 is indicated, but not shown in Fig. 34 for switch 3. Upon the operation of these two hold magnets the tip, ring and sleeve conductors for line circuits 34 of Fig. 35 are connected to conductors T12, R12 and S12 in the upper half of level 2 of switch 3 in Fig. 34, thence into switch 2 of Fig. 27 and into switch 1 of Fig. 23, thence over the crosspoints and into the tip, ring and sleeve conductors TT, RT and ST leading into junctor circuit 0 of Fig. 24, thereby interconnecting the called line circuit 34 of Fig. 35 to the terminating end of junctor circuit 0 in Fig. 24. Upon the interconnection of line circuit 34 of Fig. 35 with the terminating end of junctor circuit 0 in Fig. 24, a circuit is completed for holding operated the line hold magnet LHM34 shown in Figs. 34 and 35. This circuit extends from ground in Fig. 29, over the parallel make contacts 7 of relays SMTA and SMTB, over make contact 7 of relay JR0, to the S0 lead into Fig. 23, to the ST lead leading into Fig. 24, and over the crossbar switch link on lead S12 into Fig. 34 thence over the crosspoint to the sleeve conductor S of line circuit 34 in Fig. 35 to battery through the winding of line hold magnet LHM34. As previously explained, upon the operation of relays HMTA and HMTB of Fig. 7, circuits are completed in Fig. 29 whereby relays HMKA and HMKB test for holding ground on the sleeve of line circuit 34 in Fig. 35. If ground is found on this sleeve conductor S in Fig. 35 for line circuit 34, it is assumed that the junctor circuit 0 of Fig. 24 is properly holding the line hold magnet operated from the line and trunk hunting circuit of Fig. 29 over the closed crossbar switch paths. Relays HMKA and HMKB of Fig. 29 operate to indicate a proper check for this hold magnet situation.

The operation of relays HMKA and HMKB, indicating a proper holding condition existing upon the hold magnets LHM34 of Fig. 35 and THM11 of junctor circuit 0 in Fig. 24, initiates action whereby the marker circuit advances to the condition where it can connect the originating end of junctor circuit 0 of Fig. 24 to the tip, ring and sleeve conductors of the calling line circuit 30 of Fig. 35, thereby to complete the call between these two line circuits under the supervision of junctor circuit 0. Upon the operation of relays HMKA and HMKB, circuits are completed in Fig. 41 for operating relays TRKA, TRKAA, TRKB and TRKBA of the sequence control circuit. A circuit is completed in Fig. 41 from ground, over make contact 2 of relay HMKA, make contact 1 of relay RCTA, make contact 1 of relay JREA, through the windings of relays TRKA and TRKAA, and through make contacts 12, 11 and 10 of respective relays JREA, RCTA and HMKA to battery. Relays TRKA and TRKAA operate in this circuit and lock over their own make contacts 12 under the control of make contacts of several other relays, as will be apparent in Fig. 41. Similar operating and locking circuits are provided in Fig. 41 for relays TRKB and TRKBA. The operation of relays TRKA and TRKBA cause the release in Fig. 7 of relays HMTAA, HMTA, HMTBA and HMTB. The operation of relays TRKAA and TRKBA also causes the release in Fig. 37 of relays SMTA and SMTB, which in turn cause the release of their associated relays SMRA, SMRB, etc. in Fig. 7. The release of relays SMRA, SMRB, etc. causes the release in Fig. 30 of the sleeve relay S4, the release of which in turn causes the release in Fig. 32 of the sleeve-end relays SEA, SEB, etc. The release of relays SEA and SEB causes the reoperation in Fig. 17 of relays RUCA and RUCB. The reoperation of relay RUCB completes a circuit in Fig. 16, as previously explained, for operating the units relay U4 from ground supplied from the dial pulse register over lead U4–0 in Fig. 16. The reoperation of the units relay U4 of Fig. 16 causes the reoperation, as previously explained in Fig. 17 of the units end relays UEA and UEB.

Meanwhile, upon the release of relays HMKA, HMKB, SMTA and SMTB and upon the operation of relays TRKA and TRKB, circuits are completed in Fig. 41 for the operation of relays TRCA, TRCAA, TRCB and TRCBA. The circuits for operating relays TRCA and TRCAA extends in Fig. 41 from ground, over make contact 4 of relay TRKA, break contacts 1 and 6 of relays HMKA and SMTA, through the windings of the relays, over break contacts 10 and 11 of relays SMTB and HMKB, to battery over make contact 10 of relay TRKA. Similar circuits are provided in Fig. 41 whereby relays TRCB and TRCBA are also operated. Relays TRCA and TRCB of Fig. 41, in operating, cause the release of relays RCTA, RCTB, etc. also of Fig. 41, which in turn cause the release of all of the relays RCA0 through RCE0 of Fig. 12. Relay RCC0, in releasing, causes the release in Fig. 16 of the units relay U4, which in turn causes the release in Fig. 17 of the relays UEA and UEB. The release of relay RCD0 causes the release in Fig. 12 of the tens connector relays TCS3, THC3, TU3 and TM3. Relay THC3, in releasing, causes the release in Fig. 37 of the select magnet connector relay SMC3, which thereupon causes the release in Fig. 34 of the select magnets SM31 and SM32 (neither of which is shown) previously used for establishing the connection between the called P.B.X line circuit 34 of Fig. 35 and the terminating end of the junctor 0 circuit of Fig. 24. The release of relays RCTA and RCTB causes the release in Fig. 47 of relays LTA, LTAA, LTB and LTBA, which in turn cause the release of relays LEA, LEAA, LEB and LEBA also of Fig. 47. The release of relays LEA and LEB of Fig. 47 causes the release of all operated link test slave relays LTS2 through LTS9 of Figs. 46 and 47, the release of the relays LTS2 through LTS9 causing the release of operated select magnets SM11 and SM12 of switch 1 in Fig. 23. The release of relays UEA and UEB of Fig. 17 and the release of relays RCTA and RCTB of Fig. 41 cause the release of the TRKA, TRKB, etc. relays also in Fig. 41. This completes the restoration to normal of the tens connector circuit (Fig. 12), the units selection circuit (Figs. 15, 16 and 17), the link and trunk hunting circuit (Figs. 29, 30, 32 and 33), the link test circuit (Figs. 46 and 47), and the select magnet control circuit (Fig. 37), and has advanced the sequence circuit (Fig. 41) for purposes of completing the originating end of the junctor connection.

It will be recalled at the time that the hold magnet THM08 of switch 0 in Fig. 3 was operated to interconnect the dial pulse register 0 of Fig. 18 with the line circuit 30 of Fig. 35, an additional hold magnet THM09 on switch 0 of Fig. 3 was also operated. The purpose of this extra hold magnet is to record for further use information relating to which link of the crossbar switch was used on the dial tone job so that the same link may be reused in interconnecting the calling line 30 of Fig. 35 with the originating end of the junctor circuit 0 of Fig. 24. It will be recalled that the dial tone connection used the lower half of the ninth horizontal link in response to the operation of select magnets SM00 and SM09 of switch 0 in Fig. 3 prior to the operation of the hold magnets THM08 and THM09.

Figure 2G:
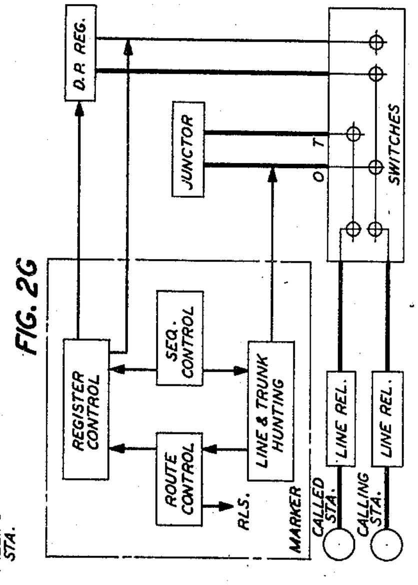

The sequence circuit then signals the register control circuit to operate the select magnets corresponding to the link to which the calling line and the dial pulse register are connected. The line and trunk hunting circuit is also signaled to operate the originating hold magnet of the selected junctor. The line and trunk hunting circuit then checks to determine that the junctor is holding the calling line, and signals the route control circuit to release the marker. The route control circuit signals the register control circuit to release the dial pulse register and restores the marker to normal (Fig. 2G).

It will be recalled that at the time hold magnet THM08 of switch 0 in Fig. 3 was operated to complete the dial tone connection, hold magnet THM09 was also operated. The purpose of hold magnet THM09, which may be designated a memory-hold-magnet, is to record information as to which link of the crossbar switch was used on the dial tone job so that the same link might be used to connect the calling party to the originating end of the junctor circuit 0 of Fig. 24. In this respect, it will be recalled that the lower half of horizontal 9 was used for the dial tone job by virtue of the fact that select magnets SM00 and SM09 of switch 0 in Fig. 3 were operated for that purpose.

It is now necessary to cause the operation of the corresponding select magnets SM10 and SM19 of switch 1 in Fig. 23 in order that the same lower half of horizontal 9 may be used to make connection to the tip, ring and sleeve leads T0, R0 and S0 comprising the originating section of junctor circuit 0 of Fig. 24. In Fig. 6, two circuits are completed for grounding conductors SM00 and SM01 extending from Fig. 6 into Fig. 3. One of the circuits in Fig. 6, in the upper left-hand corner thereof, extends from ground, over the parallel make contacts 5 of relays TRCAA and TRCBA, break contacts 3 of relays COB and COA and through make contact 5 of relay RP0 to conductor SM00 extending into Fig. 3. The other circuit extends from ground in Fig. 6, over the parallel make contacts 11 of relays TRCAA and TRCBA, break contacts 5 of relays COB and COA, and through make contact 6 of relay RP0 to conductor SM01 extending into Fig. 3. In Fig. 3 ground on conductor SM01 extends over the crosspoints controlled by select magnet SM00 and hold magnet THM09, thence up along the vertical, and over the crosspoints controlled by select magnet SM09 and hold magnet THM09, to conductor SM9 extending into Fig. 37. A similar circuit is provided whereby the ground on conductor SM00 in Fig. 3 is extended over the same group of crosspoints to conductor SM0, also extending into Fig. 37. In Fig. 37 ground on conductor SM0 extends over make contact 10 of relay SMC1 to battery through the winding of select magnet SM10, thereby operating that select magnet SM10 of switch 1 in Fig. 23. Ground on conductor SM9 from Fig. 3 into Fig. 37, extends over make contact 9 of relay SMC1 and to battery through the winding of select magnet SM19, thereby operating that select magnet SM19 of switch 1 in Fig. 23.

The circuits are now in condition whereby, upon the operation of the hold magnet THM10 of switch 1 in Fig. 23, the originating end of junctor circuit 0 of Fig. 24 may be connected to the tip, ring and sleeve conductors of line circuit 30 in Fig. 35—in parallel with the same tip, ring and sleeve conductors connected to dial pulse register 0 of Fig. 18. Upon the release, as above described, of relays TRKAA and TRKBA of the sequence control circuit of Fig. 41, circuits are completed in Fig. 37 for reoperating relays SMTA and SMTB. The circuit for operating relay SMTA extends from ground, over break contacts 5 of relays TRKAA and RLAB, break contact 4 of relay RLSA, through the winding of relay SMTA, break contacts 9 of relays RLSB, RLBB and STAR, break contact 4 of relay STBR, break contact 3 of relay TRKBA, break contact 5 of relay LTAA, break contact 10 of relay COA, to battery through make contact 4 of relay TRCAA and make contact 12 of relay SMC1. A similar circuit is provided in Fig. 37 for operating the corresponding relay SMTB. Upon the operation of relays SMTA and SMTB of Fig. 37, a circuit is completed for operating the hold magnet THM10 of junctor circuit 0 in Fig. 24.

This circuit extends in Fig. 29 from two parallel ground supplies: one ground supply extends over make contact 4 of relay SMTB, break contact 7 of relay HMTA, break contact 4 of relay HMTB, break contact 5 of relay TRKB, break contact 8 of relay SOA, break contact 4 of relay SOB, make contact 1 of relay TRCBA, and break contacts 9 of relays TRKB and TRKA to conductor J; and, the other ground supply extends in Fig. 29 over make contact 4 of relay SMTA, break contact 7 of relay HMTB, break contact 4 of relay HMTA, break contacts 5, 8 and 4 of respective relays TRKA, SOB and SOA, make contact 1 of relay TRCAA to conductor J over break contacts 3 and 7 of respective relays TRKB and TRKA. The ground on conductor J in Fig. 29 extends over make contact 4 of junctor register relay JR0 to conductor OHM0 leading into Fig. 24 and thence to battery through the winding of magnet THM10. Hold magnet THM10 thereupon operates and, as will be apparent from Fig. 23, the operation of this hold magnet THM10 connects conductors S0, R0 and T0 from the junctor circuit 0 of Fig. 24 over the right-hand three crosspoints corresponding to select magnet SM10 in Fig. 23, thence vertically to level 9 and over the three crosspoints corresponding to the lower half of level 9, thence over conductors S09, R09 and T09, across the switches to the sleeve, ring and tip conductors of line circuit 30 of Fig. 35 and also to the sleeve, ring and tip conductors of dial pulse register 0 circuit of Fig. 18.

When the hold magnet THM10 of Fig. 23 operates to connect the tip, ring and sleeve conductors T0, R0 and S0 of the junctor circuit 0 of Fig. 24 to the tip, ring and sleeve conductors of the calling line 30 of Fig. 35, a circuit is completed over the tip and ring loop into Fig. 24, on the tip conductor T0 over break contact 8 of relay D to ground through the upper winding of relay A, and on the ring conductor R0 over break contact 6 of relay D to battery through the lower winding of relay A. Relay A operates in this loop circuit and operates relay B of Fig. 24 in an obvious manner. Relay B, in operating, provides holding ground for the line hold magnets and the junctor hold magnets so that the crossbar switch connections will remain completed after the marker and register are released. In Fig. 24, make contact 4 of relay B completes a circuit from ground through half of the resistance A to the originating sleeve conductor S0, thence across the sleeve conductor S09 of the lower half of the ninth switch level into Fig. 34, thence to the sleeve conductor S of line circuit 30 in Fig. 35, and to battery through the winding of line hold magnet LHM30. In a similar fashion in Fig. 24, make contact 2 of relay B connects ground through the other half of the resistance A to the terminating sleeve conductor ST into Fig. 23, thence to the sleeve conductor S12 of the upper half of switch level 2, thence into Fig. 34 and, by means of crossbar switch structure not shown in Fig. 34, to the sleeve conductor S of line circuit 34 in Fig. 35 and to battery through the winding of line hold magnet LHM34. Also in Fig. 24 make contacts 8 and 10 of relay B complete holding grounds for the terminating and originating hold magnets THM11 and THM10 of junctor circuit 0. By means of these various holding circuits, relay B of junctor circuit 0 in Fig. 24 will hold all four hold magnets operated to maintain the connection across the crossbar switch network between line circuits 30 and 34 of Fig. 35 and the respective originating and terminating circuits of junctor 0 in Fig. 24.

In the meantime, in the route control circuit of the marker in Fig. 7, upon the operation of relays SMTA and SMTB of Fig. 37, circuits were completed whereby the slow operate relays HMTAA, HMTA, HMTBA and HMTB were operated after a suitable time delay in order to make a previously-described test to determine whether or not the junctor circuit 0 of Fig. 24 is properly holding the hold magnets operated. Ground on the hold magnet lead OHM0 of junctor circuit 0 in Fig. 24 extends into Fig. 29, over make contact 4 of relay JR0 to the J conductor, thence in parallel circuits previously described through break contacts of relays TRKA and TRKB, make contacts 1 of relays TRCBA and TRCAA and break contacts of relays SOB, SOA and TRKB and TRKA, and thence, with respect to the winding of relay HMKB in Fig. 29, over parallel make contacts of 11 and 4 of relays HMTA and HMTB to battery through the winding of the hold magnet check relay HMKB. A similar circuit prevails for causing the operation of the corresponding relay HMKA. As previously described, the operation of relays HMKA and HMKB represents a proper check by the marker circuit that the junctor circuit 0 of Fig. 24 is properly holding the originating hold magnet connection.

Upon the operation of relays HMKA and HMKB, the down check relays DCKA and DCKB in Fig. 50 are released. The release of relays DCKA and DCKB of Fig. 50 causes the operation, previously described, of the route control relays in Fig. 7 pertaining to the release of the marker circuit—namely relays RLA, RLB, etc. These release relays operate and lock in circuits previously described. The operation of relays RLAB and RLBB completes circuits extending from the register control of Fig. 6 into the dial pulse register 0 circuit of Fig. 18 for operating the release relays RRLA and RRLB of the register. These circuits extend from grounds in Fig. 6, over make contacts 4 of relays RLAB and RLBB and through respective make contacts 3 and 4 of relay RPA0 to respective conductors RRA0 and RRB0 extending into Fig. 18, thence over respective break contacts 3 and 5 of relay BYR and through respective make contacts 12 and 11 of relay ON to battery through respective windings of relays RRLA and RRLB. Relays RRLA and RRLB operate in these circuits and complete locking circuits for themselves in an obvious fashion over their respective make contacts 1 and 12 in Fig. 18.

The operation of the release relays RRLA and RRLB of dial pulse register 0 in Fig. 18 causes the release of all of the circuits in the dial pulse register and returns it to normal so that it may be used for another connection. In the present instance, upon the operation of these release relays, the following relays in the dial pulse register 0 of Figs. 14, 18 and 19 are released: relays TLD and TLA of Fig. 14; relays L, SR, P2A, P3 and P4 of Fig. 18; and relays TD3, STR, DC, and UD of Fig. 19. Eventually, upon the release of the slow release relay SR of Fig. 18, relay ON of Fig. 18 is also released, thereupon in turn causing the release of the relays RRLA and RRLB to return the dial pulse register 0 circuit of Figs. 14, 18 and 19 completely to normal. Upon the return to normal of the dial pulse register circuit of Figs. 14, 18 and 19, the two register hold magnets THM09 and THM08 of Figs. 3 and 6 are released, thereby removing dial pulse register 0 circuit from connection with the lower half of horizontal level 9 of the crossbar switch network. Also, upon the release of dial pulse register 0, its tens selection relay R0 of Fig. 11 is released, thereupon causing the release in Fig. 11 of relays TEA0, etc. and TEB0, etc. assuming, as will be the case in the instant example, that no other tens selection relays are operated. Also, in the register control circuit of Fig. 6, upon the release of the dial pulse register 0 circuits, previously described, are completed for reoperating the relays RA0B and RA0A provided, as will also be assumed, that dial pulse register 1 has handled another call in the meantime such that its relay RA1B and RA1A may be released to permit the marker to again assign a call to dial pulse register 0.

Returning now to the completion of the releasing function of the marker, the operation of the release relays RLA, RLB, etc. of Fig. 7 causes the release in Fig. 10 of relays TCK1 through TCK4 and relay RP0. The release of relay RP0 of Fig. 10 causes the release of relay RPA0 in Fig. 12, JR0 of Fig. 40, relays TRCA, TRCAA, TRCB and TRCBA of Fig. 41 and the select magnets SM10 and SM19 of Fig. 23. The release in Fig. 12 of relay RPA0 causes the release in Fig. 17 of relays RUCA and RUCB. The release in Fig. 40 of relay JR0 causes the release of relays JREA and JREB of Fig. 40 and the release in Fig. 37 of the operated select magnet connector relay SMC1.

Upon the operation of the relays RLAB and RLBB of Fig. 7 relays SMTA and SMTB of Fig. 37 are released, and these relays in turn cause the release in Fig. 7 of relays HMTAA, HMTBA, HMTA and HMTB. Upon the release of relays TRCAA, TRCBA, HMTA and HMTB, relays HMKB and HMKA of Fig. 29 are released.

Upon the release of relays HMKA and HMKB, previously described circuits in Fig. 50 are again effective for causing the reoperation of relays DCKA and DCKB which, upon operating, provide locking circuits for themselves over their own make contacts 12 for maintaining themselves operated independently of the condition of relays RLAA and RLBA. The operation of relays DCKA and DCKB, as previously mentioned, is an indication that the marker circuit has properly released. Upon the operation of relays DCKA and DCKB the route control release relays RLA, RLB, etc. of Fig. 7 are released. The marker is thereby restored to normal to serve another call.

When the calling and called lines are connected together through the junctor and two links, the junctor provides talking battery to both the calling and the called lines, and provides a holding path to the originating and terminating ends of the junctor as above described. The junctor signals the power supply circuit to start the ringing generator, if it has not been already started by another circuit, and provides a path for the ringing current between the called line and the power supply. The junctor also furnishes audible ringing tone to the calling line. When the called party answers the call, a supervisory circuit in the junctor opens the ringing path and reverses the originating tip and ring leads. This reversal is used on calls to P.B.X lines from tie trunks which require reversed battery-type supervision.

The calling line circuit 30 of Fig. 35 and the called line circuit 34 of Fig. 35 are connected over the crossbar switch network to the respective originating and terminating ends of junctor circuit 0 in Fig. 24. The tip, ring and sleeve conductors of line circuit 30 in Fig. 35 extend into Fig. 34 and thence over conductors T09, R09 and S09 into Fig. 23 thence down into Fig. 24 to the originating tip, ring and sleeve conductors T0, R0 and S0 of junctor circuit 0; and, the tip, ring and sleeve conductors of the called line circuit 34 of Fig. 35 extend into Fig. 34 and thence over conductors T12, R12 and S12 into Fig. 23 and thence to the terminating tip, ring and sleeve conductors TT, RT and ST of junctor circuit 0 in Fig. 24. As previously explained upon the completion of the calling line loop, relay A of the junctor circuit operated, to in turn operate relay B, and the operation of relay B applied holding grounds for the terminating and originating hold magnets THM11 and THM10 of the junctor and for the line hold magnets corresponding thereto, namely, hold magnets LHM34 and LHM30 of Fig. 35. Upon the operation of relay A of junctor circuit 0, ringing tone is applied from the box in Fig. 24, over make contact 10 of relay A, through the left-hand winding of the tripping relay TP, break contact 9 of relay TP, thence over the terminating ring lead RT, to the ring lead R of the called line circuit 34 of Fig. 35, over the P.B.X station alternating current loop, back over the tip lead T of the called line circuit 34, over the crossbar switch network to the terminating tip lead TT of the junctor, thence to ringing ground over break contact 7 of relay TP. Over this circuit ringing current is supplied to the called P.B.X station and it will be noted in Fig. 24 that a portion of this ringing current is returned through condenser A and condenser R to the originating ring conductor R0 of the junctor, thence over the crossbar switch network to the ring conductor R of the calling P.B.X station line 30 of Fig. 35 to provide the calling P.B.X station with audible ring-back to inform that party that the called P.B.X station is being rung.

When the called station 34 of Fig. 35 answers the ringing tone and lifts the receiver at the station instrument, the direct current tip and ring loop at the called station line circuit 34 is closed, thereby causing relay TP of the junctor circuit 0 in Fig. 24 to operate over its left-hand winding and to lock in a circuit from ground, over its own make contact 12 and make contact 6 of relay B to battery through its right-hand winding. Relay TP, in operating, removes the ringing ground and ringing current from the tip and ring conductors TT and RT and completes a circuit for causing the operation of relay D over the tip and ring loop of the called station. In Fig. 24 this circuit extends from the tip conductor TT, over make contact 7 of relay TP, to ground through the upper winding of relay D and from the ring conductor RT, over make contact 9 of relay TP, to battery through the lower winding of relay D. Relay D operates in this circuit and, in operating, applies ground over its make contact 10 to supplement the holding ground on relay TP from make contact 6 of relay B and applies ground over its make contact 2 to supplement the terminating hold magnet ground supplied by make contact 8 of relay B, and through its make contact 4 supplements the terminating sleeve ground controlled by make contact 2 of relay B. Relay D, in operating, reverses the battery and ground to the calling station line circuit by virtue of the transfer contacts 6 and 8 of relay D in the circuits of the upper and lower windings of relay A. This battery and ground reversal is used on calls to P.B.X lines from tie trunks which require the reversed battery type of supervision.

The junctor circuit 0 of Fig. 24 is now supplying talking battery through relay A to the calling line and through relay D to the called line. Ground extends through the upper winding of relay A over make contact 8 of relay D to the originating ring conductor R0, which is connected to the ring conductor R of the calling line circuit 30 of Fig. 35; and, battery is supplied through the lower winding of relay A and over make contact 6 of relay D to the originating tip conductor T0, which is connected to the tip conductor T of the calling line circuit 30. Similarly, ground and battery are supplied through the respective upper and lower windings of relay D, thence over make contacts 7 and 9 of relay TP to the terminating tip and ring conductors TT and RT, which are connected to the tip and ring conductors of the called line circuit 34 of Fig. 35. The calling and called P.B.X stations 30 and 34 of Fig. 35 may now converse with each other under the supervision of junctor circuit 0, the voice current path being completed in junctor circuit 0 in Fig. 24 through the direct-current blocking capacitors T and R.

*Release of connection*

The release of the junctor is under control of the called station loop. If the calling station disconnects first, the supervisory equipment of the junctor will release the originating end of the junctor, but the terminating end will be held until the called party hangs up. If the marker tests the terminating end of the junctor for a busy indication, the junctor will test busy until released by the called party. If the called party disconnects first, the junctor supervisory circuit will not function until the calling party disconnects, after which the originating and terminating hold magnets release and restore the junctor and links to normal.

If the called party did not answer, the connection is released upon the calling party disconnecting.

If the calling P.B.X party (line circuit 30 of Fig. 35) disconnects first, relay A of junctor circuit 0 of Fig. 24 releases, thereby releasing relay B. Relay A, in releasing, disconnects the ringing supply from the left-hand winding of the tripping relay TP. Relay B, in releasing, removes holding ground from the originating sleeve connection, thereby releasing hold magnet LHM30 of Fig. 35, and removes holding ground from the originating hold magnet THM10 of junctor circuit 0, thereby releasing it. This causes the release of the entire originating section of the call. However, since the called party loop is still closed, relays D and TP of the junctor circuit remain operated, thereby to maintain the terminating end of the junctor closed such that line hold magnet LHM34 of Fig. 35 and the terminating hold magnet THM11 of Fig. 24 remain operated. Then, when the called party releases, this causes the release of relay D, which in turn causes the release of relay TP. The release of relays D and TP cause the release of the junctor terminating hold magnet THM11 of Fig. 24 and the called P.B.X party line circuit hold magnet LHM34 of Fig. 35 resulting in a complete release of the entire connection.

If the called P.B.X party (line circuit 34 of Fig. 35) should release first, this will cause the release of only relay D of the junctor circuit 0 of Fig. 24. The release of only relay D does not affect any of the hold magnet holding circuits controlled by the junctor. Therefore, until such time as the calling party (line circuit 30) disconnects, both the originating and terminating sections of the junctor are still connected and all of the four hold magnets are still operated. Then, when the calling party (line circuit 30) disconnects, relay A releases, followed by the release of relay B, followed by the release of relay TP, which causes the release of all of the four hold magnets involved and results in a complete disconnection.

In the event that the called party (line circuit 34 of Fig. 35) did not answer when ringing current was supplied thereto by junctor circuit 0 of Fig. 24, the junctor would be in the condition whereby only relays A and B would be operated. Therefore, upon the disconnection of the calling party, relay A would release, followed by the release of relay B; and this, in turn, would cause the release of all of the hold magnets resulting in a complete disconnection.

*Called station busy conditions*

P.B.X lines may or may not be able to hunt to another line or lines. If a called line is busy and is not arranged for hunting, or there is no idle line to which the called busy line is arranged to hunt, the calling circuit is provided with busy tone from a busy tone trunk if the latter is idle or from the dial pulse register if the busy tone trunk is engaged. If the called busy line is arranged for hunting and an idle such line is available, the calling party will be connected to that idle alternate line.

When busy tone must be supplied, the marker tests the busy tone trunk to determine whether or not it is available. If the busy tone trunk is engaged, the marker instructs the dial pulse register to supply busy tone to the calling party and is released. When the calling party disengages in response to busy tone, the dial pulse register releases and the circuits are returned to normal.

Hereinbefore description was provided with respect to the circuit details whereby a calling P.B.X line circuit 30 of Fig. 35 was interconnected with a called P.B.X line circuit 34 of Fig. 35, it having been assumed that when the line circuit 34 was tested it was found to be idle. It will be recalled, under these circumstances, that when the units selection relay U4 of Fig. 16 was operated from the units register of Fig. 18 in the dial pulse register 0, a circuit was completed in Fig. 30 for testing the sleeve conductor S of line circuit 34 in Fig. 35. This circuit extended from ground in Fig. 30 through the lower winding of relay S4, over make contact 12 of relay U4, to conductor 4, over make contact 5 of relay TM3 (operated because the tens digit of the called P.B.X line circuit 34 was a 3-registered in the tens register of Fig. 19) to conductor S34 leading into Fig. 35, and to the right-hand side of the winding of line hold magnet LHM34. In the previous example it was assumed that line circuit 34 was idle, whereupon the sleeve conductor S of line circuit 34 did not have ground upon it and relay S4 of Fig. 30 could operate to battery through the winding of line hold magnet LHM34.

In the present instance the circuit description will be set forth with regard to the action of the P.B.X if when line circuit 34 of Fig. 35 is tested it is found to be busy. In this event, when the previously-described circuit is completed for relay S4 of Fig. 30 to the sleeve lead S of line circuit 34 in Fig. 35, relay S4 cannot operate because, as assumed, line circuit 34 is busy, indicated by a ground on its sleeve lead S. The operation of the units selection relay U4 of Fig. 16, as hereinbefore explained, causes the operation of units end relays UEA, and UEB of Fig. 17. In the meantime, after a measured interval of time determined by the slow operate characteristic of relays SMTA and SMTB of Fig. 37, circuits are completed between Figs. 29, 30, 32 and 33 for ascertaining whether or not the sleeve relay S4 operated when the line circuit 34 of Fig. 35 was tested. In Fig. 29, one of these circuits extends from ground, over make contact 4 of relay SMTB, break contact 7 of relay HMTA, break contact 4 of relay HMTB, break contacts 5, 8 and 4 of respective relays TRKB, SOA and SOB, make contact 2 of relay UEB, break contact 2 of relay ZU (assumed to be released), over conductor S13 into Fig. 30, over break contacts 8 of relays S0, S1, S2, S3 and S4 (all being assumed to be released), break contact 4 of relay ZU, conductor S11 into Fig. 33, thence over break contacts 8 of the remaining sleeve relays S5 through S9, break contact 6 of relay ZU, conductor S16 into Fig. 32, over break contact 6 of relay BYB, through the winding of relay BYB, to battery over break contacts 7 and 4 of relays RLAA annd RLBA. Another circuit begins in Fig. 29 at ground and extends over make contact 4 of relay SMTA, and over a path similar to the one previously described, over conductor S10 into Fig. 30, thence over break contacts 4 of sleeve relays S0 through S4, break contact 10 of relay ZU, conductor S8 into Fig. 33, and over break contacts 4 of the remaining sleeve relays S5 through S9, break contact 12 of relay ZU, conductor S15 into Fig. 32, over break contact 6 of relay BYA through the winding of relay BYA to battery over break contacts 7 and 4 of relays RLBA and RLAA.

Relays BYA and BYB of Fig. 32 operate in these above-described circuits as an indication to the line and trunk hunting circuit of the marker that the called P.B.X line 34 of Fig. 35 was busy when tested for ground on its sleeve conductor. Relay BYA, in operating, extends a locking circuit for itself from the right-hand side of its winding over its own make contact 6 to ground through parallel make contacts 3 and 4 of relays UEA, UEB, RCTA and RCTB. Relay BYB completes a locking circuit for itself in a similar fashion, as will be apparent from the circuits in the lower right-hand corner of Fig. 32. Upon the operation of relays BYA and BYB, circuits are completed in Fig. 29 for operating the hunt connector relays HCA and HCB. The circuit for relay HCA extends from battery in Fig. 29, over make contact 8 of relay BYA, break contacts 11 and 9 of relays NT annd BSYA, parallel make contacts 9 and 12 of relays JTAA and RCB0 (operated as a result of the dial pulse register circuit 0 requesting the service of the marker for a junctor connection), through the winding of relay HCA, parallel make contacts 3 and 1 of relays JTAA and RCB0, make contact 2 of relay BYA, to ground through break contacts 5, 3 and 5 of respective relays NT, BSYA and BSYB. A similar circuit is provided whereby relay HCB in Fig. 29 is also operated. Relays HCA and HCB, in operating, complete circuits in Fig. 32 for energizing the windings of relays BSYAA and BSYBA, the circuit for the latter relay extending in Fig. 32 from battery, over make contact 10 of relay BYB, through the winding of relay BSYBA and to ground on conductor S16 through make contact 6 of relay HCB. Relay BSYBA is a slow-operate relay and its actual operation will not take place for a short interval of time. The similar situation prevails with respect to relay BSYAA.

In the meantime, upon the operation of the hunt connector relays HCA and HCB of Fig. 29, a circuit is completed from Fig. 16 into Fig. 20 for determining whether or not there are any P.B.X lines in the same hunting group with the busy called line circuit 34 of Fig. 35. In Fig. 16 ground on conductor U4G is extended over the parallel make contacts 5 of relays HCA and HCB, thence over make contact 5 of relay THC3, to conductor H34 extending into Fig. 20 to the line punching corresponding to conductor H34. In Fig. 20 a number of cross connections have been shown leading from the line punching H34 to such other punchings as H31, H36, H38 and H39 to illustrate various ramifications of the one- or two-way hunting feature of the present P.B.X. As an example, the line punching corresponding to conductor H34 in Fig. 20 is directly connected to the line punching corresponding conductor H39. The ground on conductor H34 will therefore be extended to conductor H39 and back into Fig. 17, over make contact 12 of relay THC3, the parallel make contacts 12 of the hunt connector relays HCA and HCB, over make contact 12 of relay RUCB, to battery through the winding of relay U9. This will cause units selection relay U9 to be operated as an indication that the busy called line circuit 34 of Fig. 35 is arranged, if busy, to cause the P.B.X circuits to automatically hunt to line circuit 39 as an alternate. Likewise, again referring to Fig. 20, the ground on conductor H34 extends directly to conductor H38, thence back into Fig. 17 and over make contact 11 of relay THC3, parallel make contacts 11 of relays HCA and HCB, and over make contact 11 of relay RUCB to battery through the winding of units selection relay U8, which thereupon would operate as an indication that line 34 may hunt to line 38 as well as to line 39. By the same token, with reference to Fig. 20, it will be apparent that line circuit 34 may also hunt directly to line circuit 36.

There are two other cross connecting arrangements shown in Fig. 20 involving two unidirectional current carrying elements or rectifiers. One of these interconnections is in series with the cross connection between conductor H36 and H37. The other one is connected between the punchings corresponding to conductors H34 and H31. It will be noted that these two rectifiers are poled in opposite directions with respect to the punching corresponding to conductor H34. These rectifiers are arranged such that when terminal 2 thereof is more positive than terminal 1 the rectifier represents a very low impedance to the passage of current therethrough; whereas, when terminal 2 is more negative than terminal 1 the rectifier represents a very high impedance and will not permit sufficient current to pass therethrough to operate one of the units selection relays of Figs. 15, 16 and 17.

In the particular example presently being considered, it will be apparent that the ground on conductor H34, although it is extended through a rectifier to the punching corresponding to conductor H31 leading into Fig. 15 and to the winding of the units relay U1, nevertheless relay U1 cannot operate in this circuit because the rectifier is poled to represent a very high impedance in this particular path. On the other hand, the rectifier connected between the punchings corresponding to conductors H36 and H37 in Fig. 20 is poled in the direction to represent a low impedance to the ground on conductor H34 extending over to the punching corresponding to conductor H36 and thence through the rectifier to the punching corresponding to conductor H37. This ground on conductor H37, through the relatively low impedance of the rectifier between punchings corresponding to conductors H36 and H37, will therefore be permitted to extend itself into Fig. 16 and to the winding of relay U7 to operate same.

Again referring to Fig. 20, there is one more example of a possible hunting condition, namely with respect to the terminals corresponding to conductors H32 and H33. Neither of these punchings is cross-connected to any of the others; therefore, it is obvious that any call to lines 32 and 33, if they are busy, cannot be extended to any other line because there is no cross-connection between the hunting terminals for operating units selection relays corresponding to other lines.

By virtue of these various types of cross-connections, therefore, it will be apparent that a line may be arranged for no hunting at all, one-way hunting by virtue of suitably poled rectifiers, or two-way hunting by means of solid wire conductors. As an additional comment it will be noted that while line circuit 34 cannot hunt to line circuit 31 because of the oppositely poled rectifier between the punchings corresponding to conductors H34 and H31 in Fig. 20, nevertheless line circuit 31 can hunt to line circuit 34, because in that particular direction, the rectifier between the two punchings corresponding to conductors H31 and H34 is poled in the low impedance direction.

In the present example it is assumed that the called line 34 is busy and this is going to necessitate the connection of the calling line circuit 30 of Fig. 35 to a busy-tone signal. With respect to line circuit 34, in view of the fact that it is permitted (see Fig. 20) to hunt to line circuits 36, 37, 38 and 39, the situation must be assumed that all of these others, lines 36, 37, 38 and 39 are also going to be busy in order to necessitate supplying busy tone to the called line 30. The description of the busy-tone connection will first be described under the assumption that line circuit 34 is not permitted to hunt to any other line. It will be appreciated, of course, that the circuits are arranged so that it can, but the present example will be described as though this could not take place in order to illustrate what would happen to a line such as line 33, whose punching in Fig. 20 is not connected so as to enable it to hunt anywhere. Following this description, it will be assumed that line circuit 34 can hunt, as it is presently set up to do, to lines 36, 37, 38 and 39 and that all of these additional lines are also found to be busy.

Under the conditions of the initial assumption, that the punching corresponding to conductor H34 in Fig. 20 is not connected to any other punching in the tens group 3, none of the units relays of Figs. 15, 16 and 17 will operate except of course the units relay U4 of Fig. 16, which was operated previously to cause a test of the busy line circuit 34 of Fig. 35. Since none of the other units selection relays of Figs. 15, 16 and 17 are operated by means of the operation of the hunt connector relays HCA and HCB of Fig. 29, none of the sleeve relays of Figs. 30 and 33 will be operated because all of the make contacts of the corresponding units relays connected to the lower windings of these sleeve relays are open.

On the other hand, in view of the fact that the punching in Fig. 20 corresponding to conductor H34 is in fact connected in a manner to permit hunting from line circuit 34 to line circuits 36, 37, 38 and 39, all of the units relays corresponding to the units digits of those other four conductors will be operated as previously described. This means that in Figs. 16 and 17 the units relays U6, U7, U8 and U9 will have been operated by virtue of the operation of the hunt connectors HCA and HCB of Fig. 29. Referring to Fig. 33, upon the operation of the units selection relay U9 of Fig. 17, a circuit is completed from ground, through the lower winding of the sleeve relay S9, make contact 5 of relay U9, conductor 9, make contact 12 of the relay TM3, to conductor S39 leading into Fig. 35 to the right-hand side of the hold magnet LHM39 corresponding to line circuit 39. It will be assumed for purposes of discussion that line circuit 39 is presently busy, whereupon conductor S39 will find a ground on the sleeve conductor S of line circuit 39. The ground on this sleeve conductor prevents the sleeve relay S9 of Fig. 33 from operating, thereby indicating that line circuit 39 is busy. Similar circuits are provided between Figs. 33 and 35 whereby sleeve relays S6, S7 and S8 test the corresponding sleeve conductors of lines 36, 37 and 38 of Fig. 35. It will be assumed that these three lines circuits also are busy, in which case none of the sleeve relays S6 through S9 of Fig. 33 will be operated as a result of the hunt connector operation.

Regardless of which of the above two situations prevails it will be apparent that under either circumstance none of the sleeve relays S0 through S9 of Figs. 30 and 33 is operated and this indication is one to the effect that not only is the desired called P.B.X station 34 busy, but also it is not in a hunting group with other lines or the other lines in that same hunting group to which line circuit 34 may be permitted to hunt are also busy.

After a short interval in the meantime, the slow operate characteristic of relays BSYAA and BSYBA of Fig. 32 have permitted these relays to operate in the previously-described circuits. These relays, in operating, energize the circuits for the corresponding relays BSYA and BSYB in an obvious fashion over make contacts 1, 2, 11 and 12 of relays BSYAA and BSYBA. It will be noted that relays BSYA and BSYB are also slow operate relays and will take a certain interval of time to operate as was the case with their predecessors. The interval of time measured by the slow operate characteristic of these four relays is necessary to permit the previously-described operation of the units selection relays and sleeve relays for testing for idle lines in hunting groups, etc. Eventually relays BSYA and BSYB operate and complete locking circuits for themselves and for their corresponding relays BSYAA and BSYBA. The locking circuit for relays BSYA and BSYAA extends in Fig. 32 from ground, through make contact 12 of relay BSYA and make contact 4 of relay BYA to the original operating circuit for the other two corresponding relays. A similar locking circuit is provided for the relays BSYB and BSYBA. The operation of relays BSYA and BSYB causes the release in Fig. 29 of the hunt connectors HCA and HCB, which cause the release in Figs. 16 and 17 of the operated units relays U6, U7, U8 and U9 representing the four busy line circuits 36, 37, 38 and 39 to which line circuit 34 was permitted to hunt. Relays BSYA and BSYB of Fig. 32, in operating, cause the operation in the route control circuit of Fig. 7 of relays SOA and SOB, the circuit for relay SOA extending in Fig. 7 from ground, over break contact 4 of relay BTTA, break contact 1 of relay COA, parallel make contacts 1 and 2 of relay BSYB and BSYA, through the winding of relay SOA, over the parallel make contacts 10 and 11 of relays BSYB and BSYA, to battery through break contacts 11 and 8 of relays COB and BTTA. Relay SOA operates in this circuit and relay SOB operates in a similar circuit in Fig. 7. Upon the operation of relays SOA and SOB, a circuit is completed in Fig. 30 for operating the sleeve relay S4 corresponding to the called busy P.B.X line circuit 34 of Fig. 35. This circuit extends from ground through the upper, or secondary winding of relay S4, over make contact 11 of relay U4, to battery over the parallel make contacts 5 of relays SOA and SOB, thereby causing relay S4 to operate and to close a locking circuit for itself in an obvious manner over its own make contact 12. As has been explained in detail hereinbefore the operation of any one of the sleeve relays, such as relay S4 of Fig. 30, causes the operation in Fig. 32 of the sleeve end relays SEA, SEB, etc. which, in operating, cause the release in Fig. 17 of relays RUCA and RUCB, causing the release in Fig. 16 of the units relay U4. The release of relay U4 in Fig. 16 causes the release in Fig. 17 of the units end relays UEA and UEB. In the meantime, also as has been explained in detail hereinbefore, the operation of relays SMTA and SMTB of Fig. 37 has caused the operation in Fig. 7 of relays SMRA, SMRB, etc.

Circuits are at this point completed whereby relays HMKA and HMKB of Fig. 29 are connected to the sleeve conductor of line circuit 34 of Fig. 35 to ascertain whether or not that sleeve conductor is grounded or is open. In the event that the sleeve conductor is actually open an intercept condition will be set up whereby the calling P.B.X line 30 of Fig. 35 will be routed to the attendant on an intercept basis. This subject matter will be discussed subsequently. It will be assumed in the present instance as previously mentioned that the sleeve conductor S of line circuit 34 of Fig. 35 will be found to have a ground on it indicating that it is actually busy and is not a faulty circuit. In Fig. 29 battery extends through the winding of relay HMKA and then over make contact 8 or 4 of relay SOB or SOA, thence over make contact 2 of relay SEA, through break contact 8 of relay ZU (assumed to be released for convenience of description), thence over conductor S10 in Fig. 30, over break contacts 4 of relays S0, S1, S2 and S3, make contact 4 of relay S4, make contact 5 of relay SMRAA, to conductor 4, thence over make contact 5 of relay TM3 to conductor 34 leading into the sleeve conductor S of line circuit 34 in Fig. 35. Since it is assumed that the sleeve conductor of line circuit 34 is grounded, relay HMKA in Fig. 29 will operate in the previously-described circuit. A similar circuit is completed whereby relay HMKB is also operated by ground supplied to conductor S13 of Figs. 29 and 30 from conductor 4 over make contacts 5 and 8 of relays SMRBA and S4.

Upon the operation of relays HMKA and HMKB of Fig. 29 circuits are completed in Fig. 8 for operating the busy tone relays BTTA and BTTB. The circuit for relay BTTA extends in Fig. 8 from ground, over make contact 1 of relay SOA, make contact 8 of relay SMRAA, make contact 4 of relay HMKA, break contacts 4 and 7 of relays COTA and COTB, through the winding of relay BTTA, break contact 10 of relay COTA, to battery through make contacts 8, 10 and 12 of relays HMKA, SEAA and SOA. Relay BTTA operates in this circuit and provides a locking circuit for itself extending in Fig. 8 from ground, over make contact 7 of relay RPA0, make contact 2 of relay BTTA, through the winding of relay BTTA, to battery over make contacts 11 and 16 of respective relays BTTA and RPA0. Similar operating and locking circuits are provided in Fig. 8 for relay BTTB.

The operation of relays BTTA and BTTB of Fig. 8 causes the release (if operated) of relay JR0 in Fig. 40, and initiates a circuit sequence which releases any of the following relays which may have been operated: JREA and JREB of Fig. 40; LTA, LTAA, LTB, LTBA, LTCA, LTCB, LEA, LEAA, LEB and LEBA of Fig. 47; and, relays LTS2 through LTS9 of Figs. 46 and 47. Relays LEAA and LEBA, in releasing, cause the release of any select magnets which may have been operated. The operation of relays BTTA and BTTB cause the operation in Fig. 41 of relays TRKA, TRKAA, TRKB and TRKBA. One circuit in Fig. 41 extends from ground, over make contact 1 of relay BTTA, break contacts 4, 5 and 3 of relays NCA, TRCA and TRCBA, through the parallel windings of relays TRKA and TRKAA, over break contacts 12, 8 and 10 of respective relays TRCBA, TRCA, and NCB, and to battery over make contact 12 of relay BTTA. A similar circuit is provided in an obvious fashion in Fig. 41 for causing the operation of relays TRKB and TRKBA. The operation of relays TRKAA and TRKBA cause the release in Fig. 37 of relays SMTA and SMTB, which in turn cause the release in Fig. 7 of their corresponding relays SMRA, SMRB, etc. The release of relays SMRAA and SMRBA cause the release in Fig. 29 of the corresponding relays HMKA and HMKB. In the meantime, the operation of relays BTTA and BTTB of Fig. 8 cause the release in Fig. 7 of relays SOA and SOB, which cause the release of the sleeve relay S4 of Fig. 30, which in turn causes the release in Fig. 32 of relays SEA, SEB, etc. Relays SEA and SEB, in releasing, cause the reoperation in Fig. 17 of relays RUCA and RUCB in a manner previously described.

The release of relays HMKA and HMKB cause the reoperation in Fig. 41 of relays TRCA, TRCB, etc., the circuit for relays TRCA and TRCAA extending from ground in Fig. 41, over make contact 4 of relay TRKA, break contacts 1 and 6 of respective relays HMKA and SMTA, through the parallel windings of relays TRCA and TRCAA, over break contacts 10 and 11 of respective relays SMTB and HMKB, to battery over make contact 10 of relay TRKA. Relays TRCB and TRCBA are operated in a similar circuit in an obvious fashion. Upon the operation of relays TRCA, TRCB, etc., relays TRKA, TRKB, etc., also of Fig. 41, are released and relays TRCA, TRCB, etc. remain locked under control of their own make contacts, for instance, make contacts 5 and 8 of relays TRCA and TRCB. The operation of relays TRCA and TRCB cause the release in Fig. 41 of the previously-operated relays RCTA, RCTB, etc., which in turn cause the release in Fig. 12 of relays RCA0 through RCE0, and cause the release in Fig. 32 of relays BYA and BYB. The release of relays BYA and BYB cause the release in Fig. 32 of the corresponding relays BSYA, BSYB, etc. The release of relay RCD0 causes the release in Fig. 12 of the tens connector relays TCS3, THC3, TU3 and TM3, the release of relay THC3 causing the release in Fig. 37 of the select magnet connector relay SMC3. In the meantime, upon the release of relays TRKB and TRKAA and upon the operation of relays BTTA, BTTB, TRCA and TRCB obvious circuits are completed in Fig. 7 whereby relays BTCA and BTCB are operated.

With relays BTCA, BTCB, RUCA and RUCB operated a circuit is completed in Fig. 15 for causing the operation of the units selection relay U0, the circuit extending in Fig. 15 from ground, over the parallel make contacts 2 of relays BTCA and BTCB, parallel make contacts 1 of relays RUCA and RUCB to battery through the winding of units selection relay U0. Units selection relay U0, upon operating, causes the operation in Fig. 17 of the units end relays UEA and UEB in a fashion heretofore described. Upon the operation of the units selection relay U0 of Fig. 15 and the operation of the busy tone relays BTCA and BTCB of Fig. 7 a circuit is completed whereby the lower winding of sleeve relay S0 of Fig. 30 is connected to the winding in Fig. 13 of the hold magnet THM07 (pertaining to the busy tone trunk circuit) for the purpose of determining whether or not the busy tone trunk is at the moment engaged or idle. This circuit extends in Fig. 30 from ground through the lower winding of relay S0, over make contact 12 of relay U0 to conductor 0, over the parallel make contacts 11 of relays BTCA and BTCB to conductor THM07 extending into Fig. 13 to the upper side of the winding of busy tone trunk hold magnet THM07. In the meantime, in Fig. 37, an obvious circuit is completed over make contacts 6 of relays BTCA and BTCB for causing the operation of the select magnet connector relay SMC0 which will, if the busy tone trunk is idle, permit select magnets on switch 0 of Fig. 3 to be operated for assisting in connecting the calling P.B.X station 30 of Fig. 35 to the busy tone trunk of Fig. 13.

In the present discussion it is to be assumed that the busy tone trunk of Fig. 13 is engaged such that the marker will be required to signal the dial pulse register 0 circuit of Figs. 14, 18 and 19 to return busy tone to the calling P.B.X line circuit 30. If, as assumed, the busy tone trunk of Fig. 13 is busy when tested, ground will be found to exist on the upper side of the winding of its hold magnet THM07 of Fig. 13 when tested by the previously-described circuit through the lower winding of the sleeve relays S0 of Fig. 30. Due to the presence of this busy ground relay S0 cannot operate. This will preclude, upon the operation of relays SMRAA and SMRBA of Fig. 7, any attempt to operate the hold magnet THM07 of Fig. 13. Upon the operation of the select magnet connector relay SMC0 of Fig. 37, and before the slow-operate characteristics of relays SMTA and SMTB permit the operation of these relays, circuits are completed, as previously described, extending from the upper left-hand corner of the register control circuit of Fig. 6 through the select magnet control circuit of Fig. 37 and into the select magnets for switch 0 of Fig. 3, whereby select magnets SM00 and SM09 are reoperated in an attempt to permit the busy tone trunk to be connected to the same link (lower half of level 9) to which the dial pulse register circuit 0 of Figs. 14, 18 and 19 was connected to the calling P.B.X station 30 of Fig. 35 for the dial tone job.

However, due to the fact that the busy tone trunk of Fig. 13 is assumed to be busy, the corresponding hold magnet THM07 of switch 0 in Fig. 3 cannot be operated due to the fact that sleeve relay S0 of Fig. 30 did not operate on the sleeve test; and, it will be described presently how, due to this situation, select magnets SM00 and SM09 are eventually released. Eventually relays SMTA and SMTB operate after the slow-operate time interval for permitting the required operation of various select magnets. Upon the operation of these relays SMTA and SMTB, the corresponding select magnet release relays SMRA, SMRB, etc. in the route control circuit of Fig. 7 are operated in a manner fully described hereinbefore. Also, relays SMTA and SMTB, in operating, complete circuits extending from Fig. 29 through Figs. 30 and 33 into Fig. 32 for causing the reoperation of the relays BYA and BYB in Fig. 32 from grounds on conductors S15 and S16 as described hereinbefore. Upon the reoperation of relays BYA and BYB, a circuit is completed from the register control circuit of Fig. 6 into the dial pulse register 0 circuit of Fig. 18 for causing the operation in Fig. 18 of the dial pulse register busy relay BYR, this circuit extending in Fig. 6 from ground in the lower right-hand corner over the parallel make contacts 11 of relays BYA and BYB, parallel make contacts 4 of relays BTCA and BTCB, and over the make contacts of 5 and 6 of relay RPA0 to conductor BY0 leading into Fig. 18 and to battery through the winding of relay BYR, which thereupon operates and locks over its own make contact 10 to ground over make contact 3 of the dial pulse register off-normal relay ON. Relay BYR, in operating, causes the release in the tens selection circuit of Fig. 11 in the marker of the relay R0, thereby preventing the marker from being reseized by the register after the marker releases. Relay BYR, in operating, also opens up the conductors RRA0 and RRB0 extending from the dial pulse register in Fig. 18 to the register control circuit in Fig. 6, thereby to prevent the marker from signaling the dial pulse register to release and thereby to place the release of the dial pulse register under its own control—on a time out basis or by the disconnection of the calling P.B.X line circuit 30, whichever occurs first. Make contact 6 of relay BYR prepares a circuit in Fig. 18 whereby the register release relays RRLA and RRLB will be permitted to operate to cause a release of the dial pulse register circuit if and when relay TMOR operates (indicating the end of a time out period as previously explained). Also in Fig. 18 the closing of make contact 4 of relay BYR completes a circuit from busy tone in an obvious fashion back to the calling P.B.X line circuit 30, in response to which the P.B.X party should disconnect.

Returning now to the release functions of the marker, it will be noted in Fig. 50 that the operation of relays BYA, BYB, BTCA and BTCB permit the release of the down check relays DCKA and DCKB, the release of which, in turn, as has been explained in detail hereinbefore, causes the operation of the marker release relays RLA, RLB, etc. in the route control circuit of Fig. 7. The operation of the release relays RLA, RLB, etc., as has been explained in detail hereinbefore, initiates a sequence of events whereby the entire marker circuit is returned to normal condition, it being noticed that upon the release of the units end relays UEA and UEB of Fig. 17 the relays BYA and BYB of Fig. 32 are released. As will be apparent the marker, in releasing to normal, causes the select magnets SM00 and SM09 of switch 0 in Fig. 3 to release.

Also, upon the releasing action of the marker and as a matter of fact before it becomes fully released, upon the previous operation of relays BTCA and BTCB, the relays TOLA and TOLB of Fig. 50 are released. These relays, in releasing, cause the reoperation of the time-out check relays TOKA and TOKB of Fig. 50 when the down check relays DCKA and DCKB have reoperated and when the release relays RLSA and RLSB have released. As was explained hereinbefore in some detail, the operation of relays TOKA and TOKB causes the advance, time-out and release circuit of Fig. 44 to go through its paces for an entire cycle for exercising all of the relays of this circuit. As was explained, the end of this time-out exercise is the operation in Fig. 44 of the release relays RLSA, RLSB, etc., which in turn cause the release of relays TOKA and TOKB of Fig. 50, leaving relays TOLA and TOLB locked operated, as are the down check relays DCKA and DCKB.

If the calling P.B.X line circuit 30 of Fig. 35 disconnects in response to dial tone supplied by the dial pulse register 0 circuit of Fig. 18, the line relay L of Fig. 18 is released upon the opening of the tip and ring loop from the line circuit 30. Relay L, in releasing, causes the release of relay SR, which in turn releases the off-normal relay ON. Relay SR, in releasing, removes the holding ground from the sleeve conductor S of Fig. 18, which in turn causes the release of the line hold magnet LHM30 of Fig. 35. Relay SR, in releasing, also removes holding ground from conductor RHM0 in Fig. 18 leading to the register control circuit in Fig. 6, thereby releasing the hold magnets THM08 and THM09 relating to dial pulse register 0. Upon the release of hold magnets THM08 and THM09 of Fig. 3 and LHM30 of Fig. 34, the previously described circuit between the P.B.X line 30 and the dial pulse register 0 is broken down over the crossbar network, which is returned to its normal condition. Upon the release of the off-normal relay ON on Fig. 18, all of the remaining operated relays of dial pulse register are released, namely relays PU, BYR, P3, P2A and P4 of Fig. 18, TD3, STR, UD and DC of Fig. 19, and relays TLD and TLA of Fig. 14.

If the busy tone trunk is available at the time the marker tests same in order to supply busy tone to a calling party, the calling circuit is connected to the busy tone trunk over the same crossbar link to which are connected the calling party and the dial pulse register. Thereafter, the dial pulse register is released, in turn releasing the marker, it having been ascertained by the marker that the busy tone trunk is properly holding the connection. When the calling party disengages in response to busy tone, the busy tone trunk is released and the circuits are returned to normal.

Returning to the previous discussion, it will be recalled that upon the operation of the units selection relay U0 of Fig. 15, which causes the operation of the units end relays UEA and UEB of Fig. 17, a circuit was completed through the lower winding of the sleeve relay S0 of Fig. 30 for testing the hold magnet condition of the busy tone trunk of Fig. 13. This circuit extended from ground in Fig. 30 through the lower winding of relay S0, make contact 12 of relay U0, conductor 0, parallel make contacts 11 of relays BTCA and BTCB (operated for the purpose of attempting to connect the calling P.B.X line 30 to the busy tone trunk) to conductor THM07 extending into Fig. 13 and to the upper side of the winding of busy tone trunk hold magnet THM07. If, as will be assumed, the busy tone trunk is not engaged at the moment, there will be no ground on the upper side of this hold magnet and the lower winding of the sleeve relay S0 of Fig. 30 will find a circuit to battery through the winding of hold magnet THM07. Relay S0 will operate in series with this hold magnet but the hold magnet itself will not operate. As has been explained previously in connection with the operation of the various relays of Figs. 30 and 33, upon the operation of relay S0 it completes a circuit over its own make contact 1 to the conductor 0 independently of the condition of the units selection relay U0 of Fig. 15, and relay S0 prepares over its own make contacts 11 and 12 locking circuits through its upper winding for purposes of holding this relay operated upon subsequent circuit actions concerning such relays as SMRA and SMRB. Relay S0, in operating, causes the operation in Fig. 32 of relays SEA, SEB, etc., as has been explained hereinbefore. Relays SEA and SEB, in operating, cause the release in Fig. 17 of the previously operated relays RUCA and RUCB which in turn cause the release in Fig. 15 of the units relay U0, and the release of relay U0 causes the release in Fig. 17 of relays UEA and UEB.

Also it will be recalled that at the time that the busy tone connector relays BTCA and BTCB of Fig. 7 operated an obvious circuit was completed in Fig. 37 for operating the select magnet connector relay SMC0 which, it will be recalled, completes circuits whereby certain of the select magnets of the switch 0 in Fig. 3 may be operated. Relay SMC0, in operating, energizes the windings of relays SMTA and SMTB of Fig. 37, which relays will operate after a short interval of time determined by their slow operate characteristic and during which time the necessary select magnet operation will take place. It will be recalled that dial pulse register 0 of Figs. 14, 18 and 19 was connected to the calling P.B.X line circuit 30 of Fig. 35 for purposes of the dial tone job by virtue of the lower half of the ninth level in the crossbar switches in response to the operation on switch 0 of Fig. 3 of select magnets SM00 and SM09 and the operation on switch 3 of Fig. 34 of select magnets SM30 (not shown) and SM39.

Upon the operation of the select magnet connector relay SMC0 of Fig. 37, circuits are completed between the register control of Fig. 6 and the select magnet control of Fig. 37 whereby the same select magnets SM00 and SM09 of switch 0 in Fig. 3 are operated so that the busy tone trunk of Fig. 13 will be connected to the calling P.B.X line 30 over the same link used on the dial tone job. One circuit extends from ground in the upper left-hand corner of Fig. 6 over the parallel make contacts 5 of relays TRCAA and TRCBA, break contacts 3 of relays COB and COA and over make contact 5 of relay RP0 to conductor SM00 extending into Fig. 3. Another circuit extends from ground in the upper left-hand corner of Fig. 6 over the parallel make contacts 11 of relays TRCAA and TRCBA, break contacts 5 of relays COB and COA and over make contact 6 of relay RP0 to conductor SM01 extending into Fig. 3. In Fig. 3 ground on conductors SM00 and SM01 from Fig. 6 extend over crosspoints corresponding to the lower half of levels 0 and 9 to respective conductors SM0 and SM9 extending into the select magnet control circuit of Fig. 37, where conductor SM0 extends over make contact 10 of relay SMC0 to battery through the winding of select magnet SM00 (also shown on Fig. 3) and where ground on conductor SM9 extends over make contact 9 of relay SMC0 to battery through the winding of select magnet SM09 (also shown in Fig. 3). Select magnets SM00 and SM09 of switch 0 in Fig. 3 are operated in the previously-described circuit under control of the memory hold magnet THM09 of Fig. 3 in order to prepare switch 0 such that, upon the operation of the busy tone trunk hold magnet THM07 of Fig. 3, the busy tone trunk will be connected to the lower half of switch level 9 to which is presently connected the calling P.B.X line 30 of Fig. 35 and the dial pulse register 0 circuit of Fig. 18.

Eventually relays SMTA and SMTB of Fig. 37 operate, after an interval of time determined by their slow operate characteristics, and initiate a series of circuit operations previously described whereby the hold magnet operation and checking takes place. Relays SMTA and SMTB, in operating, cause the operation as previously described of the corresponding relays SMRA, SMRB, etc. in the route control circuit of Fig. 7. Relays SMRA and SMRB, in operating, complete a locking circuit in Fig. 30 for relay S0 extending from ground, through the upper winding of relay S0, over make contact 11 of relay S0 and to battery through the parallel make contacts 1 of relays SMRA and SMRB. This circuit maintains relay S0 operated when ground is applied to conductor THM07 in Fig. 30 to operate the busy tone trunk hold magnet THM07 of Fig. 13.

Upon the operation of relays SMTA, SMTB, SMRAA and SMRBA, circuits are completed for operating the hold magnet THM07 of Fig. 13. One circuit extends from ground in Fig. 29, over make contact 4 of relay SMTA, through break contacts 7, 4, 5, 8 and 4 of respective relays HMTB, HMTA, TRKA, SOB and SOA, over make contact 2 of relay SEA, and over break contact 8 of relay ZU (assumed to be released) to conductor S10 leading into Fig. 30. A similar circuit is completed in Fig. 29 whereby ground is applied to the corresponding conductor S13 extending into Fig. 30. Ground on conductor S10 into Fig. 30 from Fig. 29 extends over make contacts 4 and 1 of respective relays S0 and SMRAA to conductor 0, and ground on conductor S13 into Fig. 30 from Fig. 29 extends over make contacts 8 and 1 of relays S0 and SMRBA to conductor 0. Ground on conductor 0 in Fig. 30 thereupon extends over the parallel make contacts 11 of relays BTCA and BTCB to conductor THM07 extending into Fig. 13 and thence to battery through the winding of hold magnet THM07, which thereupon operates. Upon the operation of hold magnet THM07 (shown in Fig. 3), the tip, ring and sleeve conductors T, R and S of the busy tone trunk circuit of Fig. 13 are connected to the tip, ring and sleeve conductors T09, R09 and S09 comprising the lower half of horizontal level 9 of the crossbar switch network and to which presently is connected the tip, ring and sleeve conductors of the calling P.B.X line circuit 30 of Fig. 35 and dial pulse register 0 circuit of Fig. 18.

Upon the operation of the busy tone trunk circuit hold magnet THM07 in Fig. 3, relay AB of the busy tone trunk in Fig. 13 is operated over the tip and ring loop back to the calling P.B.X line circuit 30 of Fig. 35. Relay AB, in operating, applies a locking ground over its make contact 6 to the busy tone trunk hold magnet THM07 in Fig. 13 and applies a low resistance holding ground through its make contact 8 to the sleeve conductor extending into Fig. 3, thence over the vertical of the crossbar switch and conductor S09 into switch 3 of Fig. 34, and thence over the crosspoints and vertical of the crossbar switch to sleeve conductor S of line circuit 30 in Fig. 35, thereby to hold operated the line hold magnet LHM30 shown in Figs. 34 and 35. Upon the interconnection of the busy tone trunk circuit of Fig. 13 with the calling P.B.X station line 30 of Fig. 35, busy tone is supplied from the busy tone circuit of Fig. 13 through condenser A to the ring lead extending over the crossbar switch network to the ring lead of the calling P.B.X line circuit 30, thereby to provide the calling P.B.X line circuit 30 with busy tone, in response to which the party at line circuit 30 of Fig. 35 should disconnect.

In the meantime, circuit action has been taking place in the marker circuit in response to the operation of relays SMTA and SMTB of Fig. 37 for causing the marker to make a check to determine whether or not the busy tone trunk is properly connected to the calling line circuit and is properly holding the hold magnets, and thereafter, assuming a proper check of these conditions, to cause the release of itself as well as the release of dial pulse register circuit 0 of Figs. 14, 18 and 19. As has been explained in detail hereinbefore, the operation of relays SMTA and SMTB causes the operation in Fig. 7 of the slow operate relays HMTAA and HMTBA which, in operating, cause the operation of their corresponding slow operate relays HMTA and HMTB. After the time interval represented by the slow operate characteristics of these relays, circuits heretofore described in detail are completed between the circuits of Figs. 29, 30 and 13 for operating the hold magnet check relays HMKA and HMKB of Fig. 29 as an indication that the busy tone trunk of Fig. 13 is properly holding the connection. In Fig. 29 battery extends through the winding of relay HMKA, over the parallel make contacts 11 and 4 of relays HMTB and HMTA, thence over a previously-described circuit to conductor S10 extending into Fig. 30, and thence over make contacts 4 and 1 of relays S0 and SMRAA to conductor 0, thence over the parallel make contacts 11 of relays BTCA and BTCB to conductor THM07 extending into Fig. 13, to the upper side of the winding of hold magnet THM07. If, as will be assumed, busy tone trunk circuit of Fig. 13 is properly holding this hold magnet operated by virtue of extending ground through make contact 6 of its relay AB, relay HMKA of Fig. 29 will operate in the previously-described circuit. A similar circuit is extended in parallel with relay HMKA for causing the operation in Fig. 29 of the corresponding relay HMKB.

As has been explained in some detail hereinbefore, the operation of relays HMKA and HMKB, indicating that the busy tone trunk of Fig. 13 is properly holding the connection, initiates a series of circuit actions whereby the marker is returned to normal, in turn releasing to normal the dial pulse register circuit 0 of Figs. 14, 18 and 19. It appears unnecessary to repeat the details of this releasing operation at this time since it is very much the same as has been described before. It will be apparent that as a result of this releasing operation select magnets SM00 and SM09 of Fig. 3 are released along with the dial pulse register hold magnets THM08 and THM09 of Fig. 3, leaving hold magnet THM07 of Fig. 3 and hold magnet LHM30 of Fig. 34 operated to maintain the connection between line circuit 30 of Fig. 35 and the busy tone trunk of Fig. 13 over the tip, ring and sleeve conductors T09, R09 and S09 comprising the lower half of horizontal level 9 of the crossbar switch network.

When the calling P.B.X line circuit 30 of Fig. 35 releases in response to the dial tone supplied to it from the busy tone trunk circuit of Fig. 13, the tip and ring loop through the instrument at station 30 of Fig. 35 is opened, thereby causing the release in the busy tone trunk circuit of relay AB which, in releasing, removes the holding ground from the sleeve conductor S back to the hold magnet of line circuit 30 of Fig. 35, thereby releasing that hold magnet LHM30 of Figs. 34 and 35, and removes the holding ground from the busy tone trunk hold magnet THM07 of Figs. 13 and 3, thereby releasing that hold magnet. The release of hold magnets LHM30 of Fig. 34 and THM07 of Fig. 3 returns the crossbar switch network to normal and releases the connection between the busy tone trunk of Fig. 13 and the calling line circuit of Fig. 35. The release of line hold magnet LHM30 of Fig. 35 again prepares the circuit for the line relay L30 of line circuit 30 so that it may be operated in a normal fashion.

In the event that the called busy line is arranged for hunting to another line, the marker tests for and selects an idle such line and connects it to the terminating section of a junctor. Following this action, the marker completes the connection in the same fashion as a normal non-hunting call to an idle called line.

In previous description when the called P.B.X line circuit 34 of Fig. 35 was tested to determine whether or not it was idle, since the sleeve relay S4 of Fig. 30 did not operate, thereby indicating that line circuit 34 was busy, the busy relays BYA and BYB of the line and trunk hunting circuit in Fig. 32 were operated, thereby in turn causing the operation in Fig. 29 of the hunt connector relays HCA and HCB. Upon the operation of relays HCA and HCB, a circuit was completed from ground on conductor U4G in Fig. 16 (the ground which is holding operated the units relay U4), over the parallel make contacts 5 of relays HCA and HCB, and over make contact 5 of the tens connector relay THC3 to conductor H34 extending into Fig. 20 to the line hunting punching corresponding to conductor H34. It has been explained in detail hereinbefore the manner and means whereby line circuit 34, by virtue of the cross-connections on Fig. 20, is enabled to hunt to certain other lines. It will be recalled that due to the particular arrangement of cross-connections in Fig. 20 line circuit 34 is arranged to hunt to lines 36, 37, 38 and 39 by virtue of the fact that the ground on conductor H34 in Fig. 20 is extended by means of solid wire strapping to the terminals corresponding to conductors H36, H38 and H39 and to the terminal corresponding to conductor H37 through the low impedance direction of the diode interconnecting the terminals corresponding to lines 36 and 37. The ground on conductor H34 in Fig. 20 is extended from the terminal corresponding to that conductor over the solid strap to the terminal corresponding to conductor H39, thence over conductor H39 back into Fig. 17 and over make contact 12 of relay THC3, and the parallel make contacts 12 of the hunt connector relays HCA and HCB, through make contact 12 of relay RUCB, to battery through the winding of the units relay U9, which thereupon operates. Returning now to Fig. 20, similar circuits are provided by virtue of the interconnection of the terminals in Fig. 20 for grounding conductors H36, H37 and H38 into Figs. 16 and 17 whereby relays U6, U7 and U8 are operated in addition to the operation of relay U9.

The operation in Figs. 16 and 17 of the units relays U6, U7, U8 and U9 is an indication to the marker that these four lines are arranged in a hunting group with the busy called line circuit 34 and that if any one of these lines 36, 37, 38 and 39 is available, the call from the calling line circuit 30 of Fig. 35 will be extended thereto. Upon the operation of the units relays U6, U7, U8 and U9, circuits are completed between Fig. 33 and the corresponding line circuits of Fig. 35 whereby the corresponding sleeve relays S6, S7, S8 and S9 can test the sleeve lead of the corresponding line circuits for a busy or idle condition. For example, a circuit is completed from ground in Fig. 33 through the lower winding of relay S9, over make contact 5 of relay U9, to conductor 9, thence over make contact 12 of the tens connector relay TM3, to conductor S39 extending into Fig. 35 to the sleeve lead of line circuit 39, which is the same as the right-hand side of the corresponding line hold magnet LHM39. As will be apparent from previous description, if line circuit 39 is busy its sleeve lead will have a ground upon it, whereupon the corresponding sleeve relay S9 of Fig. 33 cannot operate. On the other hand, if line circuit 39 is idle the lower winding of its corresponding sleeve relay S9 of Fig. 33 will find a circuit to battery in Fig. 35 through the winding of the line hold magnet LHM39 and the sleeve relay S9 will operate in this circuit, but the hold magnet will not. It will be assumed for present purposes that line circuit 39 is available. Therefore, sleeve relay S9 of Fig. 33 will operate. Similar circuits extend from the lower windings of sleeve relays S6, S7 and S8 to the sleeve conductors of the corresponding lines 36, 37 and 38 indicated in Fig. 35. Any or all of these three relays may be operated or released depending upon whether the corresponding lines are respectively idle or busy. Upon the operation of one or more of the sleeve relays S6 through S9 of Fig. 33, the sleeve end relays SEA, SEB, etc. of Fig. 32 are operated, in turn causing the release in Fig. 17 of the relays RUCA and RUCB and these relays, in releasing, release all of the operated units selection relays, namely, relays U6 and U7 of Fig. 16 and relays U8 and U9 of Fig. 17, and the release of the units selection relays causes the release in Fig. 17 of the units end relays UEA and UEB.

From this point on the circuit operation is exactly the same as previously described under conditions whereby the line circuit 34 of Fig. 35 was found to be idle. The circuit whereby the hold magnet corresponding to the selected one of the available idle lines in the hunting group is operated extends, as has been described a number of times previously, from Fig. 29 over conductors S10 and S13 (assuming relay ZU to be released) or over conductors S8 and S11 (if relay ZU is operated) into Fig. 30. The only difference in the circuit operation which is produced by virtue of the operated or released condition of relay ZU of Fig. 32 is to rearrange the order of preference in the line and trunk hunting circuit of Figs. 30 and 33 whereby a hold magnet is operated. For instance, if conductors S10 and S13 are grounded (released condition of relay ZU) one circuit extends in Fig. 30 from ground on conductor S10, over the break contact 4 of all of relays S0 through S4, break contact 10 of relay ZU, conductor S8 into Fig. 33, and over break contact 4 of relay S5. At this point it will be apparent that first preference is given to the sleeve relay S6. If it is operated, indicating that line circuit 36 is available, then relay S6 will be operated, preventing the operation of any of the other sleeve relays S7 through S9. On the other hand, if sleeve relay S6 is not operated, indicating that line circuit 36 is busy, the ground on conductor S8 in Fig. 33 will be extended over break contact 4 of relay S6, etc. For purposes of simplicity, it will be assumed that line circuits 36, 37 and 38 are all busy whereupon the ground on conductor S8 in Fig. 33 will be extended over the break contacts 4 of relays S6, S7 and S8, over make contact 4 of relay S9, and over make contact 12 of relay SMRAA to conductor 9. A similar circuit will extend from ground on conductor S13 in Fig. 30, over break contacts 8 of relays S0 through S4, break contact 4 of relay ZU, conductor S11 into Fig. 33, break contacts 8 of relays S5 through S8, make contact 8 of relay S9, and make contact 12 of relay SMRBA, again to conductor 9.

In the event that relay ZU of Fig. 32 is operated then the conductors S8 and S11 of Fig. 29 will be grounded over make contacts 8 and 2, respectively, of relay ZU. These two grounded conductors S8 and S11 extend into Fig. 30 and directly into Fig. 33, whereupon they join up with conductors S8 and S11 in Fig. 33 and follow the circuits previously described under the condition where it was assumed that relay ZU might be released. The interesting thing to note, however, is that with relay ZU released the sleeve relays are given an order of preference from relay S0 of Fig. 30 directly down the chain to relay S9 of Fig. 33; whereas, with relay ZU operated the preference is initiated at relay S5 of Fig. 33 and by virtue of the make contacts 12 and 6 of relay ZU at the right-hand side of Fig. 33 (in the event that relays S5 through S9 are unoperated) the preference is returned over conductors S10 and S13 into Fig. 30 and into the preference order of relays S0 through S4, as is the starting point under the condition when relay ZU is released.

Since, as above mentioned, it has been assumed that line circuit 39 is the only one available and therefore conductor 9 in Fig. 33 is grounded over make contact 12 of relays SMRAA and SMRBA, this ground on conductor 9 extends over make contact 12 of relay TM3, to conductor S39 into Fig. 35, to battery through the winding of the line hold magnet LHM39, which thereupon operates. Other than the ramification imposed by the preference order of the sleeve relays of Figs. 30 and 33 and other than the fact that line hold magnet LHM39 is operated instead of the hold magnet LHM34 in Fig. 35 corresponding to the busy line circuit 34, the operation whereby the calling P.B.X line circuit 30 of Fig. 35 is interconnected with line circuit 39 of Fig. 35 under the control of a junctor circuit (such as junctor circuit of Fig. 24) is exactly the same operation as was described in detail hereinbefore under the conditions whereby it was assumed that line circuit 34 of Fig. 35 was idle and was capable of being connected to the calling subscriber P.B.X line circuit 30 over junctor circuit 0 of Fig. 24. It is considered unnecessary to repeat all the details of the completion of this type of connection.

It will be apparent from previous description, of course, that at such time as the marker is satisfied that a junctor circuit is properly holding the crossbar switch connection between line circuits 30 and 39 of Fig. 35 the marker will release, as will the dial pulse register 0 circuit of Figs. 14, 18 and 19, thereby returning the circuits to normal and leaving the two P.B.X parties to hold a conversation between themselves under the supervision of a junctor circuit, such as the one shown in Fig. 24. Under these conditions the connection between line circuits 30 and 39 extends from the tip, ring and sleeve conductors T, R and S of line circuit 30 in Fig. 35, into Fig. 34 over the crosspoints of switch 3 in Fig. 34 corresponding to the lower halves of respective levels 0 and 9, thence over the crossbar switch tip, ring and sleeve conductors T09, R09 and S09, into switch 1 of Fig. 23, over the crosspoints corresponding to the lower halves of respective levels 0 and 9 to the originating tip, ring and sleeve conductors T0, R0 and S0 into Fig. 24 to the originating end of junctor circuit 0, thence through condensers T and R and over the interconnected sleeve lead, out over the tip, ring and sleeve leads TT, RT and ST of the terminating end of the junctor, into Fig. 23 and over the crosspoints of the switch corresponding, for instance, to the upper halves of levels 1 and 2, to the tip, ring and sleeve conductors T12, R12 and S12 of this level, across to switch No. 3 in Fig. 34, thence over the crosspoints corresponding to the upper halves of levels 2 and 1 and to the tip, ring and sleeve leads T, R and S into Fig. 35 to line circuit 39.

(B) TIE TRUNK TO P.B.X LINE

Tie trunk circuits are provided in the P.B.X used as an illustrative embodiment herein whereby remote P.B.X's may make connection with lines in the present P.B.X or with trunks extending therefrom and whereby stations in the instant P.B.X may affect connections to remote P.B.X's. In Figs. 31 and 35 are illustrated four tie trunk circuits Nos. 1 through 4 of which tie trunk circuit 1 in Fig. 31 is shown in detail. This particular tie trunk provides to the instant P.B.X dial selected outgoing service whereby, for instance, a P.B.X line circuit such as line circuit 34 of Fig. 35 may, by dialing the proper digits, make connection with the tie trunk circuit 1 of Fig. 31 extending to a distant P.B.X indicated in Fig. 31 as a box. Once having made connection with the distant P.B.X through tie trunk circuit 1, however, line circuit 34 of Fig. 35 must orally pass further switching instructions to the P.B.X attendant at that distant point. The same tie trunk circuit 1 of Fig. 31 is arranged for dial repeating incoming service from the distant P.B.X, whereby the distant P.B.X attendant, for instance, may dial into and through the instant P.B.X by automatic means.

The circuit action of the instant P.B.X in completing a dial repeating incoming call from a distant P.B.X through tie trunk circuit 1 of Fig. 31 is exactly the same, with a few minor exceptions, as has been previously described in connection with a station to station call. If a distant P.B.X atendant desires to place a call to line circuit 34 of Fig. 35, the circuit action will be almost identical to that previously described in connection with line circuit 30 of Fig. 35 making the same connection to line circuit 34. When the tie trunk is seized at the distant P.B.X a direct-current loop is closed between the tip and ring leads T and R extending therefrom as shown by the box in Fig. 31. The tip lead extends in Fig. 31 over break contact 5 of relay TRT to the incoming tip lead T1 of line circuit 26, and thence to ground over break contact 1, 2T of line hold magnet LHM26 and through the left-hand winding of line relay L26. The ring lead R from the distant P.B.X extends in Fig. 31 over break contact 7 of relay TRT, thence to the incoming ring lead R1 of line circuit 26, thence to battery over break contact 1, 2B of line hold magnet LHM26 and through the right-hand winding of line relay L26. Relay L26 operates in this D.C. loop closed at the distant P.B.X. Relay L26, in operating, causes the operation in Fig. 10 of the tens selection relay T2 in a circuit extending from ground over make contact 4 of relay L26, break contact 5 of relay TEA1, break contact 5 of relay TA2, winding of relay T2, break contact 9 of relay TA2, to battery through break contact 5 of relay TEB1, all in the same manner as previously described.

Since the sequence of events that ensue upon the operation of the tens selection relay T2 are for all intents and purposes identical to the sequence of events previously described in connection with the interconnection of line circuit 30 of Fig. 35 with dial pulse register 0 of Figs. 14, 18 and 19 for the dial tone job, the details will be omitted and only the high spots touched upon. Upon the operation of relay T2 of Fig. 10 relays TEA0 through TEA3 and TEB0 through TEB3 of Fig. 11 are operated and provide locking circuits for relay T2 of Fig. 10 independently of the condition of line relay L26. Upon the operation of relays TEA2, TEB2, TEA3, TEB3 and T2, relay TP2 of Fig. 10 is operated along with the four tens preference chain check relays TCK1 through TCK4 of Fig. 10. The operation of relay TP2 of Fig. 10 comprises a seizure of the marker circuit by the line circuit associated with tie trunk circuit 1 of Fig. 31 for purposes of the dial tone job. Relay TP2, in operating, also causes the operation in Fig. 12 of the corresponding tens connector relays TCS2, THC2, TU2 and TM2, and causes the operation in Fig. 12 of the tens auxiliary connector relays TACA, TACB, etc. The operation of the tens auxiliary connector relays TACA and TACB causes the operation in Fig. 17 of the line units connector relays LUCA and LUCB and the units lock relays ULA and ULB. Upon the operation of the line units connector relays LUCA and LUCB, a circuit is completed in Fig. 16 for causing the operation of the units relay U6 extending from ground in Fig. 16, over make contact 6 of relay L26, make contact 9 of relay TU2, parallel make contacts 9 of relays LUCA and LUCB, to battery through the winding of relay U6, which operates and locks in a circuit extending from the right-hand side of its winding, over its own make contact 10, to ground through the parallel make contacts 9 of the units lock relays ULA and ULB. Upon the operation of relay U6 of Fig. 16 circuits are completed in Fig. 17 for operating the units end relays UEA and UEB in a manner fully described hereinbefore, the operation of relays UEA and UEB causing the release in Fig. 17 of the line units connectors LUCA and LUCB.

The operation of the units end relays UEA and UEB of Fig. 17 is an indication that the units registration has been affected, such as by the operation of the units relay U6 of Fig. 16, which in turn necessarily means that the tens registration has taken place, such as the operation of the tens preference relay TP2 of Fig. 10 and the tens connector relays of Fig. 12 corresponding to the tens digit of 2. In the meantime, in the register control circuit of Fig. 6, upon the operation of relay TP2 and the tens auxiliary connectors TACAA and TACBA, obvious circuits are completed for causing the operation of the register group relays RGA, RGB, etc. to initiate the selection of an idle dial pulse register circuit such as dial pulse register 0 of Figs. 14, 18 and 19. The manner and means whereby an idle dial pulse register circuit is selected for supplying dial tone to the calling line circuit and for receiving therefrom the digits dialed by the calling party has been dealt with in considerable detail hereinbefore and will not be repeated at this point.

Figure 27:
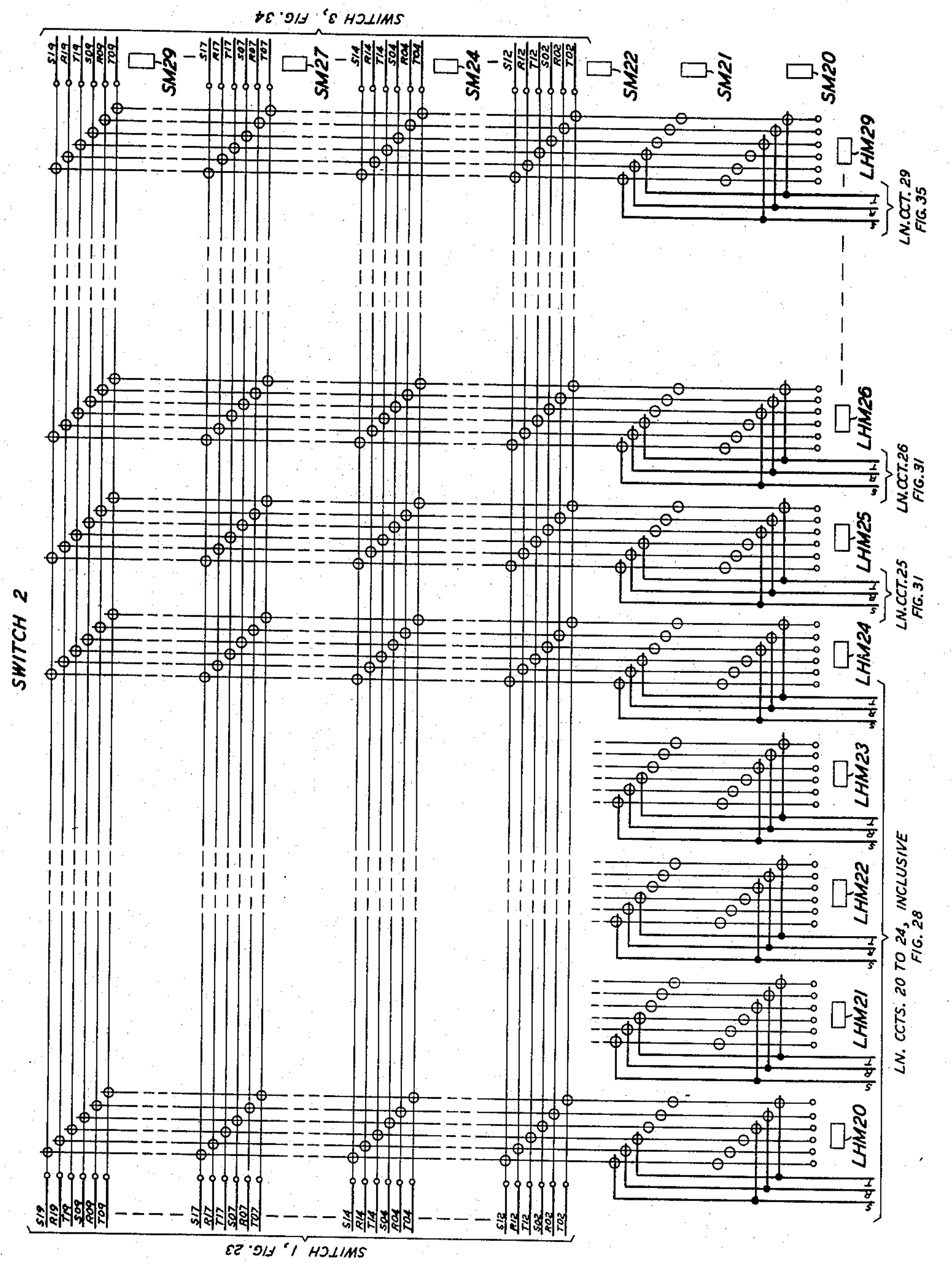

If it be assumed, as was the previous case, that dial pulse register 0 of Figs. 14, 18 and 19 is idle and available to be seized and that it will be seized, it will be apparent that certain of the select magnets on switches 0 and 2 of respective Figs. 3 and 27 must be operated in order to select crosspoints on the switches to interconnect the tip, ring and sleeve conductors of dial pulse register 0 of Fig. 18 to the tip, ring and sleeve conductors extending into line circuit 26 of Fig. 31 to which is connected the incoming tie trunk circuit 1 from the distant P.B.X. As has been described in detail hereinbefore, the selection of proper select magnets is under control of the link test circuits of Figs. 46 and 47, whereby one of the available 16 three-wire horizontal links through the crossbar switches is preselected. In Fig. 37 select magnet connectors relays SMC0 and SMC2 will be operated such that select magnet operating circuits will be extended to switches 0 and 2 of respective Figs. 3 and 27. Select magnet connector SMC0 is operated by means of make contacts of the register group relays RGBA and RGAA and select magnet connector SMC2 is operated under the control of make contact 6 of the tens connector relay THC2. It will be assumed that the lower half of level 9 of the horizontal crossbar switch network is selected for use, namely, the tip, ring and sleeve conductors T09, R09 and S09 extending from switch to switch across the Figs. 3, 23, 27, 34 and 42 into the link test circuits of Figs. 46 and 47. In Fig. 3 select magnets SM00 and SM09 will be operated to preselect for use the lower half of level 9; and, in Fig. 27 the corresponding select magnets SM20 and SM29 will also be operated.

In order to complete the connection it will be necessary to cause the operation in Fig. 3 of hold magnets THM08 and THM09 corresponding to dial pulse register 0 of Figs. 14, 18 and 19 and to cause the operation in Fig. 27 of hold magnet LHM26 corresponding to line circuit 26 of Fig. 31 connected to tie trunk circuit 1. The circuits whereby hold magnets THM08 and THM09 of Fig. 3 are operated have been described in detail in connection with the register control circuit of Fig. 6. At a suitable time, as hereinbefore explained in detail, a circuit is completed for testing the hold magnet winding of line circuit 26 of Fig. 31, extending from ground in Fig. 33, through the lower winding of relay S6, make contact 12 of relay U6, to conductor 6, over make contact 9 of relay TM2, to conductor S26 extending into Fig. 31, over make contact 10 of relay L26, to the top side of the winding of relay IN26, and thence to battery through the winding of relay IN26, which thereupon operates. Relay IN26, in operating, closes its make contact 20 in parallel with make contact 10 of relay L26, and completes a circuit from the upper side of its winding through its make contact 8 to conductor S2, whereby this relay IN26 may be held operated from the tie trunk circuit, as will be explained, and causes the operation of line hold magnet LHM26 in an obvious manner over make contact 9 of relay IN26. In the meantime, upon the operation of line relay L26 of Fig. 31, a circuit extends in Fig. 31 from ground, over make contact 8 of relay L26, to conductor IT86 extending into the line and trunk hunting circuit of Fig. 33 for making line circuit 26 busy to the rest of the circuit. Upon the operation of hold magnet LHM26 of Fig. 31, line relay L26 is released and the busy ground on conductor IT86 is now supplied from ground over make contact 12 of relay IN26 and break contact 8 of relay L26.

Upon the operation of the hold magnet LHM26 shown in Fig. 27 and the operation of hold magnets THM08 and THM09 of Fig. 3 a circuit is completed from the tip, ring and sleeve conductors of the dial pulse register 0 circuit of Fig. 18 into Fig. 3, over the three crosspoints corresponding to select magnet SM00, over the crosspoints corresponding to select magnet SM09, conductors T09, R09 and S09 into Figs. 23 and 27, over the crosspoints corresponding to select magnet SM29 in Fig. 27, and over the three crosspoints corresponding to select magnet SM20 to the tip, ring and sleeve conductors T, R and S, extending into line circuit 26 of Fig. 31. In this connection between dial pulse register 0 of Fig. 18 and line circuit 26 of Fig. 31 a low impedance ground is supplied over contacts 12 of relay SR in Fig. 18, through the S resistance and over the sleeve lead S to the sleeve lead S of Fig. 31, thence to the incoming sleeve lead S1 leading into tie trunk circuit 1, over break contact 9 of relay TRT, to battery through the winding of relay SRTT, which thereupon operates. Relay SRTT, in operating, extends ground in Fig. 31 over its own make contact 6 to conductor S2 and over make contact 8 of relay IN26 to hold relay IN26 operated. Also, as has been explained in some detail, as a result of this interconnection dial tone is supplied from dial pulse register 0 of Fig. 18 over the tip and ring loop, over the crossbar switch network and over the tip and ring leads of line circuit 26, and over the tip and ring leads T and R to the distant P.B.X. This dial tone signal is an indication to the calling party at the distant P.B.X that the digit or digits desired may be dialed into the instant P.B.X circuit.

Since it has been assumed that the distant P.B.X party wishes to make contact with the party comprising line circuit 34 of Fig. 35, the respective tens and units digits 3 and 4 will be dialed into the dial pulse register 0 of Figs. 14, 18 and 19, just as was the case previously described in some detail wherein it was assumed that the P.B.X station 30 of Fig. 35 desired to make connection with this same called P.B.X line circuit 34 of Fig. 35. Just as was the previously-described instance above referred to, the registration in dial pulse register 0 of Figs. 18 and 19 of the tens and units digits 3 and 4 of the called P.B.X line circuit 34 of Fig. 35 will cause that line circuit to be interconnected over an idle one of the 16 half links through the crossbar switch network to the terminating portion of a junctor circuit such as junctor circuit 0 of Fig. 24, and will cause the tie trunk circuit 1 of Fig. 31 to be interconnected with the originating section of the same junctor circuit such as junctor circuit 0 of Fig. 24 over the same half link through the crossbar switch as was used for the dial tone connection, namely, the lower half of level 9. The details of this interconnection with the junctor circuit 0 of Fig. 24 are identical with the circuit actions which took place when line circuit 30 of Fig. 35 was interconnected with line circuit 34 of Fig. 35 and the details thereof are not necessary to be repeated here.

The talking battery for this connection is supplied from junctor circuit 0 of Fig. 24 to both ends of the conversation and the releasing of the connection is again under the control of junctor circuit 0 of Fig. 24, as was the case hereinbefore described for the interconnection between P.B.X line circuits 30 and 34 of Fig. 35.

(C) P.B.X LINE TO TIE TRUNK

A call from a P.B.X line circuit over a tie trunk to a distant P.B.X, such as from line circuit 30 of Fig. 35 over tie trunk circuit 1 of Fig. 31 to a distant P.B.X, is handled the same way as a call between P.B.X lines up to a point where the dial pulse register is ready to seize the marker circuit for completion of the call. This particular type of a connection does not require the use of a junctor circuit such as junctor circuit 0 of Fig. 24, as was the case in a connection between P.B.X line circuits, beause the tie trunk circuit such as the one shown in Fig. 31 provides talking battery to both ends of the connection as will be explained.

It will be assumed that P.B.X line circuit 30 of Fig. 35 desires to make interconnection over tie trunk circuit 1 to a distant P.B.X. The initial phases of the control connection whereby line circuit 30 is interconnected with a dial pulse register such as dial pulse register 0 of Figs. 14, 18 and 19 and whereby the called digits are dialed into and registered in dial pulse register 0 are exactly the same as previously explained with the exception of a few minor details. In order to make connection with tie trunk circuit 1 of Fig. 31 it is necessary for the tens digit 8 and the units digit 6 to be dialed into dial pulse register 0 of Figs. 14, 18 and 19 in accordance with the identification No. 86 of this particular trunk circuit. As has been explained hereinbefore, as a result of dialing the tens digit 8 into dial pulse register 0 the relay TD8 of Fig. 19 will be operated and as a result thereafter of dialing into the dial pulse register of the units digit 6 there will be operated in Fig. 18 the relays P2A, P4 and P5 in accordance with previous description to register the units digit 6. As a result of the operation of relay TD8 of Fig. 19 a circuit is completed in Fig. 19 from ground over break contact 8 of relay TMOR, make contact 2 of relay TD8, and make contact 6 of relay TLD, to conductor T8–0 leading into the tens connector circuit of Fig. 12; and, this same ground on conductor T8–0 in Fig. 19 extends over break contact 6 of relay TRR to battery through the winding of relay TRR, which thereupon operates and locks in a circuit over its own make contact 12 to ground through make contacts 10 and 9 of relays SW and ON.

Other functions of the dial pulse register 0 take place substantially as previously described with one main exception. In Fig. 14 in connection with previous description where a junctor circuit was needed in a connection between P.B.X line circuits, the battery through the make contact 12 of relay DC was extended through break contacts of relays OT, TRR, COT and TMOR to the lead JTA0 extending into the sequence control circuit of Fig. 41 to cause the operation of relay JTA, etc., for initiating the sequence of operations whereby junctor circuit 0 of Fig. 24 was used in the connection between P.B.X line circuits. However, in the present instance due to the operation of relay TRR of Fig. 19 this battery in Fig. 14 now extends over make contact 10 of relay TRR to conductor RCTA0, and a similar battery extends over make contact 8 of relay TRR to conductor RCTB0 both extending into the sequence control circuit of Fig. 41. For instance, in Fig. 41 the battery on conductor RCTA0 from dial pulse register 0 of Fig. 14 will extend over make contact 20 of the register preference auxiliary relay RPA0, through break contacts 5 and 7 of respective relays NAA and TRCA, through the parallel windings of the register cut-through relays RCTA and RCTAA, to ground through break contacts 5 and 4 of respective relays NAB and TRCB. Similar circuits in Fig. 41 will cause the operation of the corresponding register cut-through relays RCTB and RCTBA. It will be recalled in connection with the description hereinbefore of an interconnection between P.B.X line circuits 30 and 34 of Fig. 35 by means of junctor circuit 0 of Fig. 24, that the register cut-through relays RCTA, RCTB, of Fig. 41 were not operated until a sequence of relay operations had taken place whereby a junctor circuit had been selected for use. This junctor selection was caused by the operation in Fig. 41 of relays JTA and JTB, which does not take place in the present instance. In the present situation the cut-through relays RCTA, RCTB are operated immediately because there is no need to go through the junctor selection sequence.

The operation of the register cut-through relays RCTA, RCTB, etc. causes the operation in Fig. 12 of the register connector relays RCA0 through RCE0 associated with the dial pulse register 0 assumed to be used in the present example. This operation has been described previously. Upon the operation of relay RCE0 a circuit is completed between the dial pulse register 0 of Fig. 19 and the tens connector circuit of Fig. 12 whereby the tens connector relays TK8, TKA8 and TKB8 are operated in accordance with the registration in the dial pulse register of the tens digit 8 associated with this particular group of trunks. This circuit extends from ground in Fig. 19 on conductor T8–0 extending into Fig. 12, thence over make contact 2 of relay RCE0, through the windings of relays TK8, etc. to battery through make contact 11 of relay RCE0. As will be recalled from previous description, the operation of the register preference auxiliary relay RPA0 of Fig. 12 causes the operation of the register units connector relays RUCA and RUCB of Fig. 17, which thereupon complete a circuit extending from the dial pulse register in Fig. 19 to the units selection circuit of Fig. 16 for operating the units relay U6 in accordance with the registration in the dial pulse register of the units digit 6 of the trunk No. 86. This circuit extends from ground in the right center part of Fig. 19 over break contact 8 of relay TMOR, over break contact 3 of relay OT, make contact 4 of relay P2A, break contact 8 of relay RA, make contact 10 of relay P5, break contacts 6 and 2 of relays P3 and P1, and make contact 6 of relay STR to conductor U6–0 extending into Fig. 16, thence over make contact 9 of relay RC00 and make contact 9 of relay RUCB to battery through the winding of relay U6, which thereupon operates. It will be noted in this regard that the ground extending from the left side of the make contact 9 of relay RCC0 in Fig. 16 also extends over make contact 9 of relay TKA8 to conductor H86 extending into the punching sheet of Fig. 20 and thence to the punching corresponding to conductor H87 extending back into Fig. 16 to operate the corresponding units relay U7. This merely indicates that the two tie trunk circuits 1 and 2 in Figs. 31 and 35 are in a hunting group and whichever one of the group is idle will be selected in the same fashion as was previously explained in connection with a busy called P.B.X station in a hunting group of such P.B.X stations.

Upon the operation of relay TKB8 the select magnet connector relays SMC0 and SMC2 of Fig. 37 were operated. Circuits were thereupon completed as previously described for operating select magnets on certain ones of the switches in order to reuse the same horizontal half link which was used on the dial tone connection. These circuits extend in Fig. 6 in the upper left-hand corner thereof from ground, over break contacts 2 and 3 of relays JREA and JREB, make contacts 6 and 7 of relays RCTA and RCTB, break contacts 3 and 5 of relays COA and COB, and make contacts 5 and 6 of relay RP0, to conductors SM00 and SM01 extending into Fig. 3 and over the crosspoints of the switch 0 corresponding to select magnets SM00 and SM09 to conductors SM0 and SM9 extending into the select magnet control circuit of Fig. 37, where conductor SM0 extends over make contacts 10 of relays SMC0 and SMC2 to operate select magnets SM00 and SM20 shown on Figs. 3 and 27 corresponding to switches 0 and 2, and where in Fig. 37 ground on conductor SM9 extends over make contacts 9 of relays SMC0 and SMC2 to operate the select magnets SM09 and SM29 shown in Figs. 3 and 27 corresponding to level 9 of these switches. Due to the operation of these select magnets SM00 and SM09 of Fig. 3 and SM20 and SM29 of Fig. 27, upon the operation of line hold magnet LHM26 of Fig. 27 (also shown in Fig. 31) in connection with tie trunk circuit 1, the line circuit 26 of Fig. 31 (tie trunk circuit 1) will be interconnected over the crossbar switch network with the calling P.B.X line circuit 30 of Fig. 35 in parallel with dial pulse register 0 of Figs. 14, 18 and 19.

Due to the operation in Figs. 16 and 17 of the units relays U6 and U7, corresponding to the two tie trunks arranged in a common hunting group, circuits will be completed between Figs. 33, 31 and 35 for testing the two trunk circuits to ascertain if one of them is idle. For instance, in Fig. 33 a circuit is completed from ground through the lower winding of relay S6, over make contact 12 of relay U6 to conductor 6, over make contact 9 of relay TK8 to conductor IT86 leading into Fig. 31 to the line circuit 26 associated with tie trunk circuit 1. If line circuit 26 is idle, both its line relay L26 and its incoming relay IN26 will be released, whereupon the ground on conductor IT86 will be extended through the respective break contacts 8 and 12 of these relays to battery through the winding of relay OT26. A similar circuit extends from the lower winding of sleeve relay S7 of Fig. 33 to the winding of the corresponding outgoing relay OT27 indicated but not shown in Figs. 31 and 35. It will be assumed for purposes of illustration that both of these tie trunks are available whereupon both of the corresponding sleeve relays S6 and S7 will be operated through their lower windings to battery through the winding of the corresponding relays OT26 and OT27 of Figs. 31 and 35, the relays OT26 and OT27 not operating in series with the corresponding relays. Sleeve relays S6 and S7, in operating, complete circuits over their respective make contacts 1 to the respective conductors 6 and 7 of Fig. 33 independently of the make contacts of the corresponding units relays U6 and U7. Also upon the operation of any one or more of the sleeve relays of Fig. 33 the sleeve end relays SEA, SEB, etc. of Fig. 32 are operated in a manner previously described and the operation of these sleeve end relays causes the release in Fig. 17 of the relays RUCA and RUCB, which in turn cause the release of the operated units selection relays U6 and U7 of Fig. 16, the release of which in turn causes the release in Fig. 17 of the units end relays UEA and UEB.

In the meantime, upon the operation of the select magnet connector relays SMC0 and SMC2 of Fig. 37, circuits previously described in detail are completed in Fig. 37 for causing the operation of the slow operate relays SMTA and SMTB, which in operating initiate a sequence of operations fully described hereinbefore whereby a hold magnet such as hold magnet LHM26 of Figs. 31 and 27 is operated for interconnecting the called circuit with the calling circuit over the same horizontal three-wire link through the crossbar switches which was previously used for the dial tone job. The net effect of this sequence of operations is to cause conductors S8 and S11 extending between Figs. 30 and 33 to become grounded. It will be appreciated by an inspection of Fig. 33 that with the sleeve relays S6 and S7 operated, the grounding of conductors S8 and S11 will prefer to be controlled by sleeve relay S6 since it is the first one in the order of preference for these two sleeve relays. It will also be appreciated that in the event that line circuit 26 of Fig. 31 had not been available its corresponding sleeve relay S6 would not have operated and therefore the selection of a tie trunk would have extended in Fig. 33 to the sleeve relay S7 which if idle would have been selected for use, etc. In the present example, it has been assumed that both tie trunks are availabe, whereupon both of the sleeve relays S6 and S7 were operated and this causes ground on conductor S8 in Fig. 33 to be extended over make contact 4 of relay S6 and make contact 9 of relay SMRAA to conductor 6 and also causes the ground on conductor S11 in Fig. 33 to be extended over respective make contacts 8 and 9 of the same relays S6 and SMRBA to the same conductor 6. Ground on conductor 6 in Fig. 33 thereupon extends over make contact 9 of relay TK8 to conductor IT86 extending into Fig. 31, and thence over break contacts 8 and 12 of relays L26 and IN26 to battery through the winding of the outgoing relay OT26 corresponding to line circuit 26. Relay OT26 operates in this circuit thereby extending the tip and ring leads T and R of line circuit 26 in Fig. 31 from the crossbar switch termination thereof in Fig. 27 to the outgoing tip and ring leads T2 and R2 of the tie trunk circuit 1 and causes the operation of line hold magnet LHM26 in Fig. 31 in an obvious fashion over make contact 4 of relay OT26. The operation of relay OT26 also completes a circuit in Fig. 31 from ground through resistance S26 and over make contact 1 of relay OT26 to the sleeve conductor S of line circuit 26 terminating in the crossbar switch network of Fig. 27, and at break contact 1 of relay OT26 in Fig. 31 the operation of relay OT26 opens the originating sleeve lead S1 of tie trunk circuit 1. The operation of line hold magnet LHM26 of Figs. 31 and 27 opens the operating circuit for the line relay L26 of Fig. 31.

Upon the operation of line hold magnet LHM 26 of Fig. 27 and due to the prior operation of select magnets SM20 and SM29 also of Fig. 27, the tip, ring and sleeve conductors T, R and S extending from the line circuit 26 in Fig. 31 into Fig. 27 are extended over the three crosspoints corresponding to select magnet SM20 and the three lower crosspoints corresponding to select magnet SM29 to the tip, ring and sleeve conductors T09, R09 and S09 to which are presently connected the tip, ring and sleeve conductors of the dial pulse register 0 of Fig. 14 and of the line circuit 30 of Fig. 35. It will be recalled with reference to Fig. 18 that the dial pulse register 0 was applying a low resistance holding ground through make contact 12 of relay SR and through resistance S to the sleeve lead of the interconnection. This holding ground extends to battery through the winding in Fig. 35 of the line hold magnet LHM30 to hold the connection. It will be noticed with respect to Fig. 31 that as soon as the outgoing relay OT26 operates and as soon as the crosspoint connection is made on the crossbar switches an additional low resistance holding ground is supplied over make contact 1 of relay OT26 to supplement the sleeve holding ground supplied by dial pulse register 0. This additional holding ground is provided so that when the dial pulse register and marker are released from the connection the line circuit 26 of Fig. 31 will be permitted to hold the connection.

As has been explained in considerable detail hereinbefore, eventually the hold magnet check relays HMKA and HMKB of Fig. 29 operate as an indication that the line circuit 26 (tie trunk 1) is properly holding the connection and that the marker and dial pulse register circuits may be released. The releasing action has been described hereinbefore and will not be gone into again at this point. Let it suffice to say that the marker circuits are completely released as are the circuits of dial pulse register circuit 0 of Figs. 14, 18 and 19, leaving the connection under the control of tie trunk circuit 1 and line circuit 26 of Fig. 31. However, before the marker and dial pulse register release certain relay operations take place in the tie trunk circuit 1 of Fig. 31 in order to set up the proper holding and supervision controls. As soon as the tip and ring leads T and R of line circuit 26 of Fig. 31 are connected to the tip and ring leads T and R of the calling P.B.X line circuit 30 of Fig. 35 a direct-current loop is closed over this tip and ring circuit and extending in Fig. 31 from the tip lead T of line circuit 26, over make contact 2 of relay OT26 to the outgoing tip conductor T2 of the tie trunk, thence over break contact 6 of the reversing relay RVT, to ground through the upper winding of relay M. Likewise the ring lead R of line circuit 26 extends over make contact 3 of relay OT26, to the outgoing ring lead R2 of tie trunk circuit 1, and over break contact 12 of the reversing relay RVT to battery through the lower winding of relay M. Relay M operates in this circuit and, in operating, causes the operation of relay TRT in an obvious fashion over make contact 10 of relay M, and applies a holding ground over its make contact 4 to the outgoing tie trunk sleeve lead S2 and through make contact 5 of relay OT26 to maintain operated this relay, which in turn will maintain operated the line hold magnet LHM26 corresponding to line circuit 26. Relay TRT, in operating, causes the operation in an obvious manner of relay SRTT which, through the agency of its make contact 6, supplements the holding ground on the outgoing sleeve conductor S2 of tie trunk circuit 1 for maintaining operated the outgoing relay OT26 of line circuit 26. Relay TRT, in operating, extends the tip and ring leads T and R from the distant P.B.X through make contacts 4 and 6 of relay TRT, to the windings of the relay LT and through condensers T and R to the outgoing tip and ring leads T2 and R2 of the tie trunk circuit 1. The operation of relay TRT also opens at its break contacts 5 and 7 the interconnection between the tip and ring leads T and R to the distant P.B.X and the incoming tip and ring leads T1 and R1 between the tie trunk circuit 1 and line circuit 26, and by means of its break contact 9 breaks the connection between the incoming sleeve lead S1 and the winding of relay SRTT.

Upon the operation of relays M and TRT of the tie trunk circuit 1 of Fig. 31 a circuit extends from ground through the upper winding of relay LT and over make contacts 8 and 6 of respective relays M and TRT, to the ring lead extending to the distant P.B.X; and, another circuit extends from battery through the lower winding of relay LT and over make contacts 6 and 4 of respective relays M and TRT to the tip lead T, extending to the distant P.B.X. Battery and ground on the respective tip and ring leads T and R extending to the distant P.B.X causes an incoming signal to function thereat. When the attendant at the distant P.B.X answers the incoming signal a direct-current loop is connected between the tip and ring leads thereat, thereby causing the operation of relay LT in tie trunk circuit 1 of Fig. 31. Relay LT, in operating, supplements the ground for operating relay TRT by means of make contact 6 of relay LT and causes the operation of the reversing relay RVT in an obvious manner over make contact 4 of relay LT. Relay RVT, in operating, reverses the connection of the outgoing tip and ring leads T2 and R2 to the windings of relay M such that battery and ground are reversed back towards the originating end of this call. This battery and ground reversal towards the originating end is used as an answer signal to any connected circuit requiring such a reverse battery and ground signal. In the present instance this reversal is of no particular consequence because the calling P.B.X line circuit 30 of Fig. 35 is not such a circuit as requires this reverse signalling.

The details involved in the complete release of the marker and of the dial pulse register 0 circuit of Figs. 14, 18 and 19 have not been described since it is identical with the details thereof set forth hereinbefore in connection with the release of these circuits, under similar conditions involved in a line-to-line call. When these circuits have been released a connection exists from the tip, ring and sleeve leads T, R, and S of the calling P.B.X line circuit 30 of Fig. 35 into Fig. 34 over the three crosspoints corresponding to select magnet SM30, thence vertically and over the lower three crosspoints corresponding to select magnet SM39, to the tip, ring and sleeve conductors T09, R09 and S09 comprising the lower half of level 9 of the crossbar switch link, thence into Fig. 27 and over the lower three crosspoints corresponding to select magnet SM29, downward in the crossbar switch network corresponding to hold magnet LHM26, over the three crosspoints corresponding to select magnet SM20 to the tip, ring and sleeve leads T, R and S leading into the line circuit 26 of Fig. 31. In Fig. 31 the sleeve lead S of line circuit 26 extends over make contact 1 of relay OT26 to ground through the resistance S26, this ground comprising a means whereby the connection is held from the line circuit 26. In Fig. 31 the tip and ring leads T and R extend over respective make contacts 2 and 3 of relay OT26, to the outgoing tip and ring leads T2 and R2 of the tie trunk circuit 1 in Fig. 31 and over respective make contacts 6 and 12 of the reversing relay RVT to respective battery and ground through the corresponding lower and upper windings of relay M, thereby in an obvious manner supplying talking battery to the line circuit 30 of Fig. 35. Condensers T and R isolate the originating and terminating battery supply talking circuits in a well-known manner. Ground extends through the upper winding of relay LT and over make contacts 8 and 6 of respective relays M and TRT to the ring lead R extending to the distant P.B.X and battery through the lower winding of relay LT extends over respective make contacts 6 and 4 of relays M and TRT to the tip lead T extending to the distant P.B.X. By means of this interconnection the attendant at the distant P.B.X may verbally request further switching instructions from the party at the P.B.X line circuit 30, thereby to extend any connection desired by that calling P.B.X subscriber. It will be appreciated in this particular instance that the P.B.X party at line circuit 30 cannot further control this circuit by dialing from station 30, although such tie trunk circuits are well known in the art.

At the completion of whatever conversation may result due to this connection, if the distant party disconnects first, relay LT is released, thereby releasing the reversing relay RVT. Relay RVT, in releasing, reestablishes the original ground and battery situation on the tip and ring leads towards the originating end, which reversal of battery and ground is used as a disconnect signal to any connected circuit requiring it. In the present instance the calling P.B.X line circuit 30 of Fig. 35 does not require such a signal and therefore the release of relay RVT in this instance is of no particular consequence. When the calling P.B.X party at line circuit 30 of Fig. 35 disconnects, the tip and ring loop from the instrument thereat is opened, thereby causing the release of relay M in the tie trunk circuit 1 of Fig. 31. Relay M, in releasing, releases relays OT26 in line circuit 26 and relays TRT and SRTT in the tie trunk. Relay OT26, in releasing, causes the release in Fig. 31 of line hold magnet LHM26 and the release in Fig. 35 of line hold magnet LHM30, thereby returning to normal the tie trunk circuit 1 of Fig. 31 and the calling P.B.X line circuit 30 of Fig. 35.

In the event that the calling P.B.X party at line circuit 30 of Fig. 35 should disconnect first, relay M in tie trunk circuit 1 of Fig. 31 will be released, thereby reversing the battery and ground back over the tip and ring leads to the distant P.B.X as a disconnect signal. However, until such time as the distant P.B.X loop is disconnected relay LT cannot release. When relay LT is released by this distant disconnect, the relays RVT, TRT, SRTT and OT26 release, followed by the release of the hold magnets LHM26 of Fig. 31 and LHM30 of Fig. 35. It will thus be appreciated that the originating P.B.X station remains held to the tie trunk circuit even though it may have disconnected and remains so held until such time as the distant P.B.X circuit is disconnected.

(D) TIE TRUNK TO TIE TRUNK

A connection desired between one tie trunk and another tie trunk, such as from tie trunk circuit 4 of Fig. 35 to tie trunk circuit 1 of Fig. 31, is merely a combination of the circuit activities described immediately hereinbefore with respect to a connection between a calling tie trunk and a called P.B.X line and a connection between a calling P.B.X line and a called tie trunk. It is considered unnecessary to go into the details of a tie-trunk-to-tie-trunk call in view of the fact that it is merely a duplication or an obvious combination of circuit functions previously described in connection with calls between tie trunks and P.B.X lines. It may be noted however that in the situation of a call between tie trunks the operations and releases of relays such as relay M and RVT of tie trunk circuit 1 of Fig. 31 will effect the necessary answering and disconnect, etc. supervision by reversals of battery and ground to the originating and terminating ends of the call.

(E) P.B.X LINE (TOLL ALLOWED) TO CENTRAL OFFICE TRUNK

As has been mentioned hereinbefore the various line circuits of the P.B.X may have one of three classes of service such as toll-allowed, toll-denied, and restricted. Restricted stations cannot, without the assistance of the P.B.X attendant, dial central office trunks such as the central office trunk 0 of Figs. 4 and 5 extending to a local central office. If a restricted line attempts to make such a call the circuits will automatically route the calling P.B.X line to the P.B.X attendant as an intercept condition. A toll denied station may automatically dial and connect to a central office trunk extending to a local central office and, upon receipt of second dial tone therefrom, may dial a local subscriber in that central office. However a toll denied P.B.X station cannot dial to a toll facility through the central office. In the event that a toll denied station attempts to dial to a toll facility the usual reversal of battery and ground over the tip and ring conductors from the toll facility will, under the control of the central office trunk in the P.B.X, cause the calling P.B.X station to be extended to a busy tone in the trunk circuit of the P.B.X. A toll allowed station may not only dial automatically to the central office and to any local subscriber therein, but also may dial to a toll facility through that central office, all without the assistance of the P.B.X attendant. Any station in the P.B.X however may, as will be described hereinafter, use the P.B.X attendant for any such call.

The example presently to be described is the circuit action caused by a toll allowed P.B.X station, such as line circuit 30 of Fig. 35, dialing to and through a central office trunk, such as central office trunk 0 of Figs. 4 and 5, to a local central office, such as indicated in skeleton form in Fig. 31A; and, upon receiving second dial tone from the central office, line 30 may dial to and be connected with a local subscriber in that central office or may dial to a toll operator facility, as will be described hereinafter. In Fig. 31A skeletonized circuits are shown in the upper portion thereof extending at the right from the tip and ring conductors T and R of a central office trunk from the P.B.X through the various crossbar switches of the illustrative central office and through an intra-office trunk out over other crossbar switches to the desired connection with the called subscriber. The details of the circuits skeletonized in the upper part of Fig. 31A are fully shown and described in the Patent 2,585,-904 to A. J. Busch of February 19, 1952. In the lower part of Fig. 31A is shown, again somewhat skeletonized, a typical operator cord and trunk circuit comprising a toll board facility and to which the incoming trunk from the P.B.X circuit may make connection for extension of a call to and over a toll line. The operator cord and trunk circuit illustrated in Fig. 31A has been adapted from a more complete showing thereof in Patent 2,657,-274 to R. E. Hersey of October 27, 1953. It will be apparent to those skilled in the art that the central office trunk circuit from the P.B.X could very well terminate in well known facilities in a step-by-step central office, a panel type central office, a crossbar type of central office, as shown, or a manual office and that the showings of Fig. 31A are merely for the purposes of clarity and understanding of the extension of such a connection and are not intended in any way to be limiting upon the scope of the present subject matter.

*Dial tone connection*

The details of circuit operation whereby the calling P.B.X line circuit 30 of Fig. 35 is interconnected over the crossbar switches of the P.B.X with dial pulse register 0 of Figs. 14, 18 and 19, and whereby dial tone is supplied to the calling line circuit 30, have been fully set forth hereinbefore, and it is deemed unnecessary to repeat the details thereof. It will be assumed that this dial tone connection, as was the case under previous description, has taken place over the lower half of level 9 of the crossbar switches comprising the tip, ring and sleeve conductors T09, R09 and S09 of the crossbar switches shown in Figs. 3, 23, 27, 34 and 42. As a result of this dial tone connection the following relays will have been operated: line hold magnet LHM30 shown in Figs. 34 and 35; relays L, SR and ON of Fig. 18; and, relays TLA and TLD of Fig. 14 (indicating the toll allowed class of service for the calling P.B.X line circuit 30). Also, in the register control circuit of the marker in Fig. 6 the relays RA0B and RA0A will be released indicating that register circuit 0 of Figs. 14, 18 and 19 is presently engaged.

*Dialing*

There are ten central office trunks provided between the instant P.B.X and a central office such as the one illustrated in skeletonized form in Fig. 31A. These central office trunks are trunks 0 through 4 of Figs. 4, 5 and 9 and trunks 5 through 9 of Fig. 43, of which central office trunk 0 is shown in detail in Figs. 4 and 5. It will be noticed by reference to the punching sheet of Fig. 20 that the punchings corresponding to line circuit conductors H90 through H99 are all strapped together, thereby permitting any one of the ten central office trunks to hunt to any of the others. In this particular instance, since all of the ten trunks are in the same hunting group, it is necessary for only the single tens digit of 9 to be dialed into the dial pulse register 0 of Figs. 14, 18 and 19 in order to effect selection of one of the central office trunks. When the P.B.X party at line circuit 30 of Fig. 35 has dialed the tens digit of 9 into dial pulse register 0 the pulse counting relays of Fig. 18 are operated as follows: relays P1, P2, P2A, P3, and P5. Upon the reoperation of the line relay L of Fig. 18 during the interdigital pause after the dialing of the tens digit of 9, relay RA of Fig. 18 releases. This completes a circuit in Fig. 19 for operating the tens digit register relay TD9, the circuit extending from ground in Fig. 19 over break contact 8 of relay TMOR, break contact 3 of relay OT, make contact 4 of relay P2A, break contact 8 of relay RA, make contact 3 of relay P5, break contact 8 of relay P4, make contact 6 of relay P1, break contact 9 of relay STR, through the winding of relay TD9, to battery through make contact 7 of relay ON and break contacts 11 and 4 of the respective dial pulse register release relays RRLB and RRLA. Relay TD9 operates in this circuit and extends a locking circuit for itself from the upper end of its winding, through its own make contact 1, to ground through break contact 8 or relay TMOR. Relay SW, in the lower left-hand corner of Fig. 19, operates in the same operating circuit for relay TD9 in an obvious manner over break contact 10 of relay DC. Relay SW locks to ground over make contacts 4 and 6 of relays SW and PU and, in operating, releases all of the operated pulse counting relays of Fig. 18. Relay SW, in operating, causes the operation of relay STR as previously described, thereby switching the output of the pulse counting relays of Fig. 18 from the tens digit register of Fig. 19 directly to the units leads leading to the units selection circuit of the marker of Figs. 15, 16, and 17 such that the pulse counting relays of Fig. 18 will act as the units digit register in the event that a units digit is required.

Upon the operation of the tens digit relay TD9 of Fig. 19, circuit operations take place in Fig. 19 whereby the dial completion relay DC is operated as an indication that no further digits are required prior to an attempt to seize the marker circuit for completion of this particular call. Relay OT in Fig. 19 is operated in a circuit extending from ground over break contact 8 of relay TMOR, make contact 2 of relay TD9, make contact 8 of relay TLD, break contact 8 of relay OT, to battery through the winding of relay OT, which thereupon operates and locks over its own make contact 4 to off-normal ground. Relay OT, in operating, also extends its locking ground over its own make contact 8 and over break contact 4 of relay TMOR to battery through the winding of relay UD, which thereupon operates and locks over its own make contact 2 to off-normal ground. Upon the operation of relay UD, the dial completion relay DC of Fig. 19 operates in a circuit extending from battery, through break contacts 4 and 11 of relays RRLA and RRLB, make contact 7 of relay ON, winding of relay DC, break contact 6 of relay RA, make contact 4 of relay UD, to ground through break contact 8 of relay BYR. Relay DC, in operating, completes a locking circuit for itself over its own make contact 1 independently of the contacts of relays RA and UD. Upon the operation of relay DC, with relay SW also operated, relay PU of Fig. 18 is released, thereby causing the release of relay SW. The operation of relay OT causes the generation in the dial pulse register circuit of the artificial units digits 1 and 4 in order to satisfy the units selection circuit of Figs. 15, 16 and 17 when the dial pulse register requests the service of a marker. This circuit extends from ground in Fig. 18, through make contact 3 of relay ON, break contact 6 of relay TMOR, conductor UD extending into Fig. 19 and thence over the parallel make contacts 2 and 12 of relay OT, and the parallel break contacts 3 and 1 of relay TRR, to respective conductors U1–0 and U4–0 extending respectively into Figs. 15 and 16 to the corresponding units selection circuits relating to units selection relays 1 of Fig. 15 and 4 of Fig. 16. The dial pulse register 0 circuit of Figs. 14, 18 and 19 is now in condition whereby it may attempt to seize the marker circuit in order to complete the desired connection to a central office trunk as indicated by the tens digit 9 registered in the dial pulse register.

*Completing connection to central office trunk*

Upon the operation, in dial pulse register 0 of Fig. 19, of the dial completion relay DC, a circuit is completed between Fig. 14 and Fig. 11 whereby the tens selection relay R0 of Fig. 11 is operated to represent a bid by dial pulse register circuit 0 for the services of the marker. This circuit extends from battery in Fig. 14, over make contact 12 of relay DC, to conductor DC2 extending into Fig. 11, thence over the parallel break contacts 9 and 11 of relays TEB2 and TEA2, through the winding of relay R0, parallel break contacts 9 and 11 of relays TEA2 and TEB2, conductor DC1 extending into Fig. 14, over make contact 2 of relay DC, to ground over break contacts 9 and 6 of relays BYR and RT. Relay R0, in operating, causes the operation of the tens ends relays TEA0 through TEA3 and TEB0 through TEB3 of Fig. 11, which in turn permit the operation in Fig. 10 of the tens preference chain relay RP0 and the tens check relays TCK1 through TCK4. Relay RP0 of Fig. 10, in operating, causes the operation in Fig. 12 of the corresponding auxiliary relay RPA0. Upon the operation of relay RPA0, circuits are completed between Figs. 14 and 41 whereby the sequence control relays RCTA, RCTB, etc. are operated. Battery in Fig. 14 extends over make contact 12 of relay DC and make contact 10 of relay OT, to conductor RCTA0 extending into Fig. 41, and thence over make contact 20 of relay RPA0 etc., to cause the operation of relays RCTA and RCTAA as previously described. A similar circuit extends between Figs. 14 and 41 to cause the operation of relays RCTB and RCTBA. The operation of relays RCTA and RCTB causes the operation in Fig. 12, as previously described, of relays RCA0 through RCE0; and, the operation of relay RCE0 completes a circuit in Fig. 12 for causing the operation of the tens connector relays TK9, TKA9 and TKB9 in a circuit extending from ground on conductor T9–0 in Fig. 19 extending into Fig. 12, over make contact 3 of relay RCE0, through the windings of the tens connector relays TK9, TKA9 and TKB9, to battery through make contact 10 of relay RCE0.

On the operation of the register preference auxiliary relay RPA0 of Fig. 12, the register units connector relays RUCA and RUCB of Fig. 17 are operated in a manner previously described, and the operation of these connectors completes circuits between Fig. 19 and Figs. 15 and 16 for causing the operation of the units selection relays U1 and U4. Ground extends from conductor U1–0 in Fig. 19 into Fig. 15, over make contact 2 of relay RCC0, and make contact 2 of relay RUCB, to battery through the winding of relay U1, which thereupon operates, as does the units relay U4 of Fig. 16 in a similar fashion by virtue of the ground on conductor U4–0 extending from the dial pulse register 0 circuit of Fig. 19. It will be noted, in Fig. 16 as an example, that the operating ground for relay U4 on conductor U4G is extended over make contact 5 of relay TKA9 to conductor H95 into Fig. 20 to the punching corresponding to conductor H95, and thence by virtue of the strappings to all of the other punchings corresponding to the other conductors in the series H90 to H99, and for instance back over conductor H99 into Fig. 15, over make contact 1 of relay TKA9, and make contact 1 of relay RUCB, to battery through the winding of relay U0, which thereupon operates. It will be obvious, due to the strapping arrangement in Fig. 20, that all of the units relays U0 through U9 of Figs. 15, 16, and 17 will be operated as an indication that any one of the ten trunks in this group may be used for the connection desired.

As previously described, the operation of any one of the units selection relays of Figs. 15, 16 and 17 causes the operation in Fig. 17 of the units end relays UEA and UEB. It will be noted in Fig. 37 that the operation of the tens connector relay TKB9 completes circuits over its respective make contacts 1 and 2 for operating the select magnet connector relays SMC0 and SMC8 to prepare for the operation of select magnets on switches 0 and 8 of Figs. 3 and 42 as a part of the operation whereby one of the ten trunk circuits terminating on these two switches is connected to the same horizontal link used by calling line circuit 30 of Fig. 35 on the dial tone job (which it will be recalled is the lower half of level 9 comprising tip, ring and sleeve conductors T09, R09 and S09 of the crossbar switch structure). In order to cause the selected trunk to be connected to the same link used on the dial tone job it will be necessary, as has been explained in considerable detail hereinbefore, to cause the operation on switches 0 and 8 of Figs. 3 and 42 of the select magnets SM00 and SM09 of Fig. 3 and SM80 and SM89 of Fig. 42, followed by the operation of one of the hold magnets THM00 through THM04 of Fig. 3 and THM85 through THM89 of Fig. 42 corresponding to the selected idle trunk.

Upon the operation of any of the units selection relays of the Figs. 15, 16 and 17 a circuit is completed between Figs. 30 and 33 whereby the lower windings of the corresponding sleeve relays S0 through S9 test the desired circuit to determine whether or not it is idle. In the present instance all of the units relays U0 through U9 of Figs. 15, 16 and 17 are operated and so all of the sleeve relays S0 through S9 of Figs. 30 and 33 will simultaneously test for a busy or idle condition in all ten trunks at the same time. For example, with respect to the operation of units relay U9, a circuit is completed in Fig. 33 extending from ground, through the lower winding of relay S9, over make contact 5 of relay U9, to conductor 9, thence over make contact 12 of relay TK9, to conductor IT90 extending into Fig. 5 to the central office trunk circuit 0. Ground on conductor IT90 in Fig. 5 extends, by means of T option, to conductor IT90 extending into the alarm and transfer circuit of Fig. 36, thence over make contact 9 of relay ATA, to conductor ITC90 back into Fig. 5, over break contacts 10 of relays SRT and S1T, break contacts 7 and 8 of relays CT and HM, and break contact 4 of relay MC, to the lower terminal of the winding of relay MC. In the event that trunk circuit 0 of Figs. 4 and 5 is presently engaged, either of relays S1T and SRT of Fig. 4 will be operated, whereupon in Fig. 5 ground will extend over make contact 10 of one of these operated to the conductor ITC90. In this event the lower winding of relay S9 of Fig. 33 will not find a battery to operate same. On the other hand, if trunk circuit 0 is idle at the moment, relays SRT and S1T of Fig. 4 will be released, as will relays CT of Fig. 4 and HM and MC of Fig. 5, whereupon the lower winding of relay S9 of Fig. 33 will find a circuit to battery above described through the winding of relay MC. Therefore, in the event that the trunk circuit of Figs. 4 and 5 is idle relay S9 of Fig. 33 will operate in series with the winding of relay MC of Fig. 5, relay MC not operating in this circuit. On the other hand, any trunk circuit which is presently engaged will prevent the operation of the corresponding sleeve relay S0 through S9 of Figs. 30 and 33. It will be assumed for purposes of illustration that all of the ten trunk circuits are busy except the trunk circuit 0 of Figs. 4 and 5, thereby causing the operation of sleeve relay S9 of Fig. 33 and preventing the operation of any of the other sleeve relays of Figs. 30 and 33. This assumption, coupled with an assumption that relay ZU of Fig. 32 is released, will permit the seizure of trunk 0 as has been explained hereinbefore with respect to the preference arrangement in the hold magnet operating circuits controlled by Figs. 30 and 33.

A short explanation is deemed advisable at this point to explain the existence of the wiring option in trunk circuit 0, Fig. 5. It will be recalled in the previous description of the testing circuit for the sleeve relay S9 of Fig. 33 that an option T was involved in the control lead IT90 between the line and trunk hunting circuit of Fig. 33 and the alarm and transfer circuit of Fig. 36. With respect to trunk circuits 0 of Fig. 5, 1 and 2 of Fig. 9, and 5 of Fig. 43, it is necessary to provide T option wiring in order to route the control leads for these trunks through the alarm and the transfer circuit of Fig. 36 in connection with the transfer feature, whereby four of the P.B.X line circuits can under certain conditions be switched through directly to these four trunks to the central office so that the P.B.X may be completely operative without the necessity of having an attendant available. On the other hand with respect to the other six trunks namely trunks 3 and 4 of Fig. 9 and 6 through 9 of Fig. 43 it is not necessary to provide T option wiring as shown in Fig. 5. In these instances the conductor IT9—for these trunks will be extended directly by means of V wiring to the contacts 10 of relay SRT and will not be routed through the alarm and transfer circuit.

The operation of the sleeve relay S9 of Fig. 33 completes a circuit over its own make contact 1 independently of make contact 5 of relay U9 and, in operating, causes the operation in Fig. 32 of the sleeve end relays SEA, SEB, etc., the operation of which causes the release in Fig. 17 of the register units connector relays RUCA and RUCB, the release of which in turn causes the release in Figs. 15, 16 and 17 of all of the operated units selection relays, the release of which in turn causes the release in Fig. 17 of the units end relays UEA and UEB.

In the meantime, circuits are completed in the register control of Fig. 6 and in the select magnet control of Fig. 37 whereby the necessary select magnets on switches 0 and 8 of respective Figs. 3 and 42 are operated in order to prepare for interconnection of the trunk circuit 0 of Figs. 4 and 5 to the same crossbar link used by calling P.B.X line circuit 30 of Fig. 35 for the dial tone connection. One of these circuits extends from ground in Fig. 6, over break contacts 2 and 3 of relays JREB and JREA, parallel make contacts 6 of relays RCTA and RCTB, break contacts 3 of relays COB and COA, and make contact 5 of relay RP0 to conductor SM00 extending into Fig. 3. Another circuit of a similar nature extends from ground in Fig. 6 to conductor SM01 of Fig. 3. In Fig. 3 these two conductors SM00 and SM01 extend over crosspoints corresponding to select magnets SM00 and SM09 to respective conductors SM0 and SM9 extending into the select magnet control circuit of Fig. 37, as previously explained. In Fig. 37 ground on conductor SM0 from Fig. 3 extends over make contact 10 of relays SMC0 and SMC8, to battery through the windings of select magnet SM00 and SM80, thereby causing the operation of these select magnets SM00 of Fig. 3 and SM80 of Fig. 42; and, ground on conductor SM9 in Fig. 37 from Fig. 3 extends over make contact 9 of relays SMC0 and SMC8, to battery through the windings of select magnets SM09 and SM89, thereby causing the operation of these select magnets SM09 of Fig. 3 and SM89 of Fig. 42.

In the meantime, in the select magnet control circuit of Fig. 37 circuits have been completed for energizing the windings of the select magnet timing relays SMTA and SMTB, the circuit for relay SMTA extending from ground, over break contacts 5 of relays TRKAA and RLAB, break contact 4 of relay RLSA, winding of relay SMTA, break contacts 9 of relays RLSB, RLBB and STAR, break contacts 4, 3, 5 and 10 of respective relays STBR, TRKBA, LTAA, and COA, make contact 5 of relay RCTAA, break contacts 7 of relays JREB and JREA, to battery through make contacts 12 of relays SMC0 and SMC8. A similar circuit is completed in Fig. 37 for energizing the winding of relay SMTB. After a suitable time delay, determined by the slow operate characteristics of these relays, they will operate and complete circuits heretofore previously described in detail extending from Fig. 29 through Figs. 30 and 33 for applying ground for instance to conductors S10 and S13 from Fig. 29, into Fig. 30, assuming that relay ZU of Fig. 32 is released. Grounds on these conductors S10 and S13 of Fig. 30 will extend to the right through Fig. 30, over break contacts of all of the unoperated sleeve relays S0 through S4, respective break contacts 10 and 4 of relay ZU, to conductors S8 and S11 extending into Fig. 33, thence over break contacts of sleeve relays S5 through S8, and over respective make contacts of 4 and 8 of the operated sleeve relay S9, and respective make contacts 12 of relays SMRAA and SMRBA, to conductor 9, thence over make contact 12 of relay TK9 to conductor IT90 into Fig. 5, thence by virtue of the T option wiring over conductor IT90 into Fig. 36, over make contact 9 of relay ATA, back to Fig. 5 over conductor ITC90, and to battery through the winding of relay MC in a previously described circuit, thereby causing the operation of relay MC. Relay MC, in operating, locks over its own make contact 4 to a circuit extending by means of conductor RLSE to the class of service section of the marker in Fig. 26, thence through break contacts 7 and 1 of relays RLAB and RLBB, to a ground over the parallel make contacts 4 of relays TEA3 and TEB3. The operation of relay MC opens the previously described circuit through the lower winding of sleeve relay S9 of Fig. 33 but relay S9 remains operated through its upper winding under control of its own make contact 11 and the parallel make contacts 12 of relays SMRA and SMRB of Fig. 7 which, as has been described in detail hereinbefore, will have been operated upon the operation of the select magnet timing relays SMTA and SMTB of Fig. 37.

Upon the operation of relay MC of Fig. 5, circuits are completed between the line and trunk hunting circuit of Fig. 29 and the trunk circuit of Fig. 5 for causing the operation of relay HM and the trunk hold magnet THM00, both of Fig. 5. In Fig. 29, in the upper left-hand corner thereof, a circuit extends from ground over break contact 6 and 7 of relays COB and COA to a conductor ME indicated as extending to all even central office trunks, and another circuit extends from ground over break contacts 6 and 7 of relays COA and COB to a conductor M0 which extends to all odd central office trunks. In the particular P.B.X circuits under consideration central office trunks 0, 2, 4, 6 and 8 are even trunks and central office trunks 1, 3, 5, 7 and 9 are odd trunks. In view of this the ground on conductor ME in Fig. 29 will extend to the even central office trunks 0 of Fig. 5, thence over make contact 9 of relay MC, to battery through the windings of relay HM and trunk hold magnet THM00, operating same. The operation of trunk hold magnet THM00 of Fig. 5 (also shown in Fig. 3) causes the tip, ring and the sleeve conductors of the central office trunk 0 of Figs. 4 and 5 to be connected to the same crossbar link (lower half of level 9) to which are connected the calling P.B.X line 30 of Fig. 35 and the dial pulse register 0 of Fig. 18. A circuit extends from ground in Fig. 5, through the SH resistance, and through break contacts 12 and 8 of respective relays HD and BY, to the sleeve conductor S extending into Figs. 4 and 3, and thence over the crossbar switches to the sleeve conductor S of line circuit 30 of Fig. 35 to hold operated the line hold magnet LHM30 of line circuit 30. A circuit is also completed upon this interconnection for causing the operation of relays S in the Fig. 4 in a circuit extending from ground in Fig. 4, over break contact 6B of relay SRT, break contact 6 of relay CT, break contact 6 of relay FF, through the winding of relay S, over break contacts 5, 3, 10 and 7 of respective relays HD, AC, RS and BY, to the tip conductor T, thence over the crossbar switch network and through the calling P.B.X line circuit loop in Fig. 35, back over the ring lead R into Fig. 4 and over break contacts 6, 2, 8, 1 and 9 of respective relays BY, RS, SRT, HD and AC, break contact 7 of relay HD, break contacts 8 of relays FF and CT, to battery through resistance BF. Relay S, in operating, causes the operation of relay S1T in Fig. 4 in an obvious circuit over make contact 1 of relay S. Relay S1T, in operating, supplies off-normal ground to trunk circuit 0 of Figs. 4 and 5 and completes circuits whereby the lamps SL1–0 and TL1–0 of the cordless attendant position circuit of Fig. 39 are lighted steadily to indicate that the circuit is engaged. The circuits for these lamps extend from ground in Fig. 39 through the respective lamps SL1–0 and TL1–0 to correspondingly designated conductors leading into Fig. 5, where, for instance, conductor TL1–0 extends through resistance TL2, break contact 3 of relay R1T, make contact 6 of relay S1T, to battery through break contact 2 of relay HD, and where conductor SL1–0 extends through resistance SL2, make contact 3 of relay HM, break contact 4 of relay FF, break contact 5 of relay BY, break contact 3 of relay HD, break contact 4 of relay RS, to battery through make contact 11 of relay S1T. Relay S1T, in operating, also extends a ground in the left center of Fig. 5 over its make contact 10 and break contact 10 of relay SRT to the circuit involving conductor IT90 leading into the line and trunk hunting circuit of Fig. 33, by means of which ground trunk circuit 0 of Figs. 4 and 5 is made busy to any marker operation involved in its possible seizure. Also relay S1T, in operating, furnishes a start ground to the ring of the line circuit in the central office corresponding to trunk circuit 0 of Fig. 4 in a circuit extending from ground in the right center of Fig. 4, over make contact 1 of relay S1T, and break contacts 4 and 2 of relays SRT and P, to the ring lead R extending into the alarm and transfer circuit of Fig. 36, thence over make contact 2 of relay ATA and over the ring lead into the central office circuit of Fig. 31A. The central office circuit action resulting from this start ground will be described below.

Upon the operation of relay MC of the trunk circuit 0 in Fig. 5, a circuit is completed between the class of service portion of the marker in Fig. 26 and the trunk circuit in Fig. 5 whereby the class of service of the calling P.B.X party line circuit 30 of Fig. 35 is transferred to class of service registers in the trunk circuit. This circuit extends from ground in the dial pulse register 0 circuit of Fig. 14, over make contact 10 of relay TLA to conductor TL10 extending into Fig. 26, over make contact 10 of relay RCB0, to conductor TLAE extending into Fig. 5, thence over make contact 1 of relay MC, to battery through the winding of relay TLAT, which thereupon operates and extends a locking circuit for itself over its own make contact 1 to off-normal ground supplied through make contact 4 of relay S1T. The operation in the trunk circuit of Fig. 5 of relay TLAT is an indication to the trunk circuit that the calling P.B.X line circuit 30 of Fig. 35 has a toll allowed class of service.

In the meantime, certain relay operations are taking place in the marker circuit whereby a test is made to ascertain whether or not the trunk circuit of Figs. 4 and 5 is properly holding operated the hold magnets necessary to maintain the line to trunk connection over the crossbar switches. At the time that relays SMTA and SMTB of Fig. 37 operated, circuits previously described in detail hereinbefore were completed in Fig. 7 for causing the operation of the hold magnet test relays HMTA, HMTB, etc. after suitable time delays as determined by the slow operate characteristics of these relays. As soon as relays HMTA and HMTB operate circuits previously described heretofore are completed between Figs. 29, 30, 33 and 5 whereby the conductor IT90 in Fig. 5 is tested to ascertain if a ground is present thereon, the presence of a ground on conductor IT90 indicating that the trunk circuit is off normal and that the tip, ring and sleeve conductors connected thereto are properly connected over the crosspoints of the crossbar switch. This testing circuit involves the relays HMKA and HMKB of Fig. 29 and the circuits have previously been described in detail whereby these two relays are placed in parallel across the conductor 9 in Fig. 33 and which extends over make contact 12 of relay TK9 to conductor IT90 extending into Fig. 5; and, assuming that a ground is present on that conductor, the hold magnet check relays HMKA and HMKB of Fig. 29 will operate to indicate that the hold magnets are properly being held by the trunk circuit.

Upon the operation of relays HMKA and HMKB, the down check relays DCKA and DCKB of Fig. 50 will release, thereby causing the operation in Fig. 7 of the marker release relays RLA, RLB, etc. The operation of the marker release relays RLA, RLB, etc., causes the release in Fig. 5 of the marker connector relay MC of the trunk and initiates a series of operations heretofore described in detail whereby the marker and the dial pulse register of Figs. 14, 18 and 19 are completely released from the connection. In the process of releasing, the select magnets SM00 and SM09 of Fig. 3 are released as are select magnets SM80 and SM89 of Fig. 42, and the hold magnets THM08 and THM09 of Fig. 3 are released, thereby leaving the calling P.B.X line circuit of Fig. 35 interconnected with central office trunk 0 of Figs. 4 and 5 over the lower half of horizontal 9 of the crossbar switch network (tip, ring and sleeve conductors T09, R09 and S09) under the control of the operated line hold magnet LHM30 of Fig. 34 and trunk hold magnet THM00 of Fig. 3, both of which are held operated from the low resistance ground applied to the sleeve conductor by the trunk circuit in Fig. 5. As a result of the releasing operation of the marker the down check relays DCKA and DCKB of Fig. 50 are reoperated and locked, all as has been previously described hereinbefore in detail. Upon the release of the marker connector relay MC of the trunk circuit in Fig. 5, the relay HM and the trunk hold magnet THM00 are held operated in a circuit extending from the windings thereof (which also comprises conductor ST90), through break contact 8 of relay MC, make contact 1 of relay HM, the parallel break contacts 8 and 4 of respective relays P and R1T, and break contacts 4 and 6 of respective relays AC and HD, to off normal ground supplied from make contact 4 of relay S1T.

Upon the operation previously described of relay S1T in the trunk circuit of Fig. 4, ground is extended from Fig. 4 over make contact 1 of relay S1T, and break contacts of 4 and 2 of respective relays SRT and P, to the ring lead R of the trunk extending towards the central office, thence into Fig. 36 and over make contact 2 of relay ATA of the alarm transfer and test circuit, to the ring lead R leading into the central office of Fig. 31A, and thence to battery through break contact 2 of line hold magnet LH and the winding of line relay L. Line relay L operates in this circuit and, by closing its make contact 1, initiates a series of operations whereby the tip and ring conductors from the P.B.X central office trunk are extended to an originating register circuit in a crossbar type central office such as fully described in Patent 2,585,904 to A. J. Busch of February 19, 1952. The originating register of the central office supplies second dial tone to the tip and ring conductors extending back to the P.B.X circuit. When the tip conductor of the P.B.X central office trunk is extended to the originating register of the crossbar office it is terminated in a ground connection through part of the dial tone transformer in the originating register. This ground extends back over the tip conductor to the tip conductor T of trunk circuit 0 in Fig. 4, and thence through the upper winding of relay H, make contact 2 of relay S1T, break contact 2 of relay SRT, to battery through resistance H, thereby causing the operation of relay H. Relay H, in operating, causes the operation of relay CT in Fig. 4 in a circuit extending from ground over make contact 1 of relay H, break contact 3 of relay FF, break contact 4 of relay P, to battery through the winding of the slow release relay CT, which thereupon operates. Relay CT, in operating, causes the operation of relay SRT in an obvious manner over make contact 10 of relay CT and relay CT prepares a locking circuit for itself extending from the left side of its winding through break contact 4 of relay P, make contact 4 of relay CT, and to ground over make contacts 4 and 1 of respective relays SRT and S1T. The operation of relay SRT causes the release of relay H and in Fig. 5 applies ground over its make contact 10 back to the conductor IT90 to maintain the trunk circuit of Figs. 4 and 5 busy to the marker of the P.B.X. Relay SRT, in operating, also in Fig. 5 over its make contact 6A supplements the off normal ground supplied by make contact 4 of relay S1T. Relay SRT, in operating, also completes a circuit in Fig. 5 over its make contact 12 to maintain steady operation of the lamp TL1–0 in the cordless position circuit of Fig. 39 independently of the condition of relay S1T of Fig. 4. Also the operation of relay SRT removes the start ground from the ring side of the trunk circuit extending towards the central office. In view of the fact that relay TLAT of Fig. 5 is operated, the ring side of the trunk circuit from the crossbar switch of Fig. 3 extends in Fig. 4 over break contact 6 of relay BY and break contact 2 of relay RS, make contact 2 of relay TLAT, and make contact 8 of relay SRT, etc., thereby shunting the ring lead through the trunk circuit around the circuit of relay P, the purpose of which will be explained hereinafter in connection with calls from line circuits to central office trunks where the line circuits are not arranged for toll allowed service.

The operation of the cut through relay CT of Fig. 4 completes a circuit between the originating register of the central office (Fig. 31A) and the P.B.X calling line circuit 30 of Fig. 35 for supplying second dial tone from the central office to the P.B.X calling party. This circuit extends from ground at one of the windings of a dial tone transformer in the originating register of the central office, out over the tip lead in Fig. 31A to the tip lead of central office trunk 0 in Fig. 36, make contact 1 of relay ATA, tip conductor T to Fig. 5, through make contact 6 of relay CT, break contact 6 of relay FF, through the winding of relay S (which thereupon remains operated), break contacts 5 and 3 of relays HD and AC, break contacts 10 and 7 of relays RS and BY, over the tip conductor T to the calling P.B.X line circuit 30 of Fig. 35, through the circuit loop at the instrument at this station, back over the ring lead R, through the crossbar switches to the ring lead R of the trunk circuit in Fig. 4, thence through break contact 6 of relay BY, break contact 2 of relay RS, make contact 2 of relay TLAT, make contact 8 of relay SRT, break contacts 1, 9 and 7 of relays HD, AC and HD, break contact 8 of relay FF, and make contact 8 of relay CT to the ring lead R extending into Fig. 36, and thence into Fig. 31A to battery through another winding of the dial tone transformer in the originating register circuit of the crossbar central office in Fig. 31A. Upon receiving second dial tone from the central office, the calling P.B.X line circuit party 30 of Fig. 35 may continue to dial additional digits to the extent of the class of service allotted thereto.

*Completing connection to local central office facility*

In view of the fact that the calling P.B.X line circuit 30 of Fig. 35 does not have a restricted class of service the P.B.X party thereat is permitted to dial directly into the central office in response to second dial tone and thereby make connection with any local subscriber terminating in that office. The P.B.X line circuit 30 will dial over the P.B.X central office trunk circuit 0 of Figs. 4 and 5 and into the originating register circuit of the crossbar central office of Fig. 31A the seven or eight (depending upon whether or not the called subscriber is on a party line) digits usually required for making connection with a local central office subscriber. Relay S of Fig. 4 will follow the line pulses but this will not affect the status of trunk circuit 0 of Figs. 4 and 5 due to the slow release characteristic of relay S1T of Fig. 4. As soon as the originating register has received sufficient digits to complete the call the services of a marker circuit in the central office are requested; and, as completely described in the above mentioned Busch patent, the marker releases the originating register and proceeds to make a connection between the tip and ring conductors of the P.B.X central office trunk, through an intra-office trunk in the central office, to the called subscriber indicated as SUB in Fig. 31A. As is well known this connection extends from the tip and ring conductors T and R from the P.B.X central office trunk entering on the upper right-hand side of Fig. 31A, over crossbar switches indicated as the line link switch LL, over a line link to a line junctor switch LJ, thence by means of a junctor to the trunk junctor switch TJ, and over a trunk link to the trunk switch TS, thence through the intra-office trunk and again out over trunk switches, trunk links, junctor switches, a junctor and line links to the line link frame where the called subscriber's line circuit terminates, and thence to the called subscriber station. As soon as this connection is put through, relay SUP of the intra-office trunk circuit of Fig. 31A operates in a circuit extending from ground through its upper winding over the tip conductor T, back to the P.B.X central office trunk through the winding of the S relay of Fig. 4 (remaining operated), thence over the loop at the calling P.B.X line circuit 30, back to the P.B.X central office trunk circuit 0 on the ring lead, and out over the ring lead to the central office, and thence to battery through the lower winding of relay SUP of the intra-office trunk. Relay SUP, in operating, completes a circuit for operating relay S1 of the intra-office trunk from ground in Fig. 31A in the intra-office trunk circuit, over the parallel break contacts 9 and 6 of relays CH and RC, over make contact 2 of relay SUP to battery through the winding of relay S1, which thereupon operates and, by means of its make contacts 1 and 2, applies ground respectively through resistances A and B to the sleeve conductors of the originating and terminating sections of the crossbar switch connection in the central office for holding operated all of the hold magnets associated with the various switches in these trains. Ringing current is supplied to the called subscriber in Fig. 31A who thereupon lifts the receiver at his station, closing a circuit from the subscriber station loop through the upper and lower windings of relay CS of the intra-office trunk, which thereupon operates. Subsequent to the operation of the relay CS, relay CH is operated and locked over its make contact 7 to ground, over the parallel make contacts 6, 2 and 1 of respective relays S1, CS and SUP; and, relay CH, in operating, completes a circuit from ground over its make contact 4 and break contact 2 of relay RC to supplement the sleeve holding ground on the terminating end of the intra-office trunk connection in the central office.

The calling P.B.X line circuit 30 of Fig. 35 may now hold the desired conversation with the called central office local subscriber shown in Fig. 31A, talking battery being supplied to the called subscriber in Fig. 31A from battery and ground through the windings of relay CS, and talking battery being supplied to the calling P.B.X line circuit 30 of Fig. 35 through the windings of relay SUP of the intra-office trunk circuit in Fig. 31A, the conversation taking place over the tip and ring conductors through the respective condensers R and T of the intra-office trunk circuit in Fig. 31A.

If, at the completion of the conversation, the called subscriber in Fig. 31A releases first, relay CS releases and a short time delay thereafter relay RC is operated. Relay RC, in operating, causes the release of relay S1 and removes the sleeve holding ground from both the originating and terminating sections of the intra-office connection in the central office, thereby releasing all of the crossbar switch connections therethrough, which in turn causes the release of relay SUP followed by the release of relay CH, and eventually the central office circuits return to normal. The opening of the tip and ring loop at the central office causes the release of relay S of the central office trunk circuit of the P.B.X in Fig. 4 which, in releasing, causes the release of relay S1T in Fig. 4. Relay S1T, in releasing, causes the release of relay CT in Fig. 4, which in turn causes the release of relay SRT. The release of relays SRT and S1T causes the release in Fig. 5 of the class relay TLAT and relay HM and the trunk hold magnet THM00, thereby breaking the connection in Fig. 3 between the central office trunk circuit of Fig. 4 and the crossbar link leading to the calling P.B.X line circuit 30 of Fig. 35. When this crossbar link is broken the line hold magnet LHM30 of Fig. 35 releases, thereby returning all of the circuits to normal.

If the calling P.B.X line circuit 30 of Fig. 35 should hang up first after the conversation is completed, then relay SUP of the intra-office trunk circuit of Fig. 31A would release first, followed by the release of relay S1, and then the operation of relay RC etc., which in turn breaks down the entire connection in substantially the same fashion as above described.

*Completing connection to central office toll facility*

If the calling P.B.X line circuit 30 of Fig. 35, when receiving dial tone from the central office as previously described, desires to be connected to a toll facility rather than to be connected with a local subscriber in the central office, the party at P.B.X station 30 will dial a suitable toll code such as the digits 211. The originating register circuit of the crossbar central office recognizes this code 211 as requiring an extension of the P.B.X central office trunk circuit to a toll facility rather than to the intra-office trunk circuit shown in Fig. 31A. In the lower portion of Fig. 31A is shown such a toll facility which, for purposes of illustration, is shown as an operator cord and trunk circuit whereby connection may be made to a toll operator at any one of a number of well known toll switchboards. When the circuits of the central office make connection between the P.B.X central office trunk circuit of Figs. 4 and 5 with the operator cord and trunk circuit, which as shown may be connected into the crossbar switch network at the central office at the same point indicated by the dash line AA, the line loop through the calling P.B.X station equipment in Fig. 35 causes the operation of relay L of the cord and trunk circuit in an obvious fashion over break contacts 1 and 2 of the trunk sleeve relay TS. Relay L, in operating, causes the operation of relay S1P in an obvious fashion over make contact 2 of relay L, and causes the call lamp CL at the operator's position to be lighted over make contact 1 of relay L. Relay S1P, in operating, completes a circuit from ground through resistance A and over make contact 1 of relay S1P to the sleeve conductor extending back over the switch train of the central office to hold operated the hold magnets associated with the crossbar switch interconnection between the cord and trunk circuit of the toll facility and the central office trunk circuit of the P.B.X of Figs. 4 and 5.

It will be noted, by comparing the L relay of the cord and trunk circuit in Fig. 31A with the SUP relay of the intra-office trunk circuit of Fig. 31A, that battery and ground have been reversed over the tip and ring conductor back to the central office trunk circuit of the P.B.X. This battery and ground reversal is used to distinguish, in the trunk circuit of the P.B.X in Figs. 4 and 5, between those P.B.X calling line circuits which may or may not be permitted to extend a connection to a toll facility. With the toll allowed class relay TLAT of the trunk circuit of Fig. 5 operated, this battery reversal situation has no effect upon the trunk circuit of Figs. 4 and 5 because relay P of Fig. 4, which is used to detect such a battery reversal, is ineffective due to the fact that make contact 2 of relay TLAT short circuits the P relay circuit. However, as will be explained hereinafter, if the calling P.B.X line circuit were a toll denied station instead of a toll allowed station, the class relay TLAT of Fig. 5 would not be operated, and in this instance the P relay of Fig. 4 would be involved in the ring lead of the trunk circuit of Figs. 4 and 5 and would detect the battery reversal supplied through the L relay windings of the cord and trunk circuit of Fig. 31A. This action, as will be explained, will cause a refusal of the toll facility to the P.B.X line circuit and will extend the P.B.X line circuit to a busy tone in the P.B.X central office trunk circuit.

Returning now to the toll facility situation, in Fig. 31A upon the lighting of the call lamp CL and when the toll operator is available to complete the connection, she will insert the answer plug in the answer jack in response to this incoming call. This action completes a circuit over the sleeve contacts of the jack and plug arrangement in an obvious fashion for operating the cord sleeve relay CS0 in series with the trunk sleeve relay TS. The operation of the trunk sleeve relay TS supplies over its make contact 3 an additional holding battery for maintaining operated relay S1P and by means of its break contacts 1 and 2 opens the circuit to the line relay L, thereby releasing it and extinguishing the call lamp CL. The tip and ring conductors are now extended over the tip and ring contacts of the answer plug and jack, over respective contacts 2 and 3 of the ring key, to the tip and ring conductors T and R of the operator cord circuit, over make contacts 2 and 3 of the cord sleeve relay CS0, thence to battery and ground through the respective right-hand upper and right-hand lower windings of the retard coil RC and the respective upper and lower windings of the supervisory relay SOP of the cord circuit, thereby causing the supervisory relay SOP to operate and to cause the lighting of the supervisory lamp SL of the cord circuit. It will be noted that the battery and ground supplied to the tip and ring conductor back to the P.B.X from the windings of the supervisory relay SOP are in the same reversed sense as were the battery and grounds supplied from the line relay L of the operator cord circuit. The toll operator may now, by operating the TLK key, connect her operator's telephone set in circuit with the left-hand windings of the retard coil RC, and thence to the cord and trunk circuit whereby she may ascertain from the calling P.B.X line circuit 30 the information required to extend the desired toll connection.

When the toll operator has answered the call by means of her trunk and cord circuit of Fig. 31A and has ascertained the information required to complete the desired connection, it may be that there is a slight delay, in which event the toll operator will so instruct the calling P.B.X party at line circuit 30 of Fig. 35. Normally, under these circumstances, the calling P.B.X party will remain off hook and wait for the toll operator to complete the connection. However, such a wait may be an inconvenience to the calling P.B.X party and the circuits of the present P.B.X are arranged whereby a toll allowed class of calling P.B.X party may hang up under such conditions without breaking down the connection to the toll operator. In this case the toll operator may ring back on the line and cause the ringer at the P.B.X line circuit 30 of Fig. 35 to call the calling P.B.X party back on the toll line when the connection is completed. Under these circumstances this selective re-ring to the calling toll allowed P.B.X party will not alert the P.B.X attendant as would normally be the case for any ringing from a central office back over a trunk circuit to the P.B.X. It will be noticed in description provided hereinafter that in the event that the calling P.B.X party is not a toll allowed station but is a toll denied or restricted station, if that party hangs up upon instructions of a delay from the toll operator, the complete connection in the P.B.X will be broken down, whereupon any re-ring by the toll operator will be recognized at the P.B.X as a normal incoming call and will alert the attendant and will not cause a selective re-ring of this toll denied or restricted calling P.B.X on-hook station.

In the event of such a delay, should the calling toll allowed P.B.X station represented by line circuit 30 of Fig. 35 go on-hook, the line loop at the calling line circuit 30 will be broken, thereby releasing the supervisory relay S in the central office trunk circuit of Fig. 4. Relay S of Fig. 4, in releasing, causes the release in Fig. 4 of relay S1T, thereby to extinguish the lamp SL1–0 in the attendant's cordless position circuit of Fig. 39, and to complete a circuit whereby the H relay in the central office trunk of Fig. 4 will operate over the tip and ring loop to battery and ground through the windings of the supervisory relay SOP in the operator cord and trunk circuit of Fig. 31A. This circuit for relay H extends from the tip conductor of the central office trunk in Fig. 4, through the upper winding of relay H, over break contact 2 of relay S1T, through the lower winding of relay H, to the ring conductor of the central office trunk of Fig. 4, thence over the tip and ring loop to the supervisory relay SOP in the operator cord circuit of Fig. 31A. Upon the release of relay S1T, the energizing winding of relay CT in Fig. 4 is opened, thereby permitting relay CT to start to release. However, relay CT is a slow-release relay and relay H of Fig. 4 will reoperate before relay CT can release, thereby completing a circuit for maintaining relay CT operated extending from ground in Fig. 4, over make contact 1 of relay H, and break contacts 3 and 4 of respective relays FF and P, to the winding of relay CT. When the toll operator is ready to complete the connection back to the calling P.B.X party, and ascertains that the party is no longer on the line, the toll operator may momentarily acutate her RNG key shown in Fig. 31A, thereby to apply over the tip and ring conductors back to the P.B.X a ringing signal which, as will be appreciated with reference to the central office trunk circuit of Fig. 4, maintains relay H operated (by virtue of the direct current battery potential involved in the signalling current) and causes the operation of relay R of Fig. 4 (by means of the alternating superimposed component in the ringing signal), as well as causing the bell at the calling P.B.X line circuit 30 of Fig. 35 to be rung over the tip and ring leads extending thereto from the central office trunk 0 of Fig. 4.

The audible ringing signal is not supplied to the attendant at the cordless position circuit because, as will be noted in the lower right hand corner of Fig. 4, the AC/DC AUD signal supplied over conductor CR and through make contact 1 of relay R1T to the BZ conductor, extending into Fig. 39 and through the ringing device of the attendant position, is not a complete circuit because the relay R1T is not operated. In Fig. 5 the operating circuit for relay R1T extends from battery through the winding thereof and over make contact 6 of relay R but at this point the circuit is not completed because relay TLAT is operated on a toll allowed class of service and the connector ACAT is not operated because the attendant is not involved in this connection. It will be noted, since relay SRT remains operated, that ground is still supplied to the off normal conductor of the trunk circuit in Fig. 5 over make contact 6A of relay SRT. Therefore, the connection back through the crossbar switches to the calling P.B.X line circuit 30 (which has disconnected) remains held as long as the toll operator holds her circuit off normal in Fig. 31A. After the short ring interval caused by the operator in Fig. 31A momentarily operating the ring signal key, this key is returned to normal, thereby reoperating the supervisory relay SOP of the operator cord circuit and relighting the supervisory lamp SL in Fig. 31A, and again permitting the H relay of the central office trunk circuit of Fig. 4 to be held operated in series with the windings of the toll operator cord supervisory relay SOP of Fig. 31A.

When the P.B.X line circuit 30 answers the re-ring signal the station loop is again closed to permit the reoperation of the S relay of the P.B.X central office trunk circuit in Fig. 4. Relay S, in operating, causes the reoperation in Fig. 4 of relay S1T, which in turn causes the lamp SL1–0 of the cordless position circuit in Fig. 39 to again light steadily. At such time as the calling P.B.X line circuit 30 of Fig. 35 answered the re-ring signal, thereby causing the reoperation of the trunk circuit of Fig. 4 of relays S and S1T, the relay H released, thereby again putting the locking circuit of the cut through relay CT of Fig. 4 under the control of its own make contacts as well as make contact of relays S1T and SRT.

When the desired conversation has been completed and the toll operator is satisfied that the parties are finished, she will take down the plug and jack connections which have been built up in her trunk and cord circuit shown in Fig. 31A, thereby causing the release in Fig. 31A of all of the operated relays associated with her circuits, extinguishing the lighted lamps, and removing from the sleeve conductor extending back to the P.B.X the holding ground supplied over make contact 1 of relay S1P. In the meantime, with reference to the P.B.X central office trunk circuit of Figs. 4 and 5, when the calling line circuit 30 of Fig. 35 disconnects the S relay of Fig. 4 will release, thereby causing the release of relay S1T in Fig. 4. Since the H relay of Fig. 4 cannot operate over the now broken loop through the toll operator's cord circuit in Fig. 31A, relay CT releases, which in turn causes the release of relay SRT of Fig. 4. The release of relays S1T and SRT of Fig. 4 causes the release in Fig. 5 of relays TLAT and HM and the release in Figs. 5 and 35 of the respective trunk hold magnet THM00 and line hold magnet LHM30, thereby causing a complete breakdown of the interconnection over the P.B.X crossbar network between line circuit 30 of Fig. 35 and the central office trunk circuit of Figs. 4 and 5, returning all of the circuits of the P.B.X to normal, as well as extinguishing the lamps SL1–0 and TL1–0 in the P.B.X attendant's cordless position circuit of Fig. 39.

(F) P.B.X LINE (TOLL DENIED) TO CENTRAL OFFICE TRUNK

If a calling P.B.X station having a toll denied class of service, such as line circuit 33 of Fig. 35, should desire to make a connection with the central office of Fig. 31A by means of a P.B.X central office trunk circuit, such as the trunk circuit 0 of Figs. 4 and 5, the details whereby this is accomplished are exactly the same as those above described with respect to such a call placed from the toll allowed P.B.X line circuit 30 of Fig. 35, with the exception of a few details which have a bearing upon the circuit action in the event that this toll denied line circuit 33 of Fig. 35 should attempt to make connection with the toll facility shown in the lower part of Fig. 31A.

When connection is made between the calling P.B.X line circuit 33 of Fig. 35 and the dial pulse register circuit of Figs. 14, 18 and 19 the toll denied class of this particular line is registered in the dial pulse register circuit by the operation of relay TLD in Fig. 14 in a circuit extending from battery on conductor CS33 (not shown in Fig. 25), extending into the punching sheet of Fig. 20, to the punching corresponding to class of service lead CS33, thence by means of a cross-connection to the punching corresponding to conductor TLD, extending back into Fig. 25, thence over the parallel make contacts 10 of relays RGA and RGB, and over make contact 9 of relay RA0A, to conductor TLD0 extending into Fig. 14, and thence through the winding of relay TLD to ground. Relay TLD of Fig. 14 operates in this circuit and locks over its own make contact 1 to off-normal battery supplied through cake contact 10 of relay ON. When the dial pulse register 0 of Figs. 14, 18 and 19 effects the seizure of the P.B.X marker circuit and the consequent connection of the calling line circuit 33 of Fig. 35 to and through the P.B.X central office trunk circuit 0 of Figs. 4 and 5, the toll allowed class of service relay TLAT of Fig. 5 is not operated by virtue of the fact that the class relay TLA of Fig. 14 in the dial pulse register was not operated on this call.

Due to the fact that the toll allowed class of service relay TLAT of central office trunk circuit 0 in Fig. 5 is not operated on a call of this nature from a toll denied station line circuit 33 of Fig. 35, two notable differences will occur in circuit operation as compared with that previously described above with respect to a similar call placed from a toll allowed station 30 of Fig. 35. One of these differences relates to the fact that if the present toll denied station 33 attempts to extend a connection through the central office of Fig. 31A to a toll facility, the calling P.B.X line circuit will be routed to a busy tone in the trunk circuit of Fig. 4. The other difference relates to the matter of a re-ring by a toll operator toward the P.B.X in an attempt to complete a desired connection requested by a toll denied P.B.X line which, as will be explained hereinafter, may be completed with the assistance of the P.B.X attendant. In the event that such a toll connection is completed to the toll operator in the central office through the assistance of a P.B.X attendant, and in the event that a toll denied station should disconnect while waiting for the toll operator to complete the connection a re-ring by the toll operator will alert the P.B.X attendant and will not cause a selective re-ring of the toll denied P.B.X line as was the case previously described for a toll allowed on hook station awaiting a toll circuit re-ring.

A toll denied station such as station 33 of Fig. 35 may complete a call of an intra-office trunk nature to a local central office subscriber, as was the case with the previously described toll allowed station making the same call, in which event the circuit action is precisely the same as previously described except for the fact that the P relay of the P.B.X central office trunk circuit 0 of Fig. 4 is involved in the ring lead circuit of that trunk. It will be noted that the ring lead entering Fig. 4 from the alarm and transfer circuit extends over make contacts 8 of relay CT, break contact 8 of relay FF, break contacts 7, 9 and 1 of relays HD, AC and HD, thence over make contact 8 of relay SRT, and break contact 2 of relay TLAT, to the right-hand side of diode A and to the left-hand side of the lower winding of relay P through break contact 5 of relay MC, and that the ring conductor from the crossbar switch network of Fig. 3 extends into the trunk circuit of Fig. 4 and over the break contact 6 of relay BY, and break contact 2 of relay RS, to the interconnection between the left-hand electrodes of diodes A and B. These diodes A and B are unidirectional current carrying devices which, with reference for instance to diode A, will represent a new impedance in the event that the left-hand electrode thereof is more positive than the right-hand electrode and will represent a fairly high impedance in the event of a reversal of this potential condition. On a connection of an intra-office trunk nature to the local central office it will be apparent, by reference to Fig. 31A, that ground is supplied back over the tip lead from the upper winding of a relay such as the relay SUP of the intra-office trunk circuit in Fig. 31A, and that battery is supplied through the lower winding of such a relay to the ring lead. With reference to Fig. 4, ground coming in on the tip lead of the trunk will be extended through make contact 6 of relay CT, break contact 6 of relay FF, through the winding of relay S, break contacts 5, 3, 10 and 7 of respective relays HD, AC, RS and BY, thence over the tip and ring loop through the instrument at P.B.X station 33 of Fig. 35, back into Fig. 4 over the ring lead and over a circuit previously described to the left-hand electrode of diode A. It will also be apparent that battery supplied from the central office will enter the trunk circuit of Fig. 4 on the ring lead and over a circuit previously described through break contact 2 of relay TLAT to the right-hand side of diode A. It is obvious under these circumstances that the left-hand side of diode A is more positive than right electrode of diode A because the left electrode is at ground potential or thereabouts and the right-hand electrode is at some potential in the neighborhood of minus 48 volts, which is the usual battery potential in the central office. Under these circumstances diode A will represent a very low impedance thereby presenting a low impedance shunt around the circuits of the windings of relay P and will prevent relay P from operating because of any battery and ground conditions supplied thereto from the local central office.

In the event that the toll denied station 33 of Fig. 35, by dialing the toll code 211 into the originating register of a central office such as in Fig. 31A, attempts to seize a toll facility, such as the operator cord and trunk circuit shown in Fig. 31A, it will be apparent that battery and ground respectively are returned to the P.B.X over the trunk circuit from the toll facility in the reverse order as above described with reference to the intra-office trunk circuit. Under these circumstances battery will be supplied to the tip lead from a relay such as the L relay in the trunk circuit of the operator cord and trunk circuit of Fig. 31A or from the upper winding of the supervisory relay SOP in the cord circuit of Fig. 31A, and that ground will be supplied through the lower winding of such a relay to the ring lead. In Fig. 4 battery on the tip and ground on the ring will be respectively supplied through circuits previously described to the corresponding left and right-hand electrodes of diode A. In this instance the left-hand electrode of diode A is far more negative than the right-hand side, thereby making diode A a very high impedance. However, the negative battery on the left-hand electrode of diode A is also on the left-hand electrode of diode B and the ground on the right-hand electrode of diode A is extended through break contact 5 of relay MC through the lower winding of relay P to the right-hand electrode of diode B. It will be noted that diode B is poled oppositely to diode A and under these circumstances will represent a fairly low impedance because its right-hand electrode is more positive than its left-hand electrode. Relay P operates in this circuit by virtue of its being in series with the ring lead through its lower winding. Relay P, in operating, extends a locking circuit for itself from battery, through its upper winding, over its own make contact 1, to conductor P extending into Fig. 5, and over break contacts 8 of respective relays RS and HD, to off-normal ground supplied by make contacts 6A and 4 of relays SRT and S1T. Relay P, in operating, causes the release of relay CT, which in turn causes the release in Fig. 4 of relay SRT. The release of relay CT opens the tip and ring leads from the circuit of Fig. 4 towards the toll office and completes circuits for maintaining relay S of the trunk circuit of Fig. 4 operated extending from battery in Fig. 4, through resistance BF, and break contact 8 of relay CT, back to the ring lead R of the calling line circuit, thence over the ring-tip loop, and back over the tip lead T into Fig. 4, and thence through the winding of relay S to ground through break contacts 6 of relay FF, 6 of relay CT and 6B of relay SRT.

The operation of relay CT, in causing the opening of the tip and ring conductors of the trunk towards the central office, provides a disconnect signal to the toll operator, who thereupon breaks down the connection at her end of this system if she has not already done so. Upon the operation of the relay P in the trunk circuit of Fig. 4 , a circuit is completed whereby busy tone is supplied to the calling P.B.X line circuit 33 of Fig. 35 extending from busy tone in Fig. 4, through condenser TN, over make contact 3 of relay P, and through break contacts 8 of relays CT and FF, back to the ring side of the calling P.B.X line loop to provide busy tone to the calling P.B.X party. The party at P.B.X line circuit 33 should disconnect in response to this busy tone and place this toll call in the proper manner, namely by means of the assistance of the P.B.X attendant, as will be described hereinafter. The disconnection by the P.B.X line circuit 33 causes the release in Fig. 4 of relay S, which in turn causes the release of relay S1T, which in turn causes the release in Fig. 5 of relay HM and trunk hold magnet THM00 and the release in Fig. 4 of relay P, thereby returning the P.B.X central office trunk circuit completely to normal. When the trunk circuit is returned to normal the holding ground is removed from the line hold magnet LHM33 (not shown) in Fig. 35, thereby breaking down the entire connection between the calling P.B.X line circuit 33 of Fig. 35 and the central office trunk circuit 0 of Figs. 4 and 5.

(G) P.B.X LINE (RESTRICTED) TO CENTRAL OFFICE TRUNK

In the event that a restricted P.B.X station desires to place a call beyond the P.B.X through a central office trunk circuit, either to a local central office subscriber or to a toll facility, the restricted P.B.X station should do so with the assistance of the P.B.X attendant by dialing the operator digit 0. If the restricted P.B.X station attempts to dial directly to and through a central office trunk, such as trunk circuit 0 of Figs. 4 and 5, without employing the assistance of the P.B.X attendant, the result of the dialing of the digit 9 to seize such a trunk circuit will be to cause the call to be routed to a P.B.X attendant on an intercept basis.

As an example of a number of different situations raised by the attempt of a restricted P.B.X station to dial to and through a central office trunk to central office facilities such as are shown in Fig. 31A, it will be assumed that the call is placed by line circuit 34 of Fig. 35 which, as will be noted in Fig. 20, does not have its class of service terminal (attached to lead CS34) connected to any of the class of service punchings leading to Fig. 25. It will be assumed that the calling P.B.X line circuit 34 of Fig. 35 has been interconnected with dial pulse register 0 of Figs. 14, 18 and 19 for purposes of the dial tone connection and that the lower half of level 9 of the crossbar switch links has been used for this interconnection. This means that the tip, ring and sleeve conductors from line circuit 34 of Fig. 35 will extend into Fig. 34 and up along the vertical corresponding to line hold magnet LHM34 (not shown), over the lower three crosspoints corresponding to select magnet SM39, to conductors T09, R09 and S09 extending across Figs. 27 and 23 into Fig. 3, and thence over the lower three cross-points corresponding to hold magnet THM08 to the tip, ring and sleeve conductors leading into the dial pulse register of Fig. 18. The calling P.B.X line circuit 34 of Fig. 35 receives dial tone over this interconnection and may proceed to dial the necessary digit 0 to call in the attendant for assistance in making this particular call.

*Connecting to attendant*

There are two ways in which the calling P.B.X restricted line circuit 34 of Fig. 35 may reach the P.B.X attendant. One of these is by dialing the operator digit 0, in which case the line circuit 34 will be routed to the cordless position circuit of Figs. 38 and 39 by means of an attendant trunk circuit, such as attendant trunk circuit 1 of Fig. 9; and, the other way is by attempting to dial directly to and through a central office trunk by dialing the trunk digit 9, whereupon the circuits will automatically treat this call on an intercept basis and will route the calling P.B.X line circuit 34 to the P.B.X attendant by means of an attendant trunk in a very slightly different fashion than would be the case for the dialing of the operator digit 0. Once having reached the P.B.X attendant by one of these two means the calling P.B.X line circuit 34 may request that the P.B.X attendant connect the calling P.B.X party with the desired connection, which could be to a local central office facility or to a central office toll facility. A description will be provided first of the manner and means whereby the attendant completes a connection to and through a central office trunk and this description will be followed by a description of the extension of this connection to either a local office central office facility or to a central office toll facility.

If the calling P.B.X line circuit 34 dials the operator digit 0, the pulse counting relays in the dial pulse register of Fig. 18 will be in the condition at the end of the dialing of this digit whereby the following relays will be operated: relays P2A, P3 and P5. Upon the release of relay RA in Fig. 18, at the end of the dialing of this first digit as heretofore explained in detail, the digit of 0 recorded in the pulse counting relays of Fig. 18 is transferred to the tens digit register of Fig. 19 by means of the operation of the tens digit relay TD0, which operates and locks in a manner previously described. Upon the operation of relay TD0, a circuit is completed in Fig. 19 for causing the operation of relay TRR extending from ground in Fig. 19, over break contact 8 of relay TMOR, make contact 2 of relay TD0, break contact 11 of relay TRR, to battery through the winding of relay TRR, which thereupon operates and extends a locking circuit for itself from the right-hand side of its winding to ground through the respective make contacts 12, 10 and 9 of relays TRR, SW and ON. Relay STR also operates as previously described and provides a holding ground from the right-hand side of its winding through make contact 12 of relay TRR to hold relay TRR operated independently of relay SW. Upon the operation of relay TRR, ground is extended from the right-hand side of make contact 2 of relay TD0, through make contact 5 of relay TRR and over break contact 5 of relay OT, to battery through the winding of relay OT, which operates and locks as previously described to off-normal ground. Relay OT, in operating, causes the operation of relay UD as previously described and relay UD also provides a locking circuit for itself to off-normal ground. Upon the operation of relay UD, the dial completion relay DC of Fig. 19 operates as previously described, thereby causing the operation in Fig. 11 of the tens selection relay R0, the operation of which initiates a chain of operations whereby the marker circuit is seized by dial pulse register 0 for completion of the present call.

The operation of the tens selection relay R0 of Fig. 11 initiates a chain of operations heretofore described in detail whereby the tens-end relays TEA0 through TEA3 and TEB0 through TEB3 of Fig. 11 are operated, thereby causing the operation in Fig. 10 of the dial pulse register 0 tens preference chain relay RP0 in series with the tens check relays TCK1 through TCK4. Also, the register preference auxiliary relay RPA0 of Fig. 12 is operated as previously described. In Fig. 14, with relays OT and TRR of Fig. 19 operated, battery is supplied over make contact 12 of relay DC and make contacts 10 and 6 of relay OT to conductors RCTA0 and RCTB0, extending into the sequence control circuit of Fig. 41 to cause the operation heretofore described of the register tens connector relays RCTA, RCTB, etc., of Fig. 41. The operation of the relays RCTA, RCTB, causes the operation in Fig. 12 of the relays RCA0 through RCE0, which in turn complete circuits extending between Fig. 19 and Fig. 12 for causing the operation of the relays TK0, TKA0 and TKB0 of Fig. 12. This circuit extends from ground on conductor T0–0 of Fig. 19 into Fig. 12, over make contact 4 of relay RCE0, through the parallel windings of relays TK0, TKA0, and TKB0, to battery through make contact 9 of relay RCE0. In the meantime in Fig. 17, upon the operation of the register preference auxiliary relay RPA0 of Fig. 12, relays RUCA and RUCB are operated as previously described. In Fig. 19, because of the operation of relays OT and TRR, circuits are completed for grounding conductors U9–0 and U5–0 extending between Fig. 19 and the units selection circuits of Figs. 17 and 16. In Fig. 18 ground extends over make contact 3 of relay ON, break contact 6 of relay TMOR, conductor UD into Fig. 19, and thence over make contacts 2 and 3 of relays OT and TRR to conductor U9–0, and over make contacts 12 and 1 of relays OT and TRR to conductor U5–0. Conductors U5–0 and U9–0 extend into Figs. 16 and 17, where conductor U5–0 extends in Fig. 16 over make contact 7 of relay RCC0 and make contact 7 of relay RUCB to battery through the winding of units relay U5, which thereupon operates, and where conductor U9–0 in Fig. 17 extends over make contacts 12 of relays RCC0 and RUCB to battery through the windings of units relay U9, which also operates. Upon the operation of at least one units relay the units-end relays UEA and UEB of Fig. 17 are operated as hereinbefore described.

The operation of relay U9 is of no consequence at present and can be disregarded. However, with respect to the operation of relay U5 in Fig. 16, it will be noted that the operating ground on conductor U5–0 from the dial pulse register circuit of Fig. 19 extends also over make contact 7 of relay RCC0 and over make contacts 7, 9 ad 10 of relay TKA0 to cause the operation of units relays U6 and U7 over respective make contacts 9 and 10 of relay RUCB. Upon the operation of units relays U5, U6 and U7 of Fig. 16, circuits are completed in Fig. 33 whereby the sleeve relays S5, S6 and S7 are allowed to test the hold magnet leads of the 3 attendant trunks, namely attendant trunk 0 of Fig. 43, attendant trunk 1 of Fig. 9 and attendant trunk 2 of Fig. 13. For instance, in Fig. 33 a circuit extends from ground, through the lower winding of sleeve relay S6, over make contact 12 of relay U6, to conductor 6, thence over make contact 9 of relay TK0 to conductor IT06 extending into the attendant trunk circuit 1 of Fig. 9, to the lower side of the winding of the attendant trunk hold magnet THM05. Similar circuits extend from Fig. 33 through the lower windings of sleeve relays S5 and S7 to the corresponding circuitry in similar attendant trunks of Figs. 43 and 13. As was the case previously described in connection with these tests by the sleeve relays of Figs. 30 and 33, if sleeve relay S6 of Fig. 33 finds a ground on conductor IT06 in the attendant trunk circuit of Fig. 9 relay S6 cannot operate, thereby indicating that attendant trunk circuit 1 is engaged at the moment. However, in the event that attendant trunk circuit 1 of Fig. 9 is available and idle, the lower winding of sleeve relay S6 of Fig. 33 will find a circuit in Fig. 9 to battery through the winding of trunk hold magnet THM05 and the sleeve relay S6 will operate in series with this hold magnet, the hold magnet THM05 not operating in series therewith. It will be noted in Fig. 33 that sleeve relay S5 enjoys the order of preference over sleeve relays S6 and S7 for the purpose of testing the hold magnet of an idle trunk corresponding to these sleeve relays. It will therefore be necessary to assume that attendant trunk circuit 0 of Fig. 43 is presently engaged in order that the sleeve relay S5 will be released so that sleeve relay S6 can cause the seizure of the idle attendant trunk circuit 1 of Fig. 9. The condition of sleeve relay S7 is of no particular consequence in this respect since it will make no difference in the subsequent circuit operation.

In the meantime, circuits have been completed in the select magnet control circuit of Fig. 37 for causing the operation of select magnet connector relays SMC0 and SMC8 in an obvious manner over respective make contacts 1 and 2 of relay TKB0. Upon the operation of these select magnet connector relays, circuits heretofore described in detail were completed in Fig. 37 for causing the energization of the windings of the select magnet timing relays SMTA and SMTB. Upon the operation of the select magnet connector relays SMC0 and SMC8 of Fig. 37, circuits also described in detail hereinbefore were completed between Figs. 6, 3 and 37 for causing the operation of select magnets on suitable ones of the crossbar switches whereby the idle attendant trunk circuit 1 of Fig. 9 may be interconnected with the same horizontal link through the crossbar switches (lower half of level 9) to which line circuit 34 of Fig. 35 is connected to dial pulse register 0 of Fig. 18 for the dial tone connection. On switch 0 of Fig. 3 select magnets SM00 and SM09 are operated and on switch 8 of Fig. 42 select magnets SM80 and SM89 are operated in circuits heretofore describe in detail. The operation of these four select magnets prepares switches 0 and 8 for the subsequent operation of one of the hold magnets corresponding to one of the attendant trunks such as hold magnet THM05 or THM06 in Fig. 3 or hold magnet THM80 in Fig. 42.

In the meantime, upon the operation of the sleeve relay S6 of Fig. 33 the sleeve end relays SEA, SEB of Fig. 32 are reoperated as previously described, thereby causing the release in Fig. 17 of the relays RUCA and RUCB, to in turn cause the release in Figs. 16 and 17 of the units relays U5, U6, U7 and U9, which in turn cause the release in Fig. 17 of the units end relays UEA and UEB. During the time of these relay operations and releases, etc. relays SMTA and SMTB of Fig. 37 will have operated, thereby initiating a series of operations involving the relays SMRA, SMRB, etc., of Fig. 7 whereby, as previously described, conductors such as conductors S10 and S13 in Fig. 30 are grounded for causing the operation of the hold magnet associated with the attendant trunk 1 of Fig. 9. Conductors S10 and S13 in Fig. 30 extend to the right across break contacts of all of the unoperated sleeve relays S0 through S4, thence through break contacts of relay ZU, to respective conductors S8 and S11 into Fig. 33, where these conductors extend over break contacts of sleeve relay S5. Conductor S8 then extends over make contact 4 of relay S6 and make contact 9 of relay SMRAA to conductor 6 and conductor S11 extends over make contacts 8 and 9 of respective relays S6 and SMRBA to conductor 6. Conductor 6 in Fig. 33 then extends over make contact 9 of relay TK0 to conductor IT06 extending into the attendant trunk circuit 1 of Fig. 9 to battery through the winding of the trunk hold magnet THM05, operating same.

The operation of hold magnet THM05 shown in Figs. 9 and 3 causes the tip, ring and sleeve conductors T, R and S of the attendant trunk circuit of Fig. 9 to be connected in Fig. 3 over the lower three crosspoints corresponding to select magnet SM00 and the lower three crosspoints corresponding to select magnet SM09, to the tip, ring and sleeve conductors T09, R09 and S09 constituting the crossbar link to which is conected the dial pulse register 0 circuit of Fig. 18 and the calling P.B.X line circuit 34 of Fig. 35. Shortly thereafter, as has been explained a number of times hereinbefore, the hold magnet test relays HMTA, HMTB, etc., of Fig. 7 operate and complete circuits whereby the hold magnet check relays HMKA and HMKB of Fig. 29 are connected in circuit to the conductor IT06 of Fig. 9 to determine whether or not the attendant trunk circuit 1 hold magnet THM05 is being held operated locally.

As soon as the attendant trunk circuit of Fig. 9 is connected over the crossbar switch network to the calling P.B.X line 34 of Fig. 35, the tip and ring loop is closed through the windings of relay AA of Fig. 9, the circuit extending in Fig. 9 from ground, through the upper winding of relay AA and over break contacts 8 and 2 of respective relays OUT and ACAA, to the tip conductor T extending to the calling P.B.X line circuit 34, back over the ring lead R into the trunk circuit of Fig. 9, and thence to battery through the lower winding of relay AA over break contacts 4 and 6 of relays ACAA and OUT. Relay AA operates in this circuit and completes a circuit for operating relay BA in Fig. 9 from ground, over the parallel break contacts 3 and 8 of relays HDA and TN and make contact 8 of relay AA to battery through the winding of relay BA. Relay BA, in operating, supplies ground over its make contact 8 to conductor IT06 in Fig. 9 to maintain operated the trunk hold magnet THM05, and completes a circuit from ground through the winding of relay SLA and make contact 9 of relay BA to the trunk sleeve conductor S extending back to the calling line circuit 34 of Fig. 35, to maintain operated the line hold magnet LHM34. When the circuits for the hold magnet check relays HMKA and HMKB are extended in parallel to conductor 6 in Fig. 33, and thence over make contact 9 of relay TK0 to conductor IT06 extending into Fig. 9, these check relays will be operated from the ground on the lower side of the winding of trunk hold magnet THM05. Hold magnet check relays HMKA and HMKB of Fig. 29, in operating, initiate a chain of operations heretofore described in detail whereby the marker and the dial pulse register 0 circuit are completely returned to normal and whereby all of the operated select magnets SM00 and SM09 of Fig. 3 and SM80 and SM89 of Fig. 42 are released and whereby the hold magnets THM08 and THM09 of Fig. 3 are released. This leaves the calling P.B.X line circuit 34 of Fig. 35 interconnected with the attendant trunk circuit 1 of Fig. 9 over the lower half of level 9 of the crossbar switch network by the operated hold magnets THM05 of Fig. 3 and LHM34 (not shown) of Fig. 34 under the control of the low impedance ground supplied from the winding of relay SLA in Fig. 9, and the ground supplied in Fig. 9 by the operated relay BA.

It will be recalled that it was assumed that attendant trunk circuit 0 of Fig. 43 was engaged at the time that a selection of an attendant trunk was desired. This was necessary because of the arrangement of the circuits in order to permit the selection of attendant trunk circuit 1 of Fig. 9 since it was shown in detail. In view of the seizure at the present time of the attendant trunk circuit 1 of Fig. 9, in order that the P.B.X attendant will be available to handle this particular call it will now be assumed that the attendant has been released from her job in connection with attendant trunk circuit 0 of Fig. 43. Of course, if the P.B.X attendant were still engaged with the attendant trunk circuit 0 of Fig. 43 the present call could wait. The operation in Fig. 9 of relay AA completes a circuit from battery in the lower right-hand corner of Fig. 9, through the 120 interruption-per-minute interrupter circuit, through make contact 6 of relay AA, break contact 4 of relay ONA, break contacts 4 and 10 of relays OUT and HDA, through resistance SL1 to conductor SL1–01, leading into the cordless position circuit of Fig. 39 and thence to ground through the lamp SL1–01, which will be flashed at the rate of 120 interruptions per minute. Relay BA of Fig. 9, in operating, completes a circuit from the ringing tone in Fig. 9, over conductor R1, through break contact 9 of relay ONA, make contact 11 of relay BA, break contact 11 of relay HDA to conductor BZ extending into Fig. 39, and thence through condenser BZ, the ringer, a break contact of the AUD SIG key, to ground over a make contact on the attendant's B jack, thereby causing the ringer to provide an audible tone to alert the attendant in addition to the flashing signal on lamp SL1–01. Part of the ringing signal in Fig. 9 is fed through condenser RT, make contact 3 of relay BA, and break contacts 8 and 9 of relays ONA and HDA to the ring side of the line and back to the calling P.B.X party at line circuit 34 of Fig. 35 so that the calling P.B.X party can hear the fact that the attendant is being rung. Relay BA, in operating, also extends ground over its make contact 6 and through break contact 12 of relay HDA to conductor IT01 into the line and trunk hunting circuit of Fig. 30 to make this attendant trunk circuit busy to the marker. It will be noted in the upper part of Fig. 9 that the operation of relay BA, by virtue of closing its make contacts 1 and 2, bridges break contacts 2 and 4 of relay ACAA thereby to keep relay AA operated when relay ACAA will have been operated at a later point in the discussion. The operation of relay BA also prepares other circuits, such as locking paths for relays ONA and HDA which become effective at a subsequent time in the circuit operations. No further circuit operations take place until such time as the P.B.X attendant by the use of her cordless position circuit shown in Figs. 38 and 39, answers the calling signals supplied to her visually and audibly that the attendant trunk circuit 1 of Fig. 9 has a request for her services.

In the event that the restricted line circuit 34 of Fig. 35 had attempted to connect to and through a central office trunk circuit by dialing the trunk digit 9, line circuit 34 would have been connected to an attendant trunk circuit, such as attendant trunk circuit 1 of Fig. 9, in the same manner as heretofore described in connection with the dialing by the P.B.X party of the operator digit 0. This particular kind of a connection would be handled on an intercept basis and only a few details of circuit operation differ from the above described situation. In the dial pulse register circuit of Fig. 19 the tens digit relay TD9 would have been operated as a result of the dialing of the digit 9. Upon the operation of the tens digit relay TD9, a circuit would have extended from ground in Fig. 19, over break contact 8 of relay TMOR, over make contact 2 of relay TD9, over break contact 8 of relay TLD, and break contact 5 of relay OT, to battery through the winding of relay OT, which thereupon operates and locks in a circuit previously described. Relay OT, in operating, causes the operation of relay UD in Fig. 19 as previously described, which in turn causes the operation of the dial completion relay DC of Fig. 19, thereby causing the marker to be seized for completion of this call. It will be noted in Fig. 19 that because relay TLD of Fig. 14 is released, the ground supplied through make contact 2 of relay TD9 extends through break contact 8 of relay TLD to the conductor T0–0 which extends into Fig. 12 to cause the operation of the tens connector relays TK0, TKA0 and TKB0, exactly as was the case above described when the calling P.B.X party dialed the operator digit 0 to secure the services of an attendant. Due to the fact that the relay OT in Fig. 19 is operated and relay TRR is released (whereas it was operated in the case of the dialing of the digit 0), the conductors in the lower left-hand corner of Fig. 19 which are grounded into the units selection circuit of Figs. 15, 16 and 17 will now be conductors U1–0 and U4–0, whereas in the previous instance they were conductors U9–0 and U5–0. The conductors grounded under the present circumstance (conductors U1–0 and U4–0) extend into Figs. 15 and 16 to cause the operation of the units selection relays U1 and U4, it being noted in Fig. 15 that the operating circuit for relay U1 also extends over make contact 2 of relay TKA0 and make contacts 1 and 3 of relay TKA0 to cause the operation of units relays U0 and U2. The operation of units selection relay U4 is of no consequence at this particular point.

With reference to Fig. 33 it will be recalled that the operation of the units relays U5, U6 and U7 of the units selection circuit of Fig. 16, under the case where the P.B.X party had dialed 0, caused the sleeve relays S5, S6 and S7 of Fig. 33 to extend circuits through their lower windings to conductors IT05 into Fig. 43, IT06 into Fig. 9, and IT07 into Fig. 13 to test for the busy or idle condition of these three respective attendant trunk circuits. Under the present circumstances, in view of the fact that relays U0, U1 and U2 of Fig. 15 are operated, it will be apparent that in Fig. 30 circuits are completed through the lower windings of sleeve relays S0, S1 and S2 and over respective make contacts 12, 5 and 12 of units relays U0, U1 and U2 to conductors 0, 1 and 2 and thence over respective make contacts 1, 2 and 3 of relay TK0 to conductors IT00 into Fig. 43, IT01 into Fig. 9 and to conductor IT02 into Fig. 13. Any attendant trunk circuit, such as the one of Fig. 9, which is busy as previously explained will have a ground applied to its conductor IT01 extending into Fig. 30 over the make contact 6 of the BA relay in Fig. 9. If the trunk is idle the conductor IT01 will extend in Fig. 9 over break contacts 12, 6 and 7 of respective relays HDA, BA and ONA to battery through the upper winding of relay TN. With respect to Fig. 30, it will be assumed again that the attendant trunk circuit 0 of Fig. 43 is busy, thereby causing the sleeve relay S1 of Fig. 30 to be first preference, whereby relay S1 will operate in series with the TN relay of the trunk of Fig. 9, relay TN not operating in this circuit.

At such time as the operating ground is supplied to conductor IT01 from the line and trunk hunting circuit of Fig. 30, relay TN of the trunk circuit in Fig. 9 will operate and in doing so will complete a circuit for operating the trunk hold magnet THM05 of Fig. 9 in a circuit extending from ground in Fig. 9, over make contact 6 of relay TN, break contact 6 of relay HDA, to battery through the winding of hold magnet THM05, which thereupon operates. The operation of the TN relay of Fig. 9, in causing the operation of hold magnet THM05, completes the tip, ring and sleeve connection between the attendant trunk circuit 1 of Fig. 9 and the calling P.B.X line circuit 34 of Fig. 35 resulting, as previously described, in the consecutive operations of relays AA and BA of Fig. 9. The marker and dial pulse register circuits are released as heretofore described. The operation of relay TN in addition to the operation of relay AA of Fig. 9 causes the 120 i.p.m. interruption battery to be supplied not only through resistance SL1 to conductor SL1–01 of Fig. 9 but also in Fig. 9 through break contact 7 of relay HDA and make contact 2 of relay TN, through the TL1 resistance to conductor TL1–01 extending into Fig. 39 to cause the interrupted flashing of lamp TL1–01 in addition to the flashing of the lamp SL1–01.

The P.B.X attendant will know whether or not the attendant trunk circuit 1 of Fig. 9 has been seized on a regular operator digit 0 basis or on an intercept basis by virtue of the flashing of one or both of the lamps in Fig. 39. If the station lamp SL1–01 flashes alone it is a straightforward 0 digit call. On the other hand, if both the station lamp SL1–01 and the trunk lamp TL1–01 flash, the attendant will know that this trunk circuit was seized on an intercept basis. In the trunk circuit of Fig. 9, until such time as the P.B.X attendant answers the call, if the call was placed on a digit 0 basis relays AA and BA will be operated in addition to the trunk hold magnet THM05. However, in the event that the trunk circuit of Fig. 9 was seized on an intercept basis relay TN of Fig. 9 will be operated in addition, thereby providing the means whereby the trunk circuit of Fig. 9 has a way of remembering in which manner it was seized.

*Completing connection to central office trunk*

In the cordless attendant position circuit of Figs. 38 and 39 when the P.B.X attendant desires to answer the attendant trunk call, indicated by the flashing of lamp SL1–01 of Fig. 39 (and lamp TL1–01 if the call is an intercept call) and the ringing of the ringer shown in Fig. 39, the attendant will operate the pick-up key associated with this particular trunk. Contacts of the various pick-up keys are shown in Fig. 38 in the center and Fig. 39 in the lower right-hand corner. Upon the operation of pick-up key 3 a circuit is completed from ground in the lower right-hand corner of Fig. 39, over break contacts 8 and 5 of relays SP and NTP, over a make contact of the attendant's A jack, break contacts of pick-up keys 1 and 2, and the make contact of pick-up key 3, to conductor ACA–01 extending into Fig. 9, to battery through the upper winding of relay ACAA, which thereupon operates and remains operated as long as the associated pick-up key is operated. Relay ACAA, in operating, completes a circuit for operating relay ONA in Fig. 9 from ground in Fig. 9, over make contact 1 of relay ACAA, break contact 2 of relay HDA, to battery through the winding of relay ONA, which operates and locks to ground over make contact 6 of relay ONA and make contact 10 of relay BA. The operation of relay ONA removes ringing current from the BZ lead extending between Figs. 9 and 39 to stop the attendant's ringer from ringing and opens the circuit in Fig. 9 whereby part of the ringing current was fed back to the calling P.B.X line circuit 34 of Fig. 35. Also, the operation of relay ONA applies steady battery to the signal lamp leads to cause the lamp SL1–01 of Fig. 39 (and also lamp TL1–01 if flashing) to light steadily. This circuit extends in Fig. 9 from battery in the lower right-hand corner, over make contact 4 of relay ONA, thence over break contacts 4 and 10 of relays OUT and HDA and through resistance SL1 to conductor SL1–01 into Fig. 39 to cause lamp SL1–1 to light steadily. In the event that relay TN of Fig. 9 is operated (in the case of an intercept situation), the steady battery supplied to conductor SL1–01 of Fig. 9 is also applied to conductor TL1–01 through break contact 7 of relay HDA, make contact 2 of relay TN, and resistance TL1, over conductor TL1–01 into Fig. 39 to cause lamp TL1–01 to light steadily. Also, in Fig. 9, if relay TN were operated, upon the operation of relay ONA a circuit is connected to the ring conductor R of the attendant trunk circuit, whereby a low level dial tone is supplied to the attendant when she answers the call, thereby giving her an additional indication that this call is an intercept call. This circuit extends in Fig. 9 from the box marked dial tone, over the LT conductor, through condenser TN, over make contacts 4 and 8 of relays TN and ONA, and over break contact 9 of relay HDA to the ring conductor R of the attendant trunk circuit.

Relay ACAA of Fig. 9, in operating, causes tip and ring conductors of the cordless position circuit to be connected to the attendant trunk circuit 1 of Fig. 9. These circuits extend in Fig. 9 from the tip and ring conductors T and R of the trunk circuit, over respective make contacts 2 and 4 of relay ACAA, to tip and ring conductors TT and TR extending into Fig. 38, where the tip conductor TT extends over break contacts 7 and 6 of relays SP and FB, thence over break contact 7 of relay FB and a make contact of the attendant's B jack, thence over a make contact of pick-up key 3 (not shown), to the operator's tip conductor T0, and where the ring conductor TR from Fig. 9 extends over break contacts 6 and 4 of relays SP and FB, and thence over break contact 9 of relay FB and a make contact of the A jack, over a make contact of pick-up key 3 (not shown), to the attendant's ring conductor R0.

The P.B.X attendant, who necessarily as previously mentioned will have her hand set shown in Fig. 38 plugged into the A and B jacks, may communicate with the party at the calling P.B.X line circuit 34 of Fig. 35 over this tip and ring circuit extended to the attendant position from the attendant trunk circuit of Fig. 9. In Fig. 38, in the tip and ring talking circuit of the attendant position, three contacts are shown marked dial 1, dial 2 and dial 3. The dial contact 2 is a pair of contacts which are normally closed and which will open if the attendant should actuate her dial to the finger stop preparatory to dialing a digit and those contacts will remain open until such time as the dial is returned to normal. Dial contact 1 is a contact which is a normally open one but which closes when the operator actuates her dial to the finger stop and remains closed until such time as the dial returns to its normal position whereupon dial contact 1 reopens. Dial contact 3 is a pair of contacts which are normally closed and remain closed even upon the actuation of the dial to the finger stop, but which contacts open and close a number of times upon the return stroke of the dial to send out over the lead R0 the usual open circuit line pulses which comprise the digit dialed by the attendant.

It will be noted, in the event that relay TN of the trunk circuit of Fig. 9 were operated, as it would have been if this call were on an intercept basis, that upon the operation of relay ONA the locking circuit for relay TN is opened and relay TN thereupon begins to release; but, since this is a slow release relay some time will be consumed before the release takes place. The interval while relay ONA is operated and before relay TN fully releases is the time during which the attendant will hear the low level dial tone supplied through make contact 4 of relay TN to the ring conductor of the trunk in Fig. 9. When relay TN eventually releases this low level dial tone is removed from the ring conductor and lamp TL1–01 of Fig. 39 is extinguished.

It will be assumed in the present example that the calling P.B.X line circuit 34 of Fig. 35 has instructed the P.B.X atendant that the P.B.X party desires a connection to the central office indicated in Fig. 31A. It will be necessary, therefore, for the P.B.X attendant to make a connection through a central office trunk, such as the one shown in Figs. 4 and 5 to the desired central office facility, whether it be an intra-office type of call to a local central office subscriber or whether it be a connection to a toll facility such as the toll operator cord and trunk circuit shown in Fig. 31A.

When the P.B.X attendant has determined both the connection desired by and the identification of the calling P.B.X line 34 of Fig. 35 she must apply a hold condition to the attendant trunk circuit of Fig. 1, seize an idle central office trunk, such as central office trunk 0 of Figs. 4 and 5, and dial the desired number into the central office equipment. In order to establish a hold condition on the attendant trunk circuit of Fig. 9 the P.B.X attendant must actuate the hold key prior to releasing the pick-up key associated with the trunk. Upon the momentary actuation of the hold key (a non-locking key designated Hold in Fig. 39), an obvious circuit is completed for operating relay HP from ground in Fig. 39, over make contacts of the B jack and the hold key, through the winding of relay HP to battery. Relay HP, in operating, completes a circuit between Figs. 39 and 9 for causing the operation of Fig. 9 of relay HDA. This circuit extends from ground in the upper left-hand corner of Fig. 39, over make contact 8 of relay HP, to conductor HD extending into Fig. 9, and over make contact 12 of relay ACAA to battery through the winding of relay HDA, which operates and completes a circuit between Figs. 9 and 39 for causing the operation of relay SP in Fig. 39. This circuit extends from ground in the upper right-hand corner of Fig. 9, over make contacts 1 and 3 of respective relays HDA and ACAA, to conductor SP extending into Fig. 39, and to battery over make contact 4 of relay HP and through the winding of relay SP. Relay SP operates in this circuit and locks over its own make contact 12 to its operating ground on conductor SP, independently of the condition of relay HP. The operation of relay SP of Fig. 39 applies a ground over its make contact 2 to supplement the ground on conductor HD extending into Fig. 9, whereby relay HDA of Fig. 9 is held operated; and, relay SP, in operating, controls a number of other circuits extending between the cordless position circuit of Fig. 39 and central office trunks, such as the trunk of Figs. 4 and 5, for purposes to be described presently. Relay HDA in the trunk circuit of Fig. 9, in operating, applies over its make contact 12 a supplementary ground to conductor IT01 extending into the line and trunk hunting circuit of Fig. 30 to maintain the attendant trunk circuit 1 of Fig. 9 busy to the marker independently of the condition of relays BA, ONA and TN. Relay HDA, in operating, also causes the release of relay ONA, opens the tone supply leads to the ring side of the trunk in Fig. 9 and to the audible ringing signal in the cordless position circuit of Fig. 39, and completes a circuit extending from the 30 interruption-per-minute interrupter of Fig. 9 over its make contact 10, through the SL1 resistance to conductor SL1–01 extending into the position circuit of Fig. 39 to change the steady lighting of lamp SL1–01 to a slow flash of 30 times per minute.

When the P.B.X attendant observes the slow flashing of lamp SL1–01 of Fig. 39 she knows that a holding condition has been established on the attendant trunk circuit 1 of Fig. 9 and that she may thereupon release the hold key and the pick-up key associated with this trunk. Upon the release of the hold key, relay HP of Fig. 39 releases and when the attendant releases pick-up key 3, contacts of which are indicated in the lower right-hand corner of Fig. 39, relay ACAA of the trunk circuit of Fig. 9 is released. Relay ACAA, in releasing, causes the release in Fig. 39 of relay SP; but, before relay SP can release, the release of relay ACAA in Fig. 9 transfers the locking circuit of relay HDA through its own break contact 12, make contact 5 of relay HDA, and break contact 6 of relay TN, to ground through make contact 8 of relay BA, whereupon relay HDA remains locked to the holding ground supplied by make contact 8 of relay BA. Also, relay ACAA in Fig. 9, upon releasing, disconnects in Fig. 9 the tip and ring conductors T and R of the attendant trunk circuit from the tip and ring leads TT and TR leading to the cordless position circuit in Fig. 38, thereby disconnecting the P.B.X attendant from the held attendant trunk circuit of Fig. 9, the lamp SL1–01 of Fig. 39 remaining flashing at the low rate of 30 interruptions-per-minute, however, as an indication to the P.B.X attendant that the associated trunk circuit of Fig. 9 is in a hold condition. It will be noted in Fig. 38 that upon the release of pick-up key 3 associated with the trunk circuit of Fig. 9, the P.B.X attendant's talking telephone circuit in the lower right-hand portion of Fig. 38 is released from connection with the parallel tip and ring leads from the various central office and attendant trunk circuits.

The P.B.X attendant, having instructed the calling P.B.X line circuit 34 to remain off-hook awaiting completion of the desired connection, has released from connection with the attendant trunk circuit 1 of Fig. 9 and has placed a holding condition on this trunk circuit, which holding condition is manifested to the P.B.X attendant by the slow flashing of lamp SL1–01 of Fig. 39. The P.B.X attendant is now perpared to seize a central office trunk circuit, such as the one shown in Figs. 4 and 5, in order to secure second dial tone from the central office shown in Fig. 31A, thereby to complete the desired connection. In order to seize a central office trunk it is necessary for the P.B.X attendant to actuate the pick-up key associated with that particular trunk, assuming that it is idle and available for service. Pick-up key 4 is the one associated with trunk circuit 0 of Figs. 4 and 5; therefore, pick-up key 4 must be actuated in order to cause the operation of the connector relay ACAT in Fig. 4. Upon the operation of pick-up key 4, a circuit is completed between Figs. 39 and 4 for operating this connector, the circuit extending from ground in the lower right-hand corner of Fig. 39, through break contacts 8 and 5 of relays ST and NTP, a make contact of the A jack, break contacts of pick-up keys 1, 2 and 3, thence over a make contact of pick-up key 4, to conductor ACA–0 extending into Fig. 4, thence through break contact 6 of relay AC, the winding of relay ACAT, to battery over break contact 10 of relay HM. The operation of relay ACAT in Fig. 4 causes the operation of relay AC in an obvious fashion over make contact 6 of relay ACAT; and, the operation of relay AC completes a locking circuit for relay ACAT extending from ground, over make contact 17 of relay ACAT and make contact 6 of relay AC through the winding of relay ACAT to battery over break contact 10 of relay HM, relay AC remaining operated as long as relay ACAT remains operated and as long as the attendant pick-up key 4 remains operated.

The operation of the relays ACAT and AC of Fig. 4 initiates a series of operations whereby the attendant telephone circuit of Fig. 38 is interconnected over central office trunk circuit 0 of Figs. 4 and 5 with the central office shown in Fig. 31A and whereby dial tone is returned to the attendant from the central office preparatory to the attendant's dialing the number required to complete the connection requested by calling P.B.X line circuit 34 of Fig. 35. Upon the operation of relay ACAT, a circuit is completed between Figs. 4 and 38 whereby the S relay of Fig. 4 is operated over the attendant's telephone circuit of Fig. 38. This circuit extends from ground in the upper right-hand corner of Fig. 4, over break contact 6B of relay SRT, break contacts 6 of relays CT annd FF, through the winding of relay S, over break contact 5 of relay HD, and over make contact 2 of relay ACAT, to the tip conductor TT extending into Fig. 38, thence over break contacts 7 and 6 of relays SP and FB, break contact 7 of relay FB, a make contact of the attendant B jack, over a make contact of a pick-up key 4 (not shown), to the operator tip conductor T0, thence through the inductance and resistance bridging the operator's tip and ring circuit, over contact 3 of the operator's dial, through the inductance in the filter circuit to the operator ring conductor R0, thence over a make contact of a pick-up key 4 (not shown) and a make contact of the attendant A jack, thence over break contacts 9 and 4 of relay FB, and break contact 6 of relay SP, to conductor TR extending into Fig. 4, thence over make contact 1 of relay ACAT, break contact 7 of relay HD, break contacts 8 of relays FF and CT, to battery through resistance BF. Relay S operates in this circuit and causes the operation of relay S1T in Fig. 4 in a circuit previously described.

Relay S1T, in operating, applies off-normal ground to the trunk circuit, causes the operation of relay TLAT in Fig. 5, applies ground to the conductor IT90 in Fig. 5 to make the trunk busy to the marker, applies steady battery to the lamp TL1–0 in Fig. 39, and applies a start ground to the ring conductor R of Fig. 4 extending into the central office as a signal to the central office to supply dial tone over the trunk circuit. Relay TLAT of Fig. 5 operates in a circuit extending from battery through its winding, over make contact 19 of relay ACAT, to off-normal ground supplied by make contact 4 of relay S1T. Relay TLAT, in operating, closes its own make contact 1 in parallel with make contact 19 of relay ACAT, thereby to remain locked operated independently of the condition of the relay ACAT. As previously explained hereinbefore, ground is applied in the left center of Fig. 5, over make contact 10 of relay S1T, and break contact 10 of relay SRT, to conductor IT90 extending into the line and trunk hunting circuit of Fig. 33 to thereby make this trunk circuit of Figs. 4 and 5 busy to the marker. In the upper right-hand corner of Fig. 5, a circuit extends from battery, over break contact 2 of relay HD, and make contact 6 of relay S1T, break contact 3 of relay R1T, through resistance TL2, to conductor TL1–0 extending into Fig. 39, thence to ground through lamp TL1–0, which thereby lights steadily as an indication to the operator that the outgoing end of the central office trunk 0 has been seized. A circuit extends from off-normal ground in Fig. 5 (over make contact 4 of relay S1T), over break contacts 8 of relays HD and RS, to conductor P extending into Fig. 4, and through resistance B, to battery through the upper winding of relay P which, however, does not operate in this circuit because of the current limiting effect of resistance B. In Fig. 4 a circuit is provided, upon the operation of relay S1T, for applying ground to the ring conductor R leading toward the central office, extending from ground in Fig. 4, over make contact 1 of relay S1T, and break contacts 4 and 2 of relays SRT and P, to the ring conductor R extending into Fig. 36 and thence over make contact 2 of relay ATA to the ring conductor extending into the central office of Fig. 31A.

As has been explained in detail hereinbefore, upon the closing of the tip and ring conductors of the trunk circuit of Fig. 4 into the central office of Fig. 31A for the dial tone job, respective ground and battery are returned over the tip and ring conductors to the trunk of Fig. 4 (from circuits in the originating register of a crossbar telephone system for example involved in the dial tone job). This ground returned over the tip conductor into Fig. 4 extends through the upper winding of relay H and over make contact 2 of relay S1T, through break contact 2 of relay SRT, to battery through resistance H, thereby causing relay H to operate to in turn operate the cut-through relay CT of Fig. 4 in a manner heretofore previously described. Relay CT, in operating, causes the operation in Fig. 4 of relay SRT which completes a locking circuit for relay CT, releases relay H, supplements the off-normal ground supplied to the trunk circuit by completing a circuit in Fig. 5 from ground over its make contact 6A, and supplements the battery in Fig. 5 supplied to the lamp TL1–0 of the attendant position in Fig. 39 by closing its make contact 12 in parallel with make contact 6 of relay S1T. Relay CT, in operating, also extends the ground supplied from the central office to the tip conductor T of trunk circuit 0 in Fig. 4, over make contact 6 of relay CT and break contact 6 of relay FF, through the winding of relay S and over the attendant telephone circuit as previously described over conductor TT into Fig. 39, thence back over conductor TR into Fig. 4, over a circuit previously described through break contacts 8 of relay FF and make contact 8 of relay CT, and out over the ring conductor to the central office, and therein returned to the battery potential, thereby maintaining operated relay S of Fig. 4 under control of battery and ground supplied from the central office dial tone circuits.

As a result of this interconnection of the trunk side of trunk circuit 0 of Figs. 4 and 5 to the central office dial tone circuits indicated in Fig. 31A, dial tone is supplied to the operator at the P.B.X attendant who may thereupon actuate her dial and cause to be registered in the originating register of the central office the digits representing the call desired by the P.B.X party at line circuit 34 of Fig. 35. As has been mentioned heretofore, the calling P.B.X party at line circuit 34 may desire to be connected to a local central office subscriber, in which event the digits dialed by the P.B.X attendant will cause an interconnection such as the intra-office trunk connection shown in the upper part of Fig. 31A. On the other hand, the calling P.B.X party at line circuit 34 of Fig. 35 may have requested a toll connection to be completed. In the latter event the digits dialed by the P.B.X attendant will most likely be a toll code such as code 211, whereupon the central office switching circuits will effect a connection to a toll facility such as the operator cord and trunk circuit in the lower portion of Fig. 31A. It will be noted that when the P.B.X attendant seizes the central office trunk 0 of Figs. 4 and 5, the toll allowed class of service relay TLAT of Fig. 5 in the trunk circuit was operated, thereby setting up the central office trunk circuit 0 of Figs. 4 and 5 such that if it is connected to a toll facility the usual battery and ground reversal will not cause any disconnection since the operation of the toll allowed class of service relay TLAT will immobilize the operation of the P relay circuit of Fig. 4.

*Connection to local central office subscriber*

If the desired call is to be made to a local central office subscriber, the P.B.X attendant will proceed to dial the usual 7 or 8 digits (depending upon whether or not the called subscriber is a party line) into the originating register of the central office equipment, in response to the completion of which dialing the central office equipment will complete an intra-office trunk connection such as the one illustrated in Fig. 31A, whereupon the P.B.X attendant will be connected through the central office circuits to the called subscriber as indicated hereinbefore, ground on the tip and battery on the ring conductors being supplied from the intra-office trunk circuit of Fig. 31A back to the central office trunk circuit 0 of Fig. 4 to maintain operated the supervisory relay S through the closed loop at the P.B.X attendant telephone circuit of Fig. 38. Having completed the desired connection to the called local office subscriber shown in Fig. 31A, the P.B.X attendant will converse with the called subscriber informing same that a call is waiting and requesting them to remain off-hook and hold the connection until such time as the operator may manipulate a few controls to extend the connection back to the calling P.B.X party at line circuit 34 in Fig. 35.

In order to complete this connection back to the calling line circuit 34 it is necessary for the P.B.X attendant to place a holding condition on the trunk side of the central office trunk circuit 0 of Figs. 4 and 5, and thereafter to use the line side of this trunk to dial back into the P.B.X to secure connection with the waiting calling P.B.X line circuit 34. This hold condition is produced in the central office trunk circuit of Figs. 4 and 5 by operations initiated when the P.B.X attendant actuates the hold key of Fig. 39. In this instance, however, upon momentarily operating the hold key to cause a hold condition, the operator does not release the trunk pick-up key, as was the case previously described when she wanted to place a hold condition on the attendant trunk circuit of Fig. 9. When the attendant causes the momentary operation of the hold key in Fig. 39, relay HP operates as previously described. Relay HP, in operating, completes a circuit for causing the operation in Fig. 5 of relay HD in a circuit extending from ground in Fig. 39, over make contact 8 of relay HP, to conductor HD leading into Fig. 5, thence over make contact 8 of relay ACAT, and break contacts 12 and 3 of relays HM and RS, to battery through the winding of relay HD. Relay HD of Fig. 5, in operating, causes the operation of the splitting relay SP of Fig. 39 in a circuit extending from ground in the upper central of Fig. 5, over the parallel make contacts 4 and 6A of relays S1T and SRT, to the off-normal ground conductor, thence over make contact 8 of relay HD, and make contact 9 of relay ACAT, directly to conductor SP and through make contact 10 of relay AC to conductor SR, both leading into Fig. 39. In Fig. 39 the ground on conductor SR extends directly to battery through the winding of relay SP, and ground on conductor SP in Fig. 39 extends over make contact 4 of relay HP, to battery through the winding of relay SP, which thereupon operates and completes a circuit over its own make contact 12 in parallel with make contact 4 of relay HP to remain locked to one or the other of these conductors SP and SR independently of the condition of relay HP. Relay SP, in operating, also, by means of its make contact 2 in Fig. 39, supplements the holding ground on conductor HD extending into Fig. 5 for holding operated relay HD of Fig. 5. In Fig. 38 the operation of relay SP puts a short circuit over its make contact 6 across the tip and ring leads TT and TR of the trunk side of the central office trunk circuit of Fig. 4 to hold the trunk side of this connection to the called local central office subscriber. This operation of relay SP, in short-circuiting the tip and ring conductors TT and TR extending from the cordless position circuit of Fig. 38 into the trunk side of central office trunk 0 of Fig. 4, also splits off the attendant telephone circuit of Fig. 38 so that it is connected only to the line side of the central office trunk over conductors LR and LT from Fig. 38 into Fig. 4, and over make contacts 3 and 4 of relay ACAT to the respective ring and tip sides of the line section of central office trunk 0. This connection will enable the P.B.X attendant to dial back to the calling line circuit 34 of Fig. 35 as soon as the marker circuit in the P.B.X has completed a connection between the line side of the trunk of Fig. 4 and the dial pulse register 0, for instance, of Figs. 14, 18 and 19. The operation of relay HD of Fig. 5 also changes the steady lighting of the lamp TL1–0 of Fig. 39 to a low interrupted rate of thirty interruptions-per-minute to indicate that the trunk side of this central office trunk of Figs. 4 and 5 is in a hold condition. This circuit extends from battery in the lower right-hand corner of Fig. 5, through the thirty IPM interrupter, over conductor SF1, through break contact 8 of relay TTT, make contact 2 of relay HD, parallel make contacts 12 and 6 of relays SRT and S1T, through break contact 3 of relay R1T, and through resistance TL2 to conductor TL1–0, extending into Fig. 39 and to ground through the filament of lamp TL1–0. When the P.B.X attendant notices the change in the condition of lamp TL1–0, to the low interruption rate of thirty IPM, she releases the hold key, thereby releasing relay HP of Fig. 39.

Upon the release of relay HP of Fig. 39, with relay SP of Fig. 39 operated, circuits are completed from the cordless position circuit in Fig. 39, through the P.B.X central office trunk circuit of Fig. 5 and into the units selection circuit of Fig. 15 and into the tens selection circuit of Fig. 11, for attempting to seize the marker of the P.B.X for completing a connection between the central office trunk circuit of Fig. 4 and a dial pulse register, whereby the attendant may dial back to the calling P.B.X line circuit 34. In the lower left-hand corner of Fig. 39 ground extends over make contacts 1 and 10 of relay SP, and break contacts 9 and 7 of relay HP, to conductors T and U extending into Fig. 5, thence over make contacts 12 and 13 of relay ACAT, and break contacts 2 and 4 of relay HM, to conductors TR0 extending into Fig. 11 and U0 extending into Fig. 15. Assuming that the marker circuit is idle and available to be seized, conductor TR0 in Fig. 11 extends over break contacts 1 and 5 of relays TEA1 and TRA0, through the winding of relay TR0, to battery over break contacts 9 and 1 of relays TRA0 and TEB1. Relay TR0 operates in this circuit, thereby causing the operation in Fig. 11 of the tens-end relays TEA0 through TEA3 and TEB0 through TEB3 in circuits previously described now extending over make contacts 4 and 2 of the operated relay TR0. Upon the operation of the tens-end relays of Fig. 11, a locking circuit is provided for relay TR0 of Fig. 11 extending from ground over the parallel make contacts 1 of relays TEB0 and TEA0, make contact 1 of relay TR0, break contact 5 of relay TRA0, through the winding of relay TR0, through break contact 9 of relay TRA0, to battery over make contact 12 of relay TR0.

The operation and locking of relay TR0 of Fig. 11 and the operation of tens-end relays TEA0, TEB0, etc. comprises a bid on behalf of central office trunk circuit 0 of Figs. 4 and 5 for the services of the marker. Circuits are now completed in the tens preference chain circuit of Fig. 10, assuming that neither of the dial pulse registers is presently trying to secure the services of the marker, for causing the operation of the tens preference chain relay TRP0 associated with the even group of trunks, of which trunk circuit 0 of Figs. 4 and 5 is one. Under the control of make contacts 3, 5, 7 and 9 of the operated relay TR0 of Fig. 11 obvious circuits heretofore described are completed for causing the operation of the tens preference chain relay TRP0 in series with the four tens check relays of Fig. 10, namely relays TCK1 through TCK4. Upon the operation of the tens preference relay TRP0 of Fig. 10, the trunk tens connector relays TRM0, TRU0 and TRC0 of Fig. 12 are operated in an obvious circuit under the control of make contacts 1 and 12 of relay TRP0. Also in Fig. 12, upon the operation of relay TRP0 of Fig. 10, circuits heretofore described in detail are completed for causing the operation of the tens connectors relays TACA, TACB, etc., under the control of make contacts 2 and 3 of relay TRP0. Upon the operation of relays TACAA and TACBA, circuits are completed in Fig. 6 for causing the operation of the register group relays RGA, RGB, etc., under the control of make contacts 3 and 5 of relays TACAA and TACBA and make contacts 10 and 9 of relay TRP0.

Circuits are also completed in Fig. 17 for causing the operation of relays LUCA, LUCB, ULA and ULB in an obvious manner under the control of make contacts 1, 2, 11 and 12 of relays TACA and TACB. Upon the operation of relays LUCA and LUCB of Fig. 17, a circuit is completed for causing the operation of the units selection relay U0 of Fig. 15, this circuit extending from the grounded conductor U0 in Fig. 15 coming from the central office trunk of Fig. 5, thence over make contact 1 of relay TRU0, over the parallel make contacts 1 of relays LUCA and LUCB, to battery through the winding of relay U0, which thereupon operates and locks over its own make contact 10 to ground over the parallel make contacts 1 of relays ULA and ULB.

The operation of the units selection relay U0 of Fig. 15 initiates a series of operations which will culminate in the operation of the hold magnet THM00 of Fig. 5 corresponding to the central office trunk circuit 0 of Figs. 4 and 5, whereby the line end of this trunk circuit will be connected over the crossbar switches to an idle dial pulse register circuit such as dial pulse register 0 of Figs. 14, 18 and 19. In the meantime, circuits have been completed in Fig. 37 for causing the operation of the select magnet connector relays SMC0, SMC1 and SMC8 in order to prepare circuits for operating select magnets on any of the switches 0 (Fig. 3), 1 (Fig. 23), and 8 (Fig. 42) upon which are terminated all of the central office trunks and dial pulse registers circuits of interest. In Fig. 37, ground extends over the parallel make contact 6 of relay TRC0 and the parallel make contacts 1 of relays RGAA and RGBA to cause the operation of connector SMC0, ground extends over the parallel make contacts 2 of relays RGBA and RGAA to cause the operation of connector SMC1, and ground extends over make contact 6 of relay TRU0 to cause the operation of connector SMC8.

In the meantime, upon the operation of relays RGA and RGB of Fig. 6, circuits heretofore described in detail are completed in Fig. 47 for causing the operation of the link test relays LTA, LTB, etc., which as has been explained in detail initiates a series of operations whereby an idle link in the crossbar switch network is ascertained so as to permit the operation in Fig. 37 of select magnets corresponding to this idle link. In view of the fact that the presently existing connection from line circuit 34 to the attendant trunk of Fig. 9 has been assumed to be using the lower half of level 9 of the crossbar switches, it will be assumed that in the present instance the dial tone connection to the central office trunk circuit of Fig. 4 will use the upper half of level 2, namely, the tip, ring and sleeve conductors T12, R12 and S12 through the crossbar switches. At the end of link testing, as has been described in detail hereinbefore, circuits are completed in Fig. 37 for causing the operation, under the control of the select magnet connectors SMC0, SMC1 and SMC8, of hold magnets SM01 and SM02 of Fig. 3 for switch 0, SM11 and SM12 of Fig. 23 for switch 1, and SM81 and SM82 of Fig. 42 for switch 8.

In the meantime, in Fig. 37, upon the operation of the link end relays LEA and LEB of Fig. 47, the operation of which has been described in detail hereinbefore, circuits previously described in Fig. 37 are completed for energizing the windings of the select magnet timing relays SMTA and SMTB. Eventually these relays SMTA and SMTB of Fig. 37 will operate after a time interval determined by their slow operate characteristics and, in operating, will cause the operation in Fig. 7 of the corresponding relays SMRA, SMRB, etc., after the operation of relays SEA, SEB, etc. of Fig. 32, which indicate the end of sleeve testing presently to be described.

Returning now to the series of operations initiated by the operation of units relay U0 of Fig. 15, a circuit is completed in Fig. 30 from ground through the lower winding of relay S0, over make contact 12 of relay U0, to conductor 0, thence over make contact of relay TRM0, to conductor ST90 leading into the trunk circuit of Fig. 5 to the lower side of the winding of trunk hold magnet THM00. If the sleeve relay S0 of Fig. 30 finds a ground on conductor ST90, it thereby knows that the central office trunk circuit is busy and cannot be seized. In the present instance, however, there will be no ground on conductor ST90, whereupon the circuit from the lower winding of relay S0 extends in Fig. 5 over conductor ST90, over break contact 6 of relay HM, and to battery through the windings of relay HM and the hold magnet THM00. Sleeve relay S0 will operate in this circuit in series with the relay HM and the hold magnet THM00, but relays HM and THM00 of the trunk circuit cannot operate in series with the winding of the S relay. The operation of the sleeve relay S0 is an indication that a proper sleeve check has been made on the trunk circuit and that it is available for having its hold magnet operated, whereupon the sleeve end relays SEA, SEB, etc., of Fig. 32 are operated as an indication of an end to the sleeve testing procedure. Upon the operation of the sleeve end relays SEA, SEB, etc., of Fig. 32, and assuming the select magnet timing relays SMTA and SMTB to have operated, previously-mentioned circuits are completed in Fig. 7 for operating the relays SMRA, SMRB, etc., thereby completing circuits between Figs. 29 and 30 whereby ground may be applied to conductors, such as conductors S10 and S13, extending from Fig. 29 into Fig. 30 and ground on these two conductors extends for conductor S10 over make contact 4 of relay S0 and make contact 1 of relay SMRAA to conductor 0 and ground on conductor S13 also extends over make contact 8 of relay S0 and make contact 1 of relay SMRBA to conductor 0, the grounded conductor 0 thence extending over make contact 1 of relay TRM0 in Fig. 30 to conductor ST90, extending into Fig. 5 to cause the operation of relay HM and of the trunk hold magnet THM00. Relay HM and hold magnet THM00 lock in a circuit extending from the windings thereof, over break contact 8 of relay MC, make contact 1 of relay HM, the parallel break contacts 8 and 4 of relays P and R1T, thence over make contact 16 of relay ACAT to off-normal ground over make contact 6 of relay HD. The operation of the hold magnet THM00 (also shown in Fig. 3) extends the tip, ring and sleeve conductors T, R and S from the line side of the central office trunk of Fig. 4 into Fig. 3, and thence over the upper three crosspoints corresponding to the select magnet SM01 and over the upper three crosspoints corresponding to select magnet SM02, to the upper half of level 2 of the crossbar switch comprising tip, ring and sleeve conductors T12, R12 and S12.

In the meantime, circuit action has taken place in the marker whereby an idle dial pulse register circuit, such as the one shown in Figs. 14, 18 and 19, is seized and connected to the line side of the central office trunk circuit of Fig. 4. Upon the operation in Fig. 37 of the select magnet timing relays SMTA and SMTB and upon the operation of the register group relays RGA, RGB, etc., of Fig. 6, a circuit is completed in Fig. 6 for causing the operation of the register work and hold magnets THM08 and THM09 in Fig. 6. The circuit for these magnets extends from ground in Fig. 6, over make contact 5 of relay SMTA, break contacts 3 and 10 of relays HMTB and HMTA, over the parallel make contacts 3 of relays RGA and RGB, and through make contact 4 of relay RA0B (assumed to be operated in the upper part of Fig. 6 as an indication that dial pulse register 0 of Figs. 14, 18 and 19 is idle and available to be seized for service), to battery through the windings of hold magnets THM08 and THM09, which thereupon operate to cause the tip, ring and sleeve conductors T, R and S of the dial pulse register 0 of Fig. 18 to be extended over the upper three crosspoints corresponding to select magnet SM01 and over the upper three crosspoints corresponding to select magnet SM02, thereby to connect these three conductors to the upper half of level 2 of the crossbar switch comprising tip, ring and sleeve conductors T12, R12 and S12, thereby to interconnect these three conductors with the same tip, ring and sleeve conductors of the line side of central office trunk 0 of Fig. 4.

A circuit is now completed for causing the operation of the line relay L in the dial pulse register of Fig. 18 extending from ground in Fig. 18, through resistance TN, through the lower right-hand winding of the dial tone coil TN, thence over break contact 10 of relay RV, and contact 1 of the TST jack, and break contacts 10 and 2 of relays RRLB and RRLA, to the register tip conductor extending into Fig. 3, thence over the crosspoints corresponding to select magnets SM01 and SM02, to the tip conductor T12 of the switch network, thence to the left and over crosspoints corresponding to the same two select magnets to the tip conductor T of the line side of trunk circuit 0 of Fig. 4, thence in Fig. 4 from the tip conductor T over break contacts 7 and 10 of relays BY and RS, and over make contact 4 of relay ACAT to the LT conductor leading into the attendant position circuit of Fig. 38, and therein over break contact 7 of relay FB, a make contact of the B jack, a make contact of the operated pick-up key 4, to the attendant tip conductor T0, thence through the direct current circuit comprising the windings and resistance to the right of dial contact 1, thence over the dial contact 3, through the inductance in the dial filter to the attendant ring conductor R0, back over a make contact of the pick-up key 4, and through a make contact on the A jack, break contact 9 of relay FB to the conductor LR extending into Fig. 4, over make contact 3 of relay ACAT, make contact 1 of relay HD, to the right-hand side of the lower winding of relay P, and to the right-hand electrode of diode B, thence from the left-hand electrode of diode B to the left-hand electrode of diode A, and through break contacts 2 and 6 of relays RS and BY, to the ring conductor R extending back to the crossbar switch network, of Fig. 3, over the crosspoints of the switch 0 to the ring conductor R12 of switch 0, thence over crosspoints and to the ring conductor R of dial pulse register 0 extending into Fig. 18, over break contacts 3 and 9 of relays RRLA and RRLB in Fig. 18, over contact 2 of the TST jack, through break contact 6 of relay RV, and the upper right-hand side of the dial tone coil TN, and thence to battery through the left-hand winding of relay L, which thereupon operates.

It will be noted in Fig. 4 that the immediately above-described circuit extending through diode B of Fig. 4 also extends from the right-hand side of the lower winding of relay P through the lower winding and over break contact 5 of relay MC to the right-hand electrode of diode A. It happens in this particular circuit that diode A is reverse-biased and thereby is a high impedance because substantially ground potential on its right-hand electrode is considerably more positive than the approximately —48 volt potential on its left electrode. Therefore the lower winding of relay P is not sufficiently energized, if at all, to cause relay P to operate. Diode B, on the other hand, has substantially ground potential on its right-hand electrode and approximately —48 volt potential on its left electrode, thereby representing a very low impedance to the passage of current therethrough in shunt of the lower winding of relay P.

In Fig. 18 the operation of the line relay L causes the operation of relay SR, which in turn causes the operation of the off-normal relay ON in Fig. 18. Relay SR of Fig. 18, in operating, extends ground in Fig. 18 over break contact 9 of relay RT and make contact 6 of relay SR to conductor RHM0, extending into the register control circuit of Fig. 6 and thence to the left-hand side of the windings of the register hold magnets THM08 and THM09 to hold these magnets operated independently of the condition of the marker relays in the register control circuit of Fig. 6. The operation of relay ON in the dial pulse register circuit of Fig. 18 causes the release in Fig. 6 of the register control relays RA0B and RA0A, thereby indicating that dial pulse register 0 is presently engaged and is not available to be seized for other service. Prior to the release of relays RA0A and RA0B of Fig. 6, a circuit was completed from the class-of-service circuit of Fig. 25 to the dial pulse register circuit in Fig. 14 to register in Fig. 14, by the operation of relay COT, the fact that this request for service of the dial pulse register is being made on behalf of a central office trunk circuit. This circuit extends in Fig. 25 from battery in the upper left-hand corner, in two parallel circuits through the separate half resistances of the resistance lamp CS, over make contacts of relays SEA and SEB, break contacts of relay ZU (assumed to be released under these circumstances), thence over make contacts 6 and 10 of relay S0, and over make contact 1 of relay TRC0 to conductor COT, thence through the parallel make contacts 9 of relays RGA and RGB, and make contact 8 of relay RA0A, to conductor COT0 extending into Fig. 14. In Fig. 14 battery on conductor COT0 extends to ground through the winding of relay COT which thereupon operates, locks over its own make contact 10 and through contact 10 of relay ON to battery, and causes relay TLD to operate and lock in an obvious manner.

Upon the operation in Fig. 18 of relay SR of the dial pulse register circuit, ground is extended from the upper left-hand corner of Fig. 18, over make contact 12 of relay SR, through the low resistance S, to the sleeve lead S extending into Fig. 3, thence over the crosspoints to the sleeve conductor S12 of the crossbar switch, thence to the left in Fig. 3 and over the crosspoints to the sleeve conductor S of the line side of central office trunk 0 of Fig. 4, and thence in Fig. 4 over the S lead to Fig. 5, through break contact 8 of relay BY, and over make contact 12 of relay HD, to the right-hand side of the winding of relay SL, through the winding of relay SL, thence over break contact 4 of relay BY, to battery through resistance PD. The sleeve relay SL operates in this circuit and completes a locking circuit for relay HM and hold magnet THM00 extending from the lower terminals of the windings thereof, over break contact 9 of relay MC, and over make contact 12 of relay SL, to off-normal ground in the trunk circuit over make contact 6 of relay HD.

Upon the operation of relay HM in Fig. 5, the start conductors TR0 and U0 extending into the tens and units selection circuits of Figs. 11 and 15 of the marker, were opened, thereby placing the control of the release of these tens and units selection relays TR0 and U0 of Figs. 11 and 15 under the control of the marker. Eventually, as has been explained in considerable detail hereinbefore, in the circuit of Fig. 7 relays HMTA, HMTB, etc., are operated to complete circuits heretofore described whereby the hold magnet check relays HMKA and HMKB of Fig. 29 will be operated if the hold magnets involved in the present connection are properly being held by some circuit other than the marker. In the present instance the above-mentioned local holding ground in Fig. 5, on the lower sides of the windings of relay HM and hold magnet THM00, is returned over conductor ST90 to Fig. 30, thence over make contact 1 of relay TRM0 to conductor 0, and thence in parallel over make contacts of relays SMRBA and SMRAA and contacts of relay S0, to conductors S10 and S13 extending into Fig. 29, and thence over circuits previously described under the control of make contacts of relays HMTA and HMTB, to battery through the windings of relays HMKA and HMKB, which thereupon operate, it being noted that the sleeve relay S0 of Fig. 30 is held operated in a circuit extending through its upper winding and over its own make contact 11 and make contacts 1 of relays SMRA and SMRB to battery.

As has been described hereinbefore, the operation of relays HMKA and HMKB of Fig. 29 cause the release in Fig. 50 of the down check relays DCKA and DCKB, the release of which causes the operation in Fig. 7 of the marker release relays RLA, RLB, etc., to initiate a series of circuit operations whereby the marker circuit is completely returned to normal, in the process releasing all of the operated select magnets of Figs. 3, 23 and 42 and leaving the operated hold magnet THM00 of Figs. 3 and 5 held operated under control of off-normal ground in the central office trunk circuit of Figs. 4 and 5, leaving the dial pulse register hold magnets THM08 and THM09 of Figs. 3 and 6 held operated under control of the operated relay SR in the register of Fig. 18, and leaving the line circuit 34 hold magnet LHM34 of Fig. 35 held operated from ground through the winding of relay SLA of the held attendant trunk circuit of Fig. 9, the hold magnet THM05 of which in Figs. 9 and 3 is held operated locally in the attendant trunk circuit under control of the operated relay BA. It will be noted in Fig. 4 that by the time relay HM of Fig. 5 operated an additional locking circuit for relay ACAT was completed extending from the right-hand side of its winding to battery through respective make contacts 7 and 12 of relays ACAT and S1T.

At this point in the description, assuming that the marker circuit has fully released to normal, the calling P.B.X line circuit 34 of Fig. 35 has its tip, ring and sleeve conductors connected to the tip, ring and sleeve conductors of the attendant trunk circuit of Fig. 9 over the lower half of level 9 of the crossbar switches comprising tip, ring and sleeve conductors T09, R09 and S09; the attendant trunk circuit 1 of Fig. 9 has been placed in a holding condition by the P.B.X attendant; the trunk end of the central office trunk circuit 0 of Figs. 4 and 5 is presently extending to a local central office subscriber as shown in Fig. 31A and this trunk connection is being held under control of the splitting relay SP of the attendant position in Fig. 39; and, the P.B.X attendant is presently connected through the line side of the central office trunk of Fig. 4 over the upper half of level 2 of the crossbar switches, namely, tip, ring and sleeve conductors T12, R12 and S12, to the dial pulse register 0 circuits of Figs. 14, 18 and 19, which at the moment is supplying dial tone to the P.B.X attendant, who may thereupon proceed to dial the digits 3, 4 in order to make connection back to the calling P.B.X line circuit 34.

In order for the P.B.X attendant in Fig. 39 to dial the off-hook P.B.X party at line 34 of Fig. 35, she causes a momentary operation of the dial back key, whereby a circuit is completed for operating relay NTP of Fig. 39, extending from ground, over a make contact of the B jack, make contact of the dial back key, and to battery through the right-hand winding of relay NTP, which thereupon operates and completes a circuit over its make contact 6 to short-circuit its left-hand winding, thereby making itself slow releasing, and locks in a circuit over its make contact 4 and conductor NT extending into Fig. 5, over make contact 11 of relay ACAT, and to ground over break contacts 2 and 7 of relays MC and RTT. The release of the dial back key, after the momentary operation thereof, opens the operating circuit of relay NTP which is held operated under control of the trunk circuit of Fig. 5 and the P.B.X marker circuit as will be explained hereinafter.

After the momentary operation of the dial back key of Fig. 39, the P.B.X attendant may proceed to dial the digits 3 and 4 into dial pulse register 0 of Figs. 14, 18 and 19, as has been explained in detail hereinbefore. As a result of the dialing of the tens digit of 3, the tens digits register relay TD3 of Fig. 19 will be operated; and, as a result of dialing the units digit 4, relays P2A, P3 and P4 of Fig. 18 will be operated to register this units digit of 4. At the end of the units digit registration when the relay RA of Fig. 18 releases, relay DC of Fig. 19 is operated as previously described to indicate the completion of dialing and the necessity of attempting to seize the P.B.X marker circuit. The operation of relay DC of Fig. 19 causes the operation in Fig. 11 of the tens selection relay R0 pertaining to dial pulse register 0, assuming that the marker tens selection circuit is idle and available to be seized. The operation of relay R0 of Fig. 11 causes the operation of relays TEA0, TEB0, etc., of Fig. 11 to indicate the end of the tens selection operation; the operation of the tens end relays of Fig. 11 causes the operation in Fig. 10 of the register preference chain relay RP0 in series with the four tens check relays TCK1 through TCK4; and, the operation of the register preference relay RP0 of Fig. 10 causes the operation of the register preference auxiliary relay RPA0 of Fig. 12. Upon the operation of relay RPA0, circuits are completed between Figs. 14 and 7 for causing the operation of the route relays COTA and COTB of Fig. 7. These circuits extend in Fig. 14 from battery in the lower left-hand corner, over make contacts 1 and 2 of the central office class relay COT, to conductors CTA0 and CTB0 extending into Fig. 7, and over respective make contacts 18 and 17 of relay RPA0, to ground through the windings of relays COTA and COTB, which thereupon operate to indicate to the marker that the call which the dial pulse register is now requesting the marker to complete was initiated by a central office trunk and that this call is a central office trunk class of call. The operation of relay RPA0 of Fig. 12 also causes the operation in Fig. 17 of relays RUCA and RUCB, as previously described, and completes the circuits previously described for causing the operation in Fig. 41 of the relays RCTA, RCTB, etc. The operation of relays RCTA and RCTB of Fig. 41 cause the operation in Fig. 12, in a manner previously described, of relays RCA0 through RCE0, the operation of relay RCC0 completing a circuit previously described extending between Fig. 19 and Fig. 16 for causing the operation of the units selection relay U4 of Fig. 16 in accordance with the registration in Fig. 19 of the units digit 4, the operation of the units selection relay U4 of Fig. 16 causing the operation in Fig. 17 of the units end relays UEA and UEB.

In the meantime, upon the operation of relay RCA0 of Fig. 12 a circuit is completed between Fig. 6 and Fig. 18 for operating the reversing relay RV of Fig. 18, this circuit extending from ground in the lower left of Fig. 6, over break contacts 9 and 3 of relays HMTAA and HMTBA, over the parallel make contacts 2 and 1 of relay RCA0, to conductor RV0 extending into Fig. 18, over make contact 4 of relay COT, to battery through the winding of relay RV, which thereupon operates. Upon the operation of relay RV of Fig. 18 the respective ground and battery supplied from the dial pulse register over the respective tip and ring conductors T and R back to the line side of the central office trunk of Fig. 4 are reversed such that battery is now supplied back over the tip lead and ground is supplied over the ring lead. This circuit extends, in Fig. 18, from ground through resistance TN and the lower right-hand winding of the dial tone coil, over make contact 6 of relay RV, contact 2 of jack TST, through break contacts 9 and 3 of relays RRLB and RRLA, to the ring conductor R extending into Fig. 3, and from battery in Fig. 18, through the left-hand winding of the line relay L, through the upper right-hand winding of the tone transformer TN, thence over make contact 10 of relay RV, contact 1 of jack TST, and over break contacts 10 and 2 of relays RRLB and RRLA to the tip conductor T extending into Fig. 3.

The tip and ring conductors T and R extending from Fig. 18 into Fig. 3 are extended to the tip and ring conductors T12 and R12 of the crossbar network, to the left to the vertical position corresponding to trunk hold magnet THM00, and thence to the tip and ring conductors T and R extending into Fig. 4 to the line side of central office trunk 0, where battery on the tip conductor extends over break contacts 7 and 10 of relays BY and RS, over make contacts 4 of relay ACAT to conductor LT extending into the cordless position circuit of Fig. 38, and thence through a make contact of the B jack, over a make contact of pick-up key 4 to the tip conductor T0 of the operator's equipment, through the operator's equipment and back over the operator's ring lead R0, over a make contact of pick-up key 4, through a make contact of the A jack to conductor LR extending into Fig. 4, over make contacts 3 of relay ACAT, and through make contact 1 of relay HD, to the right-hand side of the lower winding of relay P. In Fig. 4 ground on the ring lead, from the crossbar switch network of Fig. 3, extends into Fig. 4 and over the break contact 6 of relay BY, break contact 2 of relay RS, and to the left-hand electrode of diode A. Under these circumstances diode B will be reversed biased and therefore will represent a high impedance; whereas, diode A will be forward biased and will represent a very low impedance. Therefore the circuit will be completed from the left-hand electrode from diode A, through diode A, through break contact 5 of relay MC, and through the lower winding of relay P to the circuit previously described, thereby operating relay P. Relay P, in operating, completes a circuit for causing the operation in Fig. 5 of relay MC, the circuit extending in Fig. 5 from battery through the winding of relay MC, thence through make contact 5 of relay P, and break contact 7 of relay TTT, to the holding ground for relay HD. Relay MC, in operating, causes the release of relay P and relay MC locks in a circuit extending from the lower side of its winding, through its own make contact 4, to conductor RLSE extending into Fig. 26, through break contacts 7 and 1 of relays RLAB and RLBB, to ground over the parallel make contacts 4 of relays TEA3 and TEB3, the relay HM and the hold magnet THM00 of Fig. 5 remaining operated in a locking circuit extending from the lower terminal of the winding of relay HM, over make contact 9 of relay MC, to conductor ME extending into Fig. 29, to ground over break contacts 7 and 6 of relays COA and COB.

Upon the operation of relay MC of Fig. 5 a circuit is completed for causing the operation in Fig. 25 of relay NT in series with the relay NTP of Fig. 39, the circuit extending from ground in Fig. 25, through the winding of relay NT, to conductor NT extending into Fig. 5, thence over make contacts 2 and 11 of relays MC and ACAT, to conductor NT extending into Fig. 39, through make contact 4 of relay NTP, to battery through the right-hand winding of relay NTP. Relay NT of Fig. 25 operates in this circuit in series with relay NTP of Fig. 39 and, in operating, completes a circuit extending from ground in the lower right-hand corner of Fig. 26, over make contact 10 of relay NT, to conductor RTE extending into Fig. 4, over make contact 11 of relay MC, to battery through the right-hand winding of relay RTT, which thereupon operates and locks in a circuit extending over its own make contact 12, to conductor CL extending into Fig. 5, and thence to the same locking ground as for relay HD of Fig. 5. Relay RTT, in operating, completes a circuit in Fig. 5 over its make contact 2 to supplement the ground supplied over conductor SP leading into Fig. 39 for holding operated the splitting relay SP of the cordless position circuit. The operation of relay NT of Fig. 25 completes another circuit extending from ground in the lower right-hand corner of Fig. 25, over make contact 6 of relay NT, to conductor K0 extending into Fig. 9 for a purpose to be described hereinafter in connection with releasing the attendant trunk circuit at such time as it has served its purpose.

In the meantime, upon the operation of relay RCD0 of Fig. 12, a circuit was completed between Figs. 19 and 12 for causing the operation of the tens connector of Fig. 12 corresponding to the tens digit 3 registered in dial pulse register circuit 0 of Fig. 19, thereby causing the operation in Fig. 12 of the tens connector relays TCS3, etc. Relay THC3 of Fig. 12, in operating, causes the operation in Fig. 37 of the select magnet connector relay SMC3 preparatory to permitting the operation of certain select magnets on switch 3 of Fig. 34 containing the line circuits having the tens digit of 3. Circuits previously described, extending from the upper left-hand corner of Fig. 6 and over the memory hold magnet THM09 of Fig. 3, thence into the select magnet control circuit of Fig. 37, are effective for causing the operation in Fig. 37 (and Fig. 34) of select magnets SM31 and SM32 preparatory to causing the called P.B.X line circuit 34 of Fig. 35, if idle, to be connected to the same crossbar link to which are presently connected the dial pulse register circuit 0 and the line side of central office trunk 0. The operation of connector relay SMC3 of Fig. 37 energizes the windings in Fig. 37 of relays SMTA and SMTB, as has been explained hereinbefore, which relays are slow operating relays and unless interrupted by some other circuit operation will operate themselves after a short delay determined by their slow operate characteristic. Meanwhile, the operation of the tens connector relay TM3 of Fig. 12 completes a circuit for permitting the sleeve relay S4 of Fig. 30 to test the sleeve condition of the called P.B.X line circuit 34 of Fig. 35. This operation has been described a number of times hereinbefore and it is not considered necessary to go into the details thereof again, it merely remaining to be said that the lower winding of relay S4 will find the sleeve lead of line circuit 34 of Fig. 35 at substantially ground potential, or thereabouts, because the line circuit 34 (being the actual calling party in this instance) is busy. Therefore relay S4 of Fig. 30 cannot operate.

Eventually when relays SMTA and SMTB of Fig. 37 operate, circuits are completed between Figs. 29, 30, 33 and 32 for causing the operation in Fig. 32 of the busy relays BYA and BYB in view of the fact that no sleeve relay has been operated in the meantime. These circuits have been described in detail hereinbefore. Upon the operation of relays BYA and BYB of Fig. 32 and due to the fact that relay NT of Fig. 25 is operated two effects of interest are produced. First of all, because relay NT of Fig. 25 is operated, the operation of relays BYA and BYB of Fig. 32 cannot cause the operation in Fig. 29 of the hunting connectors as is the usual situation when a called line is found to be busy. The reason why the hunting feature is eliminated under the present circumstances is because of the operation of the no-test relay NT of Fig. 25. Also, it will be noted in Fig. 32 that upon the operation of relays BYA and BYB with relay NT operated, circuits are completed for energizing the windings of relays BSYAA and BSYBA which are slow operate relays and will take some time before they become fully operated. Upon the eventual operation of relays BSYAA and BSYBA of Fig. 32, circuits are completed for energizing the corresponding slow operate relays BSYA and BSYB, which eventually will also operate after a time delay determined by their slow operate characteristics. Due to the fact that the hunting connectors HCA and HCB of Fig. 29 cannot operate, no units selection relays of Figs. 15, 16 and 17 can be operated other than the U4 relay of Fig. 16 corresponding to the party at line 34 of Fig. 35.

Eventually, upon the operation of relay BSYA and BSYB of Fig. 32, circuits are completed in Fig. 7 for causing the operation of the sleeve operate relays SOA and SOB. The circuit for relay SOA extends in Fig. 7 from ground, through break contacts 4 and 1 of relays BTTA and COA, parallel make contacts 1 and 2 of relays BSYB and BSYA, through the winding of relay SOA, over the parallel make contacts 10 and 11 of relays BSYB and BSYA, to battery over break contacts 11 and 8 of relays COB and BTTA. Relay SOA operates in this circuit and relay SOB operates in a corresponding circuit. In Fig. 30, upon the operation of the relays SOA and SOB of Fig. 7, circuits are completed for causing the operation of the sleeve relay S4 even though the "called" P.B.X line circuit 34 of Fig. 35 is busy. This circuit extends in Fig. 30 from ground, through the upper winding of relay S4, over make contact 11 of relay U4, to battery over the parallel make contacts 5 of relays SOA and SOB. Relay S4 is operated in this fashion in order to prepare the circuits for causing the central office trunk circuit to "camp-on" the "busy" called P.B.X line circuit; but, as will be explained hereinafter, the camp-on condition will be changed to an actual connecting condition because in the present instance this is a no-test-call-back to a waiting calling line circuit as distinguished from a true camp-on condition, which will be explained in detail hereinafter. Relay S4 of Fig. 30, in operating, provides a locking circuit for itself over its own make contact 12 in an obvious fashion and causes the operation in Fig. 32 of the sleeve end relays SEA, SEB, etc., as hereinbefore described in detail. Relays SEA and SEB, in operating, cause the operation in Fig. 7 of relays SMRA, SMRB, etc., in an obvious manner over make contacts of relays SMTA, SMTB, SEA and SEB, the operation of relays SMRA and SMRB providing an additional locking circuit in Fig. 30 for relay S4. The operation in Fig. 32 of the sleeve end relays SEA and SEB causes the release in Fig. 17 of relays RUCA and RUCB, which in turn cause the release in Fig. 16 of the units selection relay U4, which in turn releases the units end relays UEA and UEB of Fig. 17. The operation of relays SEA, SEB, SMTA and SMTB also energizes the windings in Fig. 7 of relays HMTAA and HMTBA which, however, are slow operate relays and will take sometime in operating and, even after operating, they energize the windings of the corresponding relays HMTA and HMTB of Fig. 7 which are also slow operate relays and will also take an appreciable time for operating. However, before the HMTA, HMTB, etc., relays of Fig. 7 can operate, as will be noticed hereinafter, relays SMTA and SMTB of Fig. 37 will be released, thereby deenergizing these circuits so that the HMTA, HMTB, etc. relays of Fig. 7 will not operate.

Upon the operation of relays SOA and SOB of Fig. 7 and the operation of relays SMRAA and SMRBA of Fig. 7, circuits are completed for operating the hold magnet check relays HMKA and HMKB of Fig. 29. For instance, the circuit for relay HMKA in Fig. 29 extends from battery, through the winding of relay HMKA, over make contact 8 or 4 of relay SOB or SOA, thence over make contact 2 of relay SEA, break contact 8 of relay ZU (assumed to be released), over conductor S10 into Fig. 30, thence over break contacts of relays S9 through S3, make contact 4 of relay S4, and make contact 5 of relay SMRAA, to conductor 4, extending over make contact 5 of relay TM3 to conductor S34 extending to the right-hand side of hold magnet LHM34, in the line circuit 34 of Fig. 35, relay HMKA operating in this circuit due to the low impedance holding ground on the sleeve conductor of line circuit 34. Relay HMKB of Fig. 29 operates in a similar circuit. With reference to Fig. 50, it will be noticed that relays DCKA and DCKB do not release upon the operation of relays HMKA and HMKB, as is the usual case, due to the fact that an additional holding circuit is provided over make contacts 4 of relays BSYB and BSYA. The fact that relays DCKA and DCKB of Fig. 50 are not released at this time indicates that there will be no marker release.

The operation of the hold magnet check relays HMKA and HMKB of Fig. 29 initiate a series of operations which normally would result in a "camp-on" condition, whereby the calling central office trunk circuit of Figs. 4 and 5 would connect a testing circuit to the busy called line circuit 34 whereby the calling trunk circuit could cut through to the line circuit as soon as it is idle. This camp-on condition will be explained hereinafter in connection with the description of an incoming call from the central office. At the moment, the same circuit operations are initiated with respect to a camp-on condition; however, the circuit operation will end in an actual connection to the busy called line circuit 34 because of the operation of the no-test relay NT in the marker circuit of Fig. 25. Upon the operation of relays HMKA and HMKB of Fig. 29 circuits are completed in Fig. 8 for causing the operation of the camp-on relays CONA, CONAA, COA, COAA and the corresponding relays CONB, etc. The circuit for the relays CONA, etc. extends from ground in Fig. 8, over make contacts 1, 8 and 4 of relays SOA, SMRAA and HMKA, make contact 4 of relay COTA, directly through the windings of relays COA and COAA and over break contact 7 of relay LEAA and through the windings of relays CONA and CONAA and over break contact 7 of relay LEBA where both of these circuits join up and extend to battery, over make contacts 10, 8, 10 and 12 of respective relays COTA, HMKA, SEAA and SOA. Similar circuits are provided in the lower part of Fig. 8 for causing the operation of the corresponding relays CONB, etc. Upon the operation of relays COAA and COBA, locking circuits are provided for the relays of Fig. 8 extending from ground, over make contacts of relay RPA0 and make contacts of relays COTA and COAA, etc.

Normally, upon the operation of the camp-on control relays of Fig. 8 under circumstances of a normal camp-on call, as will be described hereinafter in connection with an incoming central office call, the busy relay BY of the particular central office trunk circuit, such as the one shown in Figs. 4 and 5, would be operated from Fig. 26. However, in the present instance, it will be noted by referring to Fig. 26 that due to the operation of the no test relay NT of Fig. 25, the busy relay BY of Fig. 5 cannot operate. This circuit situation in effect cancels the usual "camp-on" condition and changes the procedure whereby an actual connection will be made to the busy line circuit 34 of Fig. 35, regardless of the fact that it may appear to be busy. The operation of relays COA and COB of Fig. 8 causes the release in Fig. 37 of relays SMTA and SMTB, the release of which in turn deenergizes the windings in Fig. 7 of relays HMTAA and HMTBA, etc.

As will be noted in the upper left-hand corner of Fig. 6, the operation of relays COA and COB opens the circuit whereby the select magnets SM31 and SM32 of Fig. 37 were operated, thereby releasing these two select magnets. However, in Fig. 37 the operation of relays COAA and COBA of Fig. 8 causes the operation of select magnet connector relays SMC0 and SMC8 in an obvious fashion over make contacts 7 and 6 of these relays COAA and COBA. The operation of these two select magnet connector relays SMC0 and SMC8, coupled with the fact that select magnet connector relay SMC3 of Fig. 37 is still operated, prepares select magnet operating circuits for switches 0 of Fig. 3, 3 of Fig. 34 and 8 of Fig. 42 whereby the P.B.X line circuit 34 of Fig. 35 may be interconnected with the central office trunk circuit involved in the call, as soon as the link testing circuit of Figs. 46 and 47 is able to ascertain to which one of the sixteen half links the busy line circuit 34 of Fig. 35 is presently connected. This special link testing arrangement will be described presently. Upon the operation of relays COA, COB, CONA and CONB of Fig. 8, circuits are completed between Figs. 29 and 5 for providing a holding circuit for relay HM of Fig. 5 and trunk hold magnet THM00 of Fig. 5; and, a circuit is completed between Fig. 29 and Fig. 35 for supplying a holding ground to the hold magnet LHM34 of the line circuit 34 in Fig. 35. In Fig. 5 a circuit extends from the windings of relay HM and hold magnet THM00, through make contact 9 of relay MC, over the ME lead into Fig. 29, thence over make contact 7 or 6 of relay COA or COB, through break contacts 5 of relays ALBB and ALBA, to ground over the parallel make contacts 2 of relay CONA and CONB, whereby relay HM and trunk hold magnet THM00 of Fig. 5 are held operated. In addition, the same ground in Fig. 29 over make contacts 2 of relays CONA and CONB is extended through make contact 2 of relay SEB, and break contact 2 of relay ZU (assuming it to be released), to conductor S13 extending into Fig. 30, and another ground is supplied in Fig. 29 over the parallel make contacts 1 of relays CONA and CONB, through make contact 2 of relay SEA and break contact 8 of relay ZU, to conductor S10 extending into Fig. 30. Conductors S13 and S10 into Fig. 30 from Fig. 29 are extended over break contacts of relays S0 through S3, respective make contacts 8 and 4 of relay S4, and make contacts 5 of respective relays SMRBA and SMRAA to conductor 4, thence over make contact 5 of relay TM3, to conductor S34 extending into Fig. 35 to the winding of line hold magnet LHM34 to hold same operated.

The application to the sleeve conductor S34 of line circuit 34 in Fig. 35 of the solid ground from Fig. 29 and the operation of the camp-on relays CONA and CONB of Fig. 8 initiate a series of operations in the attendant trunk circuit 1 of Fig. 9 for releasing it from the interconnection with line circuit 34 over the crossbar switches. Solid ground on the sleeve lead S34 of line circuit 34 in Fig. 35 is extended into Fig. 34, and over the crossbar switch apparatus of switch No. 3, to the sleeve lead S09, thence to the left into Fig. 27, thence to the left into Fig. 23, and thence to the left into Fig. 3 where conductor S09 extends over the crossbar switch crosspoints corresponding to select magnets SM00 and SM09 and hold magnet THM05 to the sleeve conductor S of the attendant trunk circuit extending into Fig. 9, thence through make contact 9 of relay BA, to the left-hand side of the winding of relay SLA, whereupon relay SLA is shunted down and releases. Upon the release of relay SLA of Fig. 9, a circuit is completed for operating relay TN in Fig. 9 which circuit extends from ground in Fig. 25, over make contact 6 of relay NT, to lead K0 extending into Fig. 9, thence through break contacts 6 and 7 of respective relays SLA and OUT, and through make contact 4 of relay HDA, to battery through the winding of relay TN, which thereupon operates; and, due to its slow releasing characteristic, if its operating or locking circuit is opened the relay will release after a measured delay interval. Relay TN, in operating, locks over break contact 7 of relay ONA to ground over make contacts 10 and 5 of relays TN and BA. The operation of relay TN causes the release in Fig. 9 of relay BA which in turn causes the release of the attendant hold trunk magnet THM05 of Figs. 9 and 3. The operation of relay TN closes a locking circuit for holding operated relay HDA in Fig. 9 from ground, over make contact 6 of relay TN, through make contact 5 of relay HDA, over break contact 12 of relay ACAA, to battery through the winding of relay HDA. The operation of relay TN also opens the locking circuit for relay TN, thereby putting the release of relay TN under the control of the marker circuit and relay HDA of Fig. 9. Upon the release of hold magnet THM05 of Figs. 9 and 3, the tip, ring and sleeve conductors of the attendant trunk circuits of Fig. 9 are disconnected from the crossbar switch network, thereby causing the release in Fig. 9 of relay AA. This leaves relay HDA locked under control of the operated relay TN and leaves the relay TN operated under control of the K0 lead from the marker circuit of Fig. 25, in turn under control of the operated no-test relay NT in Fig. 25. Relays TN and HDA will be released when the marker is released, including the release of relay NT of Fig. 25. At such time as the marker circuit releases, relay TN in the attendant trunk circuit of Fig. 9 will be released, which in turn will cause the release of relay HDA of Fig. 9, thereby releasing to normal the attendant trunk circuit. Upon the release of relay HDA of Fig. 9, the lamp SL1–01 of Fig. 39 in the cordless position circuit will be extinguished, thereby indicating to the P.B.X attendant that the attendant trunk circuit 1 of Fig. 9 is completely returned to normal and available for other use.

Returning now to the description of the marker operation in connection with the control by the camp-on relays of Fig. 8, the operation of relays CONA and CONB has in the meantime caused the operation in Fig. 41 of the relays TRKA, TRKB, etc. The circuit for operating relays TRKA and TRKAA extends in Fig. 41 from ground in the upper left-hand corner thereof, over make contact 7 of relay CONA, break contact 4 of relay NCA, through break contacts 5 and 3 of relays TRCA and TRCBA, through the parallel windings of relays TRKA and TRKAA, over break contacts 12 and 8 of relays TRCBA and TRCA, over break contact 10 of relay NCB, to battery over make contact 9 of relay CONA. Relays TRKB and TRKBA are operated in similar circuits in an obvious fashion. These relays TRKA, TRKB, etc., in operating, lock under control of make contacts of relays TRKAA, TRKBA, SEA and SEB as will be apparent by inspection of the circuits on the left-hand side of Fig. 41. Relays TRKAA and TRKBA open the operating circuits in Fig. 37 for relays SMTA and SMTB to prevent the energization of these relays until such time as the relays TRKAA, etc. are released. Also, it will be noted in Fig. 7 that the operation of relays TRKA and TRKBA open the operating circuits for relays HMTA, HMTB, etc. to deenergize these windings and prevent the operation of the associated relays as was mentioned hereinbefore. Also, it will be noted in Fig. 7 that the operation of relays CONA and CONB provide locking circuits over their make contacts 4 and 11 for maintaining operated the relays SMRA, SMRB, etc. upon the release of the relays SMTA and SMTB of Fig. 37.

The operation of relays CONA, CONB, CONAA and CONBA of Fig. 8 initiates meanwhile a series of operations in the link testing circuit of Figs. 46 and 47 whereby the link test circuit ascertains which one of the 16 links through the crossbar switch is presently engaged by the line circuit 34. It will be recalled from previous descriptions that the usual test made by the link testing circuit of Figs. 46 and 47 is to ascertain the distinction between busy and idle links for purposes of making an interconnection over an idle link. In the present instance, however, it will be necessary for the link test circuit to make a special test because there are three possible conditions on the horizontal crossbar switch links at the moment. One condition is a busy line which will have a low impedance ground upon it. The second condition is an idle link which will have no potential on it other than that applied by the link test circuit. The third condition is the present situation whereby line circuit 34 of Fig. 35 is actually busy but instead of a low impedance ground on its sleeve lead, it will have, as previously described, a solid ground. The presence of the solid ground is the means whereby the link testing circuit at the moment may make a distinction between an ordinary busy line and the busy line 34. It is the operation of the camp-on relays of Fig. 8 which permits the link testing circuit of Figs. 46 and 47 to modify its operation slightly to detect this special sleeve condition. With reference to Fig. 46 it will be recalled that when the link test relays LT2 through LT9 of Fig. 46 are arranged for the usual testing for an idle link, relays LTA and LTB of Fig. 47 are operated, thereby to place the upper windings of relays LT2, etc. in series with a potentiometer arrangement including the potential on the various sleeve conductors S02, S12, S03, S13, etc. of the crossbar link circuit. Under these circumstances, busy links will have about −8 volts negative potential on their sleeve conductors and idle links will have about −42 volts on their sleeve conductors. Under these circumstances as will be recalled, the busy links having approximately −8 volts on their sleeve conductors will not be able to cause the operation of the link test relays, such as relay LT2 of Fig. 46, but idle links having approximately −42 volts on their sleeve conductors will be able to cause the operation of a sleeve test relay through its upper winding. Under the present circumstances, where the special sleeve test is to be made, it will be noted that relays CONAA and CONBA are operated instead of the normal link test relays LTA and LTB. This change in circuit operation puts the lower winding of the link test relays in series with the potentiometer including the potential on the sleeve leads of the link circuits. These link test relays LT2 through LT9 are polarized relays and the lower windings thereof are arranged in the opposite polarity sense to the upper windings. Upon the operation of relays CONA and CONB, circuits are completed in Fig. 47 for causing the operation of the link test connector relays LTCA and LTCB in obvious circuits over make contacts 5 and 10 of relays CONA and CONB. Assuming that relays TRLA and TRLB of Fig. 47 are operated (that is, that relays WLG and ZLG of Fig. 47 are both operated), circuits are completed in Fig. 46 whereby the link test relays LT2 through LT9 are permitted to test the sleeve leads of the eight upper half links comprising sleeve leads S12, S13, etc. through S19. With respect to relay LT2 of Fig. 46 a circuit extends from ground through resistance LTB2 to the right-hand side of the lower winding of relay LT2 through the parallel make contacts 2 of relays CONAA and CONBA and through resistance LTA2 to battery over parallel make contacts 1 of relays LTCA and LTCB, thereby to place upon the right-hand side of the lower winding of relay LT2 a potential determined by the potentiometer comprising the resistances LTA2 and LTB2. Another circuit extends from the left-hand side of the lower winding of relay LT2, over make contact 3 or 12 of relay TRLB or TRLA, to the sleeve lead S12 of the upper half of level 2 of the crossbar switches, and in Fig. 46 over the parallel make contacts 17 of relays LTCA and LTCB, to battery through resistance L2U, thereby to place a potential on the sleeve conductor S12 depending upon the condition of the link associated therewith. Any idle link will not have any circuitry attached to the sleeve thereof, such as sleeve lead S12 of Fig. 46; therefore, the only potential across the lower winding of the relay LT2 will be that determined by the potentiometers on the left and right-hand side of the relay and comprising the battery and ground and resistances L2U, LTB2 and LTA2. Under these circumstances, the potential existing across the lower winding of relay LT2 produces a current through this winding, but it is in the wrong direction to cause the operation of relay LT2. Therefore, no link test relay LT2 through LT9 will be operated by virtue of any idle associated link sleeve lead. On the other hand, if a link is busy in the usual sense, that is, having a low impedance holding ground on it as distinguished from a solid ground, the potential on the corresponding sleeve lead, such as lead S12 in Fig. 46, will be approximately −8 volts. This produces a potential across the lower winding of relay LT2 which is in the proper direction but which is not sufficient to cause the operation of relay LT2. Thirdly, any link which has solid ground on it, such as sleeve lead S12 of Fig. 46, will, as will be obvious by inspection, cause the left-hand side of the lower winding of relay LT2 to be at solid ground potential. This produces a potential across the lower winding of relay LT2 which is in the proper direction and of the proper magnitude to cause the operation of the corresponding test relays. It will be recalled that line circuit 34 of Fig. 35 was interconnected with the attendant trunk circuit of Fig. 9 over the lower half of level 9 of the crossbar switches comprising the tip, ring and sleeve conductors T09, R09 and S09. Therefore, sleeve conductor S09 of Fig. 46 is the only sleeve conductor of the 16 half links which has solid ground upon it. There is no sleeve lead in the upper halves of the links, namely, sleeve conductors S12, S13, S14, etc., through S19 which has solid ground upon it. Therefore, the present test of the upper halves of the links will not cause the operation of any of the link test relays LT2 through LT9 of Fig. 46.

With reference to Fig. 47, upon the previous operation of relays COA and COB of Fig. 8, circuits are completed for energizing the windings of the slow operate relays LBA and LBB of Fig. 47. The circuit for relay LBA in Fig. 47 extends from ground, through the winding thereof, over make-contact 9 of relay COA, to battery through break contacts 7 of all of the link test slave relay LTS2 through LTS9 of Figs. 46 and 47. Since none of the link test relays LT2 through LT9 of Fig. 46 were operated as a result of the above-described test of the sleeve conductors in the upper half levels, none of the corresponding link test slave relays LTS2 through LTS9 of Figs. 46 and 47 can operate, thereby permitting the operation of relays LBA and LBB after a time measured by their slow-operate characteristics. Upon the operation of relays LBA and LBB of Fig. 47, circuits are completed through their corresponding make contacts 2 and 10 to permit the operation in Fig. 47 of the all-links busy relays ALBA and ALBB if no link test slave relay LTS2 through LTS9 becomes operated before the slow operate characteristic of these all-links busy relays permits them to operate. In the meantime, upon the previous operation of relays COAA and COBA of Fig. 8, a circuit was completed in Fig. 47 for causing the operation of relay WLGA under the control of break contacts 5 and 7 of relays LBA and LBB and make contact 8 of the operated relay ZLG. This operation of relay WLGA causes the release of relay WLG, leaving relay ZLG locked under control of make contact 5 of relay WLGA, thereby to retain operated the relays TRLA and TRLB in Fig. 47. However, upon the instant operation, above-described, of relays LBA and LBB due to the fact that no grounded sleeve conductor was detected in the upper halves of the crossbar switch link levels, relays WLGA and ZLG of Fig. 47 were both released, thereupon causing the release of relays TRLA and TRLB. With relays TRLA and TRLB released it will be noted in Fig. 46 that the lower windings of the link test relays LT2 through LT9 are switched from the sleeve conductors of the upper levels (leads S12 through S19 of Fig. 46) to the sleeve conductors corresponding to the lower halves of the crossbar switch levels, namely, sleeve conductors S02, S03, etc. through S09. In this group of sleeve conductors S02 through S09 it will be recalled that sleeve conductor S09 is the one of interest at the moment, and which has upon it solid ground potential. As above explained, this will cause the operation through the lower winding thereof of the link test relay LT9 of Fig. 46. Relay LT9, in operating, completes an obvious circuit in Fig. 47 through the upper winding of relay LTS9 for causing the operation thereof, thereby deenergizing the winding of relays ALBA and ALBB of Fig. 47 and causing the release of relays LBA and LBB. Also, a locking circuit is completed in Fig. 46 for relay LT9 in an obvious manner over make contacts 9 and 6 of relays COBA and LTS9. This holding ground applied to the left-hand side of the windings of relay LT9 of Fig. 46, also applies a solid ground through break contacts 7 and 9 of relays TRLA and TRLB directly to the sleeve conductor S09, which extends through switch 8 of Fig. 42 and into switch 3 of Fig. 34 and over crosspoints thereof controlled by hold magnet LHM34 of Fig. 35, to the winding of this hold magnet to maintain it operated. Also, it will be noted in Fig. 47 that the release of relays LBA and LBB again completes a circuit for causing the operation of relay WLG, etc.

Upon the release of relays LBA and LBB with the link test slave relay LTS9 operated, circuits are completed in Fig. 47 for operating the link end relays LEA, LEB, etc. The circuit for operating relays LEA and LEAA of Fig. 47 extends from ground, over make contact 10 of relay LTS9, break contact 9 of relay LBA, parallel make contacts 2 of relays COAA and COBA, break contacts 3 and 2 of relays RLAB and RLSB, through the windings of the link end relays, over break contacts 11 of relays RLSA and RLBB, to battery over the parallel make contacts 19 of relays COAA and COBA. Similar circuits are provided for causing the operation in Fig. 47 of the corresponding relays LEB and LEBA. Relays LEA and LEB, in operating, complete locking circuits in Figs. 46 and 47 for relay LTS9 of Fig. 47. This circuit extends from battery in Fig. 47, over the parallel make contacts 20 of relays COAA and COBA, through the lower winding of relay LTS9, over the parallel make contacts 11 and 12 of relay LTS9, to conductor 460 extending into Fig. 46 to ground over the parallel make contacts 1 of relays LEA and LEB.

Upon the operation of relays LEA, LEB, etc. of Fig. 47, circuits are completed in Fig. 37 for causing the operation on switches 0, 3 and 8, of Figs. 3, 34 and 42, of the select magnets necessary to cause an interconnection over the lower half of level 9 of the crossbar switches, namely, select magnets corresponding to levels 0 and 9 thereof. In Fig. 37, due to the operation of the link test slave relay LTS9 of Fig. 47, a circuit is completed whereby conductor SM9 in the upper left-hand corner of Fig. 37 is grounded and this grounded conductor then extends over the parallel make contacts 9 of the operated select magnet connector relays SMC0, SMC3 and SMC8 to cause the operation of select magnets SM09, SM39 and SM89. Also circuits are completed for causing the operation of select magnets SM00, SM30 and SM80 extending from ground in the upper right-hand corner of Fig. 37, over make contact 1 of relay LTS9, over break contacts 2 and 1 of respective relays TRLA and TRLB, over parallel make contacts 3 of relays LEA and LEB to conductor SM0, thence over make contacts 10 of relays SMC0, SMC3 and SMC8 to cause the operation of select magnets SM00, SM30 and SM80. Since line hold magnet LHM34 of line circuit 34 in Fig. 35 is still operated the tip, ring and sleeve conductors of this line circuit are still connected to the tip, ring and sleeve conductors T09, R09 and S09 comprising the lower half of level 9 of the crossbar switches. At such time as the hold magnet THM00 of the trunk circuit of Fig. 5 will have been released and reoperated, due to the fact that the select magnets SM00 and SM09 of Fig. 3 have been operated, the trunk circuit of Figs. 4 and 5 will be connected to the same tip, ring and sleeve conductors T09, R09 and S09 to which is connected the line circuit 34 in Fig. 35.

Upon the operation of relays LEAA and LEBA of Fig. 47, relays CONA, CONAA, CONB and CONBA of the route control circuit in Fig. 8 are released, thereby releasing relays LT9 of Fig. 46 and LTCA and LTCB of Fig. 47. In addition, the release of relays CONA and CONB removes the ground in Fig. 29 from the conductor ME extending into Fig. 5, thereby to cause the release of relay HM of Fig. 5 and of the trunk hold magnet THM00 of Figs. 5 and 3. The release of relays CONA and CONB also removes the ground in Fig. 29 from conductors S10 and S13 extending into Fig. 30 whereby the sleeve conductor of line circuit 34 was solidly grounded; however, the line hold magnet LHM34 of Fig. 35 is still held operated by solid ground applied to sleeve conductor S09 in Fig. 46 through make contacts of relays COBA and LTS9. The release of trunk hold magnet THM00 of Figs. 5 and 3 disconnects the tip, ring and sleeve conductors of the line side of the trunk in Fig. 4 from the crossbar switch link to which it was connected with the dial pulse register 0 of Figs. 14, 18 and 19, namely, the upper half of level 2 comprising tip, ring and sleeve conductors T12, R12 and S12; and, this releases the sleeve relay SL of Fig. 5, the release of which is of no particular consequence at this time. The tip, ring and sleeve conductors of dial pulse register 0 of Fig. 18 remain connected to the upper half of level 2 of the switches until such time as the dial pulse register is released by the marker circuit.

In the meantime, upon the release of relays CONA, CONB, etc. of Fig. 8, certain circuit operations have been initiated leading up to the reoperation of the trunk hold magnet THM00 of Figs. 5 and 3 and the ultimate release of all of the circuits involved in the connection once the trunk has been connected over the lower half of level 9 of the switches to the P.B.X party at line circuit 34 of Fig. 35. The release of relays CONA and CONB causes the release in Fig. 7 of relays SOA and SOB which in turn release the sleeve relay S4 of Fig. 30, the release of which in turn causes the release in Fig. 32 of the sleeve end relays SEA, SEB, etc. Also, in Fig. 7, the release of relays CONA and CONB causes the release of relays SMRA, SMRB, etc. which in turn cause the release of the hold magnet check relays HMKA and HMKB of Fig. 29, which, in releasing, complete circuits in Fig. 41 for causing the operation of relays TRCA, TRCB, etc. In Fig. 41 the circuit for operating relays TRCA and TRCAA extends from ground, over make contact 4 of relay TRKA, break contacts 1 and 6 of relays HMKA and SMTA, through the parallel windings of relays TRCA and TRCAA, over break contacts 10 and 11 of relays SMTB and HMKB, to battery through make contact 10 of relay TRKA. Relays TRCA and TRCAA operate in this circuit and relays TRCB and TRCBA of Fig. 41 operate in similar circuits in an obvious fashion. The operation in Fig. 41 of relays TRCA, TRCB, etc. causes the release in Fig. 41 of relays TRKA, TRKB, etc. and of relays RCTA, RCTB, etc. The release of relays TRKAA and TRKBA of Fig. 41, with relays LEA and LEB of Fig. 47 operated, energizes the windings in Fig. 37 of relays SMTA and SMTB. Eventually, relays SMTA and SMTB of Fig. 37 will operate after a time interval determined by their slow operate characteristics. In Fig. 37 the circuit for energizing the winding of relay SMTA extends from ground, through break contacts 5, 5 and 4 of relays TRKAA, RLAB and RLSA, through the winding of relay SMTA, break contacts 9 of relays RLSB, RLBB and STAR, break contacts 4 and 3 of relays STBR and TRKBA, to battery over the parallel make contacts 12 of relays LEA and LEB. The winding of relay SMTB is energized in a similar circuit in an obvious fashion.

In the meantime, the release of relays RCTA, RCTB, etc. of Fig. 41 causes the release in Fig. 12 of relays RCAO through RCEO, the release of which in turn causes the release in Fig. 12 of the tens connector relays TCS3, etc. The release of relays RCTA and RCTB of Fig. 41 also causes the release in Fig. 32 of relays BYB and BYA which in turn cause the release of the corresponding relays BSYA, BSYB, etc. of Fig. 32. If will be noted at this point that the relays DCKA and DCKB of Fig. 50 do not release upon the release of relays BSYA and BSYB because the locking circuits through make contacts 3 of relays HMKA and HMKB were completed before the release of relays BSYA and BSYB. Therefore, the down check relays DCKA and DCKB remain operated.

Eventually, the relays SMTA and SMTB of Fig. 37 operate after a time interval determined by their slow operate characteristic. Upon the operation of these relays, circuits are completed between Fig. 29 and Fig. 5 for causing the operation of the trunk hold magnet THM00 of Fig. 5. One circuit extends from the lower central part of Fig. 29, from ground, over make contact 4 of relay SMTB, break contacts 7 and 4 of relays HMTA and HMTB, and in parallel therewith over make contact 3 of relay COTB, thence through break contacts 5, 8 and 4 of relays TRKB, SOA and SOB, thence through break contacts 5 of relays ALBA and ALBB, and over make contacts 6 or 7 of relay COB or COA, to conductor ME leading into Fig. 5, and over make contact 9 of relay MC, to battery through the windings of relay HM and hold magnet THM00, which thereupon operate. The operation in Fig. 3 of trunk hold magnet THM00, with select magnets SM00 and SM09 operated, interconnects the tip, ring and sleeve conductors of the trunk circuit of Figs. 4 and 5 with the tip, ring and sleeve conductors T09, R09 and S09 comprising the lower half of level 9 of the crossbar switches, and thence over these three conductors into Fig. 34 and over corresponding crosspoints for line circuit 34 and into Fig. 35 to the tip, ring and sleeve conductors of line circuit 34. The solid ground on sleeve conductor S09 of the crossbar switch network, applied thereto from Fig. 46, is extended back into the trunk circuit of Fig. 4 to the sleeve conductor of the trunk and thence into Fig. 5 to cause the reoperation of the sleeve relay SL, the operation of which is of no particular consequence at this time. The tip and ring leads from line circuit 34 of Fig. 35 are connected over the tip and ring leads T09 and R09 of the crossbar switch network, to the tip and ring leads of the trunk circuit of Fig. 4, and thence over respective break contacts 7 and 6 of relay BY, and respective break contacts 10 and 2 of relay RS, etc. and over respective make contacts 4 and 3 of relay ACAT, to the tip and ring conductors LT and LR leading into the cordless position circuit of Fig. 38, and thence to the attendant's telephone circuit over make contacts of pick-up key 4 associated with the trunk circuit of Figs. 4 and 5, by means of which circuit the attendant may inform the P.B.X party at line circuit 34 that the desired connection with the central office has been completed.

Upon the operation of relays SMTA and SMTB of Fig. 37, the circuits for relays HMTAA, HMTBA, etc. of Fig. 7 are energized and eventually relays HMTAA and HMTBA are operated, to in turn energize their slow operating counterparts HMTA and HMTB. When relays HMTAA and HMTBA of Fig. 7 operate, circuits are completed between Fig. 26 and Fig. 5 for causing the operation in Fig. 5 of the ring start relay RS. This circuit extends from ground in Fig. 26, over make contact 10 of relay RPA0, the parallel make contacts 12 of relays HMTBA and HMTAA, through break contacts 8 of relays TKA8, TKA9 and TKA0, to conductor RSE extending into Fig. 5, through the make contact 12 of relay MC, to battery through the winding of relay RS, which thereupon operates. The operation of relay RS in Fig. 5 continues the holding bridge across the central office end of the trunk circuit of Fig. 4 and causes the release in Fig. 5 of relay HD. The release of relay HD causes steady battery to be applied in Fig. 5 to conductor TL1–0 extending into Fig. 39 to cause the lamp TL1–0 to light steadily, and causes battery interrupted at a rate of 30 interruptions-per-minute to be applied to conductor SL1–0 in Fig. 5, extending into Fig. 39 to cause the lamp SL1–0 to flash at a rate of 30 interruptions-per-minute. One circuit extends from battery in the upper right-hand corner of Fig. 5, through break contact 2 of relay HD, over the parallel make contacts 12 and 6 of relays SRT and S1T, through break contact 3 of relay R1T, through resistance TL2 and to conductor TL1–0; and, the other circuit extends from battery in the lower right-hand corner of Fig. 5, through the 30 i.p.m. interrupter, to conductor SF1, thence over make contact 4 of relay RS, break contact 3 of relay HD, break contacts 5 and 4 of relays BY and FF, through make contact 3 of relay HM, and through resistance SL2 to conductor SL1–0. In addition, in Fig. 5, the release of relay HD causes the release of relay SL and places a low impedance holding ground on the sleeve conductor S extending from ground in Fig. 5, through resistance SH and through break contacts 12 and 8 of relays HD and BY to conductor S, thence into Fig. 4 to the sleeve conductor S of the trunk circuit, extending into Fig. 3 to the sleeve conductor S09 of the lower half of level 9 of the crossbar switches, and thence into Fig. 35 to the winding of line hold magnet LHM34 to maintain this hold magnet operated under control of central office trunk circuit of Figs. 4 and 5. The release of relay HD of Fig. 5 also completes a circuit for causing the operation of relay FB in the P.B.X attendant position circuit of Fig. 39. This circuit extends from battery in Fig. 39, through the winding of relay FB, over make contact 4 of relay SP, to conductor FB extending into Fig. 5, thence over make contact 5 of relay ACAT, and over break contact 8 of relay HD to off-normal ground in the trunk circuit. The operation of relay FB of Fig. 39 causes ground and battery to be applied to the respective tip and ring conductors LT and LR extending from the attendant's telephone circuit back to the line side of the trunk circuit of Fig. 4. Ground in Fig. 38 extends through a coil and make contact 6 of relay FB to the line tip conductor LT and battery extends through another coil and make contact 4 of relay FB to the line ring conductor LR, both extending back into the central office trunk circuit of Fig. 4. This particular circuit operation, whereby ground and battery are extended back over the tip and ring conductors to the central office trunk, supplies talking battery and ground to the station circuit of line 34 in Fig. 35 so that the attendant may communicate with the calling P.B.X party thereat.

Eventually, when relays HMTA and HMTB of Fig. 7 operate, circuits are completed for reoperating the hold magnet check relays HMKA and HMKB in Fig. 29 as an indication that the central office trunk circuit of Figs. 4 and 5 is properly holding the connection. In Fig. 29, ground extends over make contact 4 of relay SMTA, make contact 3 of relay COTA, parallel make contacts 4 and 11 of relays HMTA and HMTB, to battery through the winding of relay HMKA, which thereupon operates, as does its companion relay HMKB in a similar circuit in an obvious fashion. Upon the operation of relays HMKA and HMKB, the down check relays DCKA and DCKB of Fig. 50 release, thereby causing the operation in Fig. 7 of the marker release relays RLA, RLB, etc. to initiate the complete releasing cycle whereby the marker circuit and the dial pulse register circuit are all returned to normal. Upon the operation of relays RLAB.

and RLBB of Fig. 7, relay MC of Fig. 5 is released, thereby maintaining relay HM and hold magnet THM00 of Fig. 5 operated in a circuit extending from the windings thereof, through break contact 8 of relay MC, make contact 1 of relay HM, parallel break contacts 8 and 4 of relays P and R1T, make contact 16 of relay ACAT, make contact 1 of relay RS, to off-normal ground in the trunk circuit over break contact 6 of relay HD. The release of relay MC of Fig. 5 causes the release of relay NT of Fig. 25 and relay NTP of Fig. 39 and the release in Fig. 5 of the ring start relay RS, which causes steady battery to be applied to lamp SL1–0 of Fig. 39, the circuit extending from battery in Fig. 5, over make contact 11 of relay S1T, break contact 4 of relay RS, break contacts 3, 5 and 4 of relays HD, BY and FF, make contact 3 of relay HM, through resistance SL2, to conductor SL1–0 extending to lamp SL1–0 of Fig. 39 thereby to make this lamp light steadily as an indication to the attendant that the central office trunk circuit has been connected to the line circuit 34 of Fig. 35 and that she may release from the connection.

When the P.B.X attendant sees the lamp SL1–0 of Fig. 39 go into a steady lighted condition she will announce the completion of the call to the P.B.X party at line circuit 34 and then will release pick-up key 4 associated with the trunk circuit of Figs. 4 and 5. The release of pick-up key 4 causes the release in Fig. 4 of relay AC, which in turn causes the release in Fig. 4 of relay ACAT. Upon the release of relay AC and before the release of relay ACAT, relay RTT of Fig. 4 remains locked operated in a circuit extending from battery in Fig. 4, through its right-hand winding, over its own make contact 12, to conductor CL leading into Fig. 5, and thence over break contact 5 of relay AC, to off-normal ground in the trunk circuit. The release of relay ACAT in Fig. 4 breaks off all of the interconnections between the attendant's cordless position circuit of Figs. 38 and 39 and the trunk circuit of Figs. 4 and 5, except for the circuits whereby the signal lamps SL1–0 and TL1–0 of Fig. 39 remain lighted steadily in order that the attendant will know that the trunk circuit is busy. Due to the release of this interconnection relays SP and FB of Fig. 39 release, thereby removing the splitting condition in the central office trunk circuit of Fig. 4 and permitting the line side thereof, namely the tip and ring conductors extending from Fig. 3, to be connected straight through to the tip and ring leads leading to the alarm and transfer circuit of Fig. 36 and thence to the termination at the central office previously set up by the P.B.X attendant.

In the meantime the operation of the release relays RLA, RLB of Fig. 7 has initiated a series of operations, heretofore described in detail, whereby the marker circuit completely releases to normal and in doing so releases to normal the dial pulse register circuit of Figs. 14, 18 and 19. During this release operation the release of relay RPA0 of Fig. 12 causes the release in Fig. 7 of the central office trunk route control relays COTA and COTB, which in turn cause the release in Fig. 8 of the camp-on relays COA, COB, etc., and the release in Fig. 47 of the link end relays LEA, LEB, etc., which in turn release the relay LTS9 of Fig. 47, which in turn removes the solid ground from the sleeve conductor S09 of Fig. 46. The remaining marker release functions are the same as previously described, as are those with respect to the dial pulse register 0 of Figs. 14, 18 and 19, and it is considered unnecessary to repeat this description in detail at this point.

Upon the complete release of the P.B.X marker circuit and of the dial pulse register 0 circuit of Figs. 14, 18 and 19, the P.B.X party at line circuit 34 is interconnected over the lower half of level 9 of the crossbar switches comprising tip, ring and sleeve conductors T09, R09 and S09 into the left-hand side of the central office trunk 0 of Fig. 4, through the central office trunk circuit, out over the tip and ring leads in the right-hand side of Fig. 4 to the alarm transfer and test circuit of Fig. 36, and thence over make contacts of relay ATA to the central office terminating circuits of Fig. 31A, depending upon whether the call placed by the P.B.X attendant on behalf of the party at line circuit 34 was to a local subscriber in the central office (by means of the intraoffice trunk connection in the upper part of Fig. 31A) or to a toll facility (as shown by the operator cord and trunk circuit in the lower half of Fig. 31A). Ground extends from the upper left-hand corner of Fig. 5, through resistance SH, over break contacts 12 and 8 of relays HD and BY, to conductor S extending into Fig. 4, thence up into Fig. 3, over the crosspoints corresponding to select magnets SM00 and SM09 to the sleeve conductor S09 in the lower half of level 9, thence across the crossbar switch network into Fig. 34 and down over the vertical corresponding to line circuit 34 to the sleeve conductor S in Fig. 35, to battery through the line hold magnet LHM34, thereby to maintain this hold magnet operated. In Fig. 5 the trunk hold magnet THM00 (also known in Fig. 3) and relay HM are held operated in a circuit extending from the lower sides of the windings thereof, through break contact 8 of relay MC, make contact 1 of relay HM, over the parallel break contacts 8 and 4 of relays P and R1T, to off-normal ground in the trunk circuit of Fig. 5 through break contacts 4 and 6 of relays AC and HD, thereby to maintain operated the hold magnet THM00 for trunk circuit 0 of Figs. 4 and 5. Relay TLAT of Fig. 5 remains locked operated in a circuit extending from battery, through its winding, over its own make contact 1, to off-normal ground in the trunk circuit of Fig. 5. In Fig. 39 the lamps SL1–0 and TL1–0 remain lit steadily as an indication to the P.B.X attendant that both ends of the trunk circuit of Figs. 4 and 5 are in use. In Fig. 4 relay RTT remains locked operated in a circuit extending from battery, through the right-hand winding, over its own make contact 12, to conductor CL extending into Fig. 5, and to off-normal ground over break contact 5 of relay AC. The closed line loop at station 34 in Fig. 35 extends over the tip and ring conductors of the crossbar switch network into the left-hand side of Fig. 4 where the tip conductor T extends through break contacts 7, 10, 3 and 5 of relays BY, RS, AC and HD, and through the winding of relay S, thence over break contact 6 of relay FF and make contact 6 of relay CT to the tip conductor T, extending into the transfer circuit of Fig. 36, and where the ring conductor entering the left-hand side of Fig. 4 extends over break contacts 6 and 2 of relays BY and RS, make contacts 2 and 8 of relays TLAT and SRT, break contacts 1, 9 and 7 of relays HD, AC and HD, over break contact 8 of relay FF and make contact 8 of relay CT to the ring conductor R extending into the transfer circuit of Fig. 36. In Fig. 36 the tip and ring conductors T and R from the right-hand side of the trunk circuit in Fig. 4 extend over respective make contacts 1 and 2 of relay ATA and thence to the tip and ring conductors T and R into the line link termination at the central office of Fig. 31A. In Fig. 31A the tip and ring conductors from the transfer circuit of Fig. 36 terminate respectively in ground and battery through the windings of the supervisory relay SUP of the intraoffice trunk in the event that this call has been terminated to a local central office subscriber, or these tip and ring leads terminate in the reverse sense to battery and ground through the windings of the supervisory relay SOP of the operator cord circuit in the lower part of Fig. 31A in the event that this call has been extended by the P.B.X attendant to the toll facility at central office. Due to the fact that the relay TLAT of Fig. 5 is operated (indicating a permissible toll allowed class of service) it makes no difference whether the tip and ring leads at the central office are terminated in respective ground and battery or vice versa. In Fig. 4 the supervisory relay S of the central office trunk circuit 0 operates in this tip and ring line loop between P.B.X party 34 in Fig. 35 and the termination in the central office of Fig. 31A; and, relay S, in remaining operated, holds operated relay S1T of Fig. 4 and relays CT and SRT of Fig. 4 also remain operated as previously described.

The original calling party at line circuit 34 of Fig. 35 may now hold the desired conversation either with a local subscriber in the central office or with another party over the toll facility completed under control of the operator at the toll facility indicated in Fig. 31A. It will be recalled in connection with the previous description of a call placed by a toll allowed P.B.X station to a toll facility, that in the event that the toll operator informed the calling P.B.X party to wait a short while pending completion of the call, the calling P.B.X party should remain off hook but that in the event that a toll allowed P.B.X party should go on hook pending the completion of the call a rering by the toll operator would cause the selective ringing of that particular calling P.B.X party's line without alerting the P.B.X attendant. In the present instance a call to the toll facility of Fig. 31A was placed by means of the P.B.X attendant because the calling circuit 34 of Fig. 35 had a restricted class of service. In the event that the toll operator should inform the party at line circuit 34 to wait completion of the call, if the party at line circuit 34 remains off hook, none of the circuit will be disturbed. However, should the P.B.X party at line circuit 34 disconnect, the circuit action will be different than as previously described for the toll allowed class of service P.B.X party. In the present instance if the P.B.X party at line circuit 34 disconnects, this will cause a release of all of the switching equipment in the P.B.X such that any rering by the toll operator will alert the P.B.X attendant just as it would for an originating incoming call.

If the P.B.X party at line circuit 34 in Fig. 35 disconnects pending completion of the call by the toll operator, the tip and ring loop through the station line circuit in Fig. 35 will be opened, thereby releasing the supervisory relay S in the trunk circuit of Fig. 4. The release of relay S with relays RTT and SRT of Fig. 4 operated completes a circuit in Fig. 4 for causing the operation of the fast-flash relay FF extending from ground in Fig. 4, over break contact 2 of relay S and make contacts 4 and 1 of relays RTT and SRT, to battery, through the winding of relay FF. Also, the operation of relay S eventually releases the slow releasing relay S1T of Fig. 4. Relay FF, in operating, places a low impedance shunt across the central office end of the trunk circuit of Fig. 4 in a circuit extending from the tip lead T thereof, over make contact 6 of relay FF, make contact 9 of relay FF, low impedance resistance LS, make contact 9 of relay RTT, through break contact 6 of relay TTT, through coil H1, back to the ring conductor R and back to the central office over make contact 8 of relay FF. The operation of relay FF also causes the P.B.X attendant's lamp SL1–0 of Fig. 39 to go out, indicating to the P.B.X attendant that the line side of the central office trunk, namely the calling P.B.X party at line circuit 34 of Fig. 35, has disconnected. Relay S1T of Fig. 4, in releasing, places the two windings of relay H in Fig. 4 in series through break contact 2 of relay S1T across the tip and ring conductors leading back to the central office in Fig. 31A; and, as long as the toll operator at the central office maintains her equipment off normal, relay H will operate in this circuit and will remain operated. When relay S1T of Fig. 4 releases, relay CT of Fig. 4 started to release and, because of the intervening operation of relay FF of Fig. 4, relay CT has no holding circuit and therefore eventually will release, in turn releasing relay SRT which removes off-normal ground from the trunk circuit. The release of off-normal ground from the trunk circuit causes the release in Fig. 5 of relays TLAT and HM and the release of the trunk hold magnet THM00 (also shown in Fig. 3). Eventually relays RTT and FF of Fig. 4 also release. As soon as relay FF releases a circuit is completed in Fig. 4 for reoperating the cut-through relay CT in a circuit extending in Fig. 4 from ground, over make contact 1 of relay H, break contact 3 of relay FF, break contact 4 of relay P, to battery through the winding of relay CT, which thereupon reoperates and in turn causes the reoperation of relay SRT. With relays H, CT and SRT of Fig. 4 operated and as long as the toll operator maintains her circuit in Fig. 31A off-normal to hold all of the switching equipment back to the trunk side of the central office trunk of Fig. 4, the trunk circuit of Figs. 4 and 5 is now in the same condition as if it were seized at the central office as an incoming call during the silent interval of the ringing cycle, as will be explained hereinafter in detail in connection with an incoming call. Thus, when the toll operator rerings on the circuit, as by operating the ringing key of Fig. 31A, the P.B.X attendant will receive a signal at the cordless position circuit of Figs. 38 and 39 as distinguished from the situation previously described where a rering to an on-hook toll allowed station caused a selective rering of that on-hook toll allowed P.B.X station without alerting the P.B.X attendant. The difference between the two situations is that in the case of the toll allowed party means is provided in the trunk circuit, as has been explained hereinbefore, for holding the P.B.X switching equipment back to the line circuit regardless of the fact that the P.B.X party thereat may go on-hook; whereas, in the present instance of a toll denied or restricted station 34 of Fig. 35, if the waiting P.B.X party goes on-hook, all of the internal switching equipment in the P.B.X is broken down and the toll operator, by holding her circuit off normal, can hold only the switching equipment between her and the central office end of the P.B.X trunk circuit of Fig. 4.

Previously, she could hold the entire connection all the way back to the calling P.B.X line circuit.

Assuming now that the calling P.B.X line circuit 34 does not disconnect and that the desired conversation is completed, certain of the release operations will be described. If, at the completion of the conversation, the party at line circuit 34 of Fig. 35 hangs up first the same circuit release functions will take place in the trunk circuit of Figs. 4 and 5 and in the crossbar switch network as was described immediately above: then, when the central office circuit is broken down, by the release of the called party in this instance, the opening of the tip and ring loop from the central office would cause the release of relay H in Fig. 4 which in turn causes relay CT of Fig. 4 to release to in turn release relay SRT of Fig. 4, thereby causing the lamp TL1–0 at the cordless position circuit of Fig. 39 to go dark and to return the entire P.B.X situation to normal. If the called party at the central office should disconnect first, the tip and ring loop thereto from the right-hand side of Fig. 4 will be opened, thereby causing the release of the supervisory relay S in the trunk circuit of Fig. 4 to initiate the same series of operations for completely releasing the trunk circuit of Figs. 4 and 5 as well as the hold magnet connections through the crossbar switch network of the P.B.X, relay H of Fig. 4 in this particular instance not being enabled to operate because of the open tip and ring loop to the central office, thereby permitting relays H, CT and SRT of Fig. 4 also to release and to stay released.

(H) INCOMING CENTRAL OFFICE TRUNK

Any call incoming to the P.B.X from a central office will necessarily come in over one of the central office trunks shown in Figs. 4, 5, 9 and 43, such as central office trunk 0 shown in detail in Figs. 4 and 5. Incoming central office trunk calls must be answered by the P.B.X attendant who will thereupon, in accordance with the instructions from the calling end, complete the desired connection within the P.B.X or through the P.B.X over a tie line or another central office trunk. A call incoming to the P.B.X could be effected by one of the situations as shown in the central office skeletonized layout of Fig. 31A, namely from a local central office subscriber or from some operator in the central office. Since lines from central offices to a P.B.X (even though they take place over what are designated central office trunks) have terminations in the central office which look just like subscribers lines and will undoubtedly be in the usual P.B.X hunting group, upon tht dialing of a P.B.X directory number one of a number of hunting group lines to the P.B.X will be seized depending upon which one is available. Since the P.B.X termination in the central office appears as a subscriber's line circuit, once it has been seized the trunk to the P.B.X will carry a ringing signal from the central office as an indication to the P.B.X that a call is incoming thereto.

*To attendant*

One of two conditions prevail when the central office trunk is seized at the central office on a call incoming to the P.B.X. One condition is when the seizure is effected during the silent interval of the ringing cycle and the second condition is when the seizure takes place during the ringing interval. During the silent interval of the ringing cycle or during the ringing interval thereof, no matter which, the direct current battery loop from the central office into Fig. 4 and over the tip and ring leads T and R to the central office trunk circuit of Fig. 4 will cause the operation of relay H in Fig. 4 in an obvious circuit over this tip and ring loop under control of break contact 2 of relay S1T. During the ringing cycle not only will relay H operate but also the ringing relay R of Fig. 4 will operate due to the alternating current component in the ringing signal. With relay H or relay R operated, obvious circuits in Fig. 4 are completed over their respective make contacts 1 and 4 for causing the operation of the cut-through relay CT which, upon operating, causes the operation of relay SRT in Fig. 4 and extends the tip and ring leads T and R from the central office in Fig. 4 through respective make contacts 6 and 8 of relay CT, and break contacts 6 and 8 of relay FF, into the central office trunk circuit 0 of Fig. 4. Relay SRT of Fig. 4, in operating, completes a circuit in Fig. 5 from ground over its make contact 10 to the IT90 lead to make the trunk circuit busy to the marker, and at break contact 10 of relay SRT in Fig. 5 the circuit for operating the marker connector relay MC is opened. Also, relay SRT, in operating, completes a circuit in the upper center part of Fig. 5 over its make contact 6A for supplying off-normal ground to the trunk circuit. Relay SRT, in operating, causes the steady lighting of the trunk lamp TL1–0 of Fig. 39 in a circuit extending from battery in the upper right-hand corner of Fig. 5, over break contact 2 of relay HD, make contact 12 of relay SRT, break contact 3 of relay R1T, and through resistance TL2 to conductor TL1–0 extending into Fig. 39 and to ground through lamp TL1–0, which thereupon lights steadily. The operation of the ring relay R of Fig. 4 completes a circuit in Fig. 5 for causing the operation of the ringing auxiliary relay R1T, the circuit extending in the upper center part of Fig. 5 from ground, over make contact 6A of relay SRT, thence over break contacts 6 and 4 of relays HD and AC, break contact 3 of relay TLAT, make contact 6 of relay R, to battery through the winding of relay R1T, which thereupon operates and locks over its own make contact 5 and break contact 4 of relay S1T to off-normal ground. Relay R1T, in operating, changes the steady lighting of lamp TL1–0 of Fig. 39 to a flashing lamp, flashing at the rate of 120 interruptions-per-minute in a circuit extending from this interrupter in Fig. 5, over conductor FF1, thence over make contact 3 of relay R1T, through resistance TL2 to conductor TL1–0 extending into the cordless position circuit of Fig. 39 to lamp TL1–0 and completes a circuit in Fig. 4 for causing the ringer of the attendant position in Fig. 39 to operate extending from conductor CR in Fig. 4, over make contact 1 of relay R1T, to conductor BZ extending into Fig. 39 and thence through condenser BZ and the ringer Ring, to ground over a break contact of the AUD SIG key and a make contact of the B jack. The flashing of lamp TL1–0 of Fig. 39 at a rate of 120 interruptions-per-minute and the ringing of the ringer Ring are indications to the P.B.X attendant that an incoming call needs to be answered on the trunk circuit 0 of Figs. 4 and 5.

To answer the incoming call the attendant operates the pick-up key associated with this trunk and which connects her to the calling party at the central office. The attendant may then hold the connection, connect the calling party to a line within the P.B.X, or disconnect, depending upon the situation. If the call is to be held the attendant operates the hold key in the cordless position circuit and then releases the trunk pick-up key. This places a holding bridge across the line towards the central office and disconnects the attendant from the call so that she may proceed with other business. If the call is to be disconnected the attendant merely releases the pick-up key, disengaging herself from the trunk. If the call is to be extended to a line within the P.B.X the attendant will place a hold condition on the trunk circuit back to the central office and then will steer into the P.B.X by means of the line circuit termination of the central office trunk and effect connection to the desired P.B.X party, whereupon she will complete the connection therefrom back to the central office end of the central office trunk and release from the connection.

The P.B.X attendant answers the incoming call by operating the pick-up key associated with the altered trunk lamp, such as by operating pick-up key 4 associated with the trunk circuit of Figs. 4 and 5 which in turn corresponds to the trunk lamp TL1–0 of Fig. 39. With pick-up key 4 operated, as has been explained in detail hereinbefore, the connector relays AC and of Fig. 4 are operated and break contacts 3 and 9 of relay AC in Fig. 4 open the connection between the trunk and the line end of central office trunk 0, and relay ACAT connects the attendant's telephone circuit shown in Fig. 38 over conductors TT and TR into Fig. 4, and over make contacts of relay ACAT to the trunk end of the connection leading back to the central office, thereby causing the operation of the supervisory relay S of Fig. 4, the operation of which causes the operation in Fig. 4 of relay S1T, the interconnection of the operator's telephone circuit back over the trunk circuit to the central office tripping the ringing condition in the central office in a well known manner. Relay S1T of Fig. 4, in operating, causes the release of relay H in Fig. 4 and permits the release of the ringing auxiliary relay R1T of Fig. 5 as soon as the ringing cycle is over with, and thereby to permit the release of the ringing relay R of Fig. 4. The release of relay R1T stops the ringing of the attendant ringer Ring of Fig. 39 and, by means of its break contact 3 in the upper right-hand corner of Fig. 5, changes the lamp indication to a steady battery condition on lamp TL1–0 of Fig. 39. Relay ACAT of Fig. 4, in operating, causes the operation of relay AC in Fig. 4. In the meantime, a locking circuit is provided for cut-through relay CT of Fig. 4 extending from battery, through the winding of relay CT, over break contact 4 of relay P and make contacts 4, 4 and 1 of relays CT, SRT and S1T to ground.

It may very well be that the call so far described may end with the P.B.X attendant, under such cricumstances for example as those under which the calling party from the central office may merely be requesting information from the P.B.X attendant. Under these circumstances, at the completion of this service operation, the attendant may release from the connection by releasing the trunk pick-up key, which releases all of the relays in the trunk circuit except for relay H of Fig. 4 (which will be held as long as the central office loop is closed), for cut-through relay CT of Fig. 4, and for relay SRT of Fig. 4, all of which will release when the central office connection is released.

*Hold condition on trunk*

In the event that the incoming central office call is intended to be terminated in a line circuit of the P.B.X, such as a P.B.X station or a tie line, etc. it will be necessary for the P.B.X attendant to place a hold condition on the central office end of the trunk of Fig. 4, then to steer into the P.B.X circuit to make connection over the line side of the trunk of Fig. 4 to a dial pulse register, dial the necessary digits into the register, thereby to effect a connection between the attendant telephone circuit of Fig. 38 and the desired called P.B.X line circuit. Subsequent to this, the attendant will announce the call and release from the connection leaving the called P.B.X line circuit connected with the calling party at the central office through the trunk circuit of Fig. 4. As has been described in detail hereinbefore in connection with a call from a P.B.X line circuit to a central office through the assistance of the P.B.X attendant, the attendant causes a hold condition to be placed on the trunk of the central office end of the trunk circuit of Fig. 4 by a momentary operation of her hold key shown in Fig. 39, which causes the operation of relay HP in Fig. 39. The operation of relay HP operates the hold relay HD in the trunk circuit of Fig. 5 which in turn causes the operation in Fig. 39 of the splitting relay SP in the cordless position circuit. The operation of the splitting relay SP places a holding short across the trunk side of the circuit in Fig. 4 (across the tip and ring conductors TT and TR from the cordless position circuit) and leaves the attendant telephone circuit connected across the line side of the trunk circuit of Fig. 4 by means of tip and ring leads LT and LR extending between Fig. 38 and Fig. 4. Upon release of the hold key of Fig. 39, relay HP in Fig. 39 restores to normal, preparing locking grounds for the hold and the class relays HD and TLAT of Fig. 5 by means of leads H and HG extending between Figs. 39 and 5, and transmits marker start ground over leads TR0 and U0 of Fig. 5 from the cordless position circuit conductors T and U of Fig. 39.

Having been called for by the central office trunk circuit, the marker functions to connect the trunk circuit to a dial pulse register in the manner previously described. The end result of this operation is the connection of the tip, ring and sleeve conductors T, R and S in the upper left-hand corner of Fig. 4 to the tip, ring and sleeve conductors, such as conductors T, R and S in the upper left-hand corner of Fig. 18, of a dial pulse register, over for instance the lower half of level 9 of the crossbar switches comprising tip, ring and sleeve conductors T09, R09 and S09 extending throughout Figs. 3, 23, 27, 34 and 42 into Fig. 46. This crossbar connection will be under the control of the operated hold magnet THM00 of Fig. 3 and hold magnets THM08 and THM09 also of Fig. 3, as has been described in detail hereinbefore.

*Connection to P.B.X line*

It will be assumed that the desired connection is to P.B.X line circuit 33 of Fig. 35 thereby requiring the dialing by the P.B.X attendant into dial pulse register 0 of Figs. 14, 18 and 19 of the digits 33. The reason why line circuit 33 of Fig. 35 has been chosen as an illustration will be apparent by reference to Fig. 20 where on the punching sheet it is noticed that line circuit 33, corresponding to conductor H33, is not arranged to hunt to any other line circuit. This will permit a description of the situation whereby if this particular line circuit is busy, a camp-on condition can be set up from the trunk circuit of Figs. 4 and 5.

When the digits 33 have been registered in the dial pulse register of Figs. 14, 18 and 19, the register will bid for the services of a marker, will inform the marker of the class of the call, which in this particular instance is a central office trunk class of call, the class relay COT of Fig. 14 having been operated from the class of service circuit in Fig. 25, as explained hereinbefore, and will cause the marker to test the called line circuit 33 of Fig. 35 to ascertain whether or not it is available for connection. It will be recalled from previous description that under these circumstances the tens connector relays TCS3 etc. of Fig. 12 will be operated, as well as the units selection relay U3 of Fig. 15, whereupon the lower winding of sleeve relay S3 of Fig. 30 will be connected to the sleeve conductor S33 of line circuit 33 in Fig. 35 to ascertain whether or not it is available. If line circuit 33 is available the lower winding of the sleeve relay S3 of Fig. 30 will operate in series with the line hold magnet LHM 33 (not shown in Fig. 35), the hold magnet itself not operating in this circuit. Following this action, as has also been described in detail hereinbefore, the marker will proceed to operate the appropriate select magnets on switches 0 and 3 of Figs. 3 and 34 whereby the line side of the trunk circuit of Fig. 4 (associated with trunk hold magnet THM00 of Fig. 3) is interconnected with the tip, ring and sleeve conductors of line circuit 33 in Fig. 35 over the same link used for the dial tone job, namely the lower half of level 9 comprising tip, ring and sleeve conductors T09, R09 and S09.

Incident to completing this connection the marker causes the operation in the trunk circuit of Fig. 5 of the ringing start relay RS in a circuit extending from ground in Fig. 26, over make contact 10 of relay RPA0, parallel make contacts 12 of the hold magnet timing relays HMTBA and HMTAA, through break contacts 8 of relays TKA8, TKA9 and TKA0, to conductor RSE extending into Fig. 5, over make contact 12 of the operated marker connector relay MC, to battery through the winding of the ringing start relay RS, which thereupon operates and locks over break contact 5 of relay RTT and make contact 5 of relay RS, over make contact 15 of relay ACAT, to ground on conductor H from the cordless position circuit of Fig. 39.

Subsequently, upon the release of the marker after it is satisfied that the connection between the line side of the trunk of Fig. 4 and P.B.X line circuit 33 is being held from ground on the sleeve leads S from the trunk circuit in Fig. 4, the marker connector MC of Fig. 5 is released. When relay MC is released ringing current is transmitted to the station line 33 of Fig. 35 through the primary winding of relay RTT in a circuit extending in Fig. 4 from ground to the tip side of the connection over make contact 10 of relay RS and break contact 7 of relay BY, thence over the tip-ring loop to the calling line circuit 33 of Fig. 35, back over the ring lead R into Fig. 4, over break contact 6 of relay BY, make contact 2 of relay RS, break contact 10 of relay DR, through the left-hand winding of relay RTT, and over break contact 7 of the relay MC to the ringing conductor R1 into the ring generator. In Fig. 4 condenser FB in the left-hand side of the trunk circuit provides audible ringing feedback to the attendant as an indication that the line is being rung.

As long as the attendant remains on the connection during the establishment of a call the transmission path between the station line and the central office remains split. If the attendant releases from the connection immediately after dialing, when the station line is rung, ringing induction is returned to the central office. The release of pick-up key 4 by the P.B.X attendant in the cordless position circuit of Figs. 38 and 39 causes the release in Fig. 4 of the attendant connector relays AC and ACAT, and the release of connector AC connects the trunk side of the circuit of Fig. 4 through to the line side. However, the solid short across the trunk side due to the operation in Fig. 39 of the splitting relay SP remains until relay ACAT releases. When the splitting relay SP of Fig. 39 releases, the splitting short is removed, establishing the transmission path between the trunk and line sides of the central office trunk circuit of Fig. 4. Thus, when the hold relay HD of Fig. 4 is released, due to the operation previously described of the ringing start relay RS of Fig. 5, the central office will hear ringing induction.

When the party at station line circuit 33 of Fig. 35 answers the ring this causes the operation in Fig. 4 of the ringing trip relay RTT by closing a direct current loop at the line circuit 33, as compared to the alternating current loop existing thereat for ringing purposes previously described. Relay RTT of Fig. 4 operates in this direct current loop through its left-hand winding. Relay RTT, in operating, completes a locking circuit through its right-hand winding, over its own make contact 12, to conductor CL extending into Fig. 5 and thence to the locking ground supplied by break contact 5 of relay AC in the event that the attendant has disconnected, or to the ground on conductor H from the cordless position circuit of Fig. 39 in the event that the attendant connector ACAT is still operated. Relay RTT, in operating, causes the release of the ringing start relay RS. The call is now extended from either the attendant or the central office to the line circuit 33 depending upon whether the attendant has disconnected previous to the answer by station 33, and all of the lamp indications in the cordless position circuit of Fig. 39 are steady indications.

If, after dialing by the attendant is completed and the dial pulse register 0 of Figs. 14, 18 and 19 engages the marker to terminate the call, the marker finds the called P.B.X station 33 of Fig. 35 busy, a camp-on condition is established and the marker then releases. The feature of camp-on enables the central office trunk circuit to connect an identifying circuit to the link on which the busy called station line is engaged, which identifying circuit awaits the disconnect of the initial connection at which time the trunk circuit cuts the tip and ring leads through to the line and rings the station. This action is is accomplished without any aid from the attendant other than initially dialing the requested station number. When the trunk circuit camps on the busy station line the attendant will receive an audible busy tone signal if she remains on the connection after dialing, and the visual signal of lamp SL1–0 will change to an interrupted signal of 60 interruptions-per-minute. If the attendant releases immediately after dialing, only the visual indication of camp-on is transmitted to the attendant position. On the other hand, if the attendant remains on the connection until busy tone is returned she must release the pick-up key in order to remove the splitting condition of the trunk and she must notify the central office that the line is camped on. If the calling party will wait, the attendant releases from the connection and when the station line becomes idle, the trunk circuit will ring to establish the desired connection.

If the called station, such as line circuit 33 of Fig. 35, is busy when the marker tests to determine what state the line is in, it causes the operation of the camp-on relays CONA etc., CONB etc. of Fig. 8, exactly as described hereinbefore in connection with a no-test call-back condition, whereby the attendant attempts to place a call back to an onhook P.B.X line circuit which previously had requested the completion of a central office call. Upon the operation in the trunk circuit of Fig. 5 of the marker connector relay MC, a circuit is completed between Figs. 26 and 5 for causing the operation in the trunk circuit of Fig. 5 of the busy relay BY. This circuit extends from ground in Fig. 26, over the parallel make contacts 2 and 12 of relays COB and COA, over break contact 3 of relay NT, to conductor BYE extending into Fig. 5, thence over make contact 6 of relay MC, to battery through the winding of relay BY, which thereupon operates and causes the operation in Fig. 4 of relay DR in an obvious circuit from ground, over make contact 1 of relay S and make contact 12 of relay BY, to ground through the winding of relay DR. The operation of relay DR opens the ringing lead to the line side of the trunk circuit of Fig. 4 so that ringing current will not be transmitted to the station line as long as the trunk is camped on. The operation of relay BY also causes the release in Fig. 5 of the sleeve relay SL, preparing a sensing circuit to indicate when the called station line 33 becomes idle. Relay BY, in operating, also completes a circuit for supplying busy tone to the P.B.X attendant, the circuit extending from busy tone in Fig. 4, over break contact 10 of relay FF, make contact 10 of relay BY, make contact 14 of relay ACAT, to conductor BT extending into Figs. 39 and 38 to indicate to the P.B.X attendant that the called line circuit is busy. Relay BY, in operating, also causes the station lamp SL1–0 of Fig. 39 to flash at a 60 i.p.m. rate as a visual indication of a busy condition. This circuit extends in Fig. 5 from the 60 i.p.m interrupter, over conductor F1, make contact 5 of relay BY, break contact 4 of relay FF, make contact 3 of relay HM, resistance SL2, to conductor SL1–0 extending into Fig. 39.

As has been described in detail hereinbefore in connection with the discussion of a no-test call-back condition, relay HM and hold magnet THM00 of Fig. 5 are controlled from the marker when the marker is connected to the trunk circuit. During the process of marker functioning for a camp-on call, the camp-on relays CONA, CONB, etc. of Fig. 8 release, causing the release of relay HM and hold magnet THM00 of Fig. 5, since the control of the operating circuits for this relay and hold magnet are over conductor ME in Fig. 5 from the line and trunk hunting circuit of Fig. 29 of the marker. The trunk circuit is thus free from its originating link connection (the one on which the dial pulse register is still connected) and the marker then functions to operate the select magnet for the link on which the busy station line is connected. When the select magnet timing relays SMTA and SMTB of Fig. 37 operate, ground is transmitted from Fig. 29 on conductor ME into Fig. 5 on conductor ME, thereby reoperating relay HM and the trunk hold magnet THM00 to thereby connect the line side of the trunk circuit to the busy link.

When the hold magnet timing relays HMTAA and HMTBA of Fig. 7 operate in the marker, as previously described, ring start ground is transmitted over the RSE lead into Fig. 5 to operate the ring start relay RS, which in operating, causes the release of the hold relay HD of the trunk circuit in Fig. 5, which changes the trunk TL1–0 lamp indication of Fig. 39 from 30 interruptions-per-minute to a steady indication and changes the line lamp SL1–0 from 30 to 60 interrupted flashes per minute. Having completed the connecting functions, the marker releases, restoring the hold magnet control to the central office trunk circuit, having alerted the attendant of the camp-on condition visually by the 60 i.p.m. flashing signal on lamp SL1–0 of Fig. 39 and audibly by means of busy tone through her telephone circuit.

Having received the camp-on indication, the attendant releases the pick-up key associated with this particular trunk, thereby releasing relays AC and ACAT of Fig. 4. Relay AC, in releasing, closes the trunk side of the circuit of Fig. 4 through to the line side. The splitting relay SP and the feed back relay FB in the cordless position circuit of Fig. 39 are released upon the release of relay ACAT of Fig. 4. Upon the release of relay FB of Fig. 39, busy tone is removed from the attendant's telephone circuit and the attendant may now reoperate the pick-up key which then again causes the operation of relays ACAT and AC of Fig. 4 placing the attendant telephone circuit across the trunk conductors TT and TR into Fig. 4 onto the trunk side of the circuit so she can then notify the central office party of the camp-on condition.

When relays BY and RS of Fig. 5 operated, as explained above, a sensing circuit was established on the sleeve lead S of the line side of the trunk connection to determine when the station line becomes idle. Relay SL of Fig. 5 is connected in a circuit consisting of resistors PD and SH in the central office trunk circuit of Fig. 5, the line hold magnet LHM33 (not shown in Fig. 35), and the low impedance sleeve resistor connected to the sleeve conductor in the circuit engaged with the busy line 33. During camp-on, the potential across the winding of relay SL of Fig. 5 is insufficient to operate it. As soon as the initially engaged connection releases and the low impedance sleeve holding ground is removed from the sleeve lead thereof, the winding of relay SL of Fig. 5 is placed in series with the line hold magnet LHM33 (not shown in Fig. 35). The potential across the winding of relay SL then becomes great enough to operate it, thereby to cause the release of the busy relay BY of Fig. 5. When relay BY releases, the signal to the line lamp SL1–0 of Fig. 39 is changed from 60 i.p.m. to 30 i.p.m., resistor SH in the upper left-hand corner of Fig. 5 is connected to the sleeve lead S to hold the line hold magnet LHM33 (not shown in Fig. 35) operated, and the tip and ring leads T and R from the trunk circuit of Fig. 5 are closed through to the link, placing relay DR of Fig. 4 in series with the ring side of the connection. If the called station at line circuit 33 of Fig. 35 remains off-hook after relay BY of Fig. 5 releases, relay DR remains operated in a circuit extending in Fig. 4 from battery, through the winding of relay DR, over make contact 10 of relay DR, and make contact 2 of relay RS, thence over the ring and tip loop through the off-hook instrument at line circuit 33, back to ringing ground in Fig. 4 over make contact 10 of relay RS, thereby preventing ringing current from being applied to the line.

When the called P.B.X station at line circuit 33 goes on-hook, relay DR of Fig. 4 will release, thereby establishing the ringing path through the left-hand winding of relay RTT of Fig. 4 to the ring side of the line. When the station answers, relay RTT operates and locks in a previously described circuit through its right-hand winding. Relay RTT, in operating, causes the release of relay RS of Fig. 5, which then changes the condition of lamp SL1–0 of Fig. 39 from an interrupted rate of 30 i.p.m. to steady battery condition.

If, after dialing is completed by the attendant and the dial pulse register engages the marker to terminate the call, the marker finds the called station line already camped on, a camp-on-busy situation is established and the marker releases. Instead of the attendant receiving busy tone and a flashing condition on lamp SL1–0 of Fig. 39 at a rate of 60 i.p.m.'s, this lamp will flash at a rate of 120 i.p.m. and she receives busy tone interrupted at this rate of 120 i.p.m. This camp-on busy indication means that the call can proceed no further, so under these circumstances the attendant operates the hold key to discharge the call and to reconnect herself to the central office end of the trunk circuit to notify the calling party of the busy condition. If the conditions for camp-on busy exist when the marker tests to see what state the called line is in, it causes the camp-on relays CONA, CONB, of Fig. 8 to operate. When the marker connector relay MC of Fig. 5 operates, ground is transmitted, as previously explained, from Fig. 26 into Fig. 5 to cause the operation of the busy relay BY of the trunk circuit of Fig. 5. In the process of link testing, as has been explained in detail hereinbefore, the marker places a solid ground on the sleeve lead of the busy called line. When this test ground is applied, the potential on the sleeve lead of the central office trunk circuit in the upper left-hand corner of Fig. 4 rises approximately 5 volts. Since the central office trunk circuit that is already camped on the busy station is monitoring the sleeve lead, when this potential change occurs it causes the F diode in the camped-on trunk circuit to become forward biased. This F diode is similar to the F diode shown in connection with trunk circuit 0 of Fig. 5. The forward bias on the F diode causes current to flow through the F diode and places a virtual ground on the CW lead extending into the link test circuit of Fig. 47, thence over the parallel make contacts 4 of relays COAA and COBA, through the winding of the camp-on-stop relay COS, and through the parallel make contacts 17 of relays COBA and COAA to the junction of resistances COSA and COSB, comprising a potentiometer extending between ground and negative battery. The operation of the camp-on-stop relay COS of Fig. 47 causes the operation in the trunk circuit of relay FF in Fig. 4 in a circuit extending from ground in Fig. 26, over the parallel make contacts 1 and 4 of relays COSB and COSA, through break contacts 7 of relays HMTAA and HMTBA, to conductor FFE extending into Fig. 4, and to battery through the winding of relay FF, which thereupon operates and locks to ground over make contact 1 of relay SRT, its own make contact 1, and make contact 1 of the operated busy relay BY. Relay FF of Fig. 4, in operating, causes the operation of relay DR in Fig. 4 in an obvious manner, opens the sleeve lead S in Fig. 5 by means of its break contact 7, and causes the line lamp SL1–0 of Fig. 39 to flash at a rate of 120 i.p.m. in a circuit extending in Fig. 5 from this signal on conductor FF1, through make contacts 8 and 4 of relays DR and FF, thence over make contact 3 of relay HM to the previously described circuit for controlling lamp SL1–0 of Fig. 39. The operation of relay FF also supplies a 120 i.p.m tone signal to the P.B.X attendant as an audible indication to further indicate that the trunk cannot camp-on this call. This circuit extends from the 120 i.p.m. tone signal in Fig. 4, over the FT lead, through make contacts 10, 10 and 14 of respective relays FF, BY and ACAT, to the busy tone lead BT extending into the cordless position circuit of Figs. 39 and 38. Furthermore, because of the 120 i.p.m. flashing and audible tones to the P.B.X attendant, the attendant knows that a camp-on busy condition has been met. The attendant will therefore disconnect the line side of the call and will reenter the central office end of the call to inform the calling party to disconnect. To accomplish this the attendant reoperates the hold key in Fig. 39, thereby causing the operation of relay HP in Fig. 39. Relay HP, in operating, causes the release of the hold relay HD in Fig. 5, which in turn causes the TL1–0 lamp of Fig. 39 to change from a flashing rate of 30 i.p.m. to a steady condition, releases the splitting relay SP of Fig. 39, and connects the attendant's telephone circuit of Fig. 38 across the trunk end of the central office trunk circuit. As long as the hold key of Fig. 39 is held operated, relay HM and the trunk hold magnet THM00 of Fig. 5 are held operated from ground on conductor HM extending from Fig. 39 into Fig. 5. When the hold key of Fig. 39 is released, relay HP in Fig. 39 releases, thereby removing the holding ground from the relay HM and hold magnet THM00 of Fig. 5. Thus, the attendant is again connected to the central office end of the trunk circuit of Fig. 4 and the called line is disconnected.

*Connection to another trunk circuit*

If the code dialed by the attendant in response to the incoming call is a tie trunk code (tens digit 8), when the marker connector relay MC of Fig. 5 operates to terminate the call, the dial pulse register transmits a ground through the marker to operate the relay TTT in Fig. 5 of the central office trunk circuit. As will be recalled, in the dial pulse register circuit of Fig. 19, upon the dialing of a tens digit of 8, relay TRR was operated, thereby causing the operation in Fig. 14 of relay TTR, which in turn extends a ground from Fig. 14, over its make contact 3, to conductor TR10 into Fig. 26, thence through make contact 6 of relay RCB0, to conductor TTE extending into Fig. 5, over make contact 3 of relay MC, and break contact 11 of relay HD, to battery through the winding of relay TTT, which thereupon operates and locks over its own make contact 1, to the holding ground over break contact 5 of relay AC if the attendant has released from the connection, or to ground on conductor H extending into Fig. 39 in the event that the attendant is still connected to the circuit. Relay TTT, in operating, causes the trunk lamp TL1–0 of Fig. 39 to light steadily and causes lamp SL1–0 of Fig. 39 to flash at a rate of 30 i.p.m., prevents the operation of the feed battery relay FB of Fig. 39 in the cordless position circuit, thereby preventing battery from being supplied to the circuit from the cordless position, inductively couples the line and trunk sides of the central office trunk circuit of Fig. 4 through inductor H and make contacts 10 and 6 of relay TTT, and prevents the release of the hold relay HD of Fig. 5. When the tie trunk answers, it reverses battery and ground over the tip and ring loop, as previously explained, to provide supervision to the central office trunk circuit. The reversed battery operates relay P of Fig. 4, which then supervises the connection and causes the operation in Fig. 4 of relay RTT in a circuit extending from the locking ground of relay TTT in Fig. 5, over conductor CL into Fig. 4, over make contact 2 of relay TTT, make contact 9 of relay P, and break contact 11 of relay MC, to battery through the right-hand winding of relay RTT, which thereupon operates and locks over its make contact 12 independently of the contacts of relays MC, P and TTT.

When the tie trunk disconnects momentarily or permanently, relay P of Fig. 4 releases, in turn restoring relay S of Fig. 4 to normal and the central office trunk circuit then goes into a recall or disconnect condition depending upon the duration of the disconnect of the tie trunk. If relay P of Fig. 4 is reoperated immediately upon releasing, the attendant is alerted to a recall condition. Upon the disconnection of either the tie trunk or a P.B.X station line, relay S of Fig. 4 will release either under the control of the loop through the station line circuit or under the control of relay P of Fig. 4. When relay S releases as the switch hook is depressed, ground is supplied to operate relay FF in an obvious manner through operated relays SRT and RTT in Fig. 4. Relay FF of Fig. 4 releases relay S1T of Fig. 4, which then releases unoperated connector relay AC of Fig. 4, bridges its make contacts 6 and 8 in the upper part of Fig. 4 around the contacts 6 and 8 of the cut through relay CT, and places a low resistance holding bridge across the central office tip and ring. The release of relay S of Fig. 4 releases relay S1T of Fig. 4 which then releases the cut through relay CT. Relay SRT of Fig. 4 begins to release when relay CT releases. If the switch hook is reoperated at the P.B.X line or tie trunk circuit, relay S of Fig. 4 reoperates, in turn reoperating relays S1T and DR of Fig. 4. Relay S1T, in reoperating, causes the reoperation of relay CT through the operated make contact 3 of relay FF. Relay CT, in reoperating, reestablishes the energizing path for the winding of relay SRT in Fig. 4. Thus, as long as relay CT can be reoperated before relay SRT releases the switch hook signal actuates a recall condition. However, if relay SRT releases before the cut through relay CT is reoperated due to switch hook reoperation, the central office trunk circuit disconnects. When relay DR of Fig. 4 operates, the SL1–0 lamp signal of Fig. 39 is changed to a flashing rate of 120 i.p.m. and the cordless position circuit ringer is operated steadily. The attendant recognizes the flashing station lamp and steady ringer as a recall and then reoperates the pick-up key associated with this central office trunk to answer the recall condition. When the pick-up key is operated, relays ACAT and AC of Fig. 4 operate, thereby removing the locking path for relay FF, which releases. Relay FF, in releasing in Fig. 4, removes the low resistance bridge from the central office tip and ring conductors, releases relay DR of Fig. 4, changes the SL1–0 lamp indication of Fig. 39 to a steady condition, and silences the ringer in the cordless position circuit.

(I) MISCELLANEOUS CALL FEATURES

*Busy trunks and busy links*

If all of the trunks in a desired group or a single trunk if it is not in a hunting group are or is busy, the line and trunk hunting circuit will direct the route control circuit of the marker to complete the call to the busy tone trunk substantially in the same manner as for a station busy condition.

If all of the links through the crossbar switch network are busy when the marker attempts to connect a calling station line or trunk to a dial pulse register, the link test circuit of Figs. 46, 47 and 48 will instruct the units selection circuit of Figs. 15, 16 and 17 to abandon the call. The operation of the all links busy relays ALBA and ALBB of Fig. 47 causes the operation in Fig. 17 of the abandoned call relays ACA and ACB, which in turn cause the operation in Fig. 7 of the marker release relays RLA, RLB, etc. This marker action will be repeated on successive calls until a link does become idle.

If all of the links in the crossbar switch network are busy when the marker tries to complete a call after dialing, the link test circuit signals the route control circuit of Figs. 7 and 8 to complete the call to a busy tone trunk substantially in the same manner as described previously for a station busy condition and the link which is used for this busy tone trunk connection will be the same one that had been used to connect the calling line or trunk to the dial pulse register for the dial tone job. In this instance, the busy tone connections BTTA and BTTB are operated by the operation of the all links busy relays ALBA and ALBB of Fig. 47.

*Intercepted calls*

Description has been provided hereinbefore of the manner in which an intercept situation can be caused by a restricted P.B.X line attempting to dial a trunk code from which it is restricted. A similar intercept situation can be caused by the dialing of an unassigned station line or trunk code or by a time out condition in the dial pulse register such as might be caused by a permanent signal condition on a line. Upon seizure under such conditions, the marker will attempt to complete the call but on finding certain relays unoperated will release the link test portion of the circuit and will connect the call on an intercept basis to the attendant trunk and thereby provide the attendant with an indication, over lamps in the cordless position circuit of Fig. 39 associated with the seized attendant trunk, of the fact that the attendant trunk has on it a call routed to the attendant because of an intercept situation.

*Night operation*

Hereinbefore reference has been made to the alarm transfer and test circuitry of Figs. 35 and 36, whereby upon the operation of the night key Night in the cordless position circuit of Fig. 39, relays AT and ATA of Fig. 35 are released, thereby extending directly over four of the central office trunks, four of the line circuits 30 through 33 of Fig. 35 so that access can be obtained from the P.B.X directly to a central office without the necessity of an attendant being present. As has been explained hereinbefore, these four line circuits 30 through 33 of Fig. 35 are each provided with a start key, such as the key ST0 of line circuit 30 in Fig. 35, since in order to bring in central office dial tone on outgoing calls the start key must be depressed by the caller. After receiving dial tone from the central office under these circumstances, the key may be released and dialing may proceed from one of these four stations directly into the central office.

*Irregular operation*

A number of situations may arise in the operation of the various circuits of the P.B.X which represent non-standard or irregular circuit conditions. A number of those will be described briefly hereinafter such as abandoned calls, dial pulse register time out conditions, preliminary pulse conditions in the dial pulse register, and marker time out operations.

If a station line or trunk starts to make a call and then disconnects before the marker can connect it to a dial pulse register, an abandoned call condition is presented to the marker. The marker proceeds normally up to the point of units selection but since the calling line is already disconnected no units selection relay can be operated; therefore, the units selection circuit signals the route control circuit of the marker to release. If such an abandonment occurs after the marker has connected to the dial pulse register and after the dial pulse reigster has called for a marker, but before the call is completed, the marker advance, time-out, and release circuit of Fig. 44 advances to a no-connection condition, as has been described in detail hereinbefore, whereupon the marker restores to normal.

In order that a dial pulse register will not be permanently engaged on a line off-hook condition or by incomplete dialing, a timing circuit operates on every dial pulse register seizure. This is to insure that suitable terminating action occurs to release the dial pulse register within a certain period of time. The timing circuit comprises two relays, such as relays PU and TMOR of Fig. 18, which are controlled by timed pulses from a timing circuit. On a normal call the timing starts as soon as dial tone is transmitted to the calling line. The operation of the dial for the first digit stops this timing and restarts it after the first digit has been dialed. Completion of dialing also retimes the register. If a dial pulse register has been allotted to a calling line and no dialing action takes place within the timing interval, the marker is instructed to connect the call to an attendant trunk on an intercept basis. If only the first digit of a directing code is dialed and the timing circuit completes its cycle, a partial dial condition exists. Under this condition the dialed digit is translated in the dial pulse register to the attendant code digit 0 and the marker is instructed to set up the call to an attendant trunk on an intercept basis. If for some reason the register is not released by the marker upon completion of its functions, the register times itself out and releases. Under a situation where all of the attendant trunks may be busy the marker will complete an intercept call to the busy tone trunk. If the busy tone trunk is also busy, the marker will set the dial pulse register circuit to return busy tone over the connection. If the station continues to remain off-hook the register will again time out and release. Waiting calls will then be served by the dial pulse register and then the permanent signal line will again be connected to a register, whereupon this action will continue until an intercept trunk becomes idle or the busy tone trunk becomes idle. If a station line or tie trunk remains off-hook after being connected to a central office which has disconnected, the line or trunk will be connected to a dial pulse register and will be handled as a permanent signal condition. Also, if a station line or tie trunk remains off-hook after being connected to another station line or tie trunk, and that other end has disconnected, no alarm is given and the permanent signal line or trunk remains busy to all other calls.

Since the single digit 1 is not assigned as a tens digit and since means must be provided for eliminating single pulses due to accidental momentary line opens as might be caused by faulty removal of the hand set from the cradle, etc., the dial pulse circuit registers are designed to refuse registration of a tens digit of 1 and to continue furnishing dial tone to the calling line circuit. This particular situation has been mentioned hereinbefore in connection with the operation of relay P2A of Fig. 18.

Various marker time-out situations will occur such as second trial, no connection, trouble release, down-check and time-out check. As soon as the marker is seized, the advance, time-out, and release circuit of Fig. 44 starts timing the marker. If the route control circuit of Figs. 7 and 8 has not released the marker within a given time interval, the advance, time-out, and release circuit advances the marker to a second trial. The marker is restored to its call start condition and the sequence circuits of the line and trunk hunting and select magnet control circuits are advanced so that alternate circuitry is preferred on the second trial. If the marker is unable to complete a connection on the second trial before the advance, time-out, and release circuit functions the second time, the marker is restored to normal and the route control circuit is directed to complete the call to the busy tone trunk. If the marker is unable to complete a call to the busy tone trunk before the advance, time-out, and release circuit functions for a third time, the marker is released from the call and the call is locked out of the marker until all other calls within the preference arrangement have been served. The down-check circuit of Fig. 50 checks that all circuits of the marker have released before the advance, time-out, and release circuit of Fig. 44 is allowed to remove the release condition. The down-check circuit also guards the release relays of Fig. 7 from being falsely operated. The time-out check circuit of Fig. 50 checks the advance, time-out, and release circuit of Fig. 44 every time the marker completes a call to the busy tone trunk. When the marker becomes idle after completing such a call, the time-out check circuit holds the marker busy, and exercises and checks the advance, time-out, and release circuit as has been described in detail hereinbefore. After completing its check the time-out circuit releases the marker and locks itself out of that connection until the busy tone trunk has been reused.

*Traffic and trouble indications*

Certain traffic and trouble indications are built into the P.B.X used as an exemplary embodiment herein, such as traffic overflow registers, traffic peg count registers, trouble peg count registers, and various trouble alarm situations.

The traffic register circuit shown in the lower part of Fig. 13 includes traffic overflow registers as well as traffic peg count registers and trouble peg count registers. The traffic overflow registers of Fig. 13 are as follows: ROF (dial pulse register overflow), LOF (link overflow), BTOF (busy tone overflow), JOF (junctor overflow), OF8 (trunk group 8 overflow), OF9 (trunk group 9 overflow), and OF0 (trunk group 0 overflow). These circuits register the number of calls which overflow from an all busy condition on dial pulse registers, on links, to busy tone trunks, to junctors, and to trunk codes 8, 9 and 0. The operation of these registers is controlled by the marker and the registers will score each time a call cannot be completed due to an all busy condition. In Fig. 13 the traffic peg count registers are JPC (junctor peg count), BTPC (busy tone trunk peg count), TPC8, TPC9 and TPC0 (terminating peg count registers for trunk groups 8, 9 and 0), OPC8 and OPC9 (originating peg count registers for trunk groups 8 and 9), and OPC and TPC (respectively originating and terminating total peg count registers). These circuits register the number of calls handled by the junctors, the busy tone trunk, and the trunk groups 8, 9 and 0. Two types of registers are provided: terminating peg count and originating peg count. The terminating peg count registers 8, 9 and 0 are operated each time a call is terminated from the P.B.X to a particular trunk group. An originating peg count register is operated on each call originated by station lines of the P.B.X. A terminating peg count register is also provided to record each call terminated to the P.B.X from trunks. The operation of these registers is controlled by the marker with the exception of the originating count registers 8 and 9, which are controlled by the marker and the dial pulse registers. The trouble peg count registers of Fig. 13 are STPC (second trial), NCPC (no connection), TRPC (trouble release), and TOPC (time out). These circuits record the number of times that troubles cause abnormal behavior on the part of the marker. If the marker cannot complete a call on the first trial because of trouble, a second trial is automatically made. If the marker cannot complete the call on the second trial, it is automatically released from the call and allowed to serve other waiting calls before returning to the instant call. After a call has been served and no other calls are waiting, the marker automatically checks its time-out circuits which control the second trials and trouble releasing. These circuits will again be checked following any call which is terminated to the busy tone trunk when no other calls are waiting. The time-out peg count register records the number of times that the marker checks these time-out circuits. Each of the trouble registers is advanced once each time that the marker checks its time-out circuits. Therefore, the number of second trials, no connections, and trouble releases experienced is determined by subtracting the reading of the time out peg count register from each of the readings on the trouble registers. These registers are controlled by the marker as is the case with most of the other traffic registers.

A trouble alarm lamp TR in Fig. 35 is provided in the P.B.X attendant equipment to furnish a visual signal which is common to all alarm conditions for the P.B.X. This lamp TR is under control of the alarm, transfer, interrupter and test circuit of Figs. 35 and 36. The marker alarm circuits are arranged to detect any irregularities in the marker operation. Dual operating paths in the marker are checked by alarm relays so that a failure of one of the paths to operate or to release along with the other one will be detected. The marker is so arranged that it will continue to process calls with one of its dual paths not operated; however, the alarm relays and their associated lamps will assist in locating trouble conditions. The alarm, transfer, interrupter, and test circuit of Figs. 35 and 36 provides alarm indications to the attendant and/or to the central office when trouble arises in the P.B.X. The circuit automatically transfers four stations lines directly to the central office trunk conductors in the event of a power failure which, as will be apparent in Fig. 35, will cause the release of the relays AT and ATA. The circuit also provides test line leads (designated T and R in the right center portion of Fig. 35) and a high resistance test battery (indicated to the right thereof) for the purposes of applying a number of tests over line circuit 39. Certain relays in this alarm, transfer, and interrupter circuit are normally held operated, as has been explained hereinbefore, and are released only under trouble conditions. When a fuse operates in any of the P.B.X power distribution circuits, an indicating lamp lights to indicate the nature of the trouble. These lamps are shown in Figs. 35 and 36. In the event of a commercial power failure, or in the event that the P.B.X is not equipped with standby batteries, all relays release and the line to trunk transfer situation takes place automatically in Figs. 35 and 36, as has been explained hereinbefore; and, the closing of break contacts 8 and 10 of relay TR provides an alarm condition to the central office. Should the marker encounter trouble of the type that operates the marker alarm relays, a trouble signal is sent to the alarm circuit. If the trouble persists, successive trouble signals will occur. The alarm circuit counts these trouble signals and weighs them against the number of marker seizures. An alarm is operated only if two trouble signals are transmitted before two calls have been completed from a dial pulse register. This latter conditional requirement may mean a maximum of five marker functions. When the alarm operates, the marker trouble lamps lock-in a permanent indication of the trouble location. To extinguish the lamps, the trouble has to be cleared and the alarm circuits reset. Permanent signals are normally routed to the P.B.X attendants, except at unattended P.B.X's. In these latter cases, the attendant trunk functions as a permanent signal holding trunk. When a dial pulse register times out due to line trouble or to incomplete dialing, the call is routed to the attendant trunk which thereupon starts the permanent signal timing circuit, which in turn transmits a minor alarm to the central office if the condition persists for over a designated period of time, such as 20 minutes.

*P.B.X attendant line circuit*

It will be apparent with reference to the attendant's cordless position circuit of Figs. 38 and 39 that in Fig. 38 pick-up key 14 is associated with line circuit 79, and that by operating pick-up key 14, the P.B.X attendant may connect her telephone circuit over the make contacts thereof to the tip and ring conductors T and R of line circuit 79 in Fig. 38. By means of this facility the P.B.X attendant may place calls within the P.B.X just as any other P.B.X line circuit could; and, providing the line circuit 79 has its class of service terminal in Fig. 20 (associated with conductor CS79) suitably cross connected to permit that class of call, the P.B.X attendant may have a class of restricted, toll denied, or toll allowed, with all of the ramifications associated therewith, as have been discussed hereinbefore in connection with other P.B.X lines having similar classes of service.

*Loudspeaker paging trunk*

With reference to Fig. 31 a loudspeaker paging trunk circuit is shown in the lower left-hand corner of the figure, associated with line circuit 25. Line circuit 25 is similar in all respects to line circuit 26 of Fig. 31 with respect to its seizure and the operation of its hold magnets, etc. with two notable exceptions. Line circuits 25 of Fig. 31 does not have any line relay, etc. since no calls will be placed from the loudspeaker paging trunk into the P.B.X. It will be noted that in Fig. 31 the conductor IT85, leaving line circuit 25 and extending to the line and trunk hunting circuit of Fig. 33, is extended over a break contact 8 of relay AP in the loudspeaker paging trunk. Also, the line circuit 25 of Fig. 31 will have no relay IN25 corresponding to relay IN26 of line circuit 26 for the same reason as mentioned above, namely, that no call can be placed inward to the P.B.X from this line circuit. Consequently, there will be no sleeve conductor S25 corresponding to conductor S26 for line circuit 26, whereby line circuit 25 could be seized on a call of digits 25.

If a P.B.X station desires to be connected to the paging trunk, the station originates a call and dials the code assigned to the paging trunk, namely, code 85. The P.B.X marker functions to connect the calling station to the paging trunk on a trunk class basis (without a junctor circuit), the tens connector relays of Fig. 12, namely, relays TK8, TKA8 and TKB8 being operated due to the registration in a dial pulse register of the tens digit of 8 and a units selection relay U5 of Fig. 16 being operated as a result of the registration of the units digit 5 in a dial pulse register. A circuit extends from ground in Fig. 33, through the lower winding of sleeve relay S5, over make contact 5 of relay U5, to conductor 5, extending over make contact 7 of relay TK8, to conductor IT85 extending into Fig. 31 to line circuit 25 associated with the loudspeaker paging trunk. If the loudspeaker paging trunk is engaged at the moment, its relay AP will be operated, whereupon ground will appear on conductor IT85 in Fig. 31 over make contact 8 of relay AP. Therefore, the sleeve relay S5 of Fig. 33 will not be able to operate and the calling P.B.X party will be routed to a busy tone condition, as has been explained hereinbefore. On the other hand, if the loudspeaker paging trunk is idle, conductor IT85 of Fig. 31 will extend over break contact 8 of relay AP, to battery through the winding of relay OT25. If the loudspeaker paging trunk is presently engaged in a call involving the line circuit 25, relay OT25 will be operated and will be held operated in a circuit extending from ground in Fig. 31, over make contacts 4 and 5 of relays AP and OT25, to battery through the winding of relay OT25 whereupon, if such is the case, ground will appear on the lower part of the winding of relay OT25, thereby to prevent the operation of sleeve relay S5 of Fig. 33. If line circuit 25 is not engaged at the moment, the sleeve relay S5 will find a circuit to battery through the winding of relay OT25 and will operate in series with this relay, relay OT25 not operating in this series circuit. Subsequently, relay S5 will remain locked operated in a circuit previously described through its upper winding, and ground will be applied to conductor 5 in Fig. 33 for hold magnet operation, this ground extending over make contact 7 of relay TK8 in Fig. 33, to conductor IT85 extending into Fig. 31, and over the circuit previously described to the lower part of the winding of relay OT25, which thereupon operates and causes the operation of line hold magnet LHM25 in an obvious circuit over make contact 4 of relay OT25. The operation of line hold magnet LHM25 and of relay OT25 extends the tip and ring conductors from Fig. 27 into the line circuit 25 of Fig. 31, thence over make contacts 2 and 3 of relay OT25, to the tip and ring conductors T2 and R2 extending into the loudspeaker paging trunk.

In the meantime, upon the operation of relay TKB8 of Fig. 12, the select magnet connector relay SMC2 of Fig. 37 is operated in an obvious manner over make contact 2 of relay TKB8. The operation of the select magnet connector SMC2, in a manner hereinbefore described in detail, causes the operation on switch 2 of Fig. 27 of suitable select magnets corresponding to the link previously used by the calling P.B.X party for the dial tone job, whereby the tip, ring and sleeve conductors of line circuit 25 of Fig. 31 are connected (upon the operation of line hold magnet LHM25) to this link and thence back to the tip, ring and sleeve conductors of the calling P.B.X line circuit. In Fig. 31, upon the operation of relay OT25, a low impedance holding ground is applied from ground, through resistance S25 in Fig. 31, and over make contact 1 of relay OT25, to the sleeve conductor S extending back over the crossbar link to hold operated the hold magnet associated with the calling P.B.X line circuit. Relay AP in the loudspeaker paging trunk of Fig. 31 operates in an obvious fashion through its two windings over the tip and ring loop back to the calling P.B.X line circuit and, in operating, applies a locking ground through its make contact 4, and make contact 5 of relay OT25 to hold operated relay OT25; and, at its make and break contacts 8, relay AP opens the conductor IT85 extending to the winding of relay OT25 and applies a ground to this conductor leading back into the marker circuit to make the loudspeaker paging trunk busy to the marker. Relay AP, by opening break contact 6, connects the tip and ring conductors T2 and R2 through respective condensers T and R to the loudspeaker paging equipment, whereby the calling P.B.X line may then make whatever announcement is necessary over this loudspeaker paging equipment. At the conclusion of the use of the loudspeaker paging trunk of Fig. 31, upon the disconnection by the calling P.B.X party line, the tip and ring loop is opened, thereby releasing relay AP in Fig. 31, which in turn reconnects resistance A in shunt of the input of the loudspeaker paging equipment, causes the release of relay OT25 which in turn causes the release of hold magnet LHM25 and the hold magnet of the calling P.B.X line circuit, and reconnects the conductor IT85 in Fig. 31 through to the winding of relay OT25, making line circuit 25 again available to be seized by another calling P.B.X line circuit.

If some P.B.X line circuit party should, by mistake, dial the digits 25, thereby intending to make connection with line circuit 25 of Fig. 31, the call will be routed to the P.B.X attendant by means of an attendant trunk circuit such as the one shown in Fig. 9. This action will take place due to the fact that conductor S25 extending from the line and trunk hunting circuit of Fig. 33 into Fig. 31 is not connected into line circuit 25. Under these circumstances, the marker would proceed to test the line circuit 25 in response to the digits 25, just as though it were going to complete the call; however, when the lower winding of relay S5 is extended over conductor 5 in Fig. 33, and over make contact 7 of relay TM2 to conductor S25 leading into Fig. 31, relay S5 of Fig. 33 could not operate. This is an indication to the marker of a busy condition of line circuit 25 of Fig. 31, as has been explained hereinbefore. The marker would then proceed through the action, hereinbefore described, of operating the busy relays of Fig. 32, followed by the operation of the hunt connector relays of Fig. 29; and, since conductor H25 extending from Fig. 16 into the punching sheet of Fig. 20 would have the terminal corresponding thereto not connected to any other terminal, no other units relays in the units selection circuits of Figs. 15, 16 and 17 would be operated, which would of course prevent the operation of any of the other sleeve relays of Figs. 30 and 33. Normally, under these circumstances, a legitimate busy line circuit 25 would be indicated; however, when the hold magnet check relays HMKA and HMKB of Fig. 29 are extended in circuits over contacts of the sleeve relays (sleeve relay S5 having been operated in the meantime over its upper winding) to the conductor S25 extending into Fig. 31, relays HMKA and HMKB of Fig. 29 would not operate, thereby failing to give a proper check of an operated hold magnet for line circuit 25. In Fig. 8, as has been explained hereinbefore, if the check relays HMKA and HMKB had operated under these circumstances to indicate a true busy condition on line circuit 25, the busy tone relays BTTA and BTTB of Fig. 8 would have operated resulting in the interconnection of the calling P.B.X line circuit with the busy tone trunk of Fig. 13.

Under the present circumstances, circuits are completed in Fig. 8 for causing the operation of the intercept connector relays ICTA and ICTB, the circuit for relay ICTA extending in Fig. 8 from ground over make contacts 1 and 8 of relays SOA and SMRAA, break contacts 5 and 9 of relays HMKA and HMKB, break contact 2 of relay NCA, through the winding of relay ICTA, break contact 2 of relay NCB, to battery over break contact 8 of relay HMKA and make contacts 10 and 12 of relays SEAA and SOA. A similar circuit is provided in Fig. 8 for causing the operation of relay ICTB in an obvious fashion. Relays ICTA and ICTB lock in circuits under control of their own make contacts 6 and 12 and make contacts 7, 8, 15 and 16 of relay RPAO (assuming that dial pulse register 0 of Figs. 14, 18 and 19 is used in this particular connection). Upon the operation of the intercept connector relays ICTA and ICTB of Fig. 8, the marker goes through a complete releasing cycle just as it did in the previously-described instance of a busy tone trunk connection except that when relay RCE0 of Fig. 12 and relays TRKA and TRKB of Fig. 41 are released, with relays TRCAA and TRCBA of Fig. 41 operated, a circuit is completed in Fig. 12 for causing the operation of the tens connector relays TK0, TKA0 and TKB0. This circuit extends from ground in Fig. 12, over the parallel make contacts 2 of relays ICTA and ICTB, break contacts 8 of relays RCE0 and RCE1, through the windings of the tens connector relays TK0, TKA0 and TKB0, over break contacts 11 of relays TRKA and TRKB, over the parallel make contacts 8 of relays TRCAA and TRCBA, to battery over the parallel make contacts 8 of relays ICTA and ICTB. Also, in Fig. 15, upon the operation of relays ICTA and ICTB, circuits are completed for causing the operation of units selection relays U0, U1 and U2 corresponding to the three attendant trunk circuits 0 of Fig. 43, 1 of Fig. 9, and 2 of Fig. 13. This circuit extends from ground in the lower part of Fig. 15, over the parallel make contacts 4 of relays ICTA and ICTB, and thence over respective contacts 2, 1 and 3 of relay TKA0 and respective make contacts 2, 1 and 3 of relay RUCB to cause the operation of units selection relays U1, U0, and U2. Now, with the operation of the tens connector relays TK0, etc. of Fig. 12 and units relays U0, U1, and U2 of Fig. 15, the tens and units selection circuits are in the same condition that they were in under the previously-described situation where a calling P.B.X partly dialed the digit 0 to make connection with the attendant over an attendant trunk. The further action of the circuits whereby the calling P.B.X party is connected to an attendant over an attendant trunk, such as attendant trunk 1 of Fig. 9, has been described hereinbefore and it is not necessary to repeat these details. It is to be noted that this intercept condition was caused by an open sleeve conductor S25 in line circuit 25 of Fig. 31. It will be appreciated that any such open sleeve conductor of any line circuit in the P.B.X will cause a similar intercept condition.

*Conference call*

A dial conference circuit is shown in the lower half of Fig. 28 having five appearances corresponding to five line circuits 20 through 24, whereby a conference may be effected between up to five P.B.X line circuits or between three P.B.X line circuits and two central office trunks. A conference is set up by the calling parties involved dialing this circuit at the same time. In response to the dialed number the dial pulse register and the marker circuit function to connect each line and trunk to a different appearance of the conference circuit. As each calling party is connected to this circuit a talking path is established to all others already connected.

To reach the conference circuit of Fig. 28 in this P.B.X, while line circuits 20 through 24 are respectively assigned terminal numbers 80 through 84, as shown on the punching sheet of Fig. 20, the parties on station lines must dial 80 while those on trunks should dial 83. If more than three parties on station lines dial 80, the fourth and fifth station lines will be connected to the trunk terminating line circuit appearances of the conference circuit. However, if more than two parties on trunks dial 83, the third trunk will not be connected and will receive busy tone. If a party on a trunk dials the station code 80 instead of the trunk code 83, the most favorable transmission condition may not be obtained. The transmission circuits for station lines are in series and those for trunks are in parallel, to equalize the transmission. As each station or trunk disconnects, it will be released from the conference circuit.

When a P.B.X station line desires to be connected to the conference circuit of Fig. 28 the P.B.X party will dial 80, whereupon, due to the presence of the tens digit 8, the dial pulse register will recognize this code as equivalent to a tie trunk code and will signal the marker to connect the calling station to the line circuit appearance of the conference circuit designated by the dialed digits 80 in accordance with the operation of the tens connector relays TK8, etc. of Fig. 12 and of the units selection relay U0 of Fig. 15. The marker tests line circuit 20 of Fig. 28 by extending ground through the lower winding of relay S0 in Fig. 30, thence over make contact 12 of relay U0, to conductor 0, over make contact 1 of relay TK8, to conductor IT80 leading into Fig. 28 to the lower side of the winding of relay OT20. If the conference appearance corresponding to line circuit 20 of Fig. 28 is idle, the marker will proceed to cause the operation of relay OT20 in Fig. 28, which in turn, over its make contact 4, operates the line hold magnet LHM20 corresponding to the line circuit 20, thereby to cut through the tip and ring conductors of this conference appearance to the crossbar switch network and back to the calling P.B.X party over the link which was used by that party on the dial tone job. Relay ACC of the dial conference circuit will be operated in the tip and ring loop back to the calling P.B.X station and the operation of relay ACC applies ground over its make contact 6 to the sleeve conductor S2 to hold operated relay OT20, which in turn, over its make contact 1, applies a holding ground back to the sleeve conductor S into the switching network to hold operated the line hold magnet of the P.B.X line connected to this particular dial conference circuit appearance. Relay ACC, in operating, also opens at its break contacts 10 the low impedance circuit across the lower windings of its transmission transformer and causes the operation of the reversing relay RVC in the lower right-hand corner of Fig. 28 over make contact 8 of relay ACC. The next two P.B.X calling parties will likewise be connected to the next two dial conference appearances corresponding to line circuits 21 and 22 in Fig. 28. It will be noted, with reference to the punching sheet of Fig. 20, that although these additional P.B.X parties also dial the digits 80, when the marker ascertains that line circuit 20 is already busy, the previously-described line hunting arrangement will be brought into operation whereby the grounding of conductor H80 extending from Fig. 15, into Fig. 20 will ground conductors H81 and H82 leading back into Fig. 15 to cause the operation of units relays U1 and U2, of which, due to the ararngement in Fig. 30 of sleeve relays S1 and S2, line circuit 21 is preferred over line circuit 22. Therefore, the second P.B.X party to call will be connected to the conference appearance corresponding to line circuit 21 of Fig. 28 and the third P.B.X party who calls the dial conference circuit will similarly be connected to line circuit 22 in Fig. 28 due to the line hunting feature embodied in the cross connections in the punching sheet of Fig. 20. The dial conference appearances corresponding to line circuits 21 and 22, when connected to a calling P.B.X line, will operate their corresponding relays, such as relays BC and CC, which accomplish similar functions as previously described with respect to relay ACC.

While it will be obvious that a fourth and a fifth P.B.X line circuit may effect connection to line circuits 23 and 24, terminating the fourth and fifth appearances of the dial conference circuit, due to the fact that the diodes DCA and DCB in Fig. 20 are connected between terminals corresponding to conductors H80, H81 and H82 and terminals corresponding to conductors H83 and H84 in their low impedance direction, thereby permitting hunting from line H80 to H83 or H84, these two line appearances 23 and 24 are primarily provided for the purpose of enabling two incoming central office trunk calls to be terminated in this dial conference circuit. When an incoming trunk desires to be connected to the conference circuit the attendant will be called in on the call, as is the case with all incoming central office calls, and she will dial the digits 83, whereupon the dial pulse register and marker circuit operate to connect the incoming trunk to line circuit appearance 23 if idle, or to line circuit 24 appearance, if line circuit 23 appearance is busy. In this respect it will be noted, in connection with the punching sheet of Fig. 20, that calling code 83, while it may be permitted to hunt to conductor H84, is not permitted to hunt to any of the conductors H80, H81 and H82 because of the reverse bias condition of diodes DCA and DCB, as has been explained hereinbefore. Therefore, while a P.B.X station may effect a connection to one of the two conference appearances corresponding to line circuits 23 and 24, an incoming central office trunk cannot cause interconnection between itself and the conference appearances corresponding to line circuits 20, 21 and 22.

When the marker effects the connection between the incoming trunk circuit and line circuits 23 or 24 in Fig. 28, a loop is closed over the switching apparatus for causing the operation of relay DCC or relay EC, as the case may be, the operation of which applies a ground over its make contact 6 back over the sleeve conductor S2 to hold the connection; and, by virtue of their break contacts 10, relays DCC and EC open the shunt across the talking circuit involving condensers T1, T2, R1 and R2, whereby these two conference appearances corresponding to line circuits 23 and 24 are placed in parallel. The operation of the reversing relay RVC of Fig. 28, upon the seizure by a P.B.X line circuit of one of the three appearances corresponding to the line circuits 20, 21 and 22, causes the well-known battery reversal back over the tip and ring leads T2 and R2 to the incoming trunk circuit for providing thereto answer supervision.

When a station line or a trunk disconnects after having been connected to the conference circuit of Fig. 28, the corresponding relay ACC, BC, CC, DCC, or EC releases, removing holding ground from the corresponding sleeve conductor and allowing the connection to release, thereby restoring the shunt conditions across the transmission circuits and, with respect to the relays ACC, BC and CC, causing the release of the reversing relay RVC, which again causes disconnect supervision to be transmitted back to the connected central office trunk by battery and ground reversal.

It is to be understood that the above-described arrangements are merely illustrative of the application of the principles of the invention. Numerous other arrangements may be devised by those skilled in the art without departing from the spirit and scope of the invention.

What is claimed is:

1. A switching arrangement comprising: a coordinate switch including a plurality of horizontal utility conductor links and a plurality of vertical utility conductor links, said vertical utility links overlying said horizontal utility links at crosspoints corresponding to respective vertical and horizontal coordinates thereof, and switch control means selectively operable to interconnect at the crosspoint thereof a selected pair of vertical and horizontal links; a separate horizontal control conductor link corresponding to each horizontal utility link; a separate vertical control conductor link overlying said horizontal control links at crosspoints corresponding to respective vertical and horizontal coordinates thereof; and, circuits controlled by the said selective operation of said switch control means to interconnect at the crosspoint thereof said vertical control link with the horizontal control link corresponding to the horizontal utility link of said selected pair.

2. A switching arrangement comprising: a coordinate switch including a plurality of continuous horizontal utility conductor links and a plurality of continuous vertical utility conductor links, said vertical utility links overlying said horizontal utility links at crosspoints corresponding to respective vertical and horizontal coordinates thereof, and switch control means selectively operable to interconnect at the crosspoint thereof a selected pair of vertical and horizontal links, said control means including selecting means operable to condition a selected horizontal utility link for interconnection with any vertical utility link and holding means operable to effect and to hold said utility link interconnection and thereafter to effect the release of said selecting means, whereby said utility link interconnection is held by the operation of said holding means; a separate continuous horizontal control conductor link corresponding to each horizontal utility link; a separate continuous vertical control conductor link overlying said horizontal control links at crosspoints corresponding to respective vertical and horizontal coordinates thereof; and circuits controlled by the said selective operation of said switch control means to interconnect at the crosspoint thereof said vertical control link with the horizontal control link corresponding to the horizontal utility link of said selected pair, said circuits including selecting means operable to condition for interconnection with said vertical control link the horizontal control link corresponding to said selected horizontal utility link and including holding means operable to effect and to hold said control link interconnection.

3. A switching arrangement comprising: a coordinate switch including a plurality of continuous horizontal utility conductor links and a plurality of continuous vertical utility conductor links, said vertical utility links overlying said horizontal utility links at crosspoints corresponding to respective vertical and horizontal coordinates thereof, and switch control means selectively operable to interconnect at the crosspoint thereof a selected pair of vertical and horizontal links, said control means including a select magnet corresponding to each horizontal utility link and operable one at a time to condition the corresponding selected horizontal utility link for interconnection with any vertical utility link and including a utility hold magnet corresponding to each vertical utility link and operable to effect and to hold said utility link interconnection and thereafter to effect the release of said one select magnet, whereby said utility link interconnection is held by the operation of said utility hold magnet; a separate continuous horizontal control conductor link on said switch and corresponding to each horizontal utility link; a separate continuous vertical control conductor link on said switch and overlying said horizontal control links at crosspoints corresponding to respective vertical and horizontal coordinates thereof; and circuits controlled by the said selective operation of said switch control means to interconnect at the crosspoint thereof said vertical control link with the horizontal control link corresponding to the horizontal utility link of said selected pair, said circuits including said one select magnet and including a control hold magnet corresponding to said vertical control link and operable at substantially the same time as said utility hold magent to effect and to hold said control link interconnection.

4. The invention claimed in claim 3 wherein said circuits include means whereby said utility hold magent and said control hold magnet are operable in parallel; wherein said horizontal control links and said vertical control link are interconnected with said switch control means; and wherein said switch control means includes means controlled by virtue of the control crosspoint interconnection for ascertaining the horizontal utility link in use.

5. The invention claimed in claim 4 wherein the said interconnection of said horizontal control links with said switch control means comprises a plurality of conductors selectively energizable in a different manner for each different horizontal control link; wherein the said interconnection of said vertical control link with said switch control means comprises energizing circuitry common to said horizontal control links; and wherein said ascertaining means comprises means for causing said energizing circuitry to energize said plurality of conductors selectively according to the interconnected control crosspoint and means responsive to the selective energization of said plurality of conductors to identify the horizontal utility link in use.

6. A switching arrangement comprising: a coordinate switch including a plurality of horizontal utility conductor links and a plurality of vertical utility conductor links, said vertical utility links overlying said horizontal utility links at crosspoints corresponding to respective vertical and horizontal coordinates thereof, first means selectively operable to select a horizontal utility link for use, second means selectively operable subsequent to the operation of said first means to interconnect at the crosspoint thereof a particular vertical utility link and said selected horizontal utility link; a separate horizontal control conductor link on said switch and corresponding to each horizontal utility link; a separate vertical control link on said switch and individual to said particular vertical utility link; and, third means effective incident to the said selective operation of said second means to interconnect said vertical control link with the horizontal control link corresponding to said selected horizontal utility link.

7. The invention claimed in claim 6 wherein said first means comprises an electromechanical selector operable in a different manner for each different horizontal utility link to be selected for use; wherein said second means comprises a variably operable electromechanical actuator operable in a particular manner to affect the said particular utility link interconnection; and, wherein said third means comprises a special electromechanical actuator operable under the control of said particular operation of said second means.

8. The invention claimed in claim 7 wherein said selector comprises a set of select magnets; wherein said variably operable actuator comprises a set of regular hold magnets; and, wherein said special actuator comprises a special hold magnet.

9. The invention claimed in claim 8 wherein each horizontal utility link selection is effected by a different selective operation of said set of select magnets; wherein said particular utility link connection is effected by the operation of a particular regular hold magnet subsequent to the said select magnet operation; and wherein said control link connection is effected by the operation of said special hold magnet subsequent to the same said select magnet operation.

10. The invention claimed in claim 9 wherein a common operating circuit is provided for said particular regular hold magnet and said special hold magnet whereby they are operated substantially at the same time.

11. The invention claimed in claim 10 wherein said coordinate switch comprises a crossbar switch having its links arranged in rectangular coordinates; wherein each vertical utility link is controlled by a separate said regular hold magnet; wherein said particular vertical utility link is controlled by said particular regular hold magnet; wherein said vertical control link is controlled by said special hold magnet; and wherein said particular regular hold magnet and said special hold magnet are arranged in parallel with respect to the operating circuit common thereto.

12. The invention claimed in claim 11 wherein said horizontal control links have connected thereto a signal circuit; wherein said vertical control link has connected thereto a signaling circuit; and, wherein said signaling circuit is interconnected with said signal circuit differently and selectively for each different control link connection effected, whereby each different such signal-signaling interconnection comprises identification of the horizontal utility link involved in a said particular utility link interconnection.

13. A switching arrangement comprising: a plurality of crossbar switches, each switch including an equal plurality of horizontal utility conductor sets and a plurality of vertical utility conductor links, the said horizontal utility sets and vertical utility links of each switch arranged in overlying rectangular coordinate relationship, corresponding horizontal utility sets of respective switches being connected in series relationship throughout all of said switches to form a plurality of continuous horizontal utility links common to all vertical utility links of all switches; a plurality of utility circuits at least a different one of which is terminated in each switch in a utility vertical thereof individual to said one circuit; at least one of said switches including a plurality of horizontal control conductor sets corresponding to but separate and disconnected from said plurality of horizontal utility sets and including a vertical control conductor link overlying said horizontal control sets at vertical coordinates corresponding to said horizontal utility links; each switch having a select magnet individual to each horizontal utility link and a work hold magnet individual to each vertical utility link; the said one switch having its select magnets also individual respectively to each corresponding horizontal control set and memory hold magnet individual to said vertical control link; a control circuit terminating in a vertical utility link of said one switch and in said vertical control link of said one switch; common control means effective to interconnect over an idle horizontal utility link any one utility circuit with the vertical utility link termination of said control circuit; said control means comprising select magnet operating means for selectively operating on each switch terminating said interconnected one utility and control circuits the select magnets corresponding to said idle horizontal utility link and comprising hold magnet operating means for thereafter operating the work hold magnets individual to the said one utility and control circuit vertical utility link terminations and comprising select magnet releasing means for thereafter releasing the operated select magnets thereby to accomplish the said interconnection over said idle horizontal utility link taken into use; said hold magnet operating means also effective concurrently with its operation of said work hold magnets to operate said memory hold magnet thereby to interconnect the said vertical control link with the horizontal control set corresponding to said horizontal utility link taken into use; said horizontal control sets connected to said common control select magnet operating means; a signal source in said control circuit and connected to said vertical control link for selectively energizing said horizontal control sets according to the horizontal utility link taken into use; said common control means operative under the control of said selective energization of said horizontal control sets to interconnect any other utility circuit with said one utility circuit over the same said horizontal utility link taken into reuse and to disconnect said control circuit therefrom; said select magnet and hold magnet operating means operative incident to the latter link-reuse operation of said common control means to operate on the switch terminating said other utility circuit the work hold magnet individual thereto and the select magnet corresponding to the said horizontal utility link taken into reuse.

14. The invention defined in claim 13 wherein each horizontal utility link is identifiable by a two-digit number individual thereto and consisting of a tens and a units digit, wherein said select magnets are identifiable by the same said numbers of horizontal utility links corresponding thereto, wherein each horizontal control set consists of a different one of ten conductors representing digits zero through nine, wherein said vertical control link consists of two signal conductors, wherein said signal source consists of means for applying ground to said signal conductors, wherein sets of crosspoint contacts are provided at the vertical coordinates of said vertical control link, and wherein said ten conductors and said two signal conductors are selectively wired to said contacts whereby the said two signal conductors when grounded will ground two of said ten conductors through a set of crosspoint contacts according to the number of the horizontal utility links in use.

15. The invention defined in claim 14 wherein sixteen horizontal utility links are provided numbered 02 through 09 and 12 through 19, wherein said two signal conductors represent respectively a tens digit and a units digit, wherein conductors 0 and 1 of said ten conductors are selectively grounded one at a time under the control of said tens digit signal conductor, and wherein conductors 2 through 9 of said ten conductors are selectively grounded one at a time under the control of said units digit signal conductor.

16. The invention defined in claim 15 wherein said common control means includes switch identifying means for ascertaining the switch terminating said other utility circuit, wherein said select magnet operating means includes means jointly controlled by said switch identifying means and by the selective grounding of said ten conductors for operating on said identified switch the select magnet numbered according to the selective grounding of said ten conductors and wherein said hold magnet operating means includes means controlled by said switch identifying means for thereafter operating the work hold magnet individual to said other utility circuit.

References Cited in the file of this patent

UNITED STATES PATENTS

| | | |
|---|---|---|
| 2,588,052 | Shepherd | Mar. 4, 1952 |
| 2,758,157 | Gohorel | Aug. 7, 1956 |
| 2,826,640 | Williford | Mar. 11, 1958 |